(12) United States Patent
Frantzen et al.

(10) Patent No.: US 10,291,645 B1
(45) Date of Patent: May 14, 2019

(54) DETERMINING MALICIOUSNESS IN COMPUTER NETWORKS

(71) Applicant: Kudu Dynamics LLC, Chantilly, VA (US)

(72) Inventors: Mike Frantzen, Catharpin, VA (US); Andrew Aarne Hendela, Annandale, VA (US); Bryan Hafen Leavitt, Westerville, OH (US)

(73) Assignee: KUDU DYNAMICS LLC, Chantilly, VA (US)

( * ) Notice: Subject to any disclaimer, the term of this patent is extended or adjusted under 35 U.S.C. 154(b) by 0 days.

(21) Appl. No.: 16/029,964

(22) Filed: Jul. 9, 2018

(51) Int. Cl.
*H04L 29/06* (2006.01)
*G06F 21/55* (2013.01)
*G06F 21/00* (2013.01)
*G06F 21/56* (2013.01)

(52) U.S. Cl.
CPC .......... *H04L 63/1433* (2013.01); *H04L 63/00* (2013.01); *H04L 63/14* (2013.01); *H04L 63/145* (2013.01); *H04L 63/1441* (2013.01); *H04L 63/20* (2013.01); *H04L 63/302* (2013.01); *G06F 21/00* (2013.01); *G06F 21/55* (2013.01); *G06F 21/552* (2013.01); *G06F 21/554* (2013.01); *G06F 21/56* (2013.01)

(58) Field of Classification Search
CPC ..... H04L 63/00; H04L 63/14; H04L 63/1408; H04L 63/1433; H04L 63/1441; H04L 63/145; H04L 63/20; H04L 63/302; G06F 21/00; G06F 21/55; G06F 21/552; G06F 21/554; G06F 21/56
USPC ..................................................... 726/24, 25
See application file for complete search history.

(56) References Cited

U.S. PATENT DOCUMENTS

| | | | |
|---|---|---|---|
| 7,352,280 B1 * | 4/2008 | Rockwood | G06F 21/55 340/521 |
| 2003/0236995 A1 * | 12/2003 | Fretwell, Jr. | H04L 63/1416 726/25 |
| 2015/0215334 A1 * | 7/2015 | Bingham | G06N 99/005 726/23 |

* cited by examiner

*Primary Examiner* — Yogesh Paliwal
(74) *Attorney, Agent, or Firm* — Jeremy C. Doerre; Chad D. Tillman; Tillman Wright, PLLC

(57) ABSTRACT

A computer implemented method provides a technical solution to the technical problem of detecting and preventing malicious activity in a computer network, the technical solution involving calculating, based on hypergraph data, a maliciousness value indicating a likelihood of association of one or more nodes of the hypergraph with a known malicious actor, and programmatically performing, based on the calculated maliciousness value, one or more actions by a computer system designed to ensure security of the computer system.

20 Claims, 192 Drawing Sheets

| Node | | |
|---|---|---|
| Type | IPAddress | |
| Value | 208.93.64.251 | |
| Link | nodeRef(IPAddress:206.45.48.10) | |
| Link | | nodeRef(jDbAccount:jdoe) |

FIG. 4

| Node | |
|---|---|
| ID | 1b342c457f213f |
| Type | IPAddress |
| Value | 208.93.64.251 |
| Link | 0a457f01def473 |
| Link | 1b342c457f213c |

FIG. 5

| | Node | |
|---|---|---|
| ID | 1b342c457f213f | |
| Type | IPAddress | |
| Value | 208.93.64.251 | |
| Links | List<nodeRef> links | |

*FIG. 6*

```
public class node { public string id;
    public nodeType type;
    public string value;
    public List<nodeRef> links;
    public int hypergraphId;

public node(nodeType t, string v) {
        id = hypergraphFinder.findNewId(hypergraphId);
        type = t;
        value = v;
    } public void addLink(string anId) {
        nodeType t;
        string v;
        hypergraphFinder.findTypeAndVal(hypergraphId, anId, ref t, ref v);
        links.Add(new nodeRef(anId, t, v));
    } public void addLink(nodeType t, string v) {
        string anId;
        hypergraphFinder.findId(hypergraphId, ref anId, t, v);
        links.Add(new nodeRef(anId, t, v));
    }

```
public class nodeRef {
    public string id;
    public nodeType type;
    public string value;

public nodeRef(string i, nodeType t, string v) {
        id = i;
        type = t;
        value = v;
    }
    ...
}
```

FIG. 8

```
public static class hypergraphFinder { public static List<hypergraph> theHypergraphs;

...

public static void findTypeAndVal(int hId, string linkId, ref nodeType theType, ref string theVal) {
        int anIndex = theHypergraphs[hId].nodes.FindIndex(node x => x.id.Equals(linkId));
        theType = theHypergraphs[hId].nodes[anIndex].type;
        theVal = theHypergraphs[hId].nodes[anIndex].value;
    } public static void findId(int hId, ref string linkId, nodeType theType, string theVal) {
        int anIndex = theHypergraphs[hId].nodes.FindIndex(node x => (x.type.Equals(theType) && x.value.Equals(theVal)) );
        linkId = theHypergraphs[hId].nodes[anIndex].id;
    }

| Node | |
|---|---|
| Type | IPAddress |
| Value | 206.45.48.10 |
| Link | nodeRef(IPAddress:208.93.64.251) |
| Link | nodeRef(jDatabase:mContainer) |

FIG. 10

| Node | |
|---|---|
| Type | jDbAccount |
| Value | jdoe |
| Link | nodeRef(IPAddress:208.93.64.251) |
| Link | nodeRef(jDatabase:mContainer) |

*FIG. 11*

| Node | |
|---|---|
| Type | jDatabase |
| Value | mContainer |
| Link | nodeRef(IPAddress:206.45.48.10) |
| Link | nodeRef(DbAccount:jdoe) |

*FIG. 12*

| Node | |
|---|---|
| Type | jDbAccount |
| Value | jdoe |
| Link | nodeRef(IPAddress:208.93.64.251) |
| Link | nodeRef(jDatabase:mContainer) |
| Link | nodeRef(Handle:jdoe) |
| Link | nodeRef(Password:Q$z2f5467g!) |

FIG. 14

| Node | |
|---|---|
| Type | |
| Value | Handle |
| Link | jdoe |
| Link | nodeRef(jDbAccount:jdoe) |
| | nodeRef(Password:Q$z2f5467g!) |

FIG. 15

| | Node | |
|---|---|---|
| Type | Password | |
| Value | Q$z2f5467g! | |
| Link | nodeRef(jDbAccount:jdoe) | |
| Link | nodeRef(Handle:jdoe) | |

FIG. 16

```
public class hypergraph { public int hypergraphId;
    public List<node> nodes;

...

public void addLink(nodeType t1, string v1, nodeType t2, string v2) {
        int i = nodes.FindIndex( node x => (x.type == t1 && x.value == v1) );
        if(i == -1) {
            nodes.Add(new node(t1,v1));
            i = nodes.FindLastIndex( node x => (x.type == t1 && x.value == v1) );
        }
        int j = nodes.FindIndex( node x => (x.type == t2 && x.value == v2) );
        if(j == -1) {
            nodes.Add(new node(t2,v2));
            j = nodes.FindLastIndex( node x => (x.type == t2 && x.value == v2) );
        }
        nodes[i].addLink(t2,v2);
        nodes[j].addLink(t1,v1);
    }

| | Node | |
|---|---|---|
| Type | Password | |
| Value | Q$z2f5467g! | |
| Link | nodeRef(jDbAccount:jdoe) | |
| Link | nodeRef(Handle:jdoe) | |
| Link | nodeRef(p2pAccount:fscott) | |

FIG. 23

| | Node | |
|---|---|---|
| Type | p2pAccount | |
| Value | bsmith | |
| Threat | true | |
| Link | nodeRef(p2pAccount:fscott) | |
| Link | nodeRef(IPAddress:45.63.124.85) | |
| Link | nodeRef(p2pAccount:ajones) | |

FIG. 26

| | Node |
|---|---|
| Type | p2pAccount |
| Value | fscott |
| Threat | false |
| ThreatDistance | 1 |
| Link | nodeRef(p2pAccount:bsmith) |
| Link | nodeRef(Password:Q$z2f5467g!) |

FIG. 28

| Node | |
|---|---|
| Type | p2pAccount |
| Value | bsmith |
| ThreatDistance | 0 |
| Link | nodeRef(p2pAccount:fscott) |
| Link | nodeRef(IPAddress:45.63.124.85) |
| Link | nodeRef(p2pAccount:ajones) |

*FIG. 29*

| Node | |
|---|---|
| Type | p2pAccount |
| Value | fscott |
| ThreatDistance | 1 |
| Link | nodeRef(p2pAccount:bsmith) |
| Link | nodeRef(Password:Q$z2f5467g!) |

FIG. 30

| Node | |
|---|---|
| Type | IPAddress |
| Value | 206.45.48.10 |
| ThreatDistance | -1 |
| Link | nodeRef(IPAddress:208.93.64.251) |
| Link | nodeRef(jDatabase:mContainer) |

FIG. 31

| Node | |
|---|---|
| Type | p2pAccount |
| Value | bsmith |
| Threat | true |
| Link | nodeRef(p2pAccount:fscott) |
| Link | nodeRef(IPAddress:45.63.124.85) |
| Link | nodeRef(p2pAccount:ajones) |

FIG. 34

| Node | |
|---|---|
| Type | p2pAccount |
| Value | fscott |
| Threat | false |
| ThreatDistance | 1 |
| Link | nodeRef(p2pAccount:bsmith) |
| Link | nodeRef(Password:Q$z2f5467g!) |

FIG. 36

| Node | |
|---|---|
| Type | IPAddress |
| Value | 208.93.64.251 |
| Threat | False |
| ThreatDistance | 4 |
| Link | nodeRef(IPAddress:206.45.48.10) |
| Link | nodeRef(jDbAccount:jdoe) |
| Link | nodeRef(IPAddress:110.87.121.218) |
| Link | nodeRef(EmailAddress:jdoe@domain.com) |

*FIG. 40*

| Node | |
|---|---|
| Type | jDbAccount |
| Value | jdoe |
| Threat | False |
| ThreatDistance | 4 |
| Link | nodeRef(IPAddress:208.93.64.251) |
| Link | nodeRef(jDatabase:mContainer) |
| Link | nodeRef(Handle:jdoe) |
| Link | nodeRef(Password:Q$z2f5467g!) |

*FIG. 41*

```
public class node {
    public string id;
    public nodeType type;
    public string value;
    public bool threat;
    public bool sensor;
    public int threatDist;
    public List<nodeRef> links;
    public int hypergraphId;

public node(nodeType t, string v) {
        id = hypergraphFinder.findNewId(hypergraphId);
        type = t;
        value = v;
        threat = false;
        threatDist = -1;
    } public void addLink(string anId) {
        nodeType t;
        string v;
        hypergraphFinder.findTypeAndVal(hypergraphId, anId, ref t, ref v);
        links.Add(new nodeRef(anId, t, v));
    } public void addLink(nodeType t, string v) {
        string anId;
        hypergraphFinder.findId(hypergraphId, ref anId, t, v);
        links.Add(new nodeRef(anId, t, v));
    }
    ...
}
```

FIG. 44

```
public class hypergraph { public List<node> nodes;
    ...

public void updateThreatDistances(int x) {
        List<node> curThreats = nodes.FindAll(node n => n.threat);
        List<node> curSensors = nodes.FindAll(node n => n.sensor);

if(curThreats.Count < curSensors.Count) {
            foreach (node n in curThreats) {
                markSurroundingNodes(n.id, x);
            }
        }
        else {
            foreach (node n in nodes) {
                if (!n.threat) {
                    int tentDist = findDistThreat(n.id);
                    if (tentDist <= x) {
                        n.threatDist = tentDist;
                    }
                }
            }
        }
    }
    ...
}
```

*FIG. 45*

| | Node |
|---|---|
| Type | Password |
| Value | Q$z2f5467g! |
| ThreatDistance | -1 |
| Link | nodeRef(jDbAccount;jdoe) |
| Link | nodeRef(Handle;jdoe) |
| Link | nodeRef(p2pAccount:fscott) |

*FIG. 48*

| Node | |
|---|---|
| Type | Password |
| Value | Q$z2f5467g! |
| ThreatDistance | -1 |
| Link | nodeRef(jDbAccount;jdoe) |
| Link | nodeRef(Handle;jdoe) |
| Link | nodeRef(p2pAccount:fscott) |

*FIG. 50*

| Node | |
|---|---|
| Type | Password |
| Value | Q$z2f5467g! |
| ThreatDistance | -1 |
| Link | nodeRef(jDbAccount:jdoe) |
| Link | nodeRef(Handle:jdoe) |
| Link | nodeRef(p2pAccount:fscott) |

FIG. 52

| Node | jDbAccount | |
|------|------------|---|
| Type | | |
| Value | jdoe | |
| Link | nodeRef(IPAddress:208.93.64.251) | |
| Link | nodeRef(jDatabase:mContainer) | |
| Link | nodeRef((Handle:jdoe) | |
| Link | nodeRef((Password:Q$z2f5467g!) | |

FIG. 54

| Node | | |
|---|---|---|
| Type | jDbAccount | |
| Value | jdoe | |
| Link | nodeRef(IPAddress:208.93.64.251) | |
| Link | nodeRef(jDatabase:mContainer) | |
| Link | nodeRef(Handle:jdoe) | |
| Link | nodeRef(Password:Q$z2f5467g!) | |

FIG. 56

| Node | |
|---|---|
| Type | p2pAccount |
| Value | fscott |
| Threat | false |
| Link | nodeRef(p2pAccount:bsmith) |
| Link | nodeRef(Password:Q$z2f5467g!) |

FIG. 60

| Node | |
|---|---|
| Type | Password |
| Value | Q$z2f5467g! |
| ThreatDistance | ②  |
| Link | nodeRef(jDbAccount:jdoe) |
| Link | nodeRef(Handle:jdoe) |
| Link | nodeRef(p2pAccount:fscott) |

FIG. 63

| Node | |
|---|---|
| Type | |
| Value | Handle |
| ThreatDistance | jdoe |
| Link | ③ |
| Link | nodeRef(jDbAccount:jdoe) |
| | nodeRef(Password:Q$z2f5467g!) |

*FIG. 68*

$$\text{Proximity}_{\text{Space}} = \frac{1}{\text{ThreatDistance}}$$

FIG. 69

| Node | |
|---|---|
| Type | Password |
| Value | Q$z2f5467g! |
| ThreatDistance | 2 |
| ProxSpace | 0.5 |
| Link | nodeRef(iDbAccount;jdoe) |
| Link | nodeRef(Handle;jdoe) |
| Link | nodeRef(p2pAccount:fscott) |

*FIG. 70*

| Node | |
|---|---|
| Type | IPAddress |
| Value | 208.93.64.251 |
| Link | nodeLink(IPAddress:206.45.48.10, 04/06/2018) |
| Link | nodeLink(jDbAccount:jdoe, 04/06/2018) |

*FIG. 72*

| Node | |
|---|---|
| Type | IPAddress |
| Value | 208.93.64.251 |
| Link | nodeLink(IPAddress:206.45.48.10, 04/06/2018 – 04/12/2018) |
| Link | nodeLink(jDbAccount:jdoe, 04/06/2018 – 04/12/2018) |

FIG. 73

```
public class node {
    ...
    public List<nodeLink> links;
    ...
    public void addLink(string anId, timeInterval anInterval) {
        nodeType t;
        string v;
        hypergraphFinder.findTypeAndVal(hypergraphId, anId, ref t, ref v);
        int i = links.FindIndex( nodeLink x => (x.id.Equals(anId)) );
        if(i == -1) { links.Add(new nodeLink(anId, t, v, anInterval)); }
        else { links[i].timePeriods.Add(anInterval); }
    } public void addLink(nodeType t, string v, timeInterval anInterval) {
        string anId;
        hypergraphFinder.findId(hypergraphId, ref anId, t, v);
        int i = links.FindIndex( nodeLink x => (x.id.Equals(anId)) );
        if(i == -1) { links.Add(new nodeLink(anId, t, v, anInterval)); }
        else { links[i].timePeriods.Add(anInterval); }
    }
    ...
}
```

FIG. 74

```
public class nodeLink { public string id;
    public nodeType type;
    public string value;
    public List<timeInterval> timePeriods;

public nodeLink(string i, nodeType t, string v, timeInterval anInt) {
        id = i;
        type = t;
        value = v;
        timePeriods = new List<timePeriods>();
        timePeriods.Add(anInt);
    }
    ...
}
```

FIG. 75

```
public class hypergraph { public int hypergraphId;
    public List<node> nodes;

...

public void addLink(nodeType t1, string v1, nodeType t2, string v2, timeInterval anInt) {
        int i = nodes.FindIndex( node x => (x.type == t1 && x.value == v1) );
        if(i == -1) {
            nodes.Add(new node(t1,v1));
            i = nodes.FindLastIndex( node x => (x.type == t1 && x.value == v1) );
        }
        int j = nodes.FindIndex( node x => (x.type == t2 && x.value == v2) );
        if(j == -1) {
            nodes.Add(new node(t2,v2));
            j = nodes.FindLastIndex( node x => (x.type == t2 && x.value == v2) );
        }
        nodes[i].addLink(t2,v2, anInt);
        nodes[j].addLink(t1,v1, anInt);
    }

$$\text{Proximity}_{\text{Time-Link}} = 1 - \frac{|\text{TimePeriod} - \text{LinkTime}|}{m}$$

FIG. 79

```
findLinkProxTime(nodeLink aLink, timeInterval anInterval, int m) {
    int x = anInterval.ShortestDiff(aLink);
    int y = 1 - (x / m);
    return y;
}
```

*FIG. 80*

ProximityTime( (p2pAccount:bsmith, p2pAccount:fscott), (04/08/18:04/08/18), 365, Days )

*FIG. 81*

ProximityTime( (p2pAccount:bsmith, p2pAccount:fscott), (04/08/18:04/08/18), 365, Days )

Time Interval for Link (p2pAccount:bsmith, p2pAccount:fscott) = 04/06/18 to 05/14/18

Time Interval for Search = 04/08/18 to 04/08/18

Shortest Difference in Days = 0 (04/08/18 -> 04/08/18)

$$\text{Proximity}_{\text{Time-Link}} = 1 - \frac{0}{365} = 1$$

FIG. 83

ProximityTime( (p2pAccount:bsmith, p2pAccount:fscott), (04/08/18:04/08/18), 1, Years )

FIG. 84

ProximityTime( (p2pAccount:bsmith, p2pAccount:fscott), (04/08/18:04/08/18), 1, Years )

Time Interval for Link (p2pAccount:bsmith, p2pAccount:fscott) = 04/06/18 to 05/14/18

Time Interval for Search = 04/08/18 to 04/08/18

Shortest Difference in Years = 0 (04/08/18 -> 04/08/18)

$$\text{Proximity}_{\text{Time-Link}} = 1 - \frac{0}{1} = 1$$

FIG. 86

ProximityTime( (p2pAccount:bsmith, p2pAccount:ajones), (04/08/18:04/08/18), 365, Days )

Time Interval for Link (p2pAccount:bsmith, p2pAccount:ajones) = 04/01/17 to 04/08/17

Time Interval for Search = 04/08/18 to 04/08/18

Shortest Difference in Days = 365 (04/08/17 -> 04/08/18)

$$\text{Proximity}_{\text{Time-Link}} = 1 - \frac{365}{365} = 0$$

FIG. 88

ProximityTime( (p2pAccount:bsmith, p2pAccount:ajones), (04/08/18:04/08/18), 1, Years )

Time Interval for Link (p2pAccount:bsmith, p2pAccount:ajones) = 04/01/17 to 04/08/17

Time Interval for Search = 04/08/18 to 04/08/18

Shortest Difference in Years = 1 (04/08/17 -> 04/08/18)

$$\text{Proximity}_{\text{Time-Link}} = 1 - \frac{1}{1} = 0$$

*FIG. 90*

ProximityTime( (p2pAccount:bsmith, p2pAccount:ajones), (04/08/18:04/08/18), 2, Years )

Time Interval for Link (p2pAccount:bsmith, p2pAccount:ajones) = 04/01/17 to 04/08/17

Time Interval for Search = 04/08/18 to 04/08/18

Shortest Difference in Years = 1 (04/08/17 -> 04/08/18)

$$\text{Proximity}_{\text{Time-Link}} = 1 - \frac{1}{2} = 0.5$$

FIG. 92

ProximityTime( (p2pAccount:bsmith, p2pAccount:ajones), (04/08/18:04/08/18), 200, Days )

Time Interval for Link (p2pAccount:bsmith, p2pAccount:ajones) = 04/01/17 to 04/08/17

Time Interval for Search = 04/08/18 to 04/08/18

Shortest Difference in Days = 365 (04/08/17 -> 04/08/18)

$$\text{Proximity}_{\text{Time-Link}} = 1 - \frac{365}{200} = -0.825$$

FIG. 94

ProximityTime( (p2pAccount:bsmith, p2pAccount:ajones), (04/08/18:04/08/18), 200, Days )

Time Interval for Link (p2pAccount:bsmith, p2pAccount:ajones) = 04/01/17 to 04/08/17

Time Interval for Search = 04/08/18 to 04/08/18

Shortest Difference in Days = 365 (04/08/17 -> 04/08/18)

$$\text{Proximity}_{\text{Time-Link}} = 1 - \frac{365}{200} = \cancel{-0.825} = 0$$

*FIG. 95*

```
public int findLinkProxTime(nodeLink aLink, timeInterval anInterval, int m) {
    int x = anInterval.ShortestDiff(aLink);
    int y = 1 – (x / m);
    if (y >= 0) { return y; }
    else { return 0; }
}
```

FIG. 96

```
public int findLinkProxTime(nodeLink aLink, timeInterval anInterval, int m) {
    int x = anInterval.ShortestDiff(aLink);
    int y = 1 - (x / m);
    if (y >= defaultMin) { return y; }
    else { return defaultMin; }
}
```

FIG. 97

$$\text{Proximity}_{\text{Time-Path}} = \prod \text{Proximity}_{\text{Time-Node}}$$

FIG. 98

```
public int findPathProxTime(List<nodeLink> path, timeInterval anInterval, int m) {
    int temp = 1;
    foreach (nodeLink curLink in path) {
        temp = temp * findLinkProxTime(curLink, anInterval, m);
    }
    return temp;
}
```

FIG. 99

PathProximityTime( (p2pAccount:bsmith, Password:Q$z2f5467g!), (04/08/18:04/08/18), 365, Days )

=

ProximityTime( (p2pAccount:bsmith, p2pAccount:fscott), (04/08/18:04/08/18), 365, Days )

*

ProximityTime( (p2pAccount:fscott, Password:Q$z2f5467g!), (04/08/18:04/08/18), 365, Days )

*FIG. 101*

ProximityTime( (p2pAccount:fscott, Password:Q$z2f5467g!), (04/08/18:04/08/18), 365, Days )

Time Interval for Link (p2pAccount:fscott, Password:Q$z2f5467g!) = 04/06/18 to 05/14/18

Time Interval for Search = 04/08/18 to 04/08/18

Shortest Difference in Days = 0 (04/08/18 -> 04/08/18)

$$\text{Proximity}_{\text{Time-Link}} = 1 - \frac{0}{365} = 1$$

*FIG. 103*

ProximityTime( (p2pAccount:bsmith, p2pAccount:fscott), (04/08/18:04/08/18), 365, Days ) = 1

ProximityTime( (p2pAccount:fscott, Password:Q$z2f5467g!), (04/08/18:04/08/18), 365, Days ) = 1

PathProximityTime( (p2pAccount:bsmith, Password:Q$z2f5467g!), (04/08/18:04/08/18), 365, Days ) = 1 * 1 = 1

FIG. 104

ProximityTime( (p2pAccount:ajones, IPAddress:207.15.124.12), (04/08/18:04/08/18), 365, Days )

Time Interval for Link (p2pAccount:ajones, IPAddress:207.15.124.12) = 03/06/18 to 03/08/18

Time Interval for Search = 04/08/18 to 04/08/18

Shortest Difference in Days = 30 (03/08/18 -> 04/08/18)

$$\text{Proximity}_{\text{Time-Link}} = 1 - \frac{30}{365} = 0.9178$$

FIG. 107

ProximityTime( (p2pAccount:bsmith, p2pAccount:ajones), (04/08/18:04/08/18), 365, Days ) = 0

ProximityTime( (p2pAccount:ajones, IPAddress:207.15.124.12), (04/08/18:04/08/18), 365, Days ) = 0.9178

PathProximityTime( (p2pAccount:bsmith, IPAddress:207.15.124.12), (04/08/18:04/08/18), 365, Days ) = 0 * 0.9178 = 0

FIG. 108

ProximityTime( (p2pAccount:bsmith, p2pAccount:ajones), (04/08/18:04/08/18), 500, Days )

Time Interval for Link (p2pAccount:bsmith, p2pAccount:ajones) = 04/01/17 to 04/08/17

Time Interval for Search = 04/08/18 to 04/08/18

Shortest Difference in Days = 365 (04/08/17 -> 04/08/18)

$$\text{Proximity}_{\text{Time-Link}} = 1 - \frac{365}{500} = 0.27$$

*FIG. 111*

ProximityTime( (p2pAccount:ajones, IPAddress:207.15.124.12), (04/08/18:04/08/18), 500, Days )

Time Interval for Link (p2pAccount:ajones, IPAddress:207.15.124.12) = 03/06/18 to 03/08/18

Time Interval for Search = 04/08/18 to 04/08/18

Shortest Difference in Days = 30 (03/08/18 -> 04/08/18)

$$\text{Proximity}_{\text{Time-Link}} = 1 - \frac{30}{500} = 0.94$$

*FIG. 113*

ProximityTime( (p2pAccount:bsmith, p2pAccount:ajones), (04/08/18:04/08/18), 500, Days ) = 0.27

ProximityTime( (p2pAccount:ajones, IPAddress:207.15.124.12), (04/08/18:04/08/18), 500, Days ) = 0.94

PathProximityTime( (p2pAccount:bsmith, IPAddress:207.15.124.12), (04/08/18:04/08/18), 500, Days ) = 0.27 * 0.94 = 0.2538

*FIG. 114*

$$\text{Proximity}_{\text{Time-Node}} = 1 - \frac{|\text{TimePeriod} - \text{NodeTime}|}{m}$$

*FIG. 115*

$$\text{Connectedness}_{node} = \text{Number of Links}$$

$$\text{Cardinality}_{node} = \frac{1}{\text{Connectedness}_{node}}$$

*FIG. 119*

$$\text{Connectedness (IPAddress:206.45.48.10)} = \frac{1}{\text{Cardinality}_{node}} = \frac{1}{17} = 0.0588$$

FIG. 120

```
public class node {
    ...
    public List<nodeLink> links;
    ...
    public int findCardinality() {
        return links.Count;
    } public int findCardinality(List<nodeLink> subList) {
        return subList.Count;
    }
    ...
}
```

*FIG. 121*

```
public class node {
    ...
    public List<nodeLink> links;
    ...
    public int findCardinality(List<nodeLink> subList) {
        return subList.Count;
    } public int findCardinality(nodeType typeToConsider) {
        List<nodeLink> typeRelevantLinks = links.FindAll(nodeLink x => x.type.Equals(typetoConsider));
        return findCardinality(typeRelevantLinks);
    } public bool compareToTypes(nodeLink testMe, List<nodeType> theTypesToConsider) {
        foreach (nodeType t in theTypesToConsider) {
            if (testMe.type.Equals(t)) { return true; }
        }
        return false;
    } public int findCardinality(List<nodeType> typesToConsider) {
        List<nodeLink> typeRelevantLinks = new List<nodeLink>();
        foreach (nodeLink curLink in links) {
            if (compareToTypes(curLink, typesToConsider)) { typeRelevantLinks.Add(curLink); }
        }
        return findCardinality(typeRelevantLinks);
    }
    ...
}
```

*FIG. 122*

```
public class node {
    ...
    public List<nodeLink> links;
    ...
    public int findCardinality(timeInterval anInterval) {
        List<nodeLink> timeRelevantLinks = links.FindAll(nodeLink x => x.timePeriods.Contains(anInterval));
        return findCardinality(timeRelevantLinks);
    }
    ...
}
```

FIG. 123

```
public class node {
    ...
    public List<nodeLink> links;
    ...
    public int findCardinality(nodeType typeToConsider, timeInterval anInterval) {
        List<nodeLink> timeRelevantLinks = links.FindAll(nodeLink x => x.timePeriods.Contains(anInterval));
        List<nodeLink> typeRelevantLinks = timeRelevantLinks.FindAll(nodeLink x => x.type.Equals(typetoConsider));
        return findCardinality(typeRelevantLinks);
    } public int findCardinality(List<nodeType> typesToConsider, timeInterval anInterval) {
        List<nodeLink> timeRelevantLinks = links.FindAll(nodeLink x => x.timePeriods.Contains(anInterval));
        List<nodeLink> typeRelevantLinks = new List<nodeLink>();
        foreach (nodeLink curLink in timeRelevantLinks) {
            if (compareToTypes(curLink, typesToConsider)) { typeRelevantLinks.Add(curLink); }
        }
        return findCardinality(typeRelevantLinks);
    }
    ...
}
```

*FIG. 124*

```
public class node {
    ...
    public List<nodeLink> links;
    ...
    public int findCardinality() {
        if (type.Equals(theNodeTypes.Password)) {
            return findPasswordCardinality();
        }
        else { return links.Count; }
    }
    public int findCardinality(List<nodeLink> subList) {
        if (type.Equals(theNodeTypes.Password)) {
            return findPasswordCardinality(subList);
        }
        else { return subList.Count; }
    }
    ...
}
```

*FIG. 125*

$$Cardinality_{Path} = \prod Cardinality_{Node}$$

FIG. 126

```
public int findPathCardinality(List<node> nodesInPath) {
    int temp = 1;
    foreach (node curNode in nodesInPath) {
        temp = temp * curNode.findCardinality();
    }
    return temp;
}
```

FIG. 127

```
public int findPathCardinality(List<node> nodesInPath, timeInterval anInterval) {
    int temp = 1;
    foreach (node curNode in nodesInPath) {
        temp = temp * curNode.findCardinality(anInterval);
    }
    return temp;
}
```

*FIG. 128*

```
public int findPathCardinality(List<node> nodesInPath, List<nodeType> typesToConsider, timeInterval anInterval) {
    int temp = 1;
    foreach (node curNode in nodesInPath) {
        temp = temp * curNode.findCardinality(typesToConsider, anInterval);
    }
    return temp;
}
```

*FIG. 129*

$$\begin{aligned}&\text{PathCardinality}(\,(\text{IPAddress:}208.93.64.251,\ \text{IPAddress:}211.154.45.43)\,) \\ &= \\ &\text{Cardinality}(\text{IPAddress:}208.93.64.251) \\ &* \\ &\text{Cardinality}(\text{IPAddress:}206.45.48.10) \\ &* \\ &\text{Cardinality}(\text{IPAddress:}211.154.45.43)\end{aligned}$$

*FIG. 132*

Cardinality(IPAddress:208.93.64.251) = 1 / 4 = 0.25

Cardinality(IPAddress:206.45.48.10) = 1 / 17 = 0.0588

Cardinality(IPAddress:211.154.45.43) = 1 / 1 = 1

PathCardinality( (IPAddress:208.93.64.251, IPAddress:211.154.45.43) ) = 0.25 * 0.0588 * 1 = 0.0147

*FIG. 137*

Cardinality(p2pAccount:bsmith) = 1 / 4 = 0.25

Cardinality(p2pAccount:fscott) = 1 / 2 = 0.5

Cardinality(password:Q$z2f5467g!) = PasswordCardinality(Q$z2f5467g!) = 1

PathCardinality( (p2pAccount:bsmith, Password:Q$z2f5467g!) ) = 0.25 * 0.5 * 1 = 0.125

*FIG. 142*

$$\text{Maliciousness} = \text{Proximity}_{Space} * \text{Proximity}_{Time} * \text{Cardinality}$$

FIG. 143

```
public int findMal(Path aPath) {
    int proxSpace = findPathProxSpace(aPath);
    int proxTime = findPathProxTime(aPath.linksInPath, timePeriod.All, instanceVars.m);
    int cardinality = findPathCardinality(aPath.nodesInPath);
    int mal = proxSpace * proxTime * cardinality;
    return mal;
} public int findMal(node n, node threat) {
    jPath thePath = findShortestPath(n, threat);
    return findMal(thePath);
} public int findMal(node n, List<nodes> threats) {
    jPath thePath = findShortestPath(n, threats);
    return findMal(thePath);
} public int findMal(node n) {
    List<node> threats = nodes.FindAll(node x => x.threat);
    jPath thePath = findShortestPath(n, threats);
    return findMal(thePath);
} public int findMal(node n, Predicate T) {
    List<node> targets = nodes.FindAll(T);
    jPath thePath = findShortestPath(n, targets);
    return findMal(thePath);
}
```

FIG. 144

```
public int findMal(jPath aPath, timeInterval anInterval) {
    int proxSpace = findPathProxSpace(aPath);
    int proxTime = findPathProxTime(aPath.linksInPath, anInterval, instanceVars.m);
    int cardinality = findPathCardinality(aPath.nodesInPath);
    int mal = proxSpace * proxTime * cardinality;
    return mal;
} public int findMal(jPath aPath, timeInterval anInterval, int m) {
    int proxSpace = findPathProxSpace(aPath);
    int proxTime = findPathProxTime(aPath.linksInPath, anInterval, m);
    int cardinality = findPathCardinality(aPath.nodesInPath);
    int mal = proxSpace * proxTime * cardinality;
    return mal;
}
```

FIG. 145

```
public class jPath {
    public List<nodes> nodesInPath;
    public List<nodeLink> linksInPath;
    ...
}
```

FIG. 146

```
public int findPathProxSpace(jPath thePath) {
    int temp = 1 / (linksInPath.Count);
    return temp;
}
```

FIG. 147

$$\text{ThreatDistance}(Password{:}Q\$z2f5467g!) = 2$$

$$\text{MalProxSpace}(Password{:}Q\$z2f5467g!) = \frac{1}{\text{ThreatDistance}(Password{:}Q\$z2f5467g!)}$$

$$\text{MalProxSpace}(Password{:}Q\$z2f5467g!) = \frac{1}{2} = 0.5$$

*FIG. 150*

PathProximityTime( (p2pAccount:bsmith, Password:Q$z2f5467g!), (04/08/18), 365, Days ) = 1 * 1 = 1

MalProximityTime(Password:Q$z2f5467g!) = 1

*FIG. 153*

Cardinality(p2pAccount:bsmith) = 1 / 4 = 0.25

Cardinality(p2pAccount:fscott) = 1 / 2 = 0.5

Cardinality(password:Q$z2f5467g!) = PasswordCardinality(Q$z2f5467g!) = 1

PathCardinality( (p2pAccount:bsmith, Password:Q$z2f5467g!) ) = 0.25 * 0.5 * 1 = 0.125

MalCardinality(Password:Q$z2f5467g!) = 0.125

*FIG. 155*

Maliciousness = Proximity$_{Space}$ * Proximity$_{Time}$ * Cardinality

MalProxSpace(Password:Q$z2f5467g!) = 0.5

MalProximityTime(Password:Q$z2f5467g!) = 1

MalCardinality(Password:Q$z2f5467g!) = 0.125

**Mal(Password:Q$z2f5467g!) = 0.5 * 1 * 0.125 = 0.0625**

*FIG. 156*

$$\text{Maliciousness} = \frac{(w * \text{Proximity}_{\text{Space}}) + (x * \text{Proximity}_{\text{Time}}) + (y * \text{Cardinality})}{w + x + y}$$

FIG. 157

$$\text{Maliciousness} = \frac{(w * \text{Proximity}_{Space}) + (x * \text{Proximity}_{Time}) + (y * \text{Cardinality})}{w + x + y}$$

MalProxSpace(Password:Q$z2f5467g!) = 0.5
Weight: w = 1

MalProximityTime(Password:Q$z2f5467g!) = 1
Weight: x = 1

MalCardinality(Password:Q$z2f5467g!) = 0.125
Weight: y = 0.5

$$\text{Mal(Password:Q\$z2f5467g!)} = \frac{(1 * 0.5) + (1 * 1) + (0.5 * 0.125)}{1 + 1 + 0.5} = 0.625$$

*FIG. 158*

| Node | |
|---|---|
| Type | Password |
| Value | Q$z2f5467g! |
| Link | nodeLink(jDbAccount:jdoe) |
| Link | nodeLink(Handle:jdoe) |
| Link | nodeLink(p2pAccount:fscott) |

*FIG. 160*

| Node | |
|---|---|
| Type | Password |
| Value | Q$z2f5467g! |
| Link | nodeLink(jDbAccount:jdoe) |
| Link | nodeLink(Handle:jdoe) |
| Link | nodeLink(p2pAccount:fscott) |

FIG. 162

| Node | |
|---|---|
| Type | Password |
| Value | Q$z2f5467g! |
| Link | nodeLink(jDbAccount:jdoe) |
| Link | nodeLink(Handle:jdoe) |
| Link | nodeLink(p2pAccount:fscott) |

*FIG. 164*

| Node | |
|---|---|
| Type | jDbAccount |
| Value | jdoe |
| Link | nodeLink(IPAddress:208.93.64.251) |
| Link | nodeLink(jDatabase:mContainer) |
| Link | nodeLink(Handle:jdoe) |
| Link | nodeLink(Password:Q$z2f5467g!) |

FIG. 166

| Node | | |
|---|---|---|
| Type | jDbAccount | |
| Value | jdoe | |
| Link | nodeLink(IPAddress:208.93.64.251) | |
| Link | nodeLink(jDatabase:mContainer) | |
| Link | nodeLink(Handle:jdoe) | |
| Link | nodeLink(Password:Q$z2f5467g!) | |

FIG. 168

| Node | |
|---|---|
| Type | jDbAccount |
| Value | jdoe |
| Link | nodeLink(IPAddress:208.93.64.251) |
| Link | nodeLink(jDatabase:mContainer) |
| Link | nodeLink(Handle:jdoe) |
| Link | nodeLink(Password:Q$z2f5467g!) |

*FIG. 170*

| Type | Node |
|---|---|
| Value | jDbAccount |
| Link | jdoe |
| Link | nodeLink(IPAddress:208.93.64.251) |
| Link | nodeLink(jDatabase:mContainer) |
| Link | nodeLink(Handle:jdoe) |
| Link | nodeLink(Password:Q$z2f5467g!) |

FIG. 172

| Node | |
|---|---|
| Type | Handle |
| Value | jdoe |
| Link | nodeLink(DbAccount:jdoe) |
| Link | nodeLink(Password:Q$z2f5467g!) |
| Link | nodeLink(EmailAddress:jdoe@domain.com) |

*FIG. 173*

| Node | |
|---|---|
| Type | Handle |
| Value | jdoe |
| Link | nodeLink(jDbAccount:jdoe) |
| Link | nodeLink(Password:Q$z2f5467g!) |
| Link | nodeLink(EmailAddress:jdoe@domain.com) |

FIG. 174

| Node | |
|---|---|
| Type | Handle |
| Value | jdoe |
| Link | nodeLink(jDbAccount:jdoe) |
| Link | nodeLink(Password:Q$z2f5467g!) |
| Link | nodeLink(EmailAddress:jdoe@domain.com) |

FIG. 175

| Type | Node |
|---|---|
| Value | p2pAccount |
| Link | fscott |
| Link | nodeRef(p2pAccount:bsmith) |
| | nodeRef(Password:Q$z2f5467g!) |

(Link row "nodeRef(p2pAccount:bsmith)" is circled)

FIG. 177

```
def search_hypergraph(starting_idents, starting_ident_type, targets, search_parameters, state, output)

# query hypergraph using refs(in) and search_parameters
    # what matches in the hypergraph (e.g. by matching shared value)
    connected_results = query_all(starting_idents, starting_ident_type,search_parameters)

# check all connected_results for any target match (e.g. this checks if a node matches one of N target tags, but could also include criteria such as a particular set of GUIDs or matching string values)
    # note: within this: for any match with a target, rebuild the "path" and any associated metadata regarding the path (ie set of hypergraph pivots) from the original starting point to the target and save it off to
    be returned
    output.update(check_for_target_matches(connected_results, state))

# update internal hypergraph search state: keep track of what has already been searched so that we don't search for it again for this particular hypergraph search
    #  note: within this: keep track of a mapping of GUID to (starting_idents,starting_ident_type), as well as a reverse mapping. This is used in the step above to rebuild the "path" connecting a starting point
    with a target point
    state.update(connected_results)

# for each connecting result, perform recursive hypergraph search on it if a) it hasn't been searched yet and b) it passes some sanity checks (i.e., is it likely to be fruitful) and c) the datatype is contained in
    the search_parameters
    for datatype in connected_results:
        if datatype not in search_parameters:
            continue
        for next_ident in connected_results[datatype]:
            # check if next identifier has already been searched or the property doesn't contain enough entropy to be plausibly searched upon (note: additional criteria could be added in as well):
            if next_ident in state or entropy(next_ident)<MIN_STRING_ENTROPY:
                continue
            else:
                next_starting_idents.append(next_ident)

# for each datatype, do recursive search
        search_hypergraph(next_starting_idents, datatype, targets, search_parameters, state, output)
```

FIG. 179

DETERMINING MALICIOUSNESS IN COMPUTER NETWORKS

STATEMENT REGARDING FEDERALLY SPONSORED RESEARCH OR DEVELOPMENT

This invention was made with government support under contract FA8750-17-C-0013 awarded by the Air Force Research Laboratory Information Directorate, Information and Intelligence Exploitation Contracting Branch (AFRL/RIKE). The government has certain rights in the invention.

INCORPORATION BY REFERENCE

The present application hereby incorporates herein by reference the entire disclosure of Appendices A and B attached hereto.

COPYRIGHT STATEMENT

All of the material in this patent document, including any computer code or computer program listing, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to detecting threats and malicious activity in computer networks.

Computer networks such as the Internet are increasingly ubiquitous. Given the importance and widespread use of computer networks, it is unsurprising that malicious actors try to carry out malicious acts over such computer networks. Such malicious acts can take a variety of forms, e.g. a cyber-attack such as a distributed denial of service attack, or a disinformation campaign over social media using bots. These malicious acts can be carried out directly by a human user, or indirectly, e.g. via a virus, bot, or other software.

Software is not inherently benign or malicious. There are many legitimate reasons for actions on a computer, and only intent differentiates between acceptable activity and a malicious act.

Conventional approaches to detecting malicious activity involve inferring intent via surrogates: detecting benign from malicious, normal from anomalous, good from bad. (See, e.g., P. Manadhata, S. Yadav, P. Rao and W. Horne, Detecting Malicious Domains via Graph Inference, in ESORICS, 2014; G. Jackson, Predicting Malicious Behavior: Tools and Techniques for Ensuring Global Security, 2012; Y. Chen and W. Chu, Database Security Protection via Inference Detection, 2006.)

However, some research has come to the conclusion that, for example, there is no functional difference between modern software such as the Chrome browser and advanced persistent threats. (T. Heberlein, The Advanced Persistent Threat You Have: Google Chrome, 2015.)

There have been identified a number of potential issues related to current approaches for detecting malicious activity.

One potential issue relates to detecting malware in the face of execution divergence, e.g. when malware acts differently depending upon whether it is in an analysis environment or on the target computer. This defeats defensive inspection in sandboxed or virtualized environments. (See, e.g., A. Dinaburg, P. Royal, M. Sharif and W. Lee, Ether: malware analysis via hardware virtualization extensions, in ACM Conference on Computer and Communications, 2008.)

Another potential issues relates to breaking software analysis systems. Frequently, offense actors will expend significant resources to analyze defensive systems, identify their weakness, and ruthlessly exploit them to evade detection. (See, e.g., A. Greenberg, How an entire nation became Russia's test lab for Cyberwar, 20 Jun. 2017. [Online]. Available: https://www.wired.com/story/russian-hackers-attack-ukraine. [Accessed 17 Aug. 2017].)

Another potential issue relates to malware acting where there is no analysis. One of the classic offensive tricks has been to bury malware deeper than where the analysis systems live such that their actions are unobservable, such as in the kernel, hypervisor, or even in the hardware peripherals. (See, e.g., Z. Cheng, Kernel Malware, February 2013. [Online]. Available: https://www.cs.bu.edu/~goldbe/teaching/HW55813/zhou.pdf [Accessed 17 Aug. 2017]; K. Zetter, How the NSA's Firmware Hacking Works and Why it's so Unsettling, 22 Feb. 2015. [Online]. Available: https://www.wired.com/2015/02/nsa-firmware-hacking/. [Accessed 17 Aug. 2017].)

Another potential issue relates to malware's use of legitimate host communications application programming interfaces (APIs). One of the classic defensive tricks was to distinguish when software appeared to be something other than what it is. For example, a web browser using the OpenSSL crypto library for secure hypertext transfer protocol (HTTPS) traffic would immediately be identifiable as pretending to be a browser since Firefox uses libnss (see, e.g., Mozilla Foundation, Network Security Services, 1 May 2016. [Online]. Available: https://developer.mozilla.org/en-US/docs/Mozilla/Projects/NSS. [Accessed 17 Aug. 2017]), Chrome uses boringssl (see, e.g., Google, Boringssl, 17 Aug. 2017. [Online]. Available: https://boringssl.googlesource.com/boringssl/. [Accessed 17 Aug. 2017]), and the Edge/Internet Explorer family use the WinHTTP (see, e.g., Microsoft, SSL in WinHTTP, [Online]. Available: https://msdn.microsoft.com/en-us/library/windows/desktop/aa384076%28v=vs. 85%29.aspx?f=255&MSPPError=-2147217396. [Accessed 17 Aug. 2017]) and SChannel library (see, e.g., Microsoft, Secure Channel, [Online]. Available: https://msdn.microsoft.com/en-us/library/windows/desktop/aa380123(v=vs.85).aspx. [Accessed 17 Aug. 2017]). The offense knows this and re-uses the operating system's own communications APIs so they are indistinguishable from native software. (See, e.g., D. Choi, The Stealthy Downloader, 28 Oct. 2013. [Online]. Available: https://blog.fortinet.com/2013/10/28/the-stealthy-downloader. [Accessed 17 Aug. 2017].)

Another potential issue relates to trusted third-party intermediaries for network communications. In 2017, Russian actors were publicly attributed to the use of English-looking Britney Spears Instagram discussion threads for malware command and control (C2). (See, e.g., M. Locklear, Russian malware link hid in a comment on Britney Spears' Instagram, 7 Jun. 2017. [Online]. Available: https://www.engadget.com/2017/06/07/russian-malware-hidden-britney-spears-instagram/. [Accessed 17 Aug. 2017].) Likewise malware C2 has used Facebook's APIs (see, e.g., M. Van Pelt, Reconnaissance and impersonation pay off for cyber criminals, 26 Jul. 2017. [Online]. Available: https://barracudalabs.com/2011/03/how-to-use-facebooks-opengraph-api-to-spread-malware/. [Accessed 17 Aug. 2017]), Gmail (see, e.g., A. Greenberg, Hackers are using gmail drafts to update their malware and steal data, 29 Oct. 2014. [Online]. Available: https://www.wired.com/2014/10/hackers-using-gmail-drafts-update-malware-steal-data/. [Accessed 17 Aug. 2017]), Twitter (see, e.g., B. Barth, Twitoor first Android malware known to leverage Twitter for command and control, 24 Aug. 2016. [Online]. Available: https://www.scmagazine.com/twitoor-first-android-malware-known-to-leverage-twitter-for-command-and-control/article/530184/. [Accessed 17 Aug. 2017]), Dropbox (see, e.g., FireEye Threat Intelligence, China-based Cyber Threat Group Uses Dropbox for Malware Communications and Targets Hong Kong Media Outlets, 1 Dec. 2015. [Online]. Available: https://www.fireeye.com/blog/threat-research/2015/11/china-based-threat.html. [Accessed 17 Aug. 2017]), and Skype (see, e.g., O. Sultan, Cyber Criminals Running Sophisticated Malware Campaign Via Skype, 11 Jun. 2016. [Online]. Available: https://www.hackread.com/skype-distributing-malware/. [Accessed 17 Aug. 2017]). The salient point is not just that the offense will hide in elusive spots, but that the offense is willing to constantly adapt to both the changing internet landscape as well as the defenses' ability to observe.

Another potential issue relates to the use of a unique hash per binary. Antivirus software, generically called Personal Security Products (PSPs), commonly calculates the cryptographic hash of files for comparison against known malicious or known benign lists. Generally, the latter do not undergo additional analysis. (See, e.g., S. McDonald, "Why AV is Dead, and what to do about it," 4 Aug. 2015. [Online]. Available: https://www.herjavecgroup.com/why-av-is-dead-and-what-to-do-about-it/. [Accessed 17 Aug. 2017].) When building targeted implants, malware authors stamp the C2 information directly into the binary as well as a random number such that each deployment has a unique hash.

Another potential issue relates to hash collisions. As discussed above, PSPs will whitelist programs with a known hash. Recent advances in cryptographic hash breaks (see, e.g., T. Xie and D. Feng, Construct MD5 Collisions Using Just a Single Block of Message, 2010; A. Kuznetsov, An algorithm for MD5 single-block collision attacks using high-performance computing cluster; Y. Sasaki and A. Kazumaro, Finding Preimage in Full MD5 Faster Than Exhaustive Search, 2009; M. Mao, S. Chen and J. Xu, Construction of the Initial Structure for Preimage Attack of MD5, in International Conference on Computational Intelligence and Security, 2009) allow an adversary to create two files with the same hash: one benign to become whitelisted and one for more nefarious purposes. Even an empty file still has a hash value (MD5: d41d8cd98f00b204e9800998ecf8427e) which most security software whitelists. It is expected that, once the public cryptologic community is able, many top-tier threat actors will deploy malware that hashes to the same value as an empty file. The authors of the Flame malware are known to have hash collision attacks beyond the public state of the art. (See, e.g., D. Fisher, Microsoft Details Flame Hash-Collision Attack, 6 Jun. 2012. [Online]. Available: https://threatpost.com/microsoft-details-flame-hash-collision-attack-060612/76658/. [Accessed 17 Aug. 2017]; A. Sotirov, Analyzing the MD5 collision in Flame, June 2012. [Online]. Available: https://trailofbits.files.wordpress.com/2012/06/flame-md5.pdf. [Accessed 17 Aug. 2017].)

Another potential issue relates to analysis tarpits. The hashes of zero byte files, and other analytically useless indicators, are frequently associated with threat actors such as in Crowdstrike's FancyBear report on the Democratic National Committee compromise (see, e.g., Contagio, APT29 Russian APT including Fancy Bear, 31 Mar. 2017. [Online]. Available: http://contagiodump.blogspot.com/2017/03/part-ii-apt29-russian-apt-including.html. [Accessed 17 Aug. 2017]) and the US Computer Emergency Response Team's (US-CERT) Grizzly Steppe report which included TOR exit nodes as Indicators of Compromise (IOCs) (see, e.g., US-CERT, "GRIZZLY STEPPE—Russian Malicious Cyber Activity," 6 Apr. 2017. [Online]. Available: https://www.us-cert.gov/security-publications/GRIZZLY-STEPPE-Russian-Malicious-Cyber-Activity. [Accessed 17 Aug. 2017]). These tarpits are an offensive asymmetric advantage in that their high false interconnectedness with other independent parties cause false linkages in graph analysis and unknown results when incorporated into machine learning algorithms.

Another potential issue relates to situations where professional offense doesn't crash a target. The academic literature on exploitation generally focuses on gaining program control. (See, e.g., R. Buchanan, R. Roemer, S. Savage and H. Shacham, Return-oriented Programming: Exploitation without Code Injection, in Blackhat, 2008; S. El-Sherei, Return-Oriented-Programming (ROP FTW), [Online]. Available: https://www.exploit-db.com/docs/28479.pdf. [Accessed 17 Aug. 2017]; A. One, Smashing the stack for fun and profit, in Phrack, 1996.) The reality of exploitation is that the more challenging problem is known in the art as "continuation of execution" to make sure the exploited target continues operating like normal such that there is no outward indication of compromise. The offense conducts significant operational fingerprinting of a target and adapts exploits and implants in real-time or in short order. Advanced threat groups are held to a 93-95% minimum success rate with the preponderance of failures expected to be detected when fingerprinting a target so that a failing exploit or implant is never even attempted.

Another potential issue relates to pervasive encryption. All that is required to exist unencrypted is the functionality to receive and load encrypted payloads. If Internet connectivity is assumed, even the payload decryption key can be stored remotely. Everything else can be sent over the network, loaded directly into memory, and be destroyed after use: data gathering, effects, spreading, et al. (See, e.g., M. Polychronakis and M. Meier, Detection of Intrusions and Malware, and Vulnerability Assessment, Springer, 2017.) For instance, the Gauss encrypted modules have evaded analysis since 2012. (See, e.g., K. Zetter, Researchers seek help cracking Gauss mystery payload, 14 Aug. 2012. [Online]. Available: https://www.wired.com/2012/08/gauss-mystery-payload. [Accessed 17 Aug. 2017].)

Needs exist for improvement in detecting threats and malicious activity in computer networks. These and other needs are addressed by one or more aspects of the present invention.

SUMMARY OF THE INVENTION

The present invention includes many aspects and features. Moreover, while many aspects and features relate to, and are described in a particular context, the present invention is not limited to use only in such context, as will become apparent from the following summaries and detailed descriptions of aspects, features, and one or more embodiments of the present invention.

Accordingly, one aspect of the present invention relates to a computer implemented method providing a technical solution to the technical problem of detecting and preventing malicious activity in a computer network, the technical solution involving programmatic performance, based on a calculated metric indicating a likelihood of association with a known malicious actor, of an action by a computer system designed to ensure security of the computer system. The method includes gathering, via one or more electronic devices configured to act as sensor devices, network information for one or more computer networks; and storing, in a dimensional graph database, data based on the information gathered for the one or more computer networks, the stored data comprising data regarding a plurality of nodes, including, for each node, an indication of a node type for that node, an indication of a node value for that node, and an indication of one or more links from that node to one or more other nodes, including, for each link, an indication of one or more time intervals associated with that link, wherein one or more of the nodes includes a tag indicating that it is known to be associated with a malicious actor. The method further includes programmatically determining a maliciousness value for a first node for which data is stored in the dimensional graph database, such programmatic determination comprising programmatically determining a shortest path from the first node to any of the nodes which includes a tag indicating that it is known to be associated with a malicious actor, programmatically calculating a proximity in space value for the first node which is inversely proportional to a distance of the determined shortest path, programmatically calculating, for each respective link forming part of the determined shortest path, a respective proximity in time value for that respective link based on the one or more time intervals associated with that respective link, programmatically calculating, based on the calculated respective proximity in time values for each respective link forming part of the determined shortest path, a proximity in time value for the determined shortest path, programmatically determining, for each respective node along the determined shortest path, a cardinality value for that respective node, wherein such determining comprises, for at least one respective node of the respective nodes, determining a connectedness value indicating a number of links to such node and calculating a cardinality value based at least in part on such determined connectedness value that is inversely proportional to such determined connectedness value, programmatically calculating, based on the calculated respective cardinality values for each respective node along the determined shortest path, a cardinality value for the determined shortest path, and programmatically calculating, based on the calculated proximity in space value, the calculated proximity in time value for the determined shortest path, and the calculated cardinality value for the determined shortest path, a maliciousness value for the first node. The method further includes programmatically comparing the determined maliciousness value for the first node to a threshold value; and blocking, based on the programmatic comparison of the determined maliciousness value for the first node with the threshold value, one or more network communications with an electronic device determined to be associated with the first node.

In a feature of this aspect, programmatically determining the shortest path from the first node to any of the nodes which includes a tag indicating that it is known to be associated with a malicious actor comprises programmatically determining the shortest path utilizing a breadth first traversal approach.

In a feature of this aspect, programmatically determining the shortest path from the first node to any of the nodes which includes a tag indicating that it is known to be associated with a malicious actor comprises programmatically determining the shortest path utilizing Dijkstra's algorithm.

In a feature of this aspect, programmatically calculating, for each respective link forming part of the determined shortest path, the respective proximity in time value for that respective link based on the one or more time intervals associated with that respective link comprises utilizing an m value which impacts how quickly or slowly a proximity in time value degrades over time.

In a feature of this aspect, programmatically calculating, based on the calculated respective proximity in time values for each respective link forming part of the determined shortest path, the proximity in time value for the determined shortest path comprises multiplying together the calculated proximity in time values for each respective link.

In a feature of this aspect, programmatically calculating, based on the calculated respective cardinality values for each respective node along the determined shortest path, the cardinality value for the determined shortest path comprises multiplying together the calculated cardinality values for each respective node along the determined shortest path.

In a feature of this aspect, programmatically determining, for each respective node along the determined shortest path, the cardinality value for that respective node comprises, for at least one respective node of the respective nodes, determining the cardinality value based on a determined uniqueness of a value of such node.

In a feature of this aspect, programmatically calculating, based on the calculated proximity in space value, the calculated proximity in time value for the determined shortest path, and the calculated cardinality value for the determined shortest path, the maliciousness value for the first node comprises multiplying together the calculated proximity in space value, the calculated proximity in time value for the determined shortest path, and the calculated cardinality value for the determined shortest path.

In a feature of this aspect, programmatically calculating, based on the calculated proximity in space value, the calculated proximity in time value for the determined shortest path, and the calculated cardinality value for the determined shortest path, a maliciousness value for the first node comprises calculating a weighted average of the calculated proximity in space value, the calculated proximity in time value for the determined shortest path, and the calculated cardinality value for the determined shortest path.

In a feature of this aspect, programmatically determining a maliciousness value for a first node for which data is stored in the dimensional graph database is performed utilizing one or more computer processors of one of the one or more electronic devices.

Another aspect relates to one or more computer readable media containing computer executable instructions configured for performance of a computer implemented method providing a technical solution to the technical problem of detecting and preventing malicious activity in a computer network, the technical solution involving programmatic performance, based on a calculated metric indicating a likelihood of association with a known malicious actor, of an action by a computer system designed to ensure security of the computer system.

Another aspect relates to a computer implemented method providing a technical solution to the technical problem of detecting malicious activity in a computer network, the technical solution involving programmatically identifying, based on a calculated metric indicating a likelihood of association with a known malicious actor, a device on a network that represents a potential threat, the method comprising:

The method includes gathering, via one or more electronic devices configured to act as sensor devices, network information for one or more computer networks; and storing, in a dimensional graph database, data based on the information gathered for the one or more computer networks, the stored data comprising data regarding a plurality of nodes, including, for each node, an indication of a node type for that node, an indication of a node value for that node, and an indication of one or more links from that node to one or more other nodes, including, for each link, an indication of one or more time intervals associated with that link, wherein one or more of the nodes includes a tag indicating that it is known to be associated with a malicious actor. The method further includes programmatically determining a maliciousness value for a first node for which data is stored in the dimensional graph database, such programmatic determination comprising programmatically determining a shortest path from the first node to any of the nodes which includes a tag indicating that it is known to be associated with a malicious actor, programmatically calculating a proximity in space value for the first node which is inversely proportional to a distance of the determined shortest path, programmatically calculating, for each respective link forming part of the determined shortest path, a respective proximity in time value for that respective link based on the one or more time intervals associated with that respective link, programmatically calculating, based on the calculated respective proximity in time values for each respective link forming part of the determined shortest path, a proximity in time value for the determined shortest path, programmatically determining, for each respective node along the determined shortest path, a cardinality value for that respective node, wherein such determining comprises, for at least one respective node of the respective nodes, determining a connectedness value indicating a number of links to such node and calculating a cardinality value based at least in part on such determined connectedness value that is inversely proportional to such determined connectedness value, programmatically calculating, based on the calculated respective cardinality values for each respective node along the determined shortest path, a cardinality value for the determined shortest path, and programmatically calculating, based on the calculated proximity in space value, the calculated proximity in time value for the determined shortest path, and the calculated cardinality value for the determined shortest path, a maliciousness value for the first node. The method further includes programmatically identifying, based on the determined maliciousness value for the first node, an electronic device determined to be associated with the first node as a potential threat.

Another aspect relates to a graphical user interface method for generating and displaying a visualization.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

FIGS. 4-6 illustrate a notional representation of stored data for a node.

FIGS. 7-9 illustrate exemplary C# style pseudocode for an exemplary node class, an exemplary nodeRef class, and an exemplary hypergraphFinder static class.

FIGS. 10-12 each illustrate a notional representation of stored data for a node.

FIGS. 14-16 each illustrate a notional representation of stored data for a node.

FIG. 22 illustrates exemplary C# style pseudocode for an exemplary hypergraph class.

FIG. 23 illustrates illustrates the storage of additional data for the node having a node type of "password" and a node value of "Q$z2f5467g!" representing a link to the node for the p2pAccount "fscott".

FIG. 26 illustrates the storage of data for a node which indicates that a node has been tagged as a threat.

FIG. 28 illustrates the storage of data for a node which indicates a threat distance value for the node.

FIGS. 29-31 illustrate the storage of data for nodes in which a threat distance field doubles as both a threat marker and a threat distance indicator.

FIGS. 34-43 illustrate an exemplary methodology for updating a threat distance value for nodes up to four edges away from a threat node.

FIG. 44 illustrates exemplary C# style pseudocode for an exemplary node class which is configured for an indication of whether a node is a threat node, an indication of whether a node is a sensor node, and an indication of a threat distance to a threat node.

FIG. 45 illustrates exemplary C# style pseudocode for an exemplary hypergraph class which includes a method to update threat distances of nodes in a hypergraph.

FIGS. 47-68 illustrate exemplary methodologies for determining a threat distance value for a node.

FIG. 69 illustrates an exemplary formula for determining a Proximity Space value for a node.

FIG. 70 illustrates storage of data for a node that includes a Proximity Space value.

FIG. 72 illustrates storage of node link information that indicates an association of a link with a particular date.

FIG. 73 illustrates storage of node link information that indicates an association of a link with a particular time interval.

FIGS. 74-75 illustrate exemplary C# style pseudocode for an exemplary node class and an exemplary nodeLink class.

FIG. 76 illustrates exemplary C# style pseudocode for an exemplary hypergraph class.

FIG. 79 illustrates an exemplary equation which can be utilized to calculate a proximity in time for a link.

FIG. 80 illustrates exemplary C# style pseudocode for an exemplary findLinkProxTime method, which determines a ProximityTimeLink value for a link.

FIG. 81 illustrates a fanciful representation of a query for a ProximityTimeLink value for the link from a node having a node type of "p2pAccount" and a node value of "bsmith" to a node having a node type of "p2pAccount" and a node value of "fscott".

FIG. 83 illustrates a fanciful representation of calculation of a ProximityTimeLink value for the link from a node having a node type of "p2pAccount" and a node value of "bsmith" to a node having a node type of "p2pAccount" and a node value of "fscott".

FIG. 84 illustrates another fanciful representation of a query for a ProximityTimeLink value for the same link from a node having a node type of "p2pAccount" and a node value of "bsmith" to a node having a node type of "p2pAccount" and a node value of "fscott".

FIG. 86 illustrates a fanciful representation of calculation of a ProximityTimeLink value for the link from a node having a node type of "p2pAccount" and a node value of "bsmith" to a node having a node type of "p2pAccount" and a node value of "fscott".

FIG. 88 illustrates a fanciful representation of calculation of a ProximityTimeLink value for the link from a node having a node type of "p2pAccount" and a node value of "bsmith" to a node having a node type of "p2pAccount" and a node value of "ajones".

FIGS. 89-90 illustrate a fanciful calculation for a link using a unit of time of "Years" instead of "Days".

FIG. 92 illustrates a fanciful representation of calculation of a ProximityTimeLink value for the link from a node having a node type of "p2pAccount" and a node value of "bsmith" to a node having a node type of "p2pAccount" and a node value of "ajones".

FIG. 94 illustrates a fanciful representation of calculation of a ProximityTimeLink value for the link from a node having a node type of "p2pAccount" and a node value of "bsmith" to a node having a node type of "p2pAccount" and a node value of "ajones".

FIG. 95 fancifully illustrates replacement of a calculated negative ProximityTimeLink value with a value of zero.

FIG. 96 illustrates exemplary C# style pseudocode for an exemplary method involving replacement of a negative value with zero.

FIG. 97 illustrates exemplary C# style pseudocode for an exemplary method involving replacement of a value below a minimum value with a minimum value.

FIG. 98 illustrates an exemplary equation which can be utilized to calculate a proximity in time for a path, or ProximityTimePath.

FIG. 99 illustrates exemplary C# style pseudocode for an exemplary findPathProxTime method, which determines a ProximityTimePath value for a path.

FIG. 101 illustrates calculation of a ProximityTimePath value for a path.

FIG. 103 illustrates a fanciful representation of calculation of a ProximityTimeLink value for the link from a node having a node type of "p2pAccount" and a node value of "fscott" to a node having a node type of "Password" and a node value of "Q$z2f5467g!".

FIG. 104 illustrates a fanciful representation of calculation of a ProximityTimePath value for the path by multiplying together the calculated ProximityTimeLink values for the component links. Here, the calculation is very simple, and merely involves multiplying "1"*"1", arriving at a ProximityTimePath value of "1".

FIG. 107 illustrates a fanciful representation of calculation of a ProximityTimeLink value for the link from a node having a node type of "p2pAccount" and a node value of "ajones" to a node having a node type of "IPAddress" and a node value of "207.15.124.12".

FIG. 108 illustrates a fanciful representation of calculation of a ProximityTimePath value for the path by multiplying together the calculated ProximityTimeLink values for the component links.

FIG. 111 illustrates a fanciful representation of calculation of a ProximityTimeLink value for the link from a node having a node type of "p2pAccount" and a node value of "bsmith" to a node having a node type of "p2pAccount" and a node value of "ajones".

FIG. 113 illustrates a fanciful representation of calculation of a ProximityTimeLink value for the link from a node having a node type of "p2pAccount" and a node value of "ajones" to a node having a node type of "IPAddress" and a node value of "207.15.124.12".

FIG. 114 illustrates a fanciful representation of calculation of a ProximityTimePath value for a path by multiplying together calculated ProximityTimeLink values for component links.

FIG. 115 illustrates an exemplary equation which can be utilized to calculate a proximity in time for a path that involves multiplying together respective ProximityTimeNode values for each node along the path.

FIG. 119 illustrates exemplary formulas for calculating connectedness and cardinality for a node.

FIG. 120 illustrates a fanciful representation of calculation of a cardinality value for the node having a node type of "IPAddress" and a node value of "206.45.48.10".

FIGS. 121-125 illustrate exemplary C# style pseudocode for exemplary methods of a node class.

FIG. 126 illustrates an exemplary equation which can be utilized to calculate a cardinality value for a path, or CardinalityPath.

FIGS. 127-129 illustrates exemplary C# style pseudocode for exemplary findPathCardinality methods, which determine a CardinalityPath value for a path.

FIG. 132 illustrates calculation of a CardinalityPath value for the path from a node having a node type of "IPAddress" and a node value of "208.93.64.251" through a node having a node type of "IPAddress" and a node value of "206.45.48.10" to a node having a node type of "IPAddress" and a node value of "211.154.45.43".

FIG. 137 illustrates a fanciful representation of calculation of a CardinalityPath value for a path by multiplying together calculated CardinalityNode values for nodes along the path.

FIG. 142 illustrates a fanciful representation of calculation of a CardinalityPath value for a path by multiplying together calculated CardinalityNode values for nodes along the path.

FIG. 143 illustrates an exemplary equation which can be utilized to calculate a maliciousness value for a node.

FIGS. 144-145 illustrate exemplary C# style pseudocode for methods for use in determining a maliciousness value for a node.

FIG. 146 illustrates exemplary C# style pseudocode for a jPath class that can be used in calculating a maliciousness value.

FIG. 147 illustrates exemplary C# style pseudocode for a method which can be utilized to calculate a proximity in space value for a path.

FIG. 150 illustrates a fanciful representation of calculation of a Proximity Space value for a node having a node type of "Password" and a node value of "Q$z2f5467g!").

FIG. 153 fancifully illustrates that a calculated ProximityTimePath value can be utilized in a maliciousness calculation for a node.

FIG. 155 fancifully illustrates calculation of a PathCardinality value for a path of "0.125", and that this calculated PathCardinality value can be utilized in a maliciousness calculation for a node.

FIG. 156 illustrates a fanciful representation of calculation of a maliciousness value for a node by multiplying together calculated ProximitySpace, ProximityTimePath, and PathCardinality values.

FIG. 157 illustrates another exemplary equation that can be utilized to calculate a maliciousness value involving a weighted average approach.

FIG. 158 illustrates an exemplary calculation of a maliciousness value utilizing a weighted average approach.

FIGS. 159-178 fancifully illustrate an exemplary methodology for determining a shortest path from a particular node to a threat node.

FIG. 179 illustrates exemplary pseudocode for an exemplary hypergraph search methodology.

FIG. 188 illustrates a generated visualization which conveys a connection to the IP address "64.210.154.28" which has been identified as a threat.

FIG. 189 illustrates a fanciful example of a hypergraph showing a path from a sensor node to a threat node.

FIG. 190 illustrates another fanciful example of a hypergraph showing a path from a sensor node to a threat node that takes into account a specified time period to search on.

FIG. 191 illustrates a simple example involving an exemplary visualization of search results for a domain name.

Figure 192:
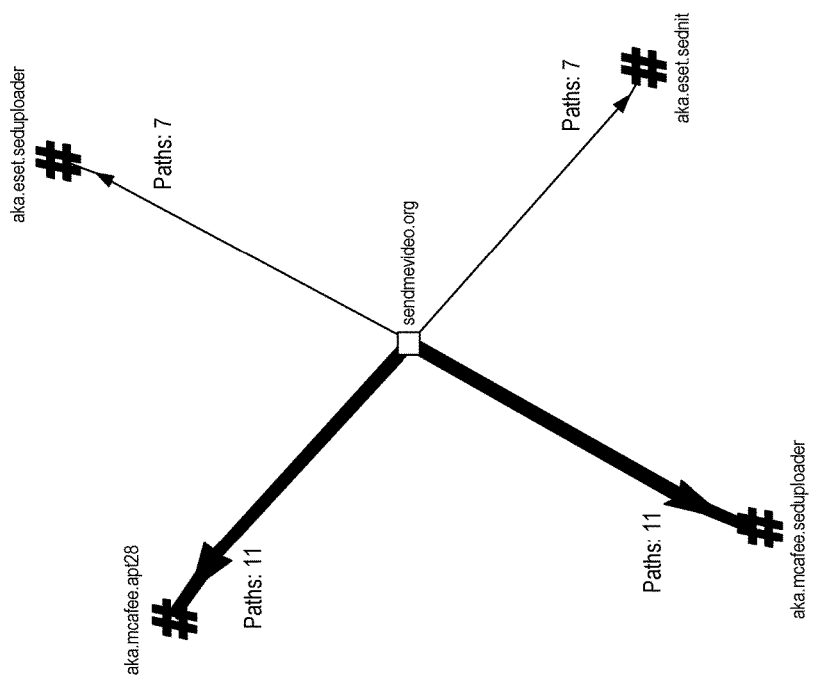

FIG. 192 fancifully illustrates that data types captured may increase over time.

DETAILED DESCRIPTION

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one", but does not exclude a plurality unless the contextual use dictates otherwise. Thus, reference to "a picnic basket having an apple" describes "a picnic basket having at least one apple" as well as "a picnic basket having apples". In contrast, reference to "a picnic basket having a single apple" describes "a picnic basket having only one apple".

When used herein to join a list of items, "or" denotes "at least one of the items", but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers". When used herein to join a list of items, "and"

denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese".

Referring now to the drawings, one or more preferred embodiments of the invention are next described. The following description of one or more preferred embodiments is merely exemplary in nature and is in no way intended to limit the invention, its implementations, or uses.

Introduction

As noted above, many conventional approaches to detecting malicious activity involve inferring intent via surrogates, e.g. detecting benign activity from malicious activity, normal activity from anomalous activity, or good activity from bad activity. However, as also noted above, this can be very difficult to do and presents a number of potential issues.

In accordance with one or more preferred implementations, instead of a standalone evaluation, software utilizes a surrogate measurement for maliciousness and threatening behavior: anything associated with a known adversary or malicious actor. In accordance with one or more preferred implementations, software calculates proximity to a malicious actor as a surrogate for intent. Such an approach is useful under a rationale that an action associated with a malicious actor, no matter how benign, is not wanted.

In accordance with one or more preferred implementations, maliciousness is approximated by measuring the proximity in hyper-dimensional space between a questionable node and a node known to be associated with a threat group. This hypergraph data may not be perfect, so in accordance with one or more preferred implementations, the proximity calculation is deformed based on temporality and cardinality to reduce error. This metric can then be used to detect malicious activity.

Hypergraphs

A system in accordance with one or more preferred implementations keeps knowledge about the world in a highly dimensional graph database. Each dimension is effectively its own manifold or topological space comprised of a 'data type' like IP address, username, and process functionality. These spaces are not mathematically smooth or continuous, and therefore a derivative cannot be calculated. Each of these spaces are allomorphic in that there is no way of mapping one space to another (e.g. from IP addresses to usernames), but each node in the hypergraph can carry coordinates from multiple spaces which allows invertible mappings between planar intersecting nodes. For example, seeing a Remote Desktop Protocol (RDP) login from an IP address I1 using the username U1 would allow mapping from I1 to U1 or the inverse, but not from arbitrary I space to the U space.

Figure 1:
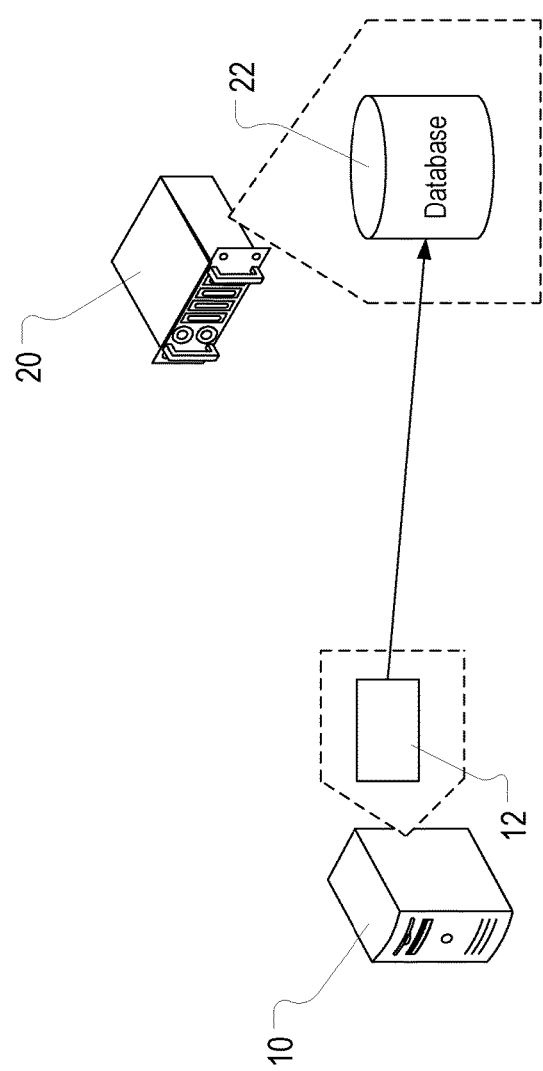
FIG. 1 illustrates exemplary network communication between an application of a computer and a database of a server.

FIG. 1 illustrates exemplary network communication between an application 12 at a computer 10 and a database 22 at a server 20. Information regarding this network communication can be utilized to generate a hypergraph. For example, if the network communication indicates that computer 10 is at IP address 208.93.64.251 and server 20 is at IP address 206.45.48.10, then nodes can be created for each of these IP addresses and a link established between them.

Figure 2:
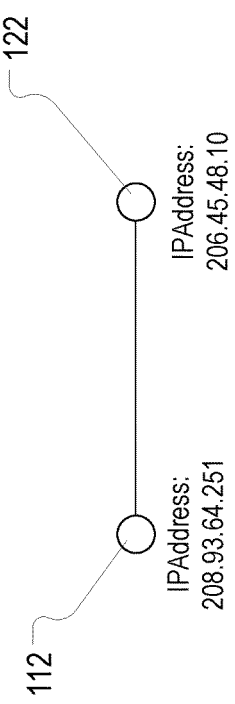
FIG. 2 illustrates an exemplary node which is created having a node type of "IPAddress" and a value of "208.93.64.251", and an exemplary node which is created having a node type of "IPAddress" and a value of "206.45.48.10".

FIG. 2 illustrates an exemplary node 112 which is created having a node type of "IPAddress" and a value of "208.93.64.251", and an exemplary node 122 which is created having a node type of "IPAddress" and a value of "206.45.48.10". Owing to the network communication between the computer 10 at IP address 208.93.64.251 and the server 20 at 206.45.48.10, a link is established between the nodes 112,122.

Network communication between the application 12 at the computer 10 and the database 22 at the server 20 involved the application 12 accessing a (fictitious) particular type of database, a jDatabase. In particular, the network communication involved the application 12 using an account associated with jDatabase to access a database named "mContainer".

Figure 3:
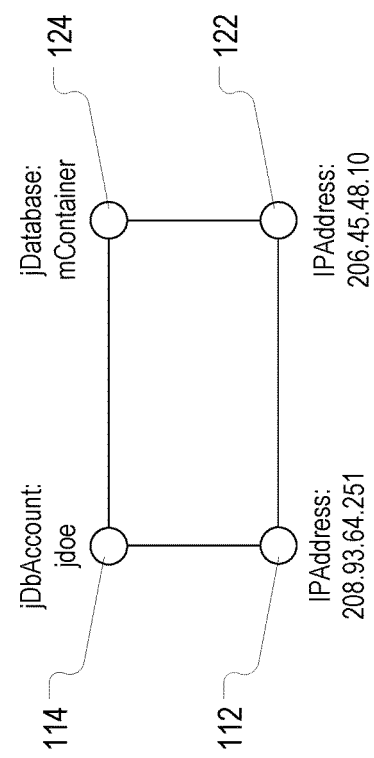
FIG. 3 illustrates additional nodes and links created based on network communication.

Based on this, a node 114 is created for the account, and a node 124 is created for the database named "mContainer", as illustrated in FIG. 3. A link is established between the node 114 representing the jDbAccount "jdoe", and the node 112. A link is also established between the node 114 representing the jDbAccount "jdoe", and the node 124 representing the jDatabase "mContainer". Additionally, a link is established between the node 124 representing the jDatabase "mContainer", and the node 122.

Data regarding these nodes and these links may be stored in various forms utilizing various storage methodologies, data objects, etc. In accordance with one or more preferred implementations, data regarding these nodes and these links is stored in a highly dimensional graph database.

FIG. 4 illustrates a notional representation of stored data for the node 112 having a node type of "IPAddress" and a node value of "208.93.64.251". As illustrated, the node includes a node type, a node value, and one or more links. In accordance with one or more preferred implementations, these node links may be links to nodes of the same node type, or a different node type. In accordance with one or more preferred implementations, a node link may be stored in the form of a pair of coordinates representing a node type and value of another node.

In accordance with one or more preferred implementations, stored data for a node may include a node ID, as illustrated in FIG. 5. In accordance with one or more preferred implementations, a node link may be stored in the form of a node ID for another node.

In accordance with one or more preferred implementations, stored data for a node may include a list object which includes a plurality of node links, as illustrated in FIG. 6.

FIGS. 7-9 illustrate exemplary C# style pseudocode for an exemplary node class, an exemplary nodeRef class, and an exemplary hypergraphFinder static class. This code includes an exemplary method for adding a link to a node by specifying either a node ID or a node type and value.

FIG. 10 illustrates a notional representation of stored data for the node 122 having a node type of "IPAddress" and a node value of "206.45.48.10". FIG. 11 illustrates a notional representation of stored data for the node 114 having a node type of "jDbAccount" and a node value of "jdoe". FIG. 12 illustrates a notional representation of stored data for the node 124 having a node type of "j Database" and a node value of "mContainer".

Figure 13:
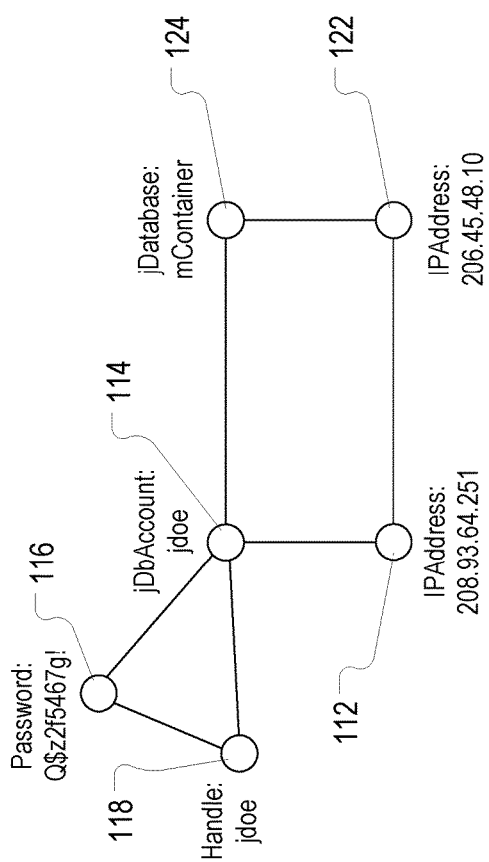
FIG. 13 illustrates creation of a node for the password "Q$z2f5467g!".

In accordance with one or more preferred implementations, a "Handle" node type may be utilized to capture the handle or name portion of an account or address. For example, the jDbAccount uses a handle of "jdoe". FIG. 13 illustrates creation of a node 118 for the handle "jdoe", and linking of this node 118 to the node 114 for the "jDoe" jDbAccount.

In accordance with one or more preferred implementations, a "Password" node type may be utilized to capture the password of an account. For example, the jDbAccount uses a password of "jdoe". FIG. 13 illustrates creation of a node 116 for the password "Q$z2f5467g!", and linking of this node 116 to both the node 114 for the "jDoe" jDbAccount and the node 118 for the "jDoe" handle.

FIG. 14 illustrates the storage of additional data for the node 114 having a node type of "jDbAccount" and a node value of "jdoe" representing links to the node 116 for the password "Q$z2f5467g!" and the node 118 for the handle "jdoe". FIG. 15 illustrates a notional representation of stored data for the node 118 having a node type of "Handle" and a node value of "jDoe". FIG. 16 illustrates a notional representation of stored data for the node 116 having a node type of "Password" and a node value of "Q$z2f5467g!".

Additional data gathered from other network communications or other sources or actions can also be used to create nodes in the hypergraph.

Figure 17:
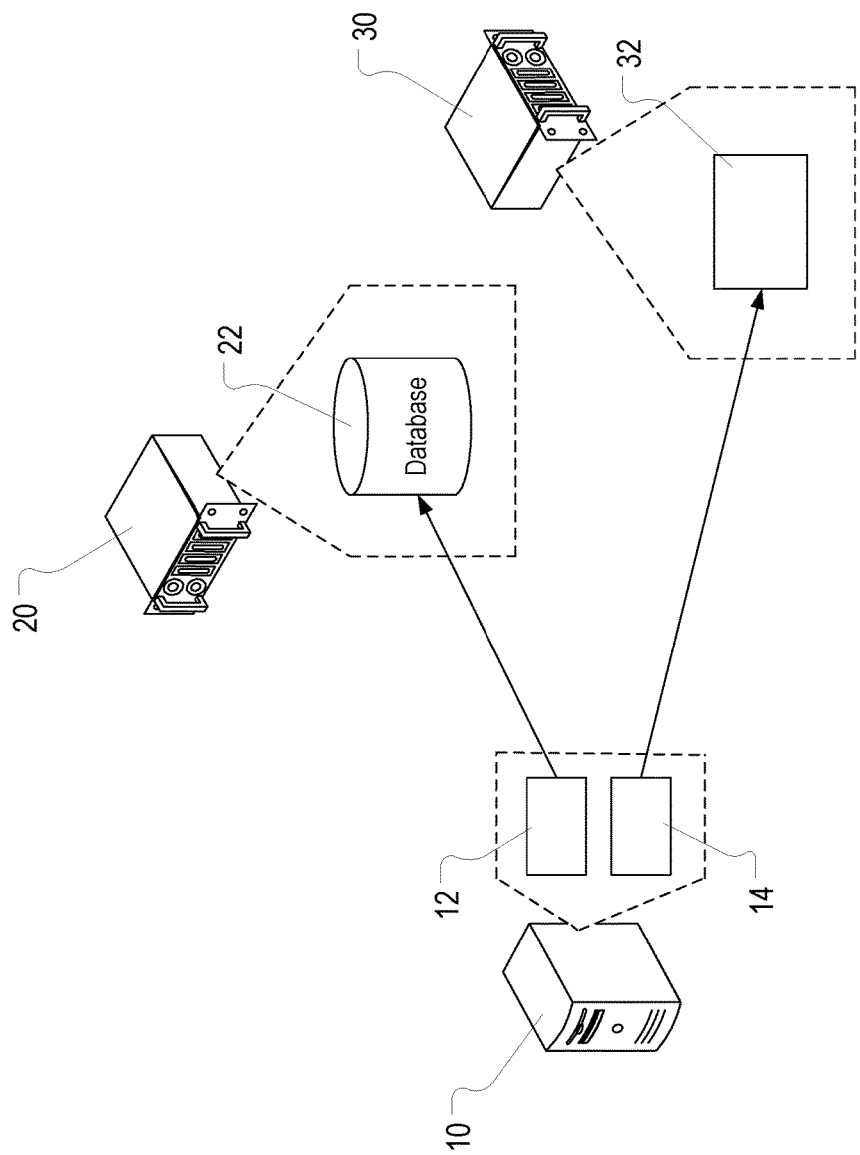
FIG. 17 illustrates network communication between another application at the computer and a mail service at a mail server.
Figure 18:
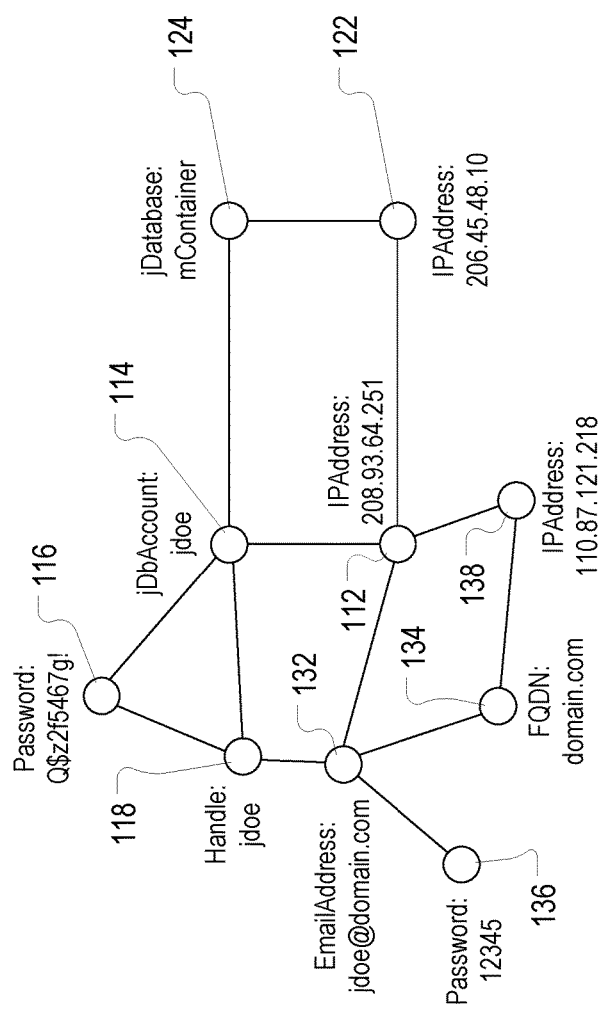
FIG. 18 illustrates the creation of additional nodes based on additional data gathered from other network communications.

For example, FIG. 17 illustrates network communication between another application 14 at the computer 10 and a mail service 32 at a mail server 30. Based on this network communication, node 132 having a node type of "EmailAddress" and a node value of "jdoe@domain.com" is created, node 138 having a node type of "IPAddress" and a node value of "110.87.121.218" is created, and node 136 having a node type of "Password" and a node value of "12345" is created. Additionally, it can be determined that the email address of "jdoe@domain.com" is associated with a fully qualified domain name ("FQDN") of "domain.com", and node 134 having a node type of "FQDN" and a node value of "domain.com" is created. Appropriate links based on known information are established between the nodes, as illustrated in FIG. 18.

Additional data may come in the form of data gathered from another device, e.g. data regarding different devices from those yet discussed.

Figure 19:
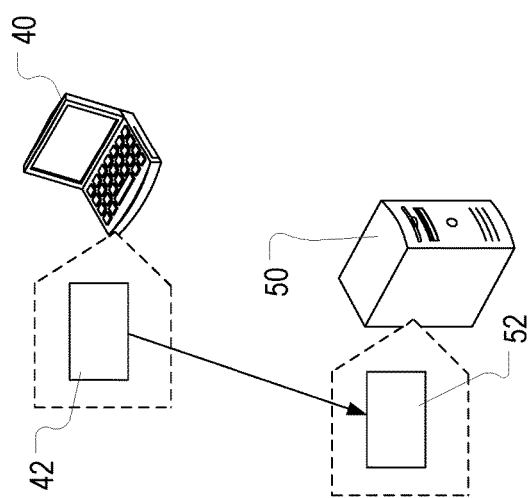
FIG. 19 illustrates network communication between a p2p application at a first computer and a p2p application at a second computer.
Figure 20:
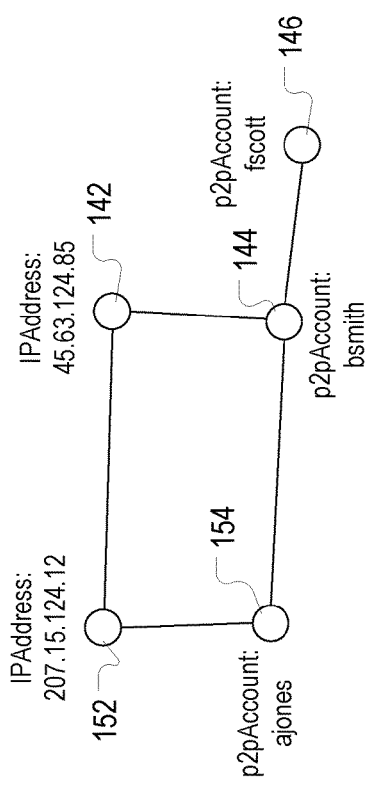
FIG. 20 illustrates nodes and links created based on information from network communication.

For example, FIG. 19 illustrates network communication between a p2p application 42 at a first computer 40 and a p2p application 42 at a second computer 50. FIG. 20 illustrates nodes and links created based on information from such network communication. This includes node 142 having a node type of "IPAddress" and a node value of "45.63.124.85", node 144 having a node type of "p2pAccount" and a node value of "bsmith", node 152 having a node type of "IPAddress" and a node value of "207.15.124.12", and node 154 having a node type of "p2pAccount" and a node value of "ajones". FIG. 20 further illustrates another node which is linked to node 144, namely node 146, having a node type of "p2pAccount" and a node value of "fscott".

Figure 21:
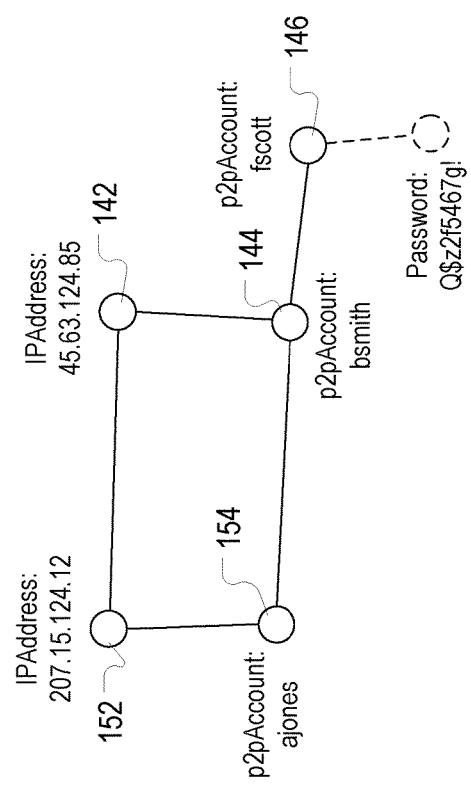
FIG. 21 illustrates establishment of a link.

Additional data may be used to establish further links to other nodes. For example, if it is determined that p2pAccount "fscott" utilizes password "Q$z2f5467g!", then a link can be established, as illustrated in FIG. 21.

FIG. 22 illustrates exemplary C# style pseudocode for an exemplary hypergraph class. This code includes an exemplary method for adding a link to a hypergraph by specifying a node type and value of a first node, and a node type and value of a second node. The method checks to determine whether each specified node exists, and creates each specified node if it does not already exist. The method then adds the link to each node. In particular, for each node, the method makes a call to a method which will add an indication of the link in the form of a reference to the other node. This establishes the link with both nodes having a record of the link. In accordance with one or more implementations, assymetric links may be utilized in which links may only flow one direction. In such a case, a record of the link may only be included at one of the nodes.

FIG. 23 illustrates the storage of additional data for the node 116 having a node type of "password" and a node value of "Q$z2f5467g!" representing a link to the node 146 for the p2pAccount "fscott".

Figure 24:
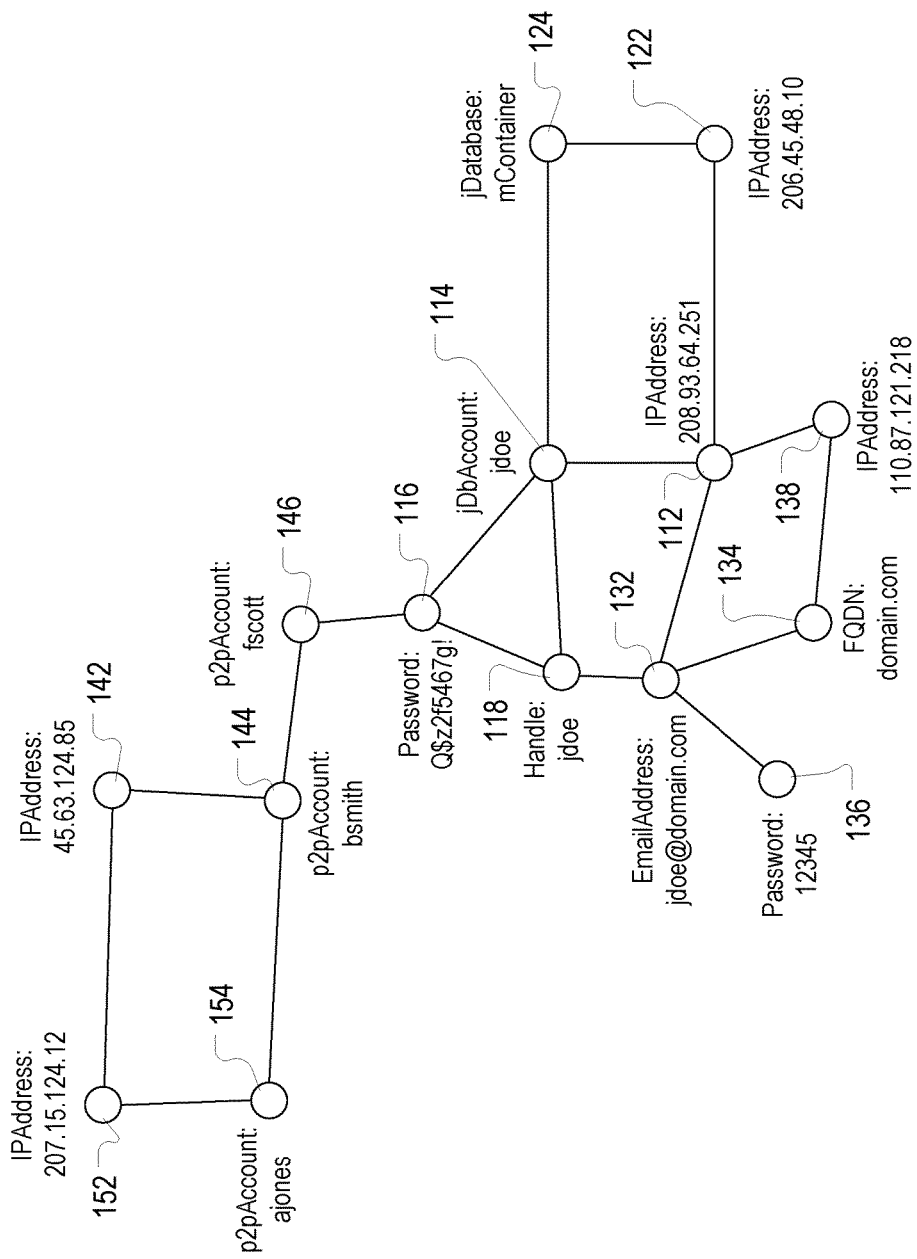
FIG. 24 illustrates linking of the subgraph illustrated in FIG. 18 with the subgraph illustrated in FIG. 20.

FIG. 24 illustrates how this link effects linking of the subgraph illustrated in FIG. 18 with the subgraph illustrated in FIG. 20.

Although described herein largely in the context of implementations in which data for nodes is stored in a manner resembling or representing node objects, and node references or links are maintained for each node object defining links between nodes, in accordance with one or more preferred implementations, data for node links may be stored in a manner resembling or representing node link objects, with nodes being emergent where node links connect to the same coordinate. In accordance with one or more preferred implementations, both approaches may be utilized together.

Proximity in Space

Figure 25:
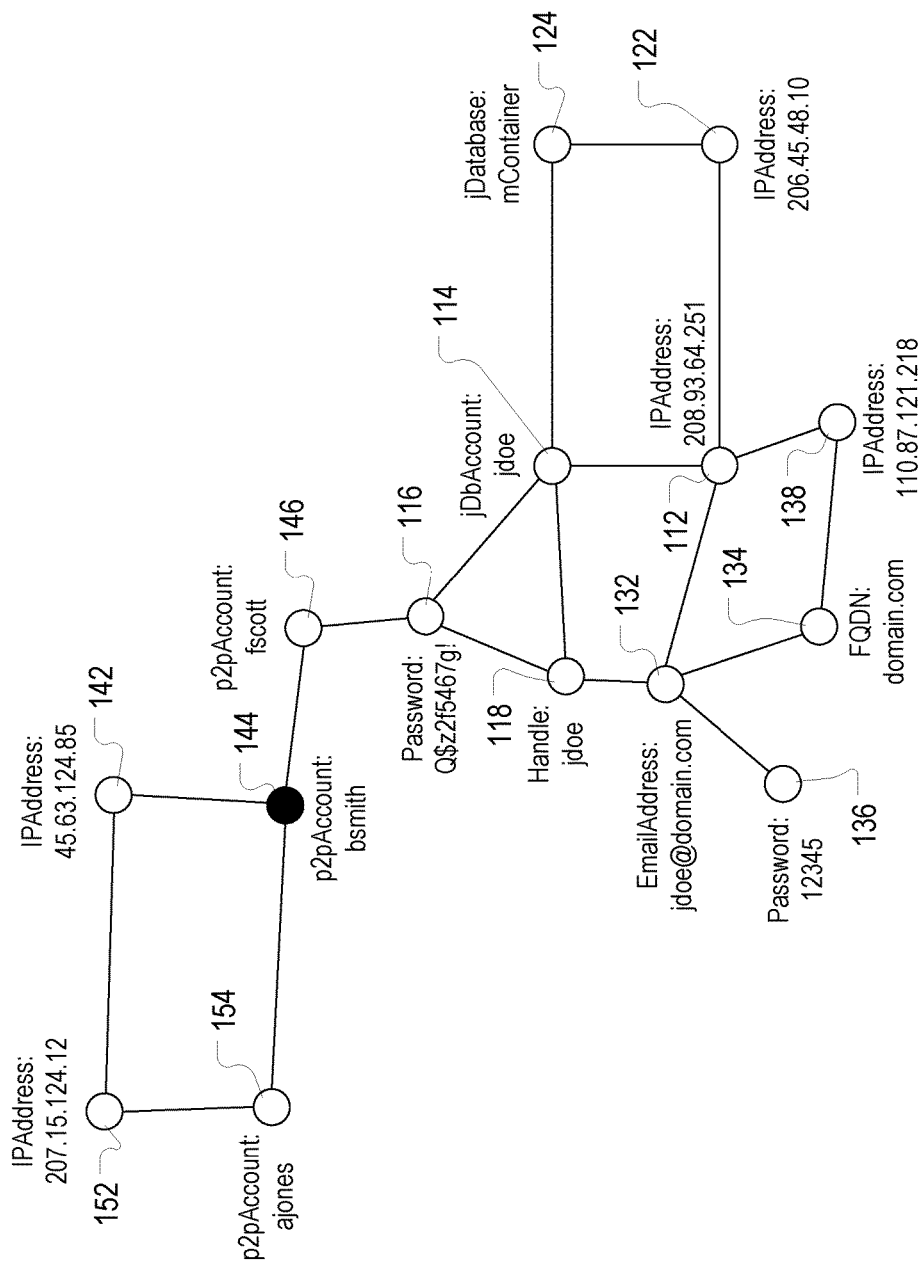
FIG. 25 illustrates a node which has been tagged as a threat.

One or more nodes of a hypergraph may be known to be a threat, e.g. known to be associated with a malicious actor. For example, the p2pAccount "bsmith" may be known to be associated with a malicious actor. In accordance with one or more preferred implementations, a node known to be associated with a malicious actor may be tagged a threat, as illustrated in FIG. 25, where the node 144, which has been tagged as a threat, is colored black to indicate that it has been tagged as a threat. As illustrated in FIG. 26, data for the node 144 for the p2pAccount "bsmith" includes a threat value of "true", indicating that the node 144 has been tagged as a threat.

Data stored for a node may include a threat tag, although in at least some preferred implementations it does not. In accordance with one or more preferred implementations, a list of nodes which have been tagged as a threat is maintained.

Figure 27:
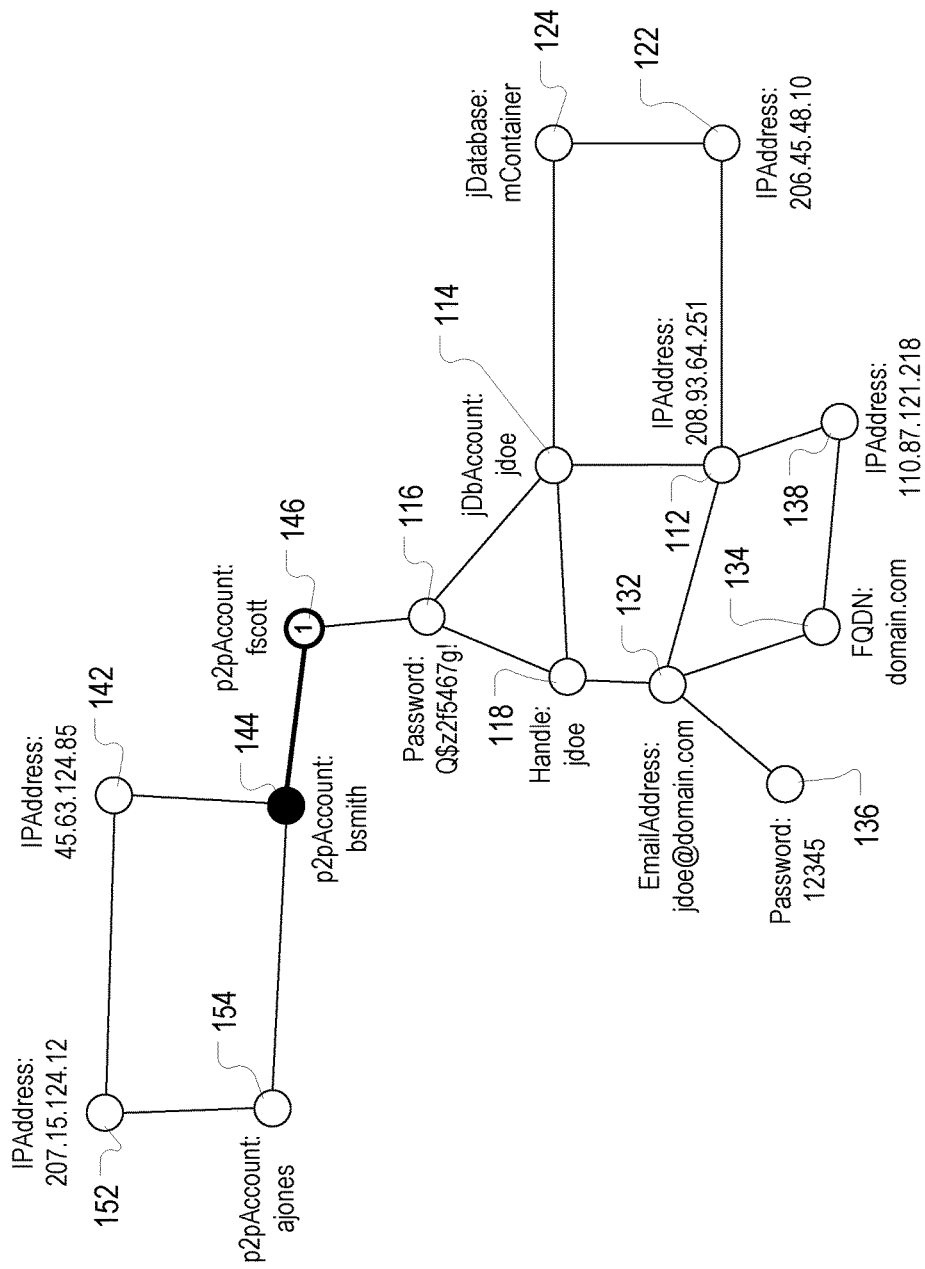
FIG. 27 illustrates a node which is one link away from a node which has been tagged as a threat.

In accordance with one or more preferred implementations, for a node in a hypergraph, a threat distance may be calculated which represents the number of links that must be traversed to reach a node that has been tagged as a threat. For example, as illustrated in FIG. 27, the node 146 can be determined to have a threat distance of one, as it is one link away from the node 144, which has been tagged as a threat.

Data stored for a node may include a threat distance, although in at least some preferred implementations it does not. In accordance with one or more preferred implementations, a threat distance is calculated as needed.

FIG. 28 illustrates the storage of data for the node 146 (having a node type of "p2pAccount" and a node value of "fscott") representing a threat distance of "1".

In accordance with one or more preferred implementations, data stored for a node includes a stored value that doubles as both a threat marker and a threat distance indicator. FIGS. 29-31 illustrate the storage of data for nodes in which a "ThreatDistance" field doubles as both a threat marker and a threat distance indicator, and a value of zero indicates that the node has been marked as a threat, a value greater than zero indicates a determined threat distance, and a value of negative one indicates that a threat distance has not been determined.

Threat distance is believed to be useful in that, as nodes become more proximate to malicious actor infrastructure, the likelihood that the behavior which created the node will be considered malicious increases.

In accordance with one or more preferred implementations, various methodologies for determining threat distance for a node or nodes and/or tagging a node or nodes with a threat distance value are utilized.

In accordance with one or more preferred implementations, some nodes can be characterized as sensor nodes, in that they are associated with data gathering for the hypergraph. In accordance with one or more preferred implementations, software uses two or more methodologies for calculating threat distance, which may be selected depending on a calculated ratio of sensor data to threat actor data (e.g. sensor nodes to threat nodes).

In accordance with one or more preferred implementations, if a number of threat nodes is less than a number of sensor nodes, then software tags all nodes up to n-edges away from threat nodes with a distance from the nearest threat node. In accordance with one or more preferred implementations, such an n value (for n-edges away) is experimentally determined based on false positives and false negatives. In accordance with one or more preferred implementations, machine learning is utilized to determine an n value.

Figure 32:
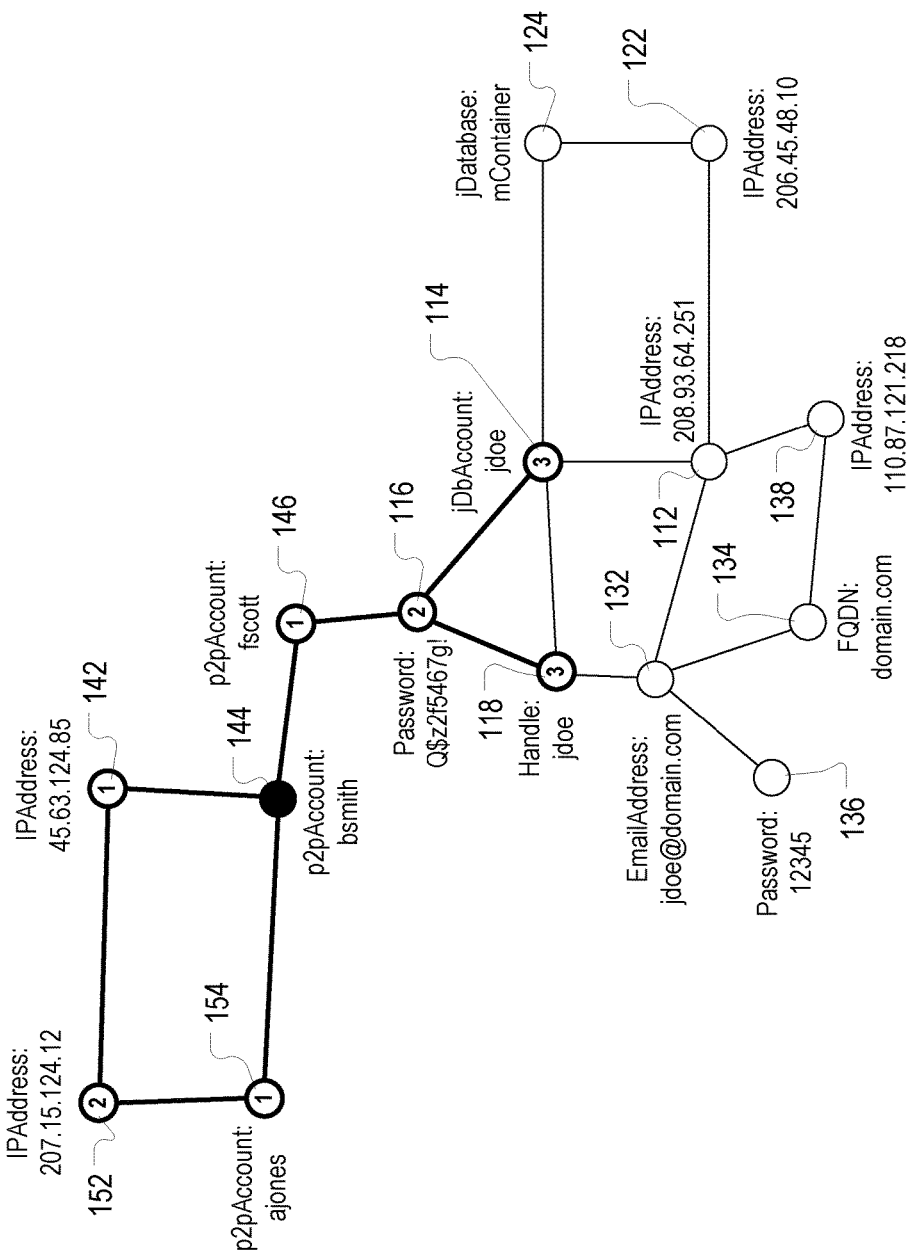
FIG. 32 illustrates tagging of nodes up to three edges away from a threat node with a threat distance value.

For example, FIG. 32 illustrates tagging of nodes up to three edges away from threat node 144 with a threat distance value. Nodes 142,146,154 are updated to indicate a threat distance of "1", nodes 116,152 are updated to indicate a threat distance of "2", and nodes 114,118 are updated to indicate a threat distance of "3".

Figure 33:
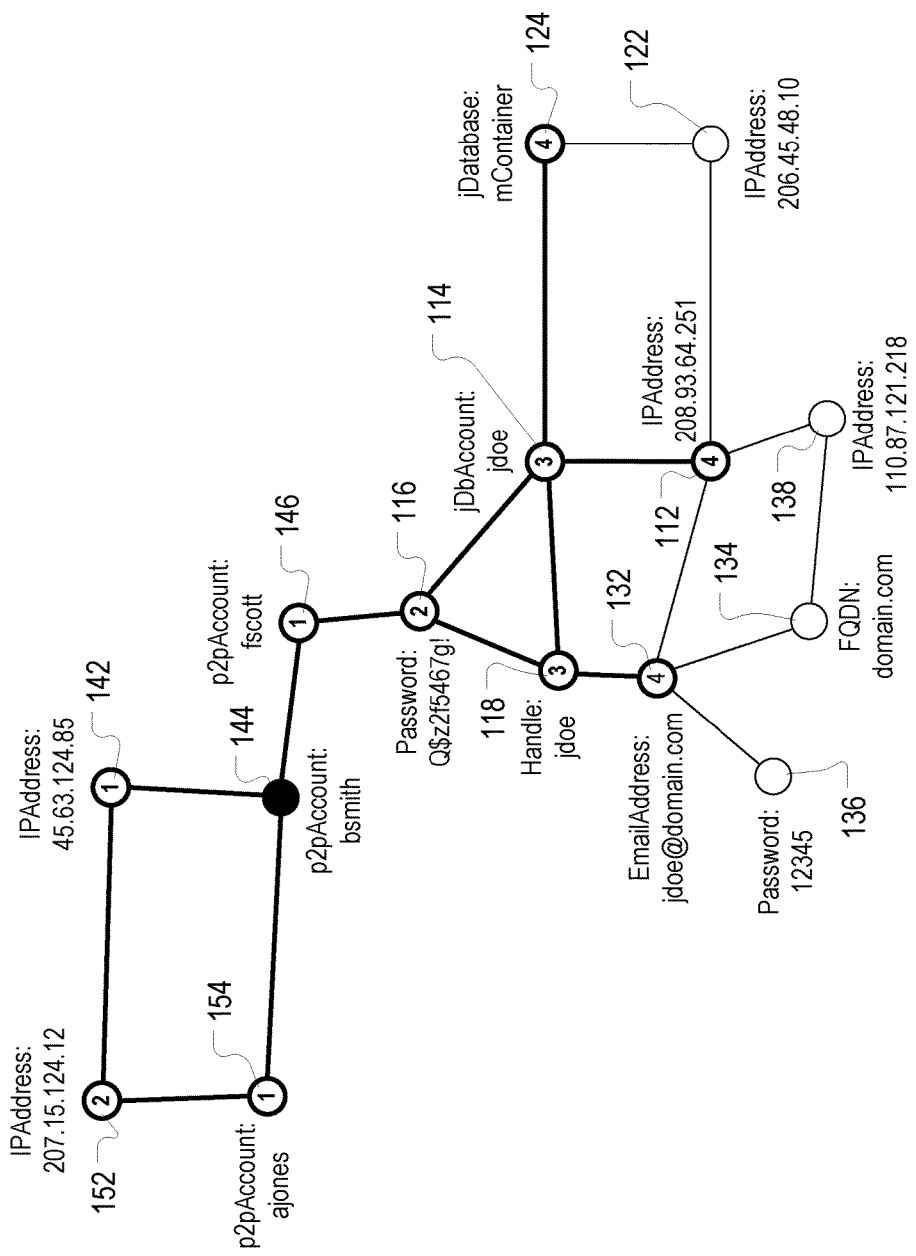
FIG. 33 illustrates tagging of nodes up to four edges away from a threat node with a threat distance value.

As another example, FIG. 33 illustrates tagging of nodes up to four edges away from threat node 144 with a threat distance value. In this example, nodes 112,124,132 are also updated to indicate a threat distance of "4".

In accordance with one or more preferred implementations, a depth first traversal or breadth first traversal is utilized for updating a threat distance value for nodes up to n edges away from a threat node.

An exemplary methodology for updating a threat distance value for nodes up to four edges away from a threat node will now be described with reference to FIGS. 34-42.

Starting at node 144, which has been tagged as a threat node, one or more links stored in association with the node 144 are accessed, and a first link from the node 144 is determined for traversal. As illustrated in FIG. 34, this would be a link for the node 146 which has a node type of "p2pAccount" and a node value of "fscott".

Figure 35:
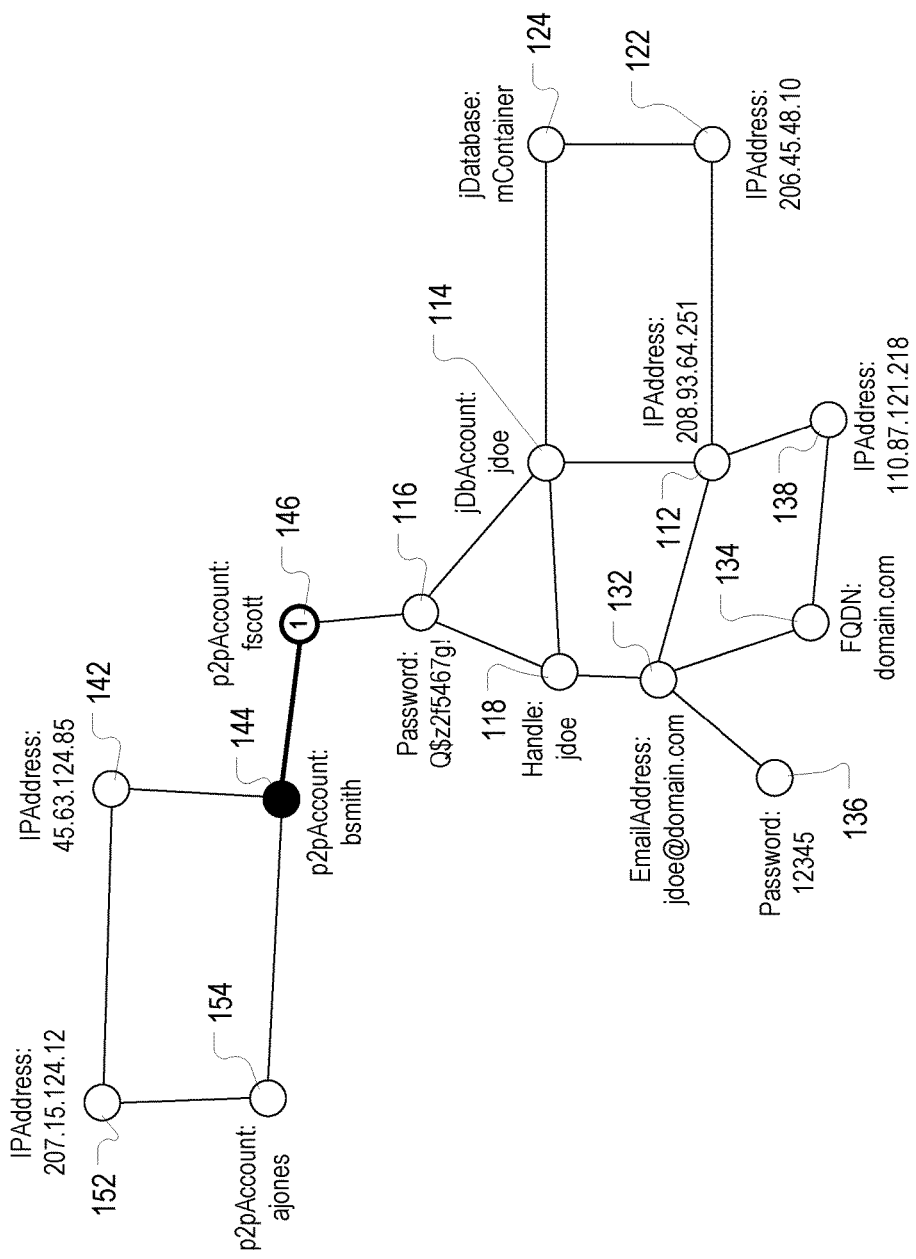

As this node 146 has not yet been visited, a traversal to this node 146 is effected and the node is updated with the threat distance of "1", as illustrated in FIG. 35. In accordance with one or more preferred implementations, this node may be checked to determine whether it is marked as a threat, or whether it is already marked with a lower threat distance value, which may obviate traversal through this node.

This node 146 is also marked as visited. Next, one or more links stored in association with this node 146 are accessed. Because the first link represents a link to a node that has already been visited (namely node 144), traversal to this node does not occur, and instead a second link from the node 146 is determined for traversal. As illustrated in FIG. 36, this is a link for the node 116 which has a node type of "Password" and a node value of "Q$z2f5467g!".

Figure 37:
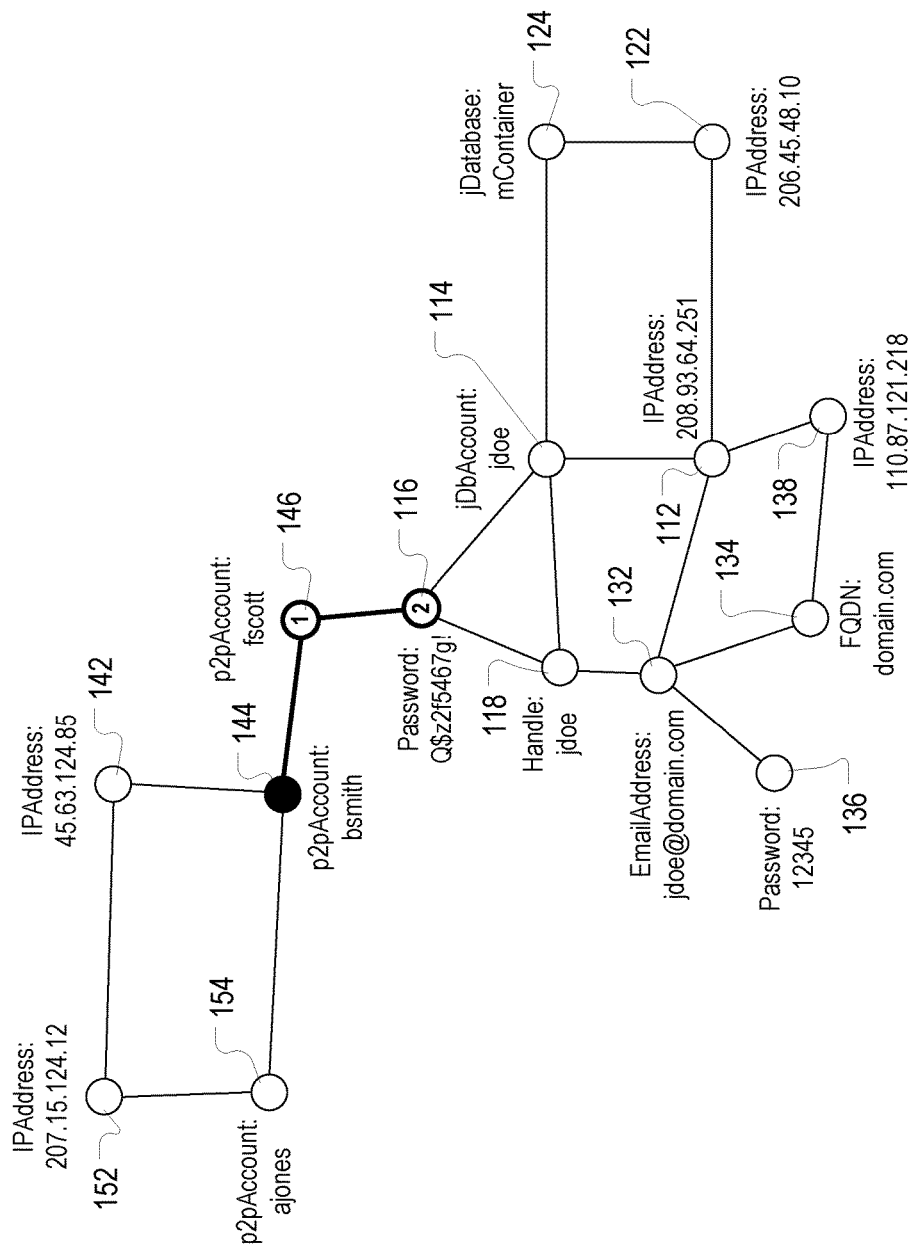
Figure 38:
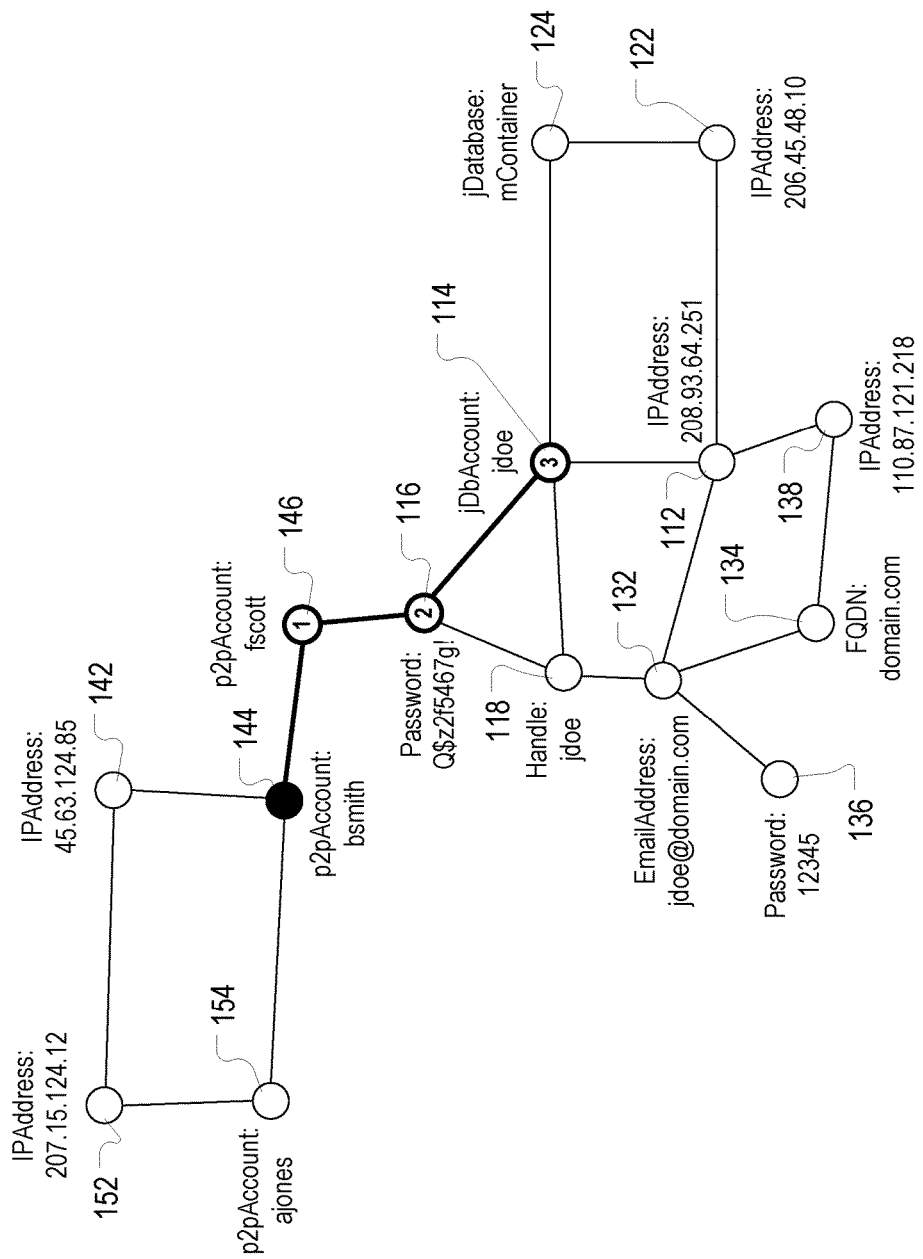
Figure 39:
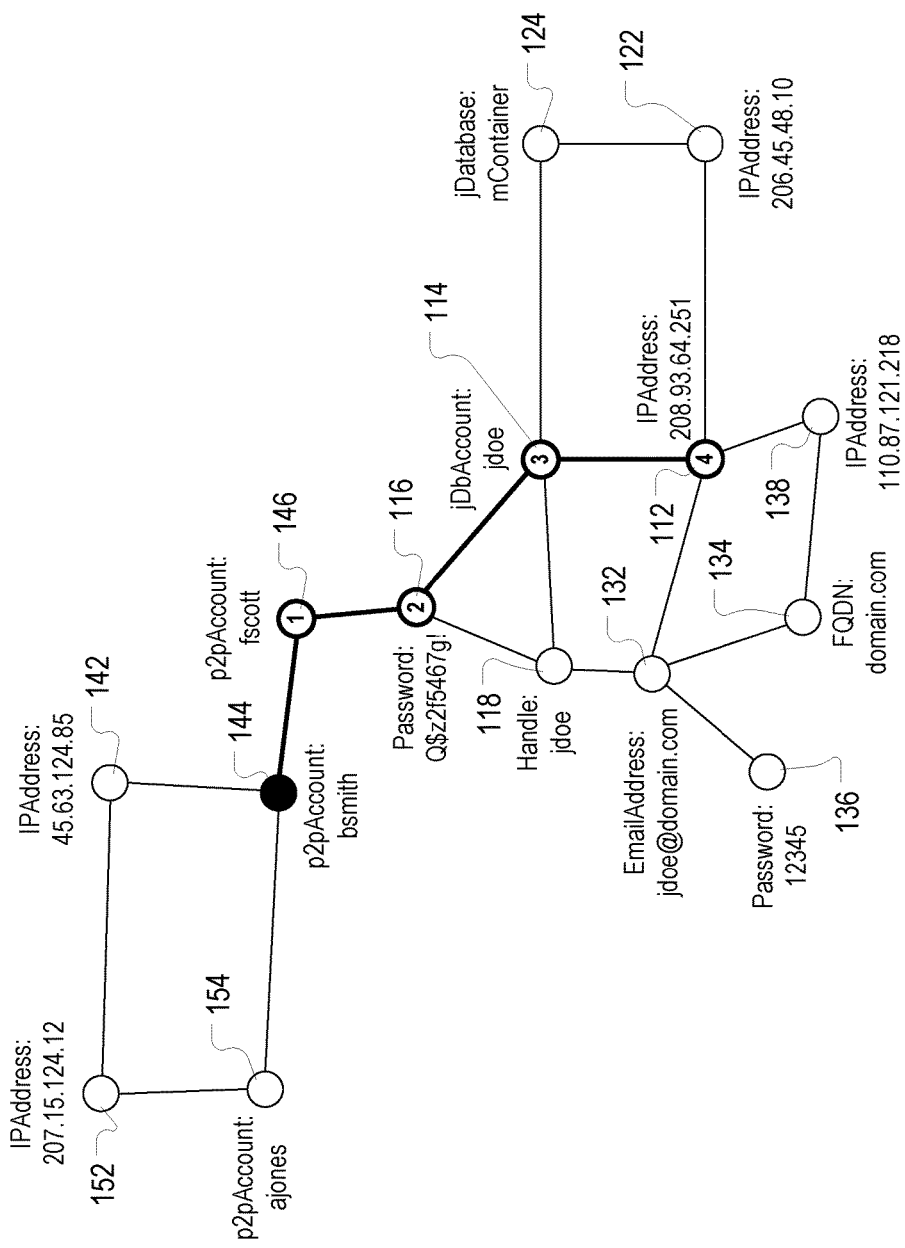

As this node 116 has not yet been visited, a traversal to this node 116 is effected and the node is updated with the threat distance of "2", as illustrated in FIG. 37. Depth first traversal continues in this manner, with traversal to node 114, and updating of this node 114 with the threat distance of "3", as illustrated in FIG. 38, and then with traversal to node 112, and updating of this node 112 with the threat distance of "4", as illustrated in FIG. 39.

As this methodology involves updating a threat distance value for nodes up to four edges away from a threat node, and traversal has now occurred to node 112 which has a threat distance of "4" (indicating that it is four edges away from a threat node), even though node 112 includes a plurality of links which would allow for further depth traversal (as illustrated in FIG. 40), further depth traversal to a link from node 112 will not occur.

Instead, the methodology returns to the last analyzed node with a threat distance less than the maximum of four (in this case node 114), and determines the first link that represents a link to a node that has not yet been visited. As illustrated in FIG. 41, this is a link for the node 124 which has a node type of "jDatabase" and a node value of "mContainer".

Figure 42:
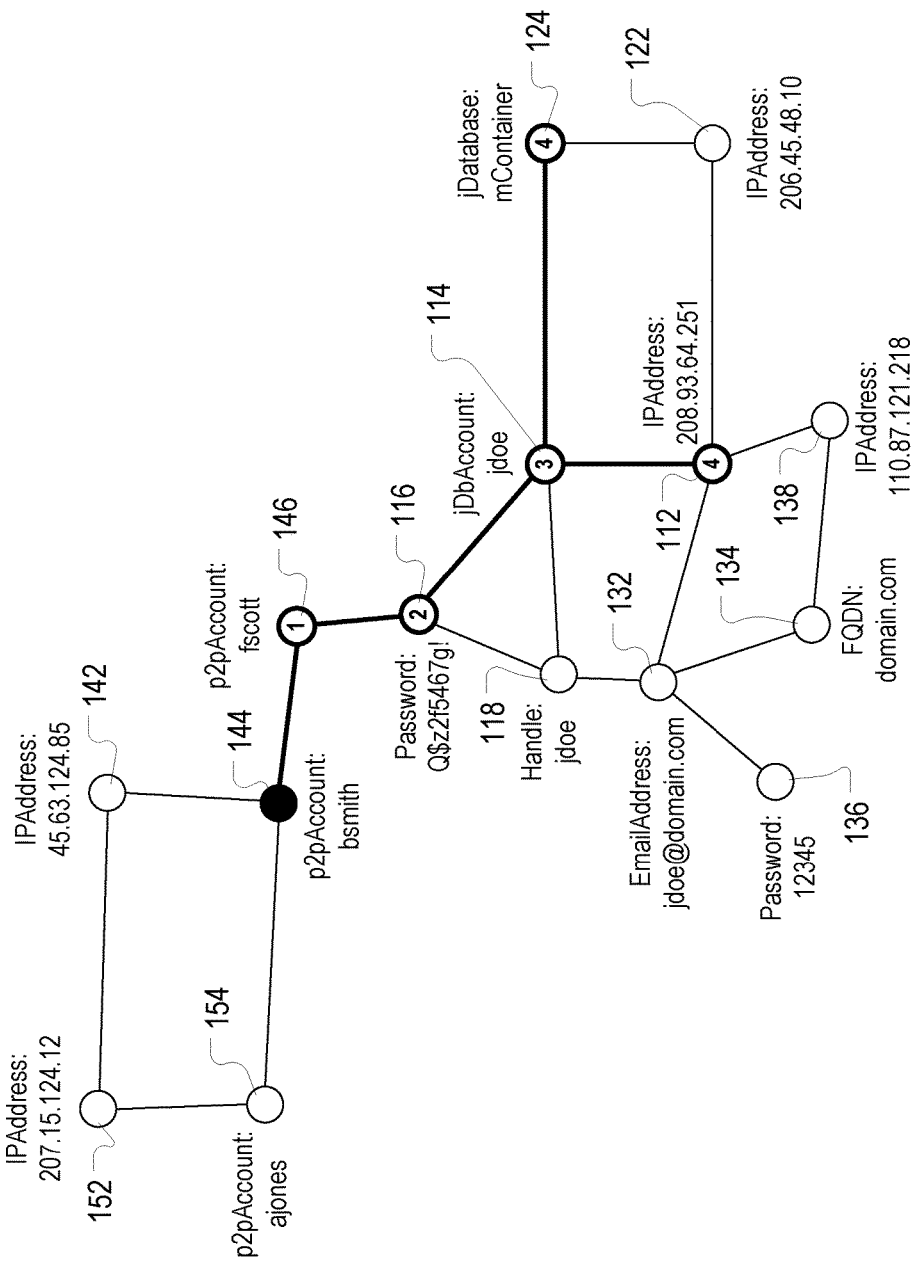

As this node 124 has not yet been visited, a traversal to this node 124 is effected and the node is updated with the threat distance of "4", as illustrated in FIG. 42.

Figure 43:
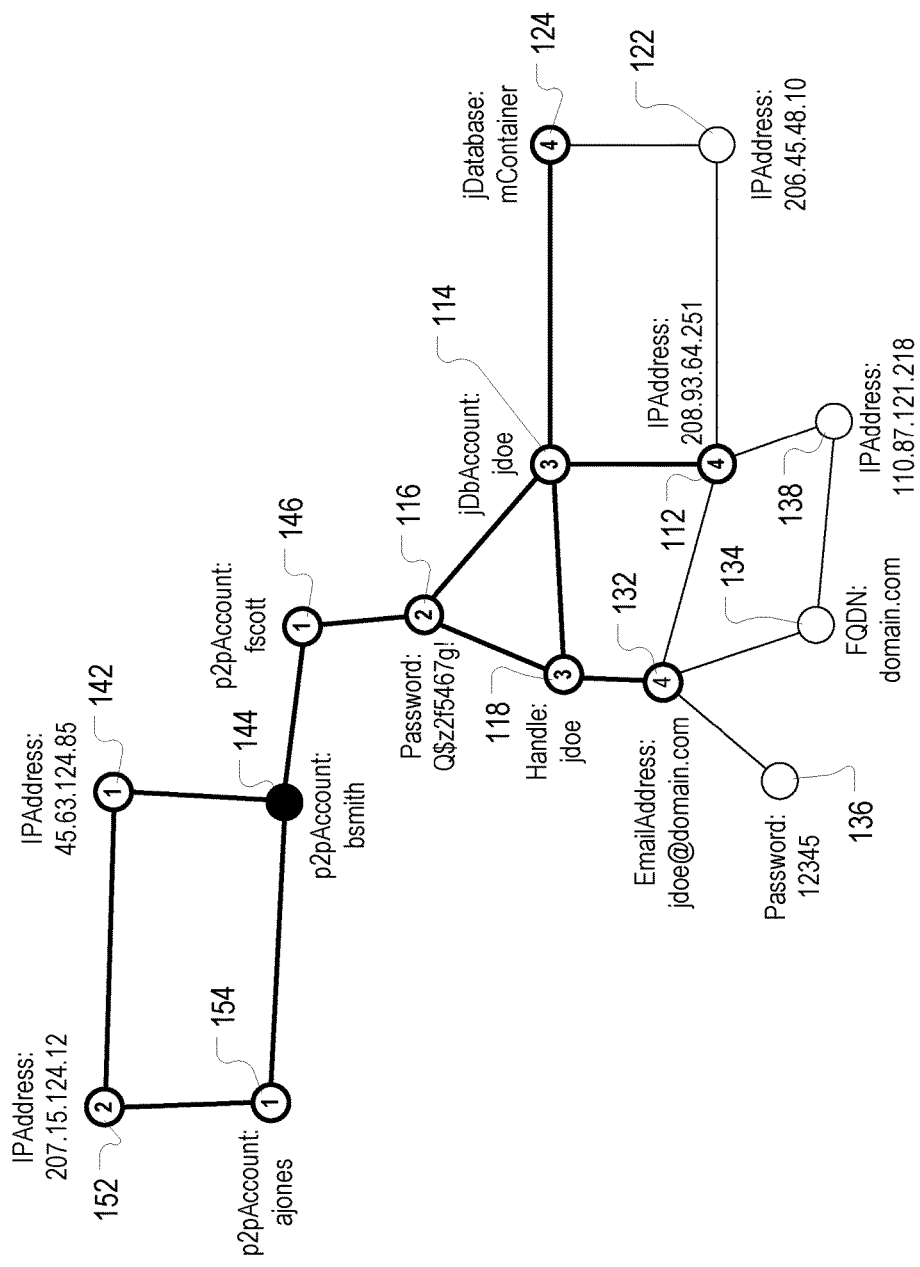

Depth first traversal continues in this manner, resulting in updating of all of the nodes within four links of threat node 144, as illustrated in FIG. 43.

In accordance with one or more preferred implementations, path information for a particular path that resulted in a determined threat distance may be gathered during performance of a traversal, and may even be stored at a node together with a threat distance. In accordance with one or more preferred implementations, path information may be stored as a list of nodes in a path to a threat node (e.g. as a list of node references or node links).

FIG. 44 illustrates exemplary C# style pseudocode for an exemplary node class which is configured for an indication of whether a node is a threat node, an indication of whether a node is a sensor node, and an indication of a threat distance to a threat node. FIG. 45 illustrates exemplary C# style pseudocode for an exemplary hypergraph class which includes a method to update threat distances of nodes in a hypergraph.

As noted above, in accordance with one or more preferred implementations, software uses two or more methodologies for calculating threat distance, which may be selected depending on a calculated ratio of sensor data to threat actor data (e.g. sensor nodes to threat nodes).

As further noted above, in accordance with one or more preferred implementations, if a number of threat nodes is less than a number of sensor nodes, then software updates nodes up to n-edges away from threat nodes with a distance from the nearest threat node. An exemplary scenario involving such updating was just described hereinabove. The pseudocode in FIG. 45 illustrates performing such updating of surrounding nodes for each node tagged as a threat based on a determination that a number of threat nodes is less than a number of sensor nodes.

In accordance with one or more preferred implementations, if a number of threat nodes is greater than a number of sensor nodes, then a threat distance for one or more nodes will be determined with a breadth first search or Dijkstra's algorithm.

Figure 46:
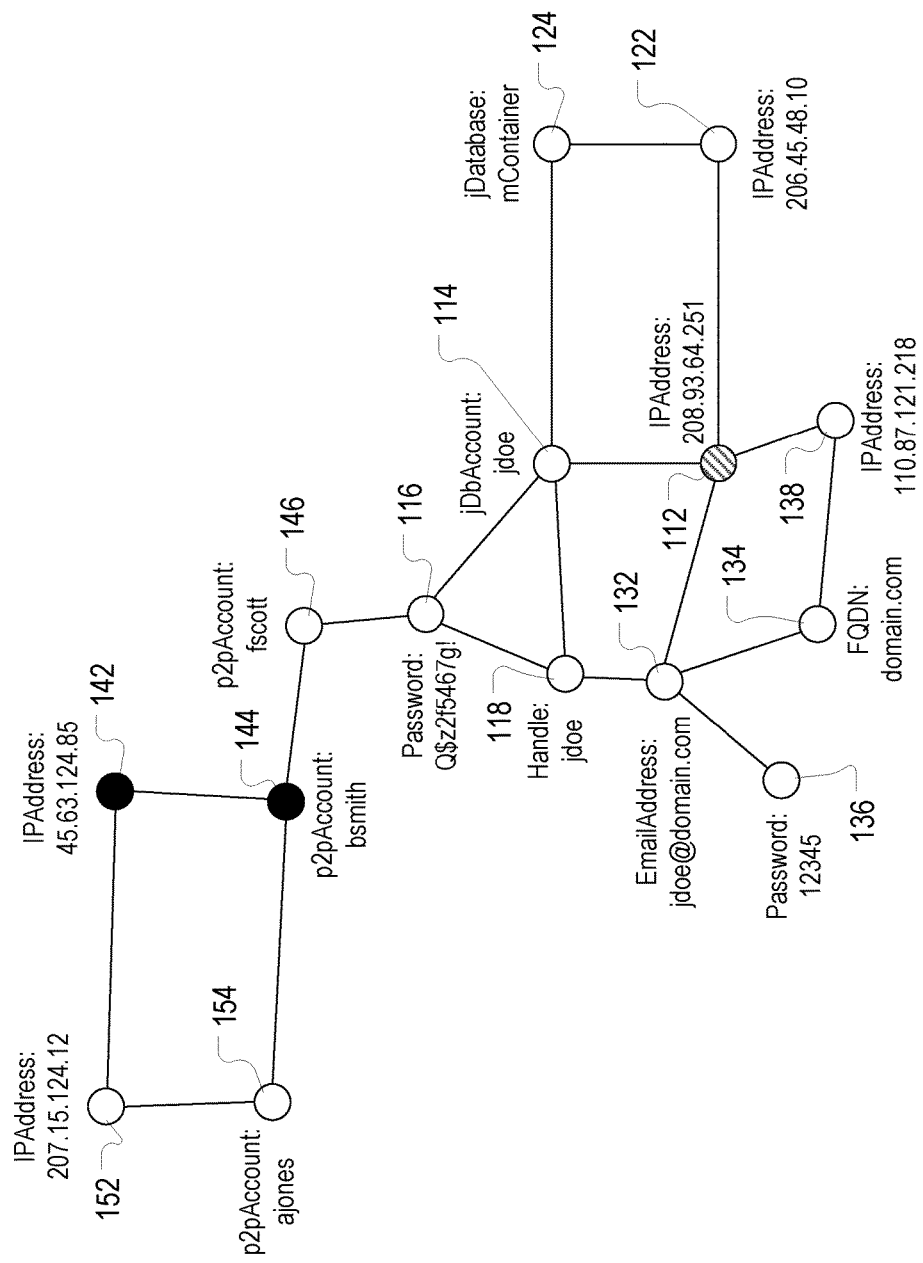
FIG. 46 illustrates a hypergraph having more threat nodes than sensor nodes.
Figure 47:
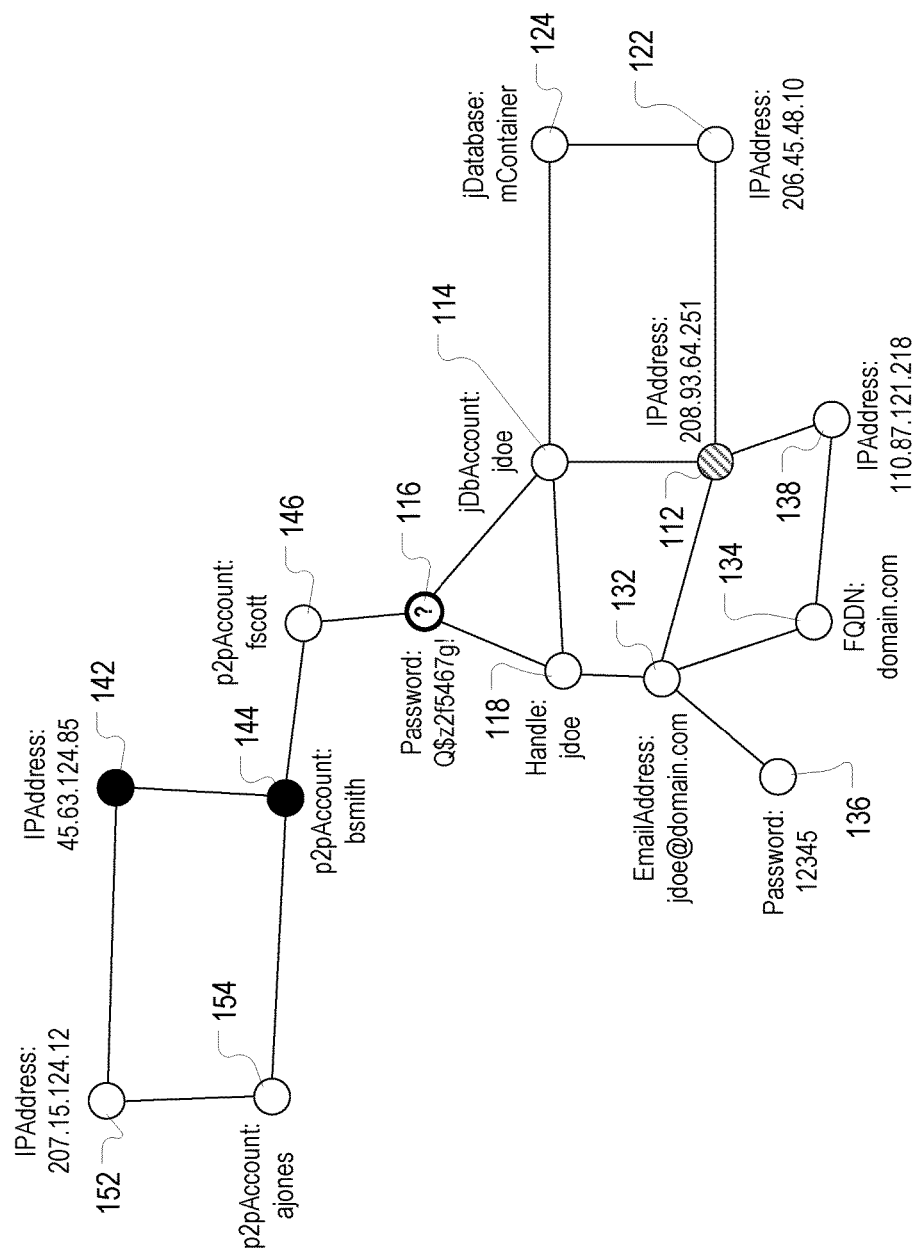
Figure 49:
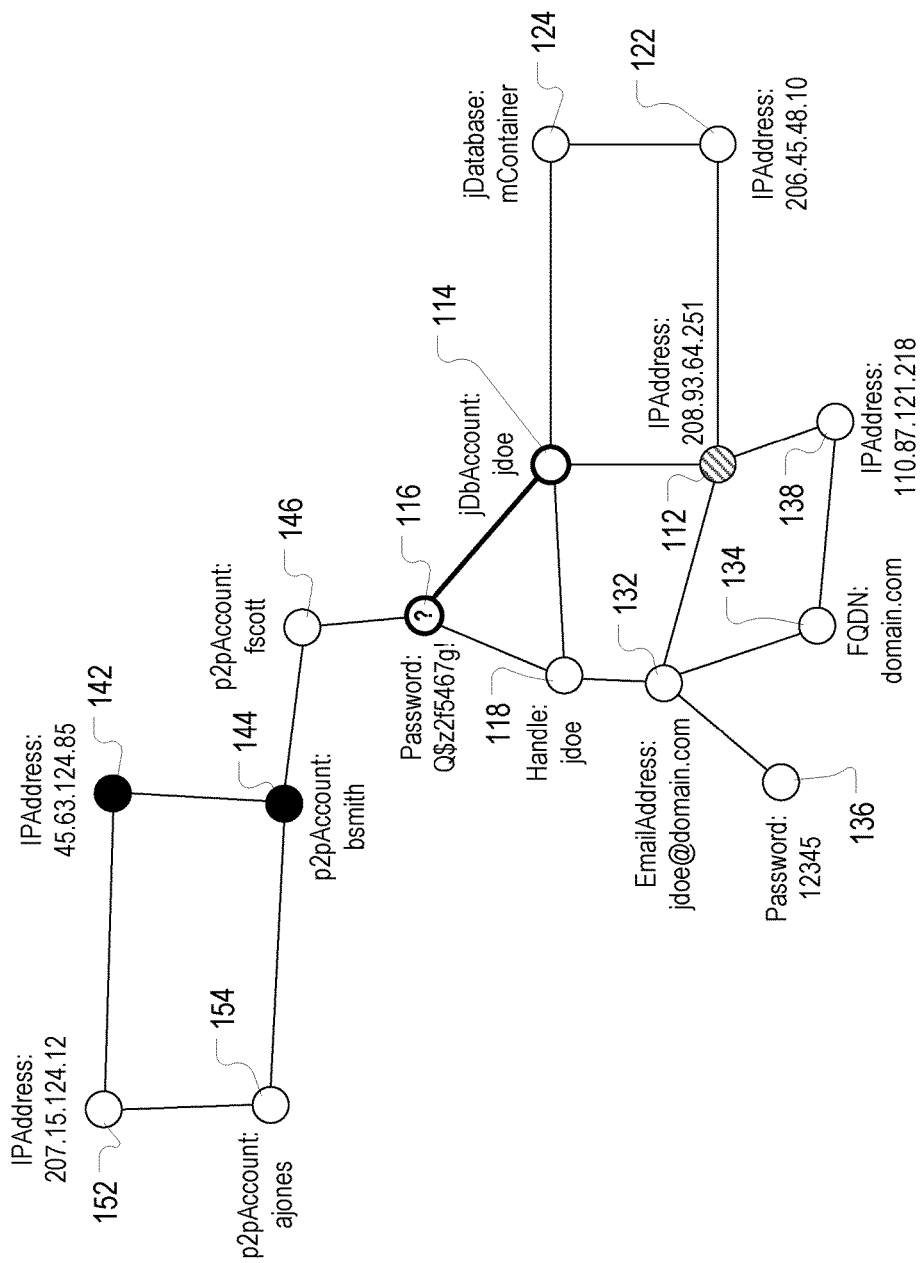

For example, FIG. 46 illustrates nodes of a hypergraph in which node 142 has now been tagged as a threat node, thus causing the hypergraph to have more threat nodes than sensor nodes (the sole sensor node 112 being identified by shading).

An exemplary methodology for determining a threat distance value for anode will now be described with respect to node 116 and with reference to FIGS. 47-63.

Starting at node 116, one or more links stored in association with the node 116 are accessed, and a first link from the node 116 is determined for traversal. As illustrated in FIG. 48, this is a link for the node 114 which has a node type of "jDbAccount" and a node value of "jdoe".

As this node 114 has not yet been visited, a traversal to this node 114 is effected and the node is checked to determine whether it has been tagged as a threat. The node is also marked as visited. As the node 114 has not been tagged as a threat, the search for a threat node continues.

However, next, rather than continuing to do a depth traversal along a link from node 114, another available link that will result in a lower total distance from the starting node 116 is utilized. In accordance with one or more preferred implementations, a list is constructed of all possible links to take from any node that has been traversed to that leads to a node that has not yet been visited (or a list may be constructed of all possible links to take from any node that has been traversed to and any node that has already been visited may be subsequently ignored or passed over), and then anode is selected that would result in the lowest total traversal distance if traversal occurred to that node.

Here, another link from the node 116 is determined for traversal. As illustrated in FIG. 50, this is a link for the node 118 which has a node type of "Handle" and a node value of "jdoe".

Figure 51:
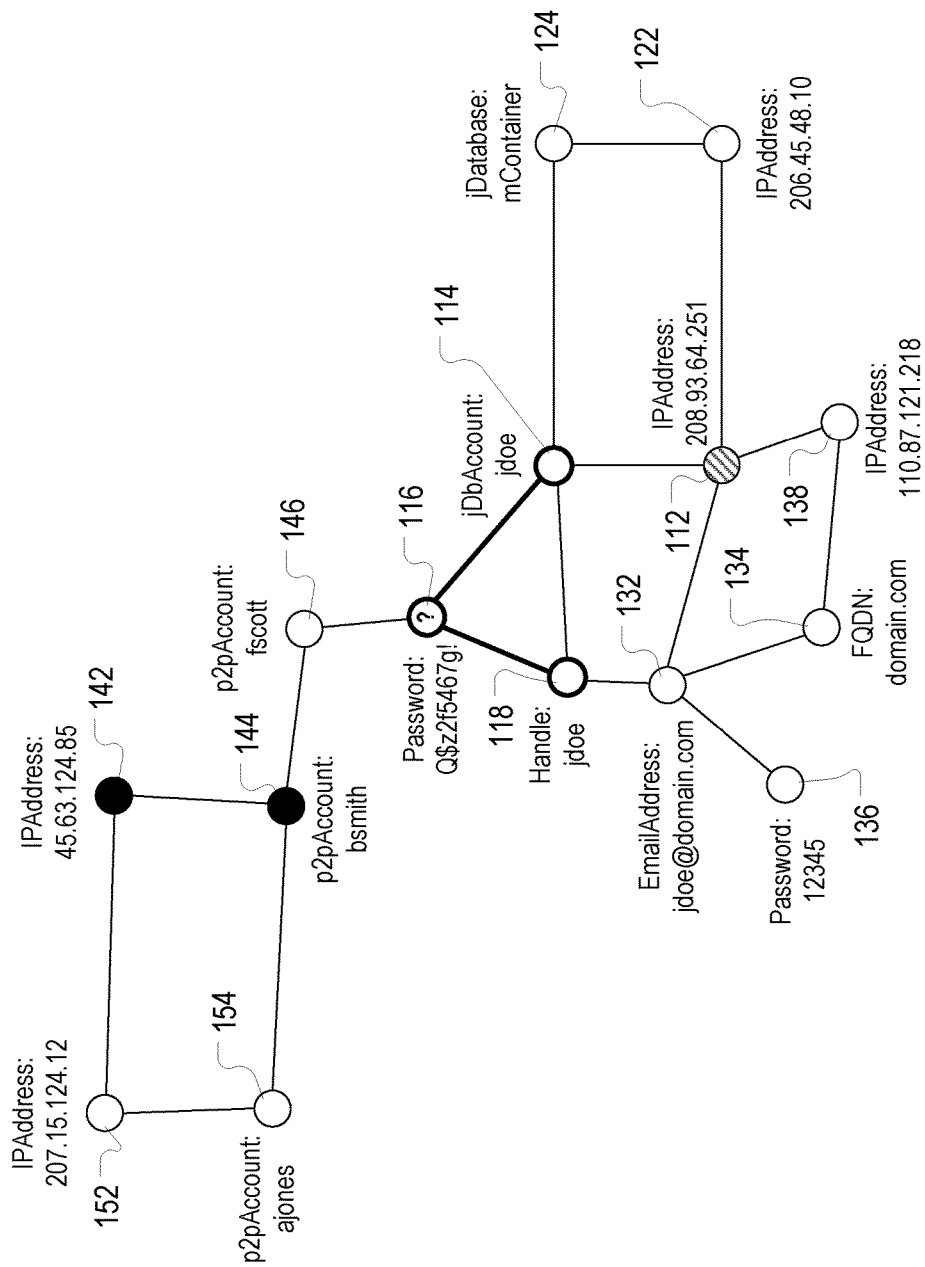

As this node 118 has not yet been visited, a traversal to this node 118 is effected and the node is checked to determine whether it has been tagged as a threat, as illustrated in FIG. 51. The node is also marked as visited. As the node 118 has not been tagged as a threat, the search for a threat node continues.

Once again, rather than continuing to do a depth traversal along a link from node 118, another available link that will result in a lower total distance from the starting node 116 is utilized. In particular, another link from the node 116 is determined for traversal. As illustrated in FIG. 52, this is a link for the node 146 which has a node type of "p2pAccount" and a node value of "fscott".

Figure 53:
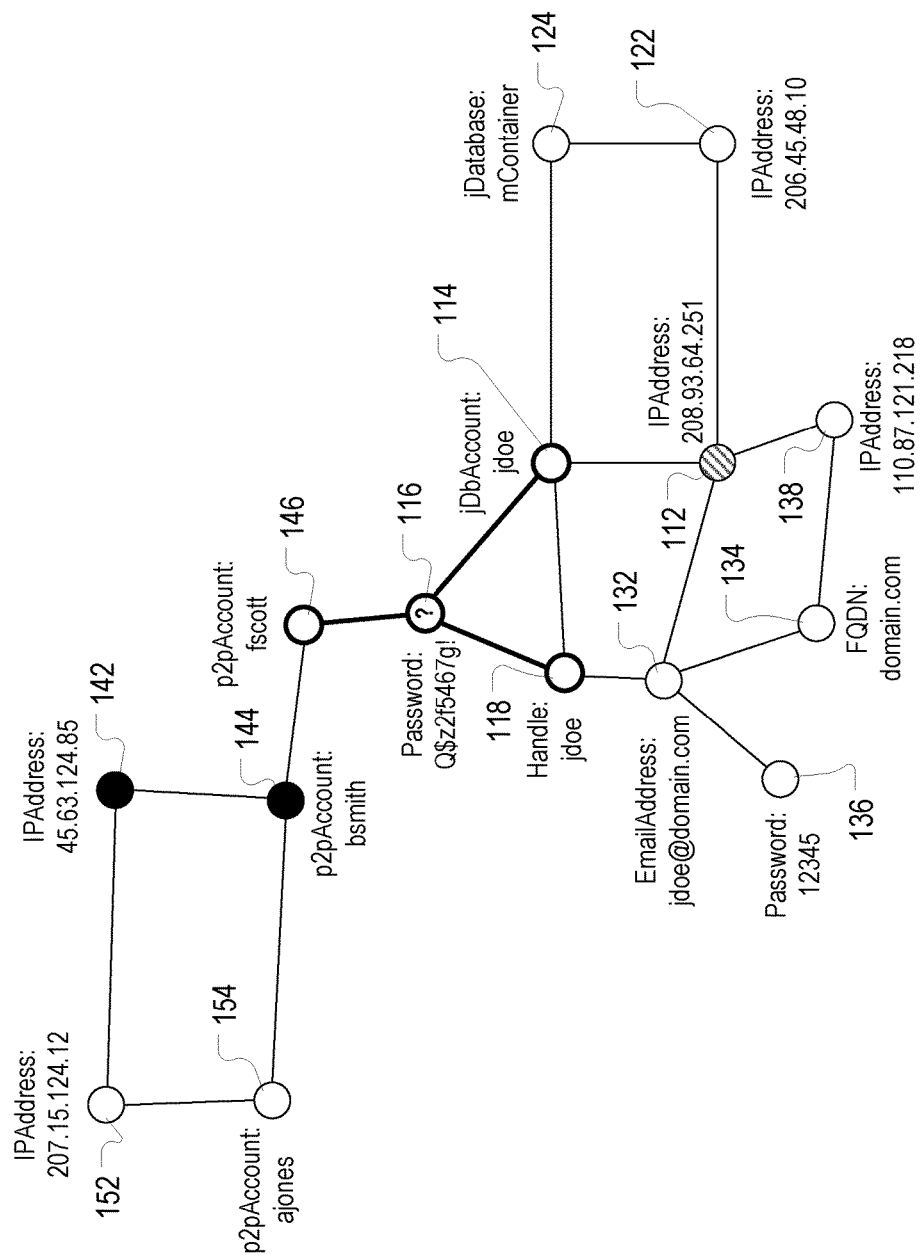

As this node 146 has not yet been visited, a traversal to this node 146 is effected and the node is checked to determine whether it has been tagged as a threat, as illustrated in FIG. 53. The node is also marked as visited. As the node 146 has not been tagged as a threat, the search for a threat node continues.

Again, rather than continuing to do a depth traversal along a link from node 118, another available link that will result in a lower total distance from the starting node 116 is utilized. This time, there are no links left which would result in a total distance from the starting node of 1, so a node is selected which would result in a total distance from the starting node of 2. In accordance with various preferred implementations, various methodologies are utilized for selecting a next link to investigate from among many possible links when each link would result in the same total distance from the starting node. Here, links with equal weight are considered in the order in which the corresponding node containing the corresponding link was traversed, with links with equal weight from the same node being considered in the order in which they are stored or listed, although various other methodologies may be utilized in accordance with one or more preferred implementations.

Here, a first link from the node 114 is determined for traversal. As illustrated in FIG. 54, this is a link for the node 112 which has a node type of "IPAddress" and a node value of "208.93.64.251".

Figure 55:
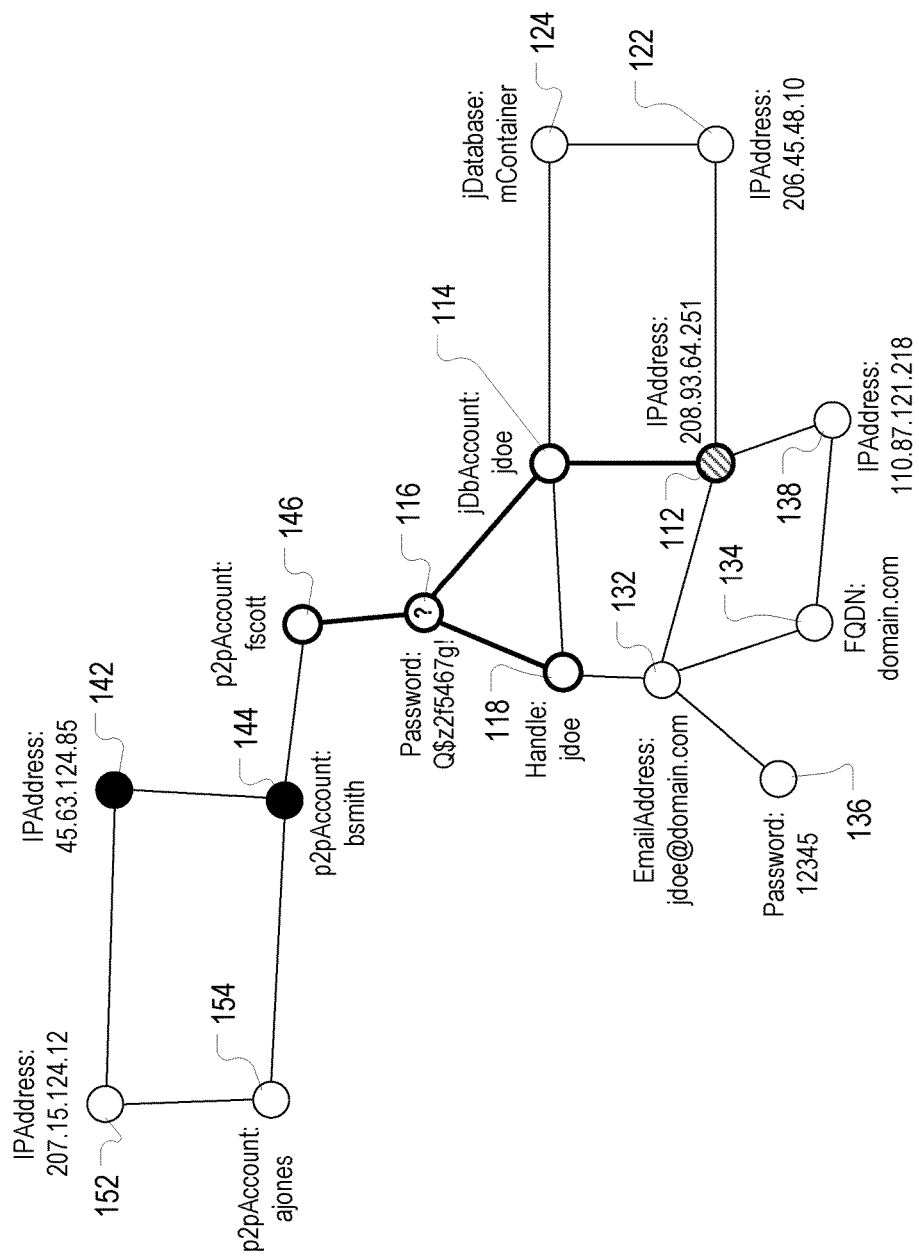

As this node 112 has not yet been visited, a traversal to this node 112 is effected and the node is checked to determine whether it has been tagged as a threat, as illustrated in FIG. 55. The node is also marked as visited. As the node 112 has not been tagged as a threat, the search for a threat node continues.

Next, rather than continuing to do a depth traversal along a link from node 112, another available link that will result in a lower total distance from the starting node 116 is utilized. In particular, another link from the node 114 is determined for traversal. As illustrated in FIG. 56, this is a link for the node 124 which has a node type of "jDatabase" and a node value of "mContainer".

Figure 57:
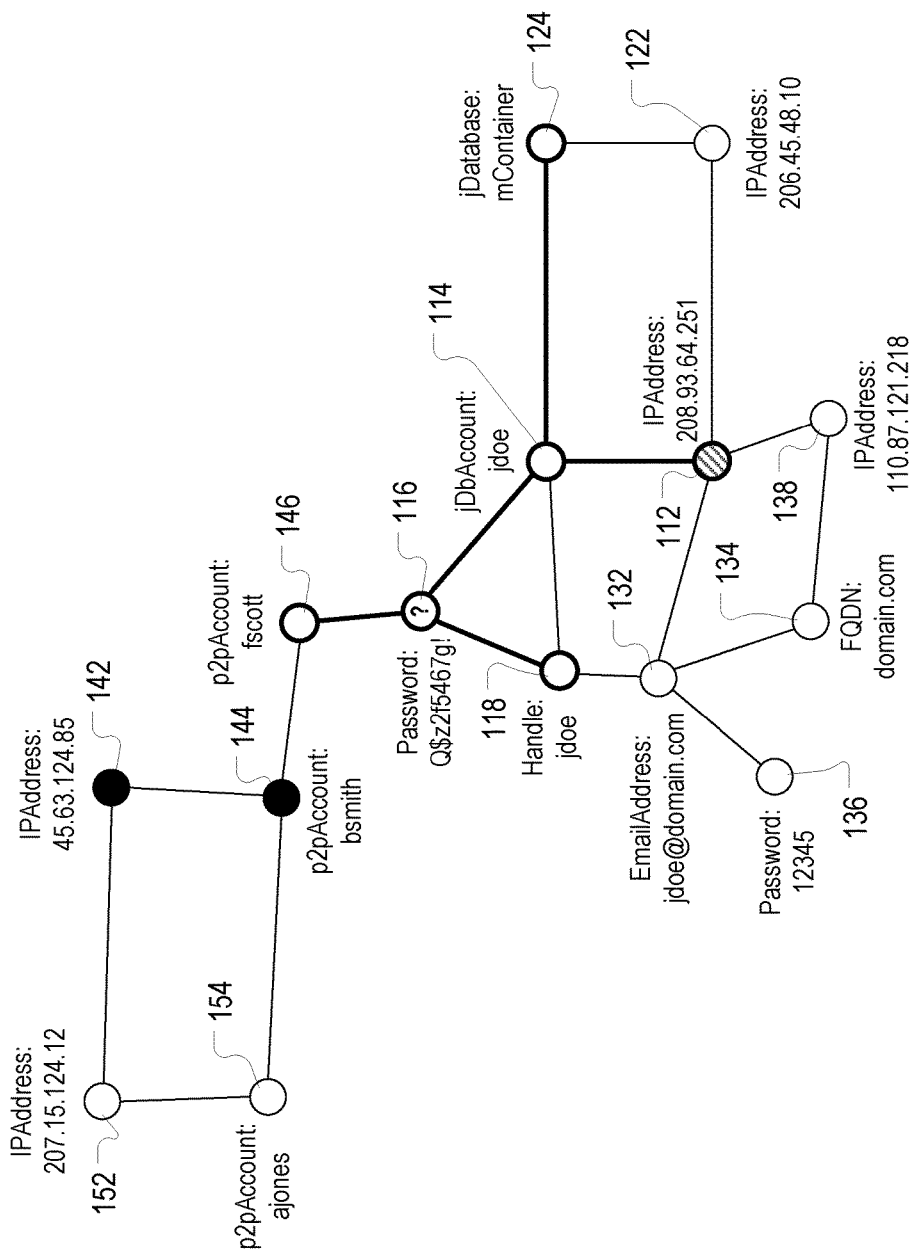

As this node 124 has not yet been visited, a traversal to this node 124 is effected and the node is checked to determine whether it has been tagged as a threat, as illustrated in FIG. 57. The node is also marked as visited. As the node 124 has not been tagged as a threat, the search for a threat node continues.

Figure 58:
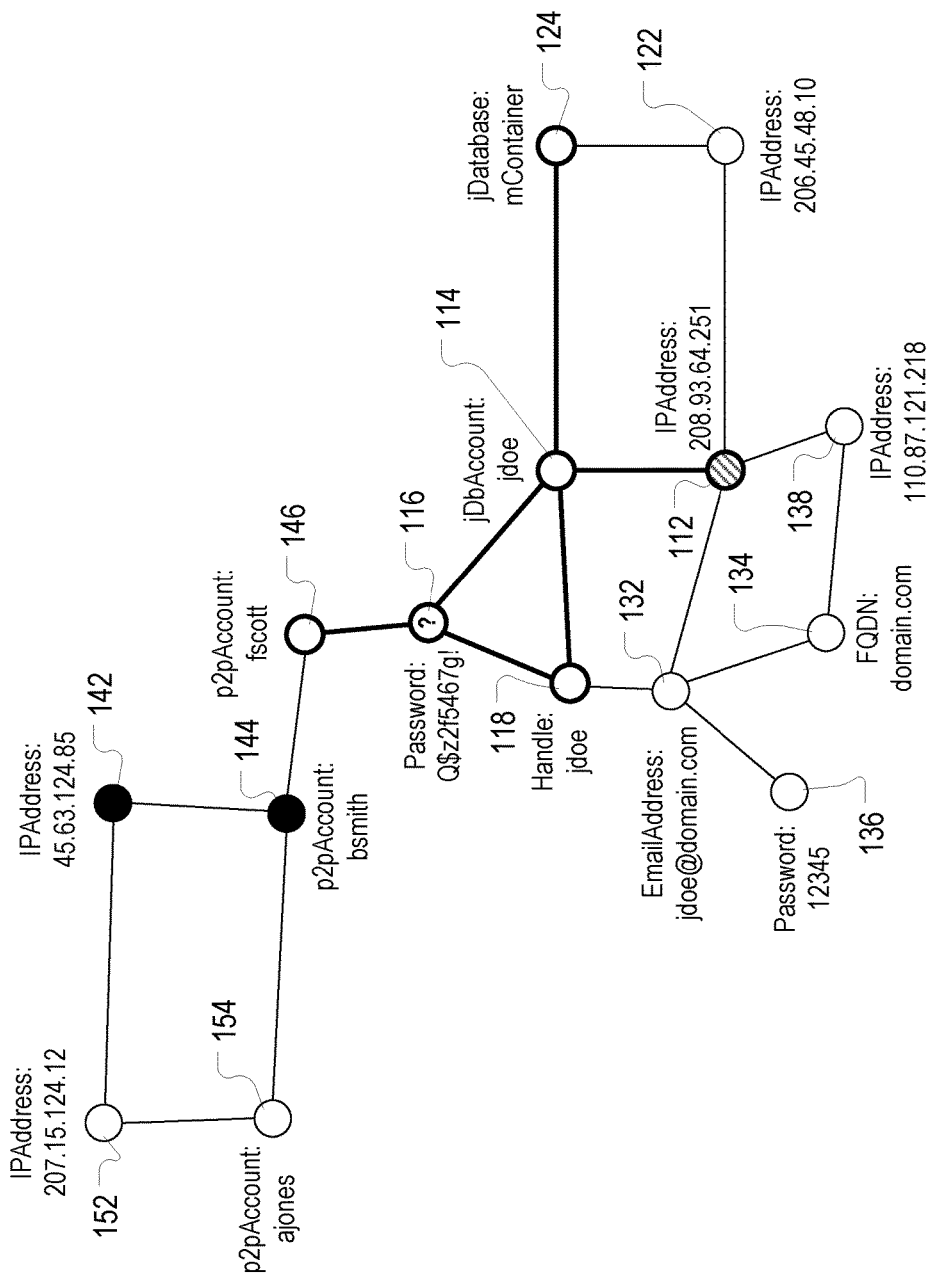
Figure 59:
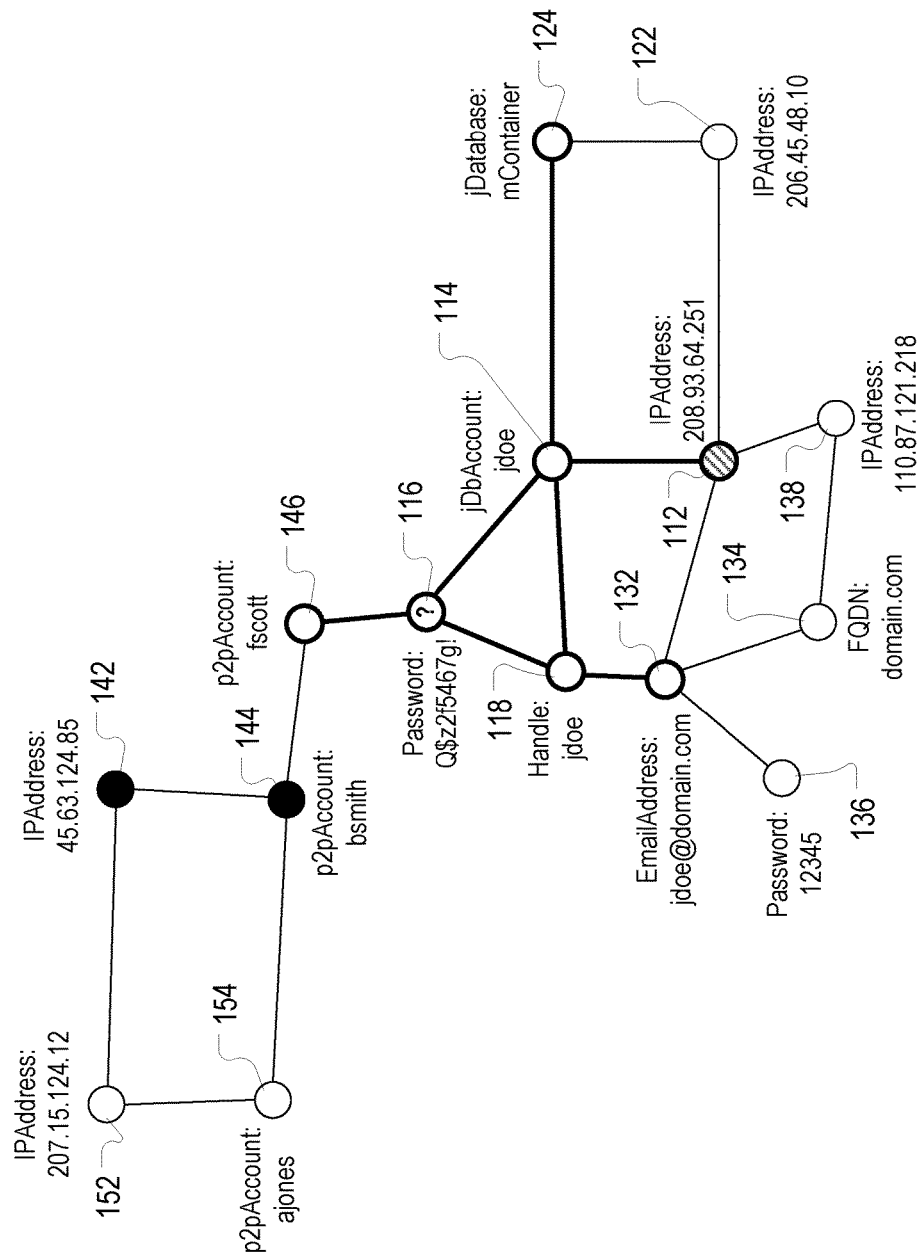

Next, rather than continuing to do a depth traversal along a link from node 112, another available link that will result in a lower total distance from the starting node 116 is sought. Notably, although the next link from the node 114 is for node 118 having a node type of "Handle" and a node value of "jdoe" (as illustrated in FIG. 56), the node 118 has already been visited (as can be seen in FIG. 58), and thus a different link is determined for traversal. Similarly, the next link from the node 114 which is for node 116 is also for a node that has already been visited, and thus a different link is determined for traversal.

This time, the only links left which would result in a total distance from the starting node of 2 are from node 146, and a first of the links from this node 146 is determined for traversal. As illustrated in FIG. 60, this is a link for the node 144 which has a node type of "p2pAccount" and a node value of "bsmith".

Figure 61:
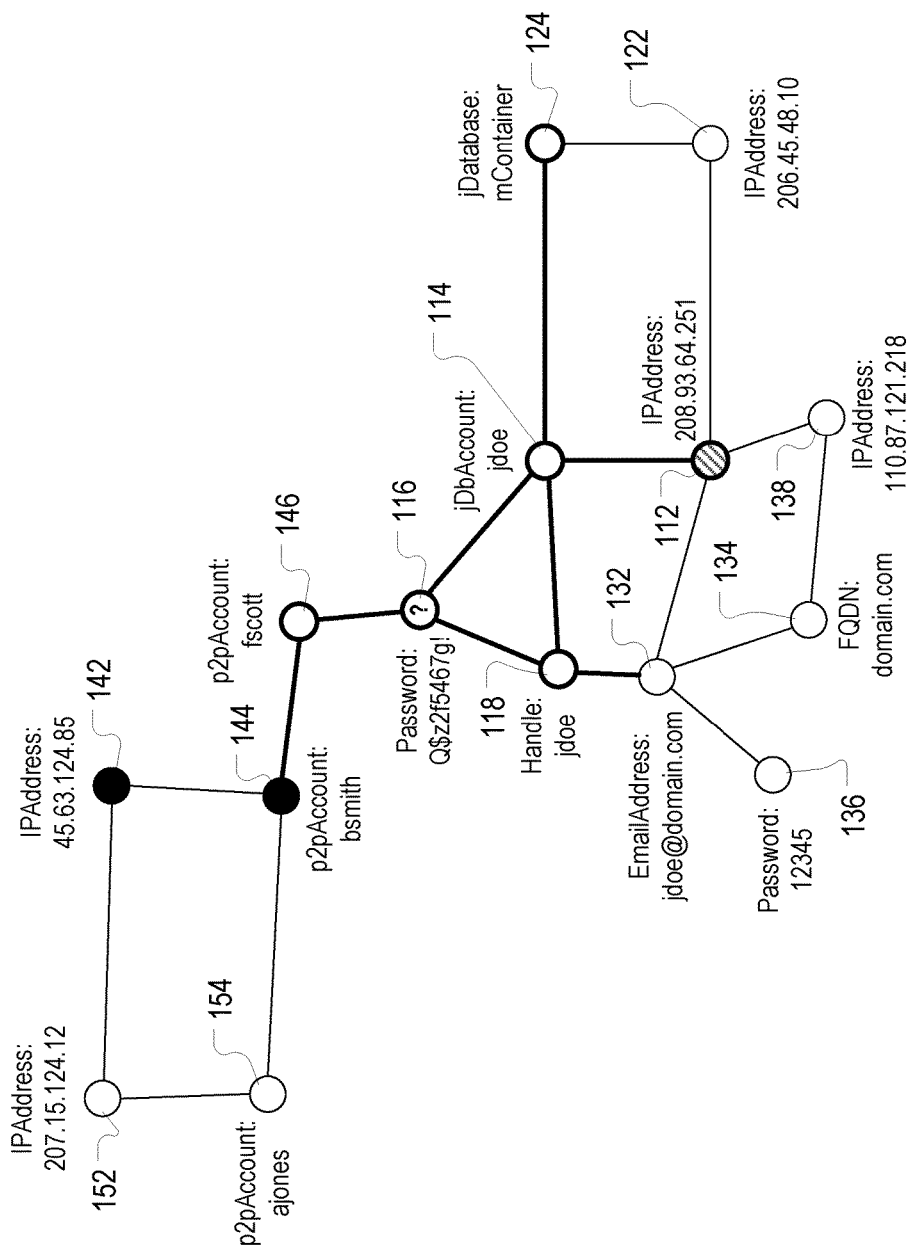
Figure 62:
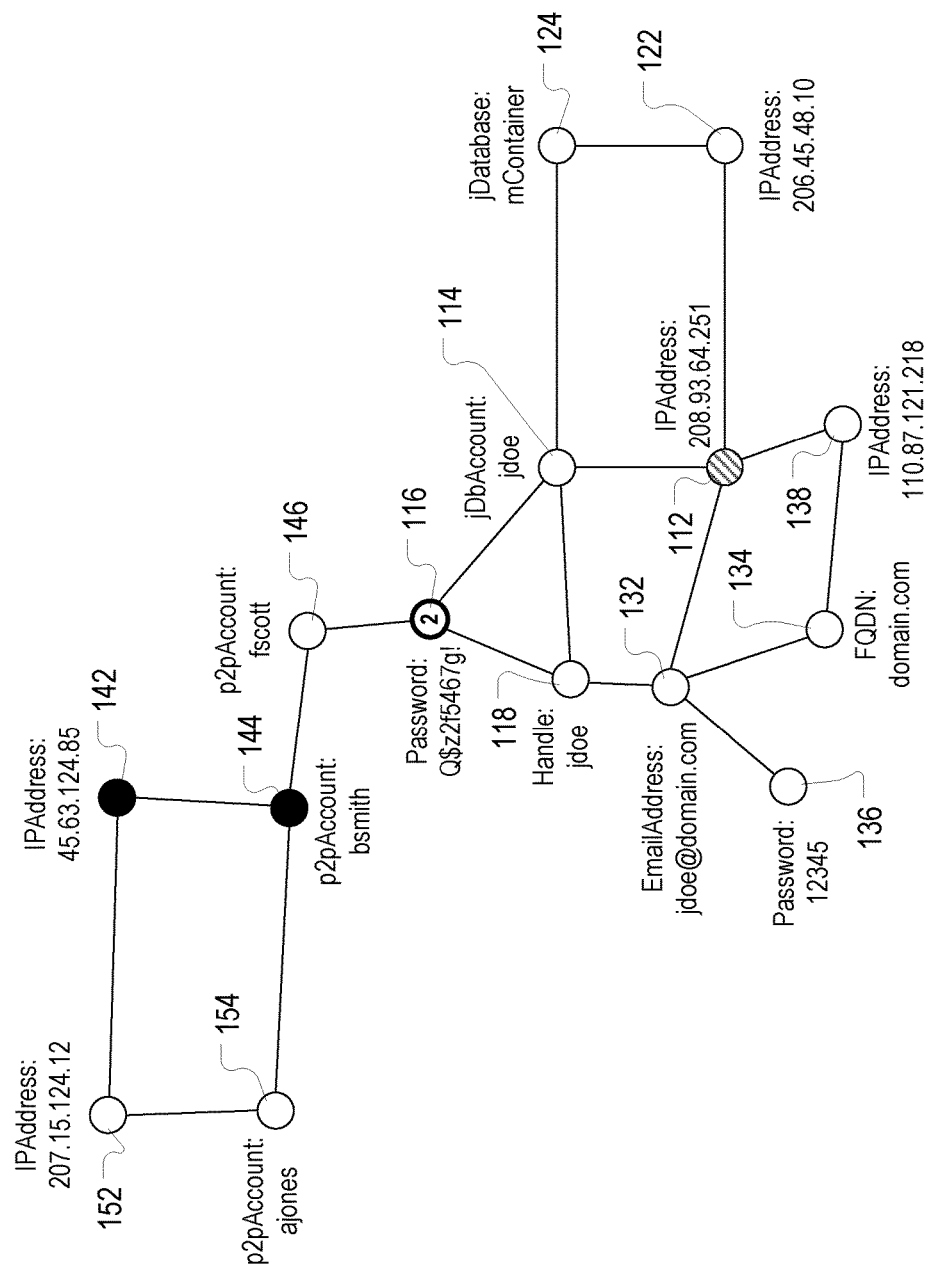

As this node 144 has not yet been visited, a traversal to this node 144 is effected and the node is checked to determine whether it has been tagged as a threat, as illustrated in FIG. 61. As the node 144 has been tagged as a threat, the search for a threat node is over. The node 116 has been determined to have a threat distance of "2" from the threat node 144, as illustrated in FIG. 62.

In accordance with one or more preferred implementations, a threat distance value for the node 116 is updated to reflect the determined threat distance of "2", as illustrated in FIG. 63.

As noted hereinabove, in accordance with one or more preferred implementations, path information for a particular path that resulted in a determined threat distance may be gathered during performance of a traversal, and may even be stored at a node together with a threat distance. In accordance with one or more preferred implementations, path information may be stored as a list of nodes in a path to a threat node (e.g. as a list of node references or node links).

In accordance with one or more preferred implementations, a threat distance value for each node along the determined threat path may be updated as well. In accordance with one or more preferred implementations, threat path data may be stored at each node along the path together with such updating. In accordance with one or more preferred implementations, stored threat path data may merely be a link to a next node for a threat path.

Figure 64:
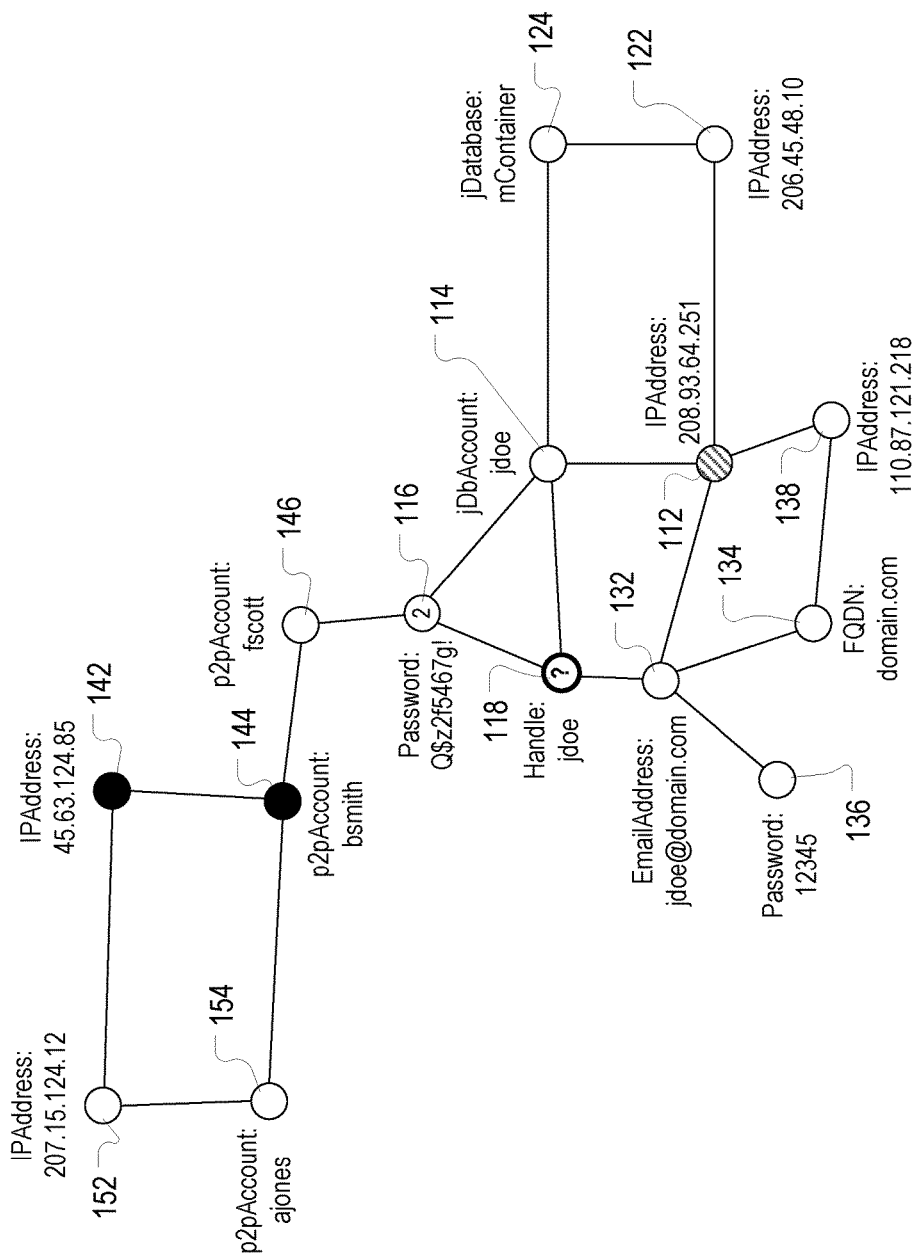

In accordance with one or more preferred implementations, an attempt to determine a threat distance value for a node may a leverage threat distance value that has already been determined for another node, e.g. a nearby node. As an example, consider an attempt to determine a threat distance value for the node 118, as illustrated in FIG. 64.

Starting at node 118, one or more links stored in association with the node 118 are accessed, and a first link from the node 118 is determined for traversal. This is a link for the node 114 which has a node type of "jDbAccount" and a node value of "jdoe".

As this node 114 has not yet been visited, a traversal to this node 114 is effected and the node is checked to determine whether it has been tagged as a threat. The node is also marked as visited. Additionally a check is performed to determine whether the node 114 has a stored threat distance value. Here, as the node 114 has not been tagged as a threat and does not have a stored threat distance value, the search for a threat node continues.

Rather than continuing to do a depth traversal along a link from node 118, another available link that will result in a lower total distance from the starting node 118 is utilized. In particular, another link from the node 118 is determined for traversal. This is a link for the node 116 which has a node type of "Password" and a node value of "Password: Q$z2f5467g!".

Figure 65:
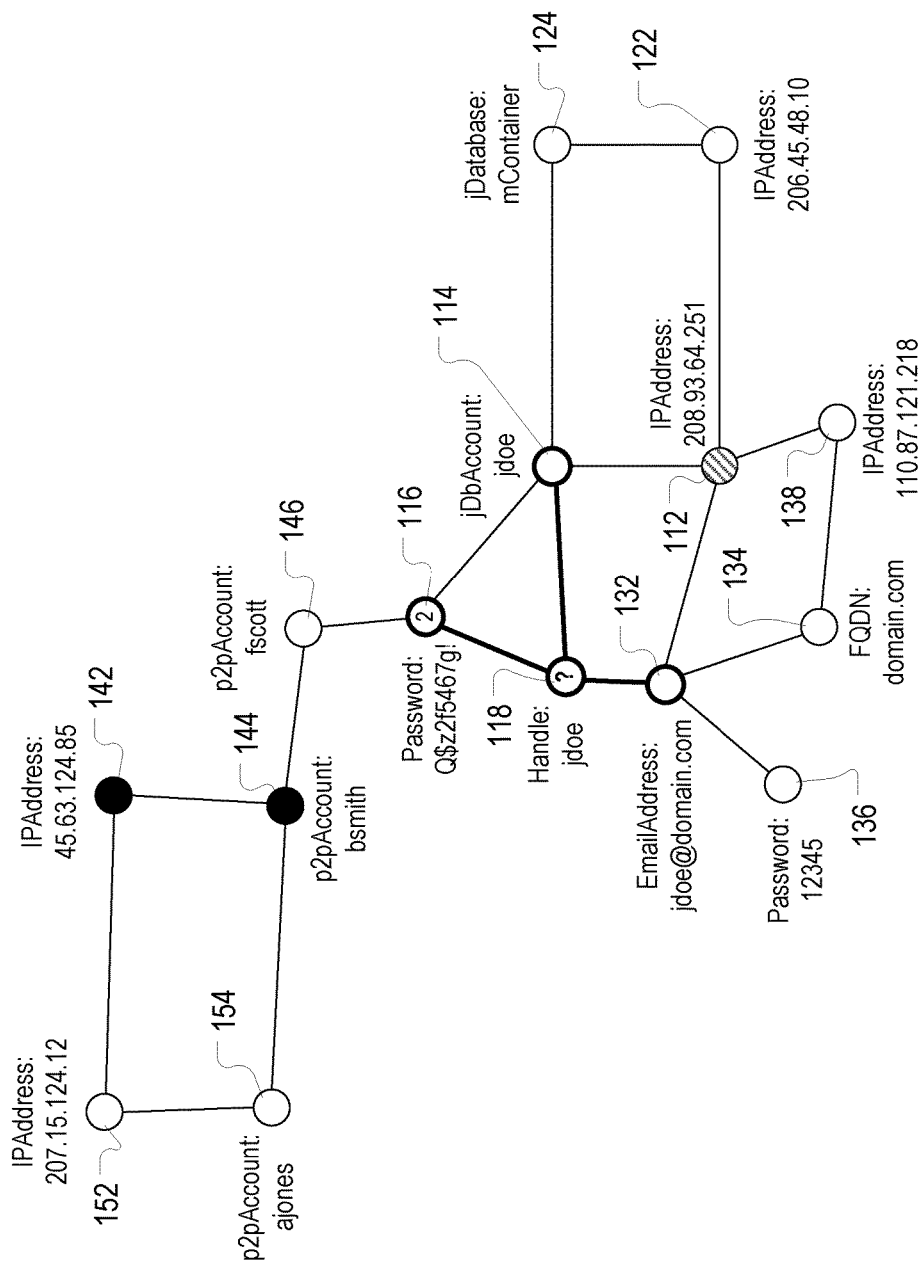

As this node 116 has not yet been visited, a traversal to this node 116 is effected and the node is checked to determine whether it has been tagged as a threat. Additionally, however, the node is checked to determine whether it has a stored threat distance value. Here, it has a stored threat distance value, as illustrated in FIG. 65. A tentative threat distance for the node 118 can be determined by adding the current traversal distance of "1" to the threat distance value of "2" stored at node 116, resulting in a tentative threat distance value of "3".

However, there is a need to continue to ensure that a shorter threat path, and thus a lower threat distance value, is not possible.

Next, rather than continuing to do a depth traversal along a link from node 116, another available link that will result in a lower total distance from the starting node 118 is utilized. In particular, another link from the node 118 is determined for traversal. This is a link for the node 132 which has a node type of "EmailAddress" and a node value of "jdoe@domain.com".

As this node 132 has not yet been visited, a traversal to this node 132 is effected and the node is checked to determine whether it has been tagged as a threat. Additionally a check is performed to determine whether the node 132 has a stored threat distance value. Here, as the node 114 has not been tagged as a threat and does not have a stored threat distance value, the search for a threat node continues.

Figure 66:
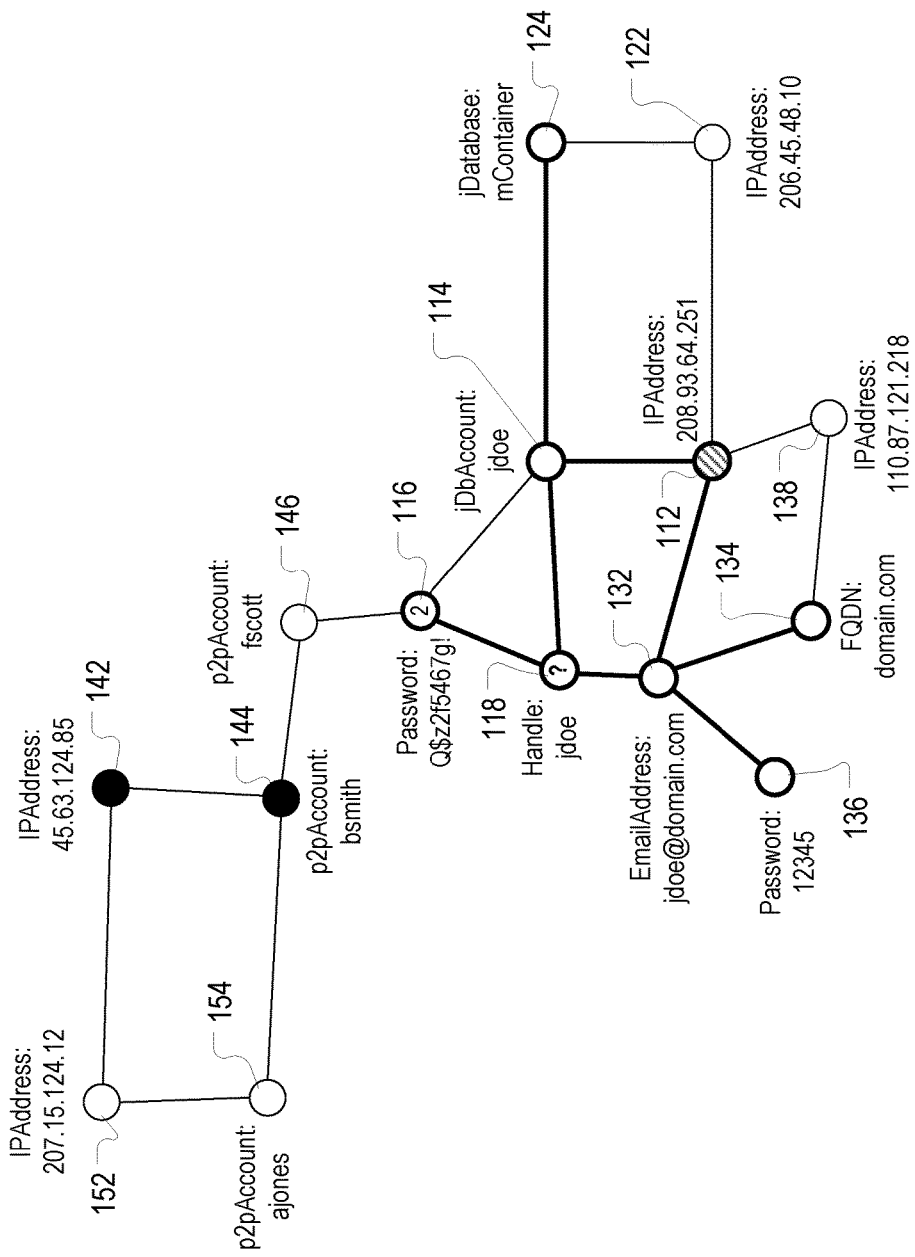
Figure 67:
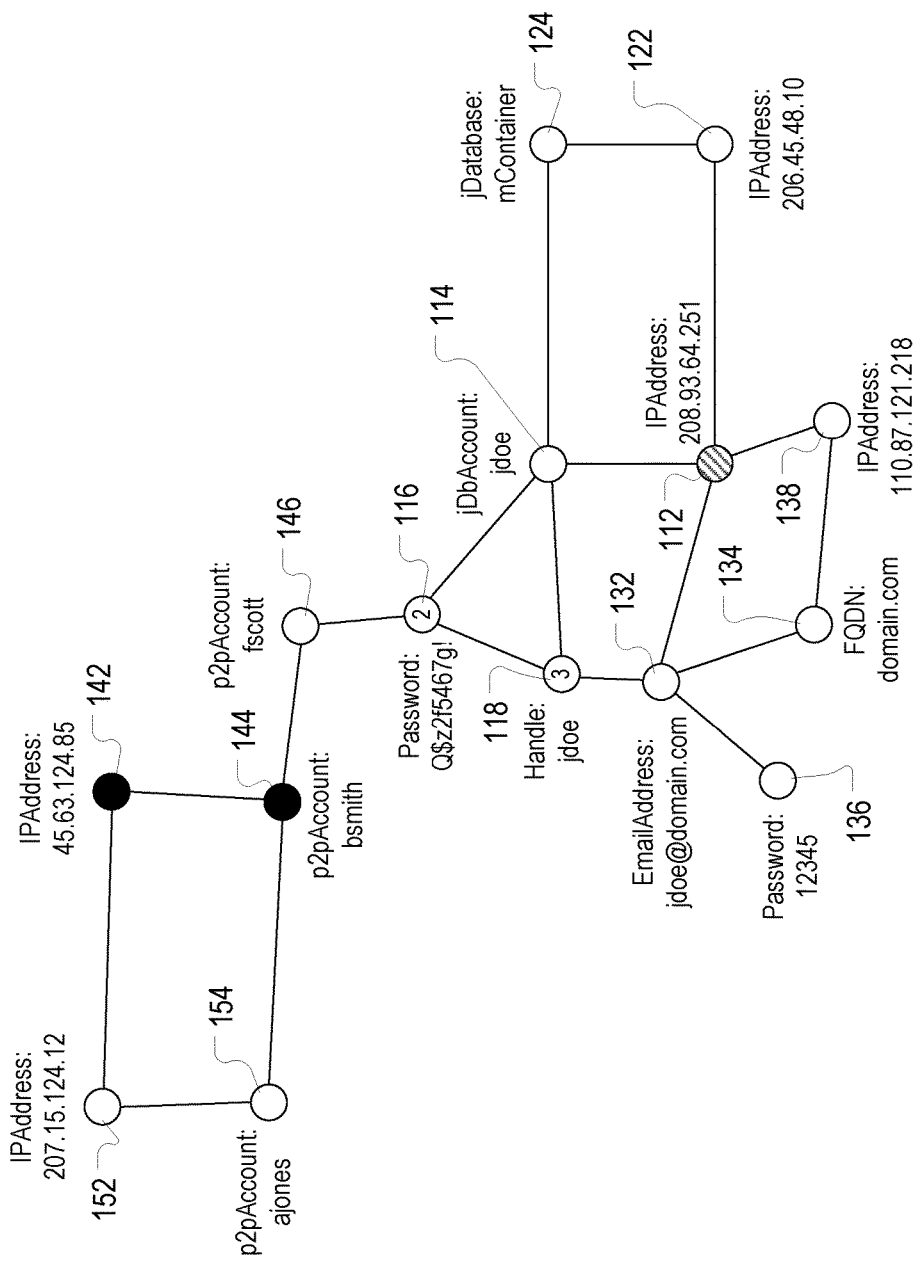

In order to ensure that a shorter threat path, and thus a lower threat distance value, is not possible, this process continues and traverses to and analyzes nodes that are two links away from the node 118, as illustrated in FIG. 66. Upon doing so, it is determined that the tentative threat distance for node 118 determined based on the stored threat distance for node 116 is the lowest possible threat distance for node 118, as illustrated in FIG. 67.

In accordance with one or more preferred implementations, a threat distance value for the node 118 is updated to reflect the determined threat distance of "3", as illustrated in FIG. 68.

In accordance with one or more preferred implementations, a ProximitySpace value is determined based on a threat distance, and used to evaluate the proximity of a node to a threat. In accordance with one or more preferred implementations, a Proximity Space value is inversely proportional to a threat distance. In accordance with one or more preferred implementations, a Proximity Space value for a node is equal to (1/ThreatDistance), as illustrated in FIG. 69.

In accordance with one or more preferred implementations, data stored for a node may include a ProximitySpace value (as illustrated in FIG. 70), although in at least some preferred implementations it does not. In accordance with one or more preferred implementations, a Proximity Space value for a node is calculated as needed.

Hereinabove, hypergraphs have been described and illustrated which include nodes and links generated based on gathered data. As discussed herein, these hypergraphs can be utilized to determine proximity of a node to a threat. Thus far, all of the links that are established have been treated as having an equal link distance and thus given equal weight for purposes of a ProximitySpace value calculation. While useful as an exemplary case, one or more preferred implementations may take account how the underlying data is modeled and also take into consideration the number of disparate data sources that are being linked together across the distance in question.

Proximity in Time

Moreover, as nodes and links are generated based on gathered data, some of this gathered data may have been gathered a long time ago, or may have been gathered recently but reflect network communications from a long time ago.

As noted above, in accordance with one or more preferred implementations, a hypergraph is deformed based on temporality. In utilizing a hypergraph to determine proximity of a node to a threat, it is useful to evaluate not only proximity in space, but also proximity in time. In accordance with one or more preferred implementations, a proximity in time for links along a path from a node to a threat is utilized to deform, or weight, a determined threat distance, e.g. by being utilized together with such a threat distance to calculate a value indicating maliciousness (for example by being multiplied together).

Figure 71:
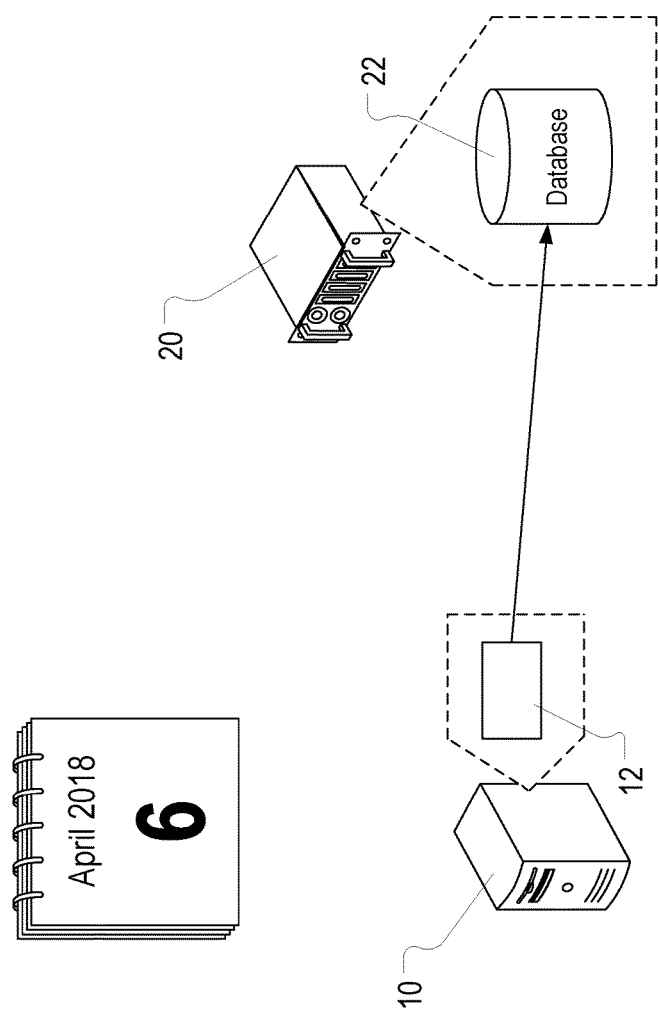
FIG. 71 illustrates occurrence of a network communication on a particular day.

For purposes of an example, return to the network communication that was illustrated in FIG. 1. FIG. 71 illustrates the same network communication, but is updated to convey that the communication occurred on Apr. 6, 2018.

In accordance with one or more preferred implementations, link data for a node can include date information indicating a date associated with a link. FIG. 72 illustrates such node link information for the node 112, where stored data for a link from the node 112 to the node 122 having a node type of "IPAddress" and a node value of "206.45.48.10" also includes an indication that the link is associated with a date of "04/06/2018".

In accordance with one or more preferred implementations, stored data for a link may include an indication that the link is associated with a time interval, e.g. "04/06/2018-04/12/2018", as illustrated in FIG. 73.

FIGS. 74-75 illustrate exemplary C# style pseudocode for an exemplary node class and an exemplary nodeLink class. This code includes exemplary methods for adding a link which includes a time interval to a node by specifying either a node ID or a node type and value.

FIG. 76 illustrates exemplary C# style pseudocode for an exemplary hypergraph class. This code includes an exemplary method for adding a link to a hypergraph by specifying a node type and value of a first node, and a node type and value of a second node, as well as a time interval.

Figure 77:
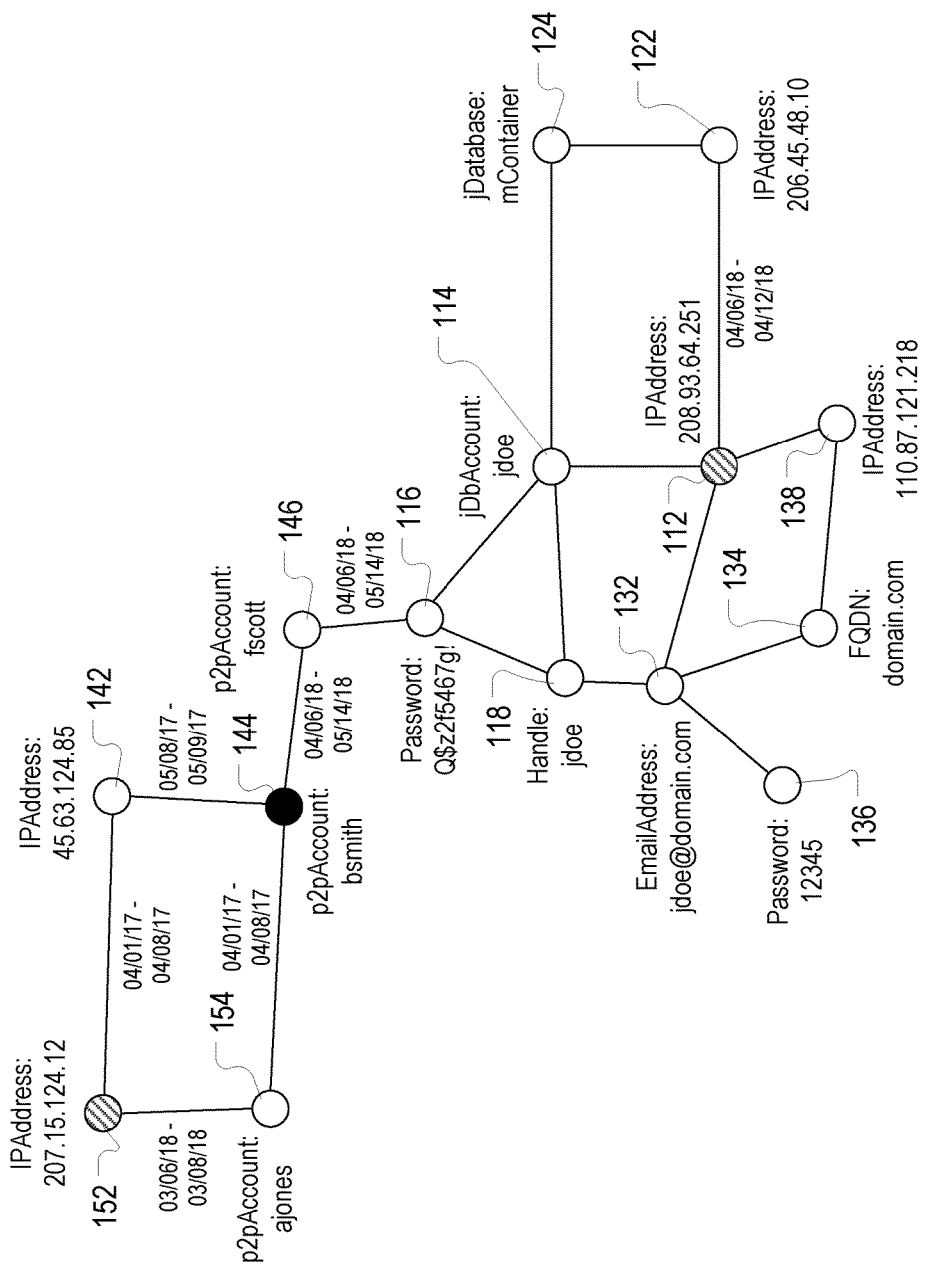
FIGS. 77-78 illustrates an exemplary hypergraph which includes node links including time interval information.
Figure 78:
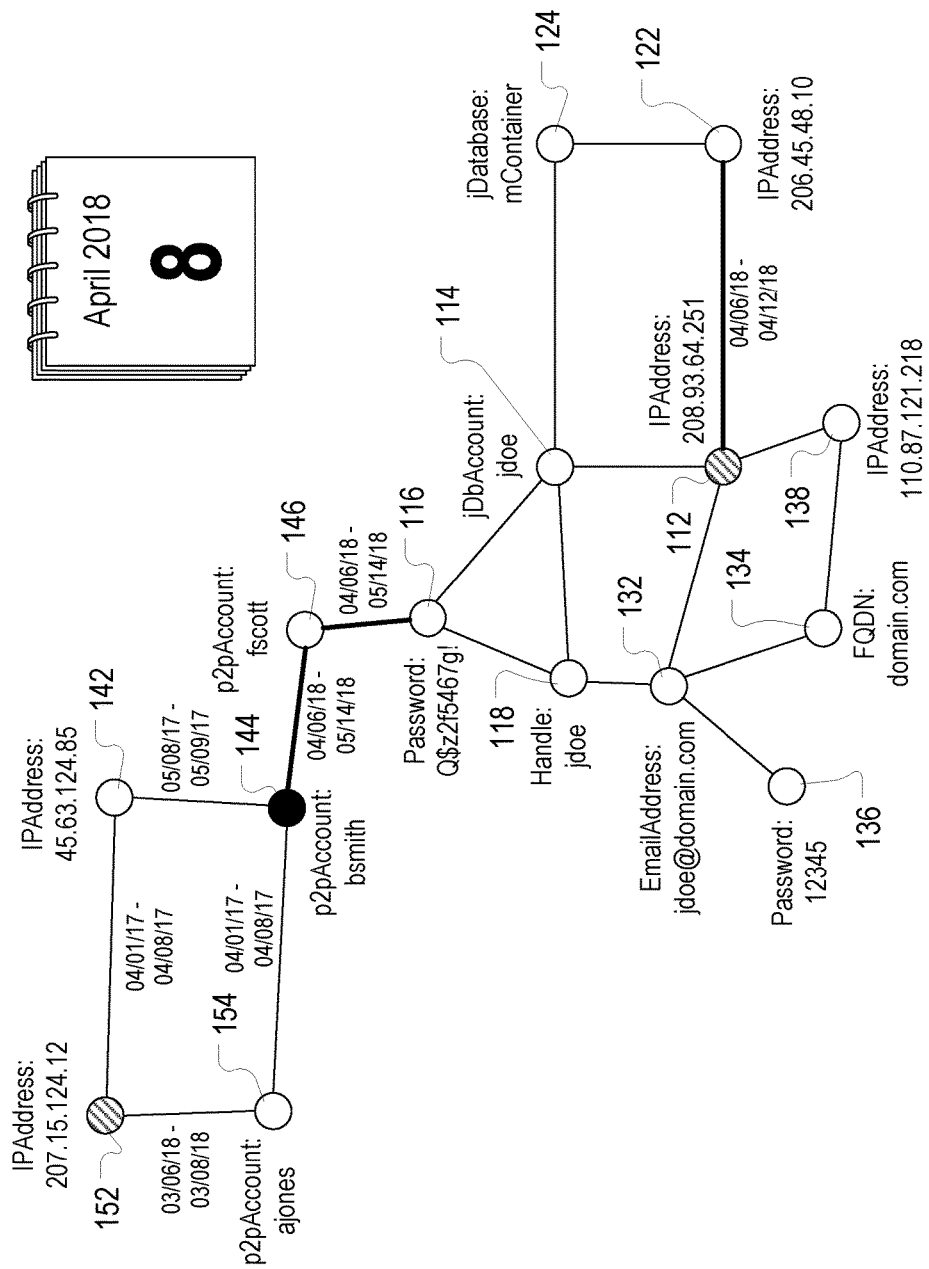

FIG. 77 illustrates an exemplary hypergraph which represents an updated version of those previously discussed which includes node links including time interval information (time interval information for some links is omitted from the illustration). For example, FIG. 78 highlights via use of thicker lines the links in the hypergraph that are associated with a time interval which encompasses Apr. 8, 2018.

As noted above, in utilizing a hypergraph to determine proximity of a node to a threat, it is useful to evaluate not only proximity in space, but also proximity in time.

FIG. 79 illustrates an exemplary equation which can be utilized to calculate a proximity in time for a link, or ProximityTimeLink. The equation involves comparing a time (such as a date) or time interval for a link to a time which is used as a baseline (e.g. for a search for maliciousness). This baseline time may be, for example, a current date, or a date of an event such as an attack which is being investigated. The equation further involves an m value which can be used to impact how quickly or slowly proximity in time degrades over time. A lower m value causes a calculated ProximityTimeLink value to degrade more slowly than a higher m value. In accordance with one or more preferred implementations, an m value can be determined on a per instance basis. In accordance with one or more preferred implementations, an m value can be determined for a particular hypergraph or particular search or query.

FIG. 80 illustrates exemplary C# style pseudocode for an exemplary findLinkProxTime method, which determines a ProximityTimeLink value for a link.

The exemplary hypergraph of FIG. 77 will now be utilized to describe exemplary calculation of ProximityTimeLink values.

Figure 82:
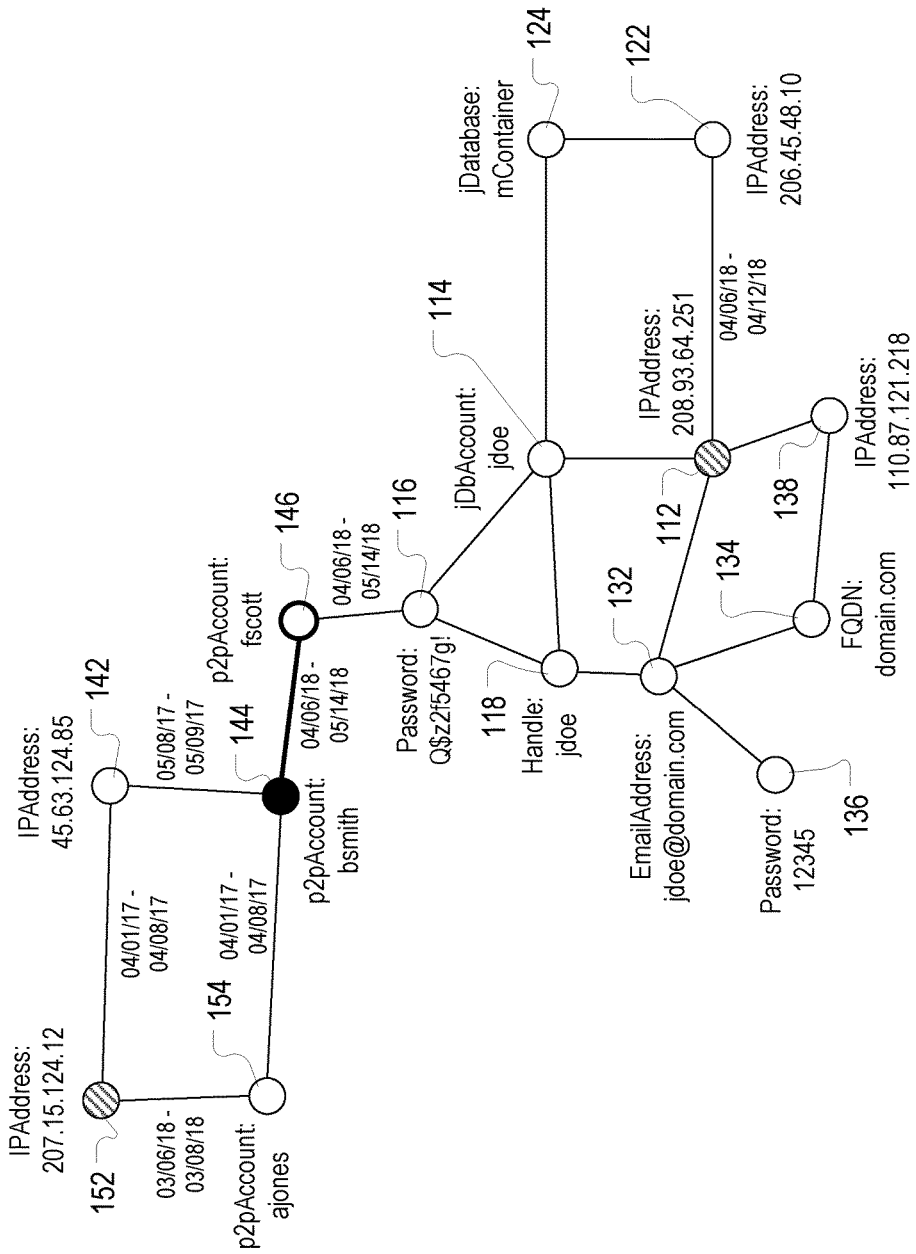
FIG. 82 highlights a link in a hypergraph via use of a thicker line.

For example, FIG. 81 illustrates a fanciful representation of a query for a ProximityTimeLink value for the link from the node 144 (having a node type of "p2pAccount" and a node value of "bsmith") to the node 146 (having a node type of "p2pAccount" and a node value of "fscott"). FIG. 82 highlights this link via use of a thicker line.

The fanciful representation of the query includes an indication of a time interval that is being used for purposes of the query, in this case "04/08/18:04/08/18". That is, this time interval is Apr. 8, 2018. This time interval could instead be multiple days, e.g. Apr. 8, 2018 to Apr. 10, 2018.

The fanciful representation of the query includes an indication of an m value to be used for a ProximityTimeLink calculation, in this case "365". The fanciful representation of the query further includes an indication of a unit of time that is being used for calculations, in this case "Days".

FIG. 83 illustrates a fanciful representation of calculation of a ProximityTimeLink value for the link from the node 144 (having a node type of "p2pAccount" and a node value of "bsmith") to the node 146 (having a node type of "p2pAccount" and a node value of "fscott").

As illustrated, a time interval for the link is Apr. 6, 2018 to May 14, 2018, while a time interval for the search is Apr. 8, 2018 to Apr. 8, 2018. Accordingly, the calculated shortest difference is "0" days. This calculated shortest difference is divided by the m value of "365", and then the result of this (which is "0") is subtracted from one, resulting in a calculated ProximityTimeLink value of "1".

It will be appreciated that a time amount can be expressed in any of a variety of units of time (e.g. seconds, minutes, hours, days, weeks, months, years, etc.). In programmatic implementations, a value of m which is utilized as an integer or other number data type is selected or determined keeping in mind an appropriate unit of time. In accordance with one or more preferred implementations, an m value might be expressed, stored, passed, or calculated as a typed time interval.

Figure 85:
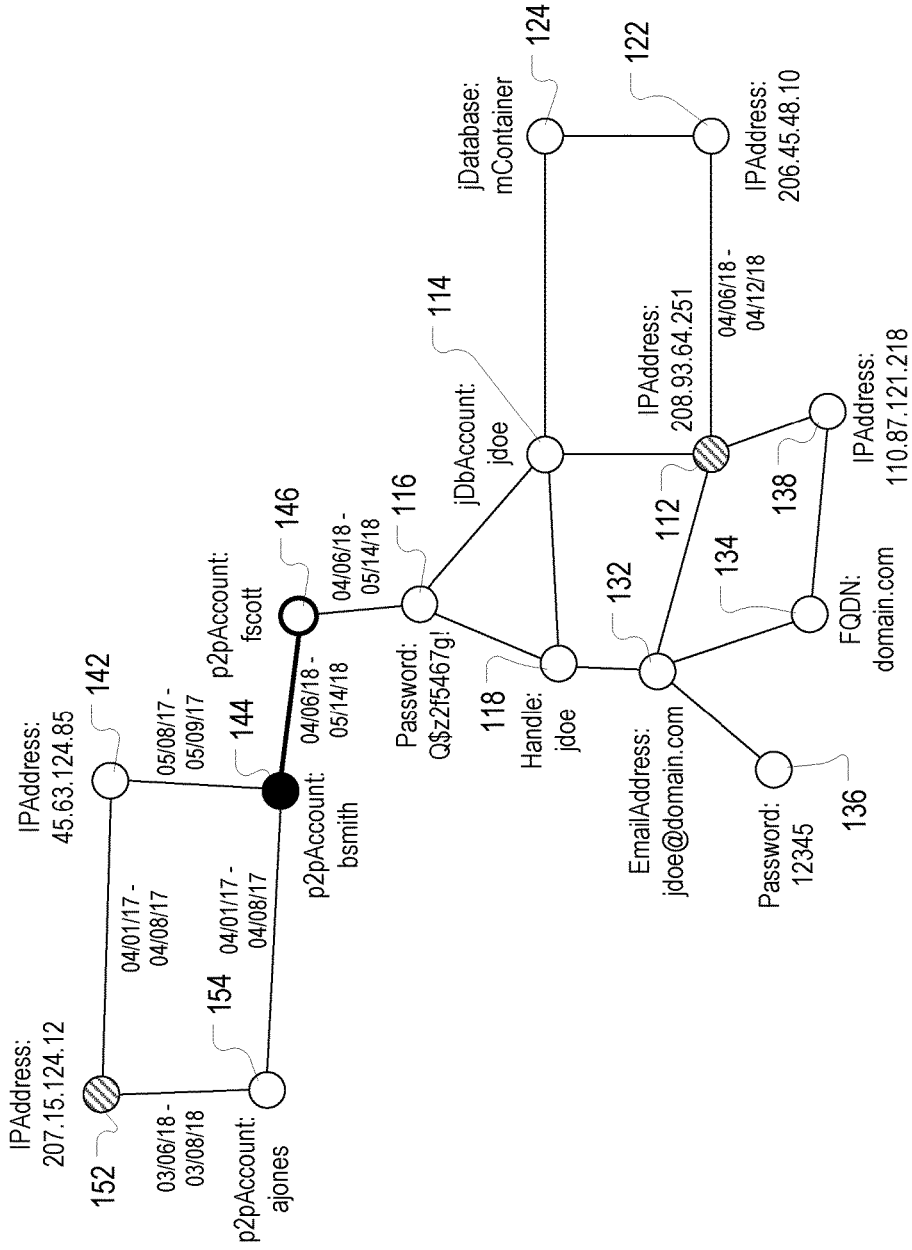
FIG. 85 highlights a link in a hypergraph via use of a thicker line.

FIG. 84 illustrates another fanciful representation of a query for a ProximityTimeLink value for the same link from the node 144 (having a node type of "p2pAccount" and a node value of "bsmith") to the node 146 (having a node type of "p2pAccount" and a node value of "fscott"). FIG. 85 highlights this link via use of a thicker line.

The fanciful representation of the query differs in that the included indication of an m value to be used for a ProximityTimeLink calculation is "1", selected to correspond to the included indication indication that the unit of time that is being used for calculations is "Years".

FIG. 86 illustrates a fanciful representation of calculation of a ProximityTimeLink value for the link from the node 144 (having a node type of "p2pAccount" and a node value of "bsmith") to the node 146 (having a node type of "p2pAccount" and a node value of "fscott").

Here, once again, the calculated shortest difference is "0", although in this case it is zero years. This calculated shortest difference is divided by the m value of "1", and then the result of this (which is "0") is subtracted from one, resulting in a calculated ProximityTimeLink value of "1".

Figure 87:
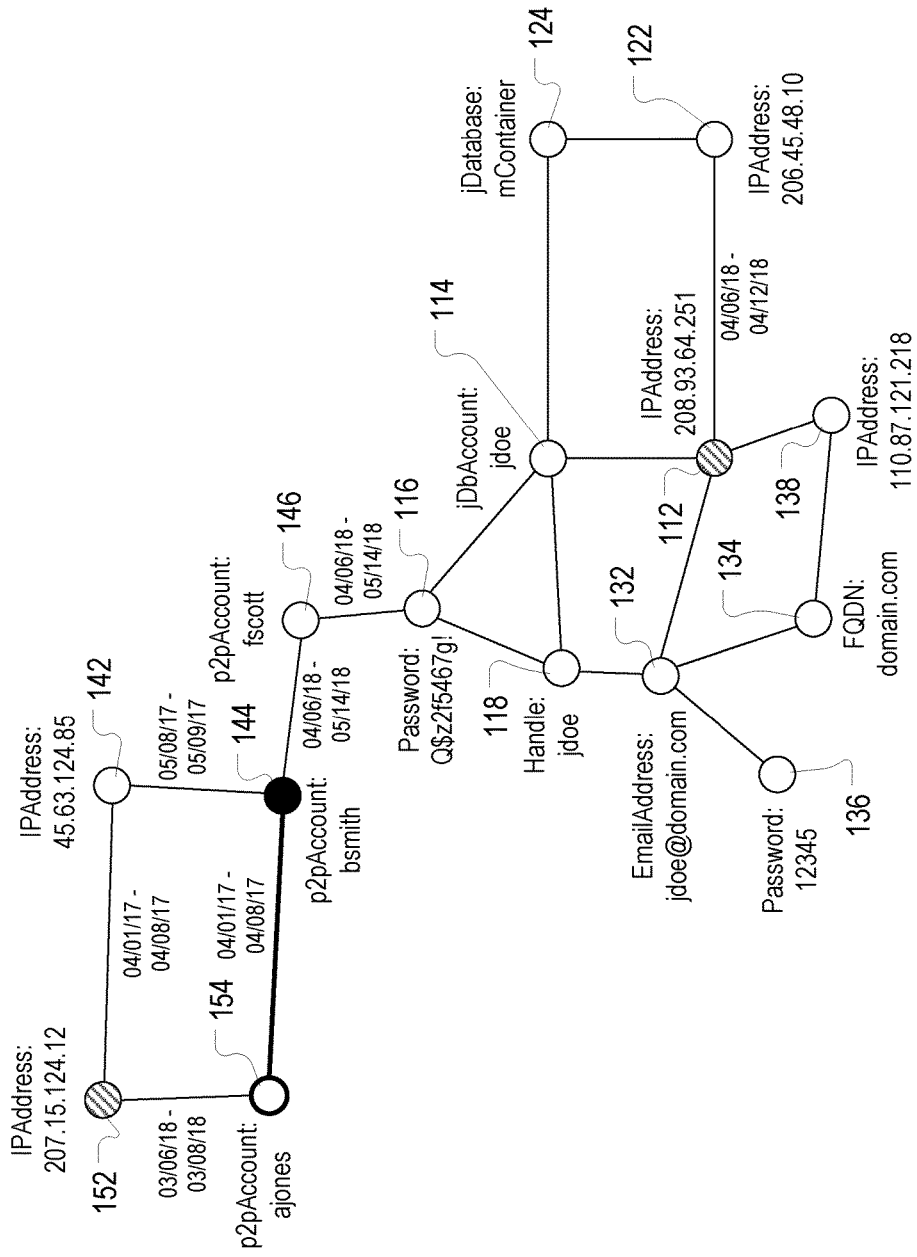
FIG. 87 illustrates a fanciful representation of a query for a ProximityTimeLink value for the link from a node having a node type of "p2pAccount" and a node value of "bsmith" to a node having a node type of "p2pAccount" and a node value of "ajones".

As another example, FIG. 87 illustrates a fanciful representation of a query for a ProximityTimeLink value for the link from the node 144 (having a node type of "p2pAccount" and a node value of "bsmith") to the node 154 (having a node type of "p2pAccount" and a node value of "ajones"). FIG. 87 highlights this link via use of a thicker line.

The fanciful representation of the query includes an indication of a time interval that is being used for purposes of the query, in this case "04/08/18:04/08/18". That is, this time interval is Apr. 8, 2018.

The fanciful representation of the query includes an indication of an m value to be used for a ProximityTimeLink calculation, in this case "365". The fanciful representation of the query further includes an indication of a unit of time that is being used for calculations, in this case "Days".

FIG. 88 illustrates a fanciful representation of calculation of a ProximityTimeLink value for the link from the node 144 (having a node type of "p2pAccount" and a node value of "bsmith") to the node 154 (having a node type of "p2pAccount" and a node value of "ajones").

As illustrated, a time interval for the link is Apr. 1, 2017 to Apr. 8, 2017, while a time interval for the search is Apr. 8, 2018 to Apr. 8, 2018. Accordingly, the calculated shortest difference is "365" days. This calculated shortest difference is divided by the m value of "365", and then the result of this (which is "1") is subtracted from one, resulting in a calculated ProximityTimeLink value of "0".

Figure 89:
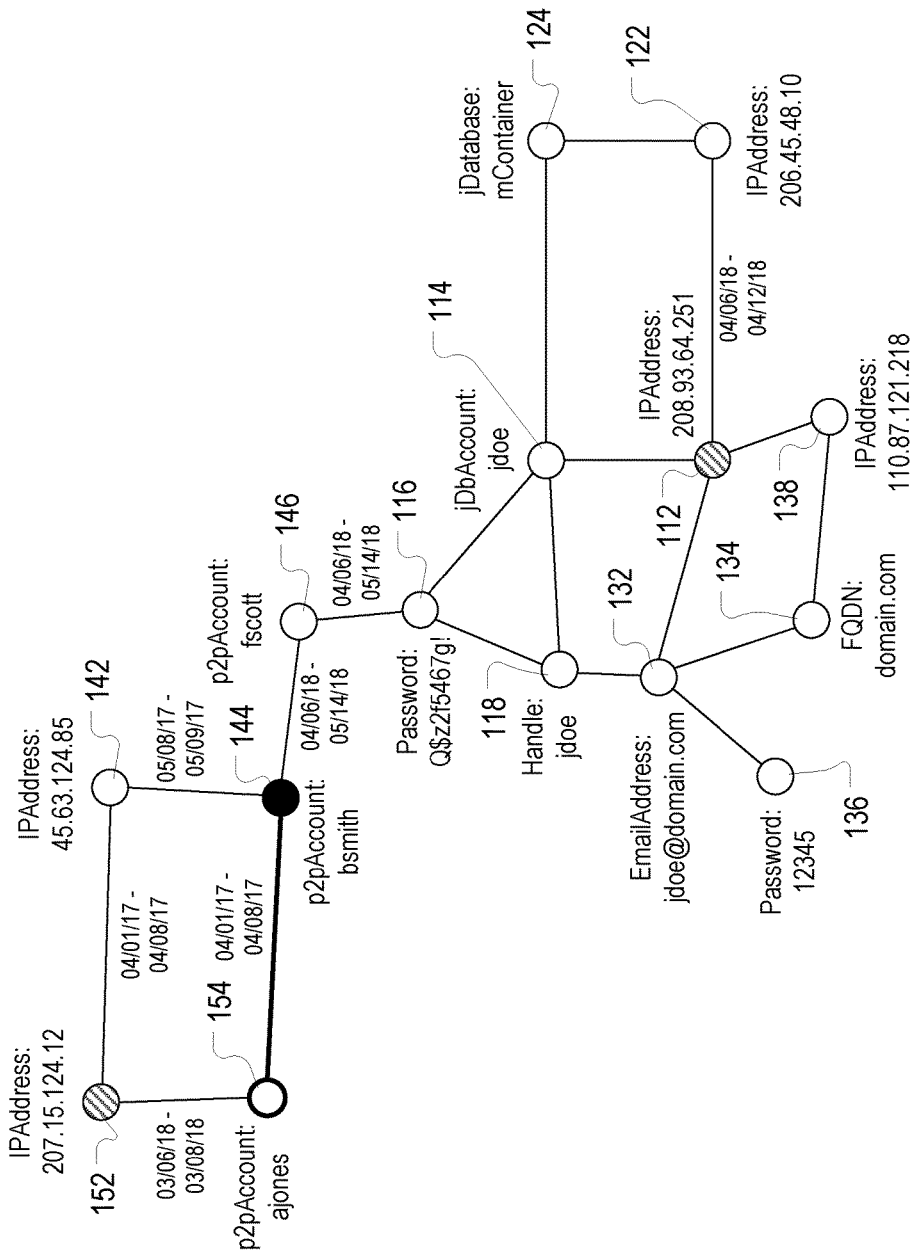

FIGS. 89-90 illustrate a fanciful calculation for the same link using a unit of time of "Years" instead of "Days".

Figure 91:
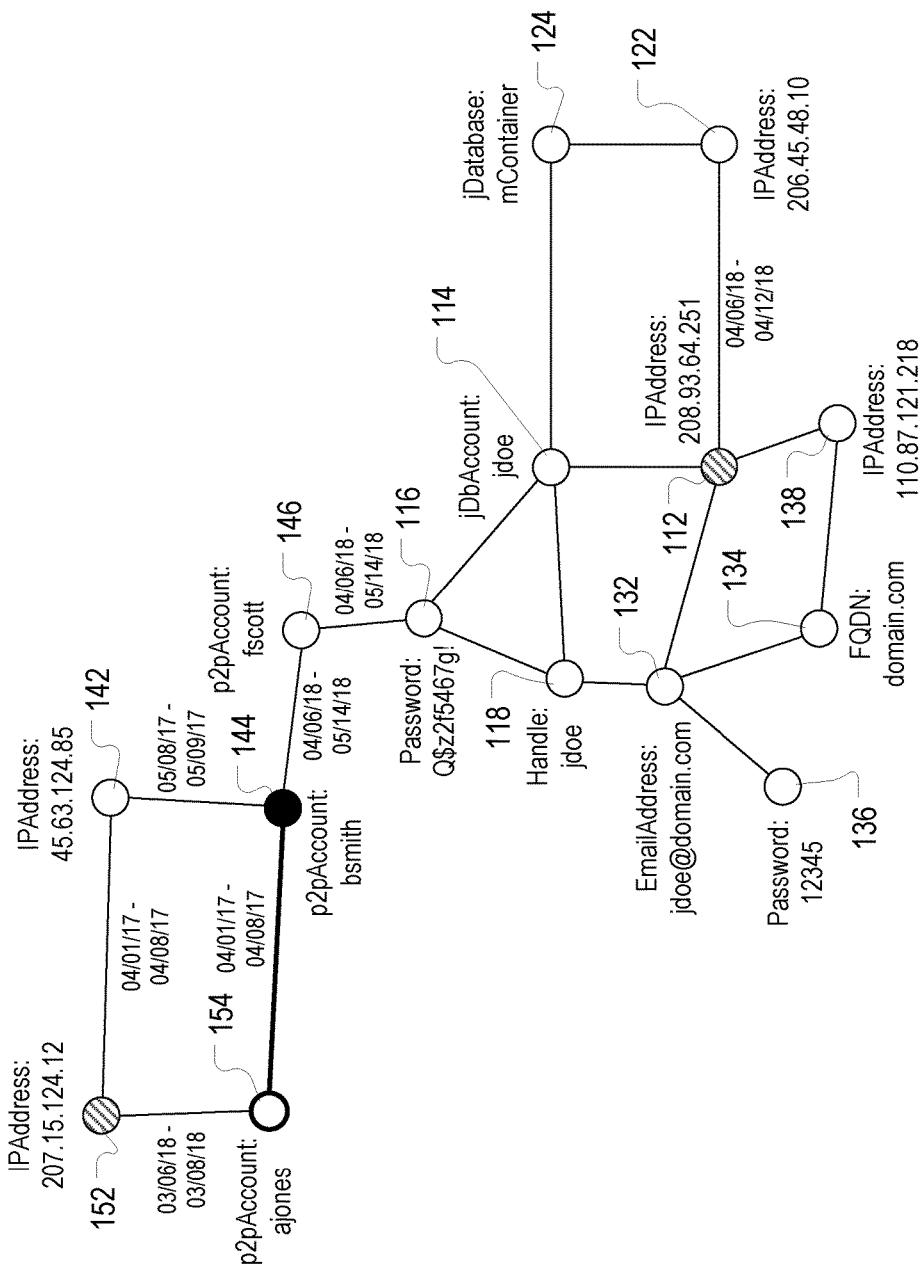
FIG. 91 illustrates a fanciful representation of another query for a ProximityTimeLink value for the link from a node having a node type of "p2pAccount" and a node value of "bsmith" to a node having a node type of "p2pAccount" and a node value of "ajones".

As another example, FIG. 91 illustrates a fanciful representation of another query for a ProximityTimeLink value for the link from the node 144 (having a node type of "p2pAccount" and a node value of "bsmith") to the node 154 (having a node type of "p2pAccount" and a node value of "ajones"). FIG. 91 highlights this link via use of a thicker line.

The fanciful representation of the query includes an indication of a time interval that is being used for purposes of the query, in this case "04/08/18:04/08/18". That is, this time interval is Apr. 8, 2018.

The fanciful representation of the query includes an indication of an m value to be used for a ProximityTimeLink calculation, in this case "2". The fanciful representation of the query further includes an indication of a unit of time that is being used for calculations, in this case "Years".

FIG. 92 illustrates a fanciful representation of calculation of a ProximityTimeLink value for the link from the node 144 (having a node type of "p2pAccount" and a node value of "bsmith") to the node 154 (having a node type of "p2pAccount" and a node value of "ajones").

As illustrated, a time interval for the link is Apr. 1, 2017 to Apr. 8, 2017, while a time interval for the search is Apr. 8, 2018 to Apr. 8, 2018. Accordingly, the calculated shortest difference is "1" year. This calculated shortest difference is divided by them value of "2", and then the result of this (which is "0.5") is subtracted from one, resulting in a calculated ProximityTimeLink value of "0.5".

Figure 93:
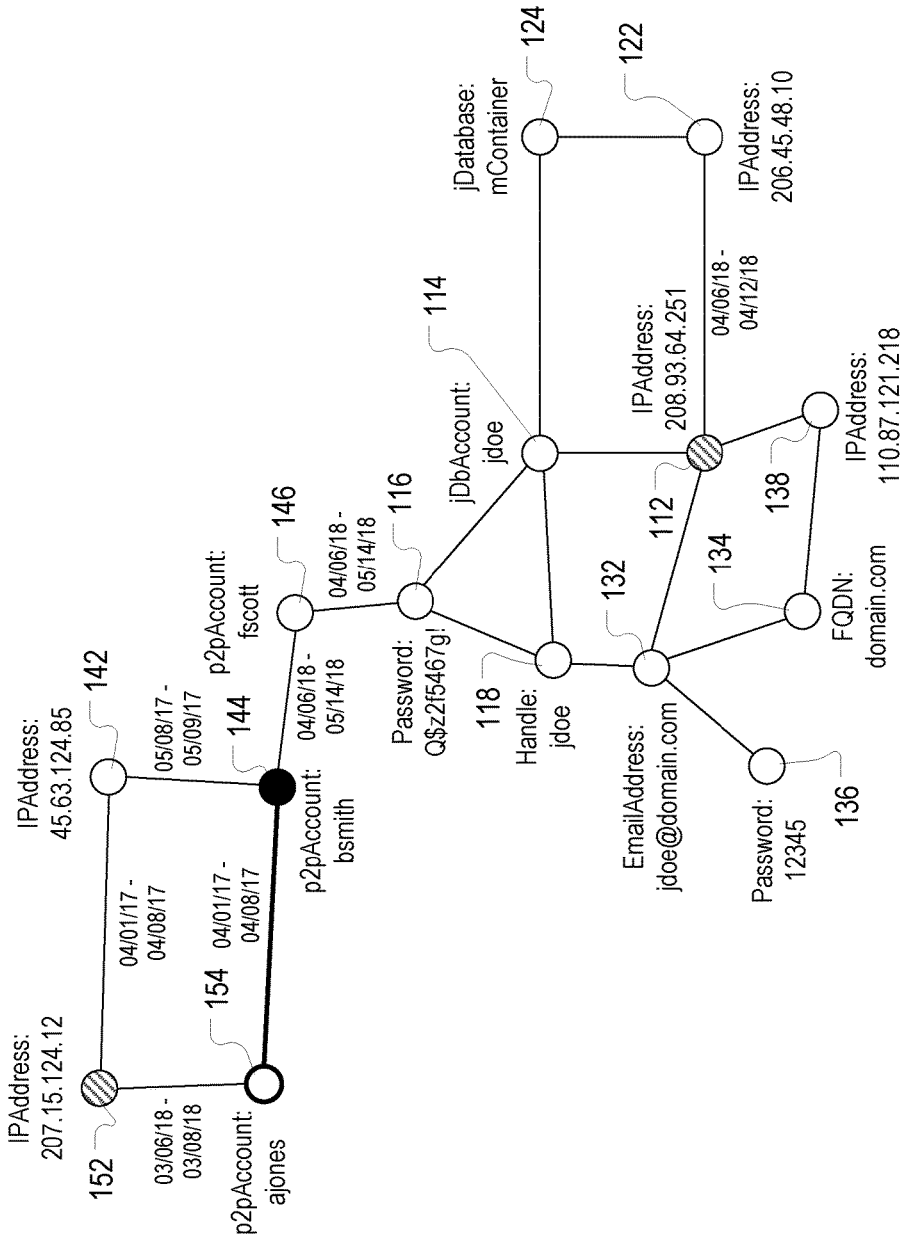
FIG. 93 illustrates a fanciful representation of another query for a ProximityTimeLink value for the link from a node having a node type of "p2pAccount" and a node value of "bsmith" to a node having a node type of "p2pAccount" and a node value of "ajones".

As another example, FIG. 93 illustrates a fanciful representation of another query for a ProximityTimeLink value for the link from the node 144 (having a node type of "p2pAccount" and a node value of "bsmith") to the node 154 (having a node type of "p2pAccount" and a node value of "ajones"). FIG. 93 highlights this link via use of a thicker line.

The fanciful representation of the query includes an indication of a time interval that is being used for purposes of the query, in this case "04/08/18:04/08/18". That is, this time interval is Apr. 8, 2018.

The fanciful representation of the query includes an indication of an m value to be used for a ProximityTimeLink calculation, in this case "200". The fanciful representation of the query further includes an indication of a unit of time that is being used for calculations, in this case "Days".

FIG. 94 illustrates a fanciful representation of calculation of a ProximityTimeLink value for the link from the node 144 (having a node type of "p2pAccount" and a node value of "bsmith") to the node 154 (having a node type of "p2pAccount" and a node value of "ajones").

As illustrated, a time interval for the link is Apr. 1, 2017 to Apr. 8, 2017, while a time interval for the search is Apr. 8, 2018 to Apr. 8, 2018. Accordingly, the calculated shortest difference is "365" days. This calculated shortest difference is divided by the m value of "200", and then the result of this (which is "1.825") is subtracted from one, resulting in a calculated ProximityTimeLink value of "−0.0825".

In accordance with one or more preferred implementations, negative ProximityTimeLink values are allowed and utilized. However, in accordance with one or more preferred implementations, rather than using a negative ProximityTimeLink value, when a negative value occurs, it is replaced by zero, as illustrated in FIG. 95.

FIG. 96 illustrates exemplary C# style pseudocode for an exemplary method involving such replacement of a negative value with zero.

In accordance with one or more preferred implementations, when a determined ProximityTimeLink is below a minimum threshold, it is replaced by a minimum value. FIG. 97 illustrates exemplary C# style pseudocode for an exemplary method involving such replacement of a value below a minimum value with the minimum value.

As noted above, in accordance with one or more preferred implementations, a proximity in time for links along a path from a node to a threat is utilized to deform, or weight, a determined threat distance.

FIG. 98 illustrates an exemplary equation which can be utilized to calculate a proximity in time for a path, or ProximityTimePath. The equation involves multiplying together respective ProximityTimeLink values for each link along the path.

FIG. 99 illustrates exemplary C# style pseudocode for an exemplary findPathProxTime method, which determines a ProximityTimePath value for a path.

The exemplary hypergraph of FIG. 77 will now be utilized to describe exemplary calculation of ProximityTimePath values.

Figure 100:
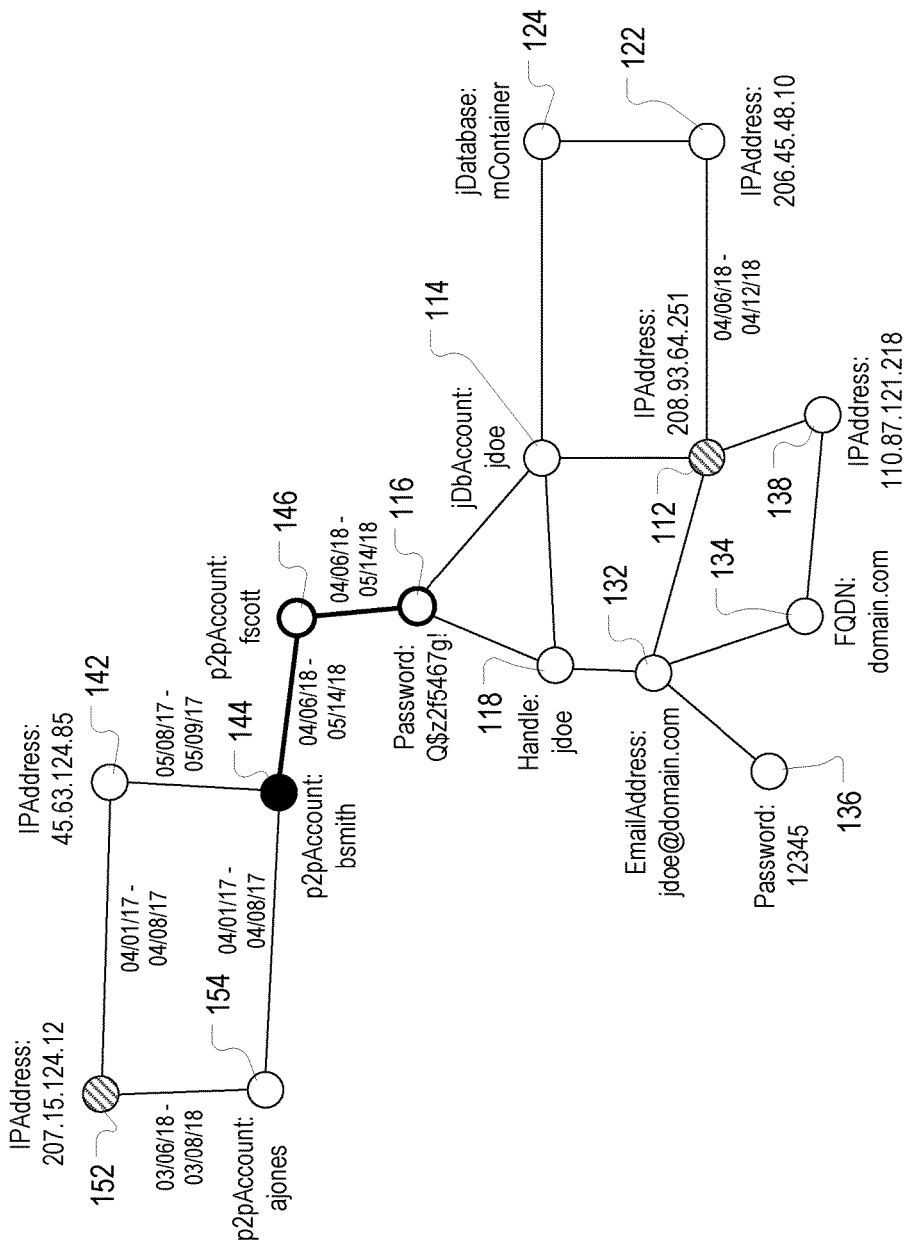
FIG. 100 illustrates a fanciful representation of a query for a ProximityTimePath value for a path from a node having a node type of "p2pAccount" and a node value of "bsmith" through a node having a node type of "p2pAccount" and a node value of "fscott" to a node having a node type of "Password" and a node value of "Q$z2f5467g!".

For example, FIG. 100 illustrates a fanciful representation of a query for a ProximityTimePath value for a path from the node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!"). FIG. 100 highlights this path via use of a thicker line.

The fanciful representation of the query includes an indication of a time interval that is being used for purposes of the query, in this case "04/08/18:04/08/18". That is, this time interval is Apr. 8, 2018. This time interval could instead be multiple days, e.g. Apr. 8, 2018 to Apr. 10, 2018.

The fanciful representation of the query includes an indication of an m value to be used for subsidiary ProximityTimeLink calculations, in this case "365". The fanciful representation of the query further includes an indication of a unit of time that is being used for calculations, in this case "Days".

As illustrated in FIG. 101, a ProximityTimePath value for the path from the node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!" is equal to a ProximityTimeLink value for the link from the node 144 (having a node type of "p2pAccount" and a node value of "bsmith") to the node 146 (having a node type of "p2pAccount" and a node value of "fscott") multiplied by a ProximityTimeLink value for the link from the node 146 (having a node type of "p2pAccount" and a node value of "fscott") to the node 116 (having a node type of "Password" and a node value of "Q$z2f5467g!").

As described above, FIG. 83 illustrates a fanciful representation of calculation of a ProximityTimeLink value for the link from the node 144 (having a node type of "p2pAccount" and a node value of "bsmith") to the node 146 (having a node type of "p2pAccount" and a node value of "fscott"). As illustrated in FIG. 83, a time interval for the link is Apr. 6, 2018 to May 14, 2018, while a time interval for the search is Apr. 8, 2018 to Apr. 8, 2018. Accordingly, the calculated shortest difference is "0" days. This calculated shortest difference is divided by the m value of "365", and then the result of this (which is "0") is subtracted from one, resulting in a calculated ProximityTimeLink value of "1" for the link from the node 144 (having a node type of "p2pAccount" and a node value of "bsmith") to the node 146 (having a node type of "p2pAccount" and a node value of "fscott").

Figure 102:
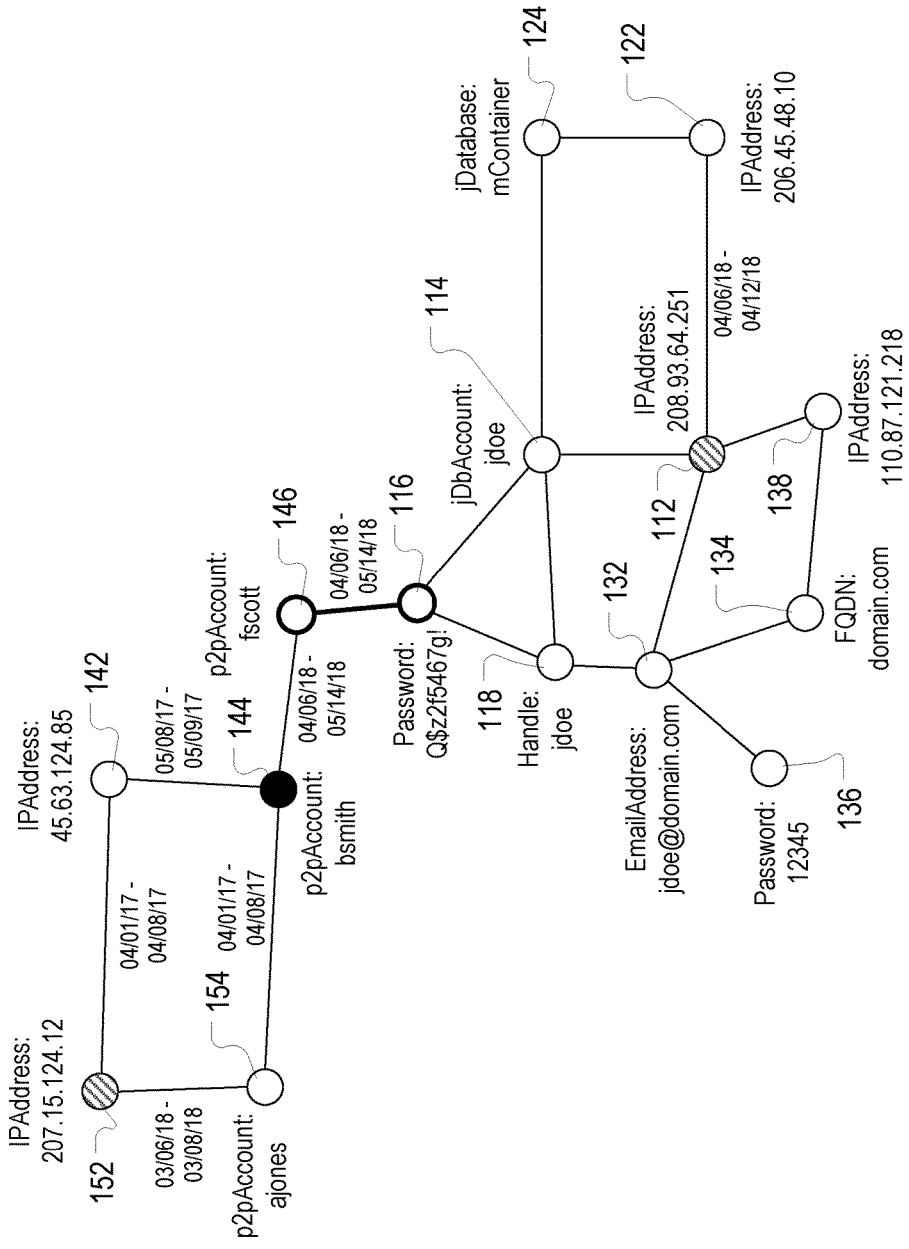
FIG. 102 illustrates a fanciful representation of a query for a ProximityTimeLink value for the link from a node having a node type of "p2pAccount" and a node value of "fscott" to a node having a node type of "Password" and a node value of "Q$z2f5467g!".

FIG. 102 illustrates a fanciful representation of a query for a ProximityTimeLink value for the link from the node 146 (having a node type of "p2pAccount" and a node value of "fscott") to the node 116 (having a node type of "Password" and a node value of "Q$z2f5467g!"). FIG. 102 highlights this link via use of a thicker line.

The fanciful representation of the query includes an indication of a time interval that is being used for purposes of the query, in this case "04/08/18:04/08/18". That is, this time interval is Apr. 8, 2018.

The fanciful representation of the query includes an indication of an m value to be used for a ProximityTimeLink calculation, in this case "365". The fanciful representation of the query further includes an indication of a unit of time that is being used for calculations, in this case "Days".

FIG. 103 illustrates a fanciful representation of calculation of a ProximityTimeLink value for the link from the node 146 (having a node type of "p2pAccount" and a node value of "fscott") to the node 116 (having a node type of "Password" and a node value of "Q$z2f5467g!"). As illustrated, a time interval for the link is Apr. 6, 2018 to May 14, 2018, while a time interval for the search is Apr. 8, 2018 to Apr. 8, 2018. Accordingly, the calculated shortest difference is "0" days. This calculated shortest difference is divided by the m value of "365", and then the result of this (which is "0") is subtracted from one, resulting in a calculated ProximityTimeLink value of "1" for the link from the node 146 (having a node type of "p2pAccount" and a node value of "fscott") to the node 116 (having a node type of "Password" and a node value of "Q$z2f5467g!").

As noted above and illustrated in FIG. 101, a ProximityTimePath value for the path from the node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!" is equal to a ProximityTimeLink value for the link from the node 144 (having a node type of "p2pAccount" and a node value of "bsmith") to the node 146 (having a node type of "p2pAccount" and a node value of "fscott") multiplied by a ProximityTimeLink value for the link from the node 146 (having a node type of "p2pAccount" and a node value of "fscott") to the node 116 (having a node type of "Password" and a node value of "Q$z2f5467g!"). FIG. 104 illustrates a fanciful representation of calculation of a ProximityTimePath value for the path by multiplying together the calculated ProximityTimeLink values for the component links. Here, the calculation is very simple, and merely involves multiplying "1"*"1", arriving at a ProximityTimePath value of "1".

Figure 105:
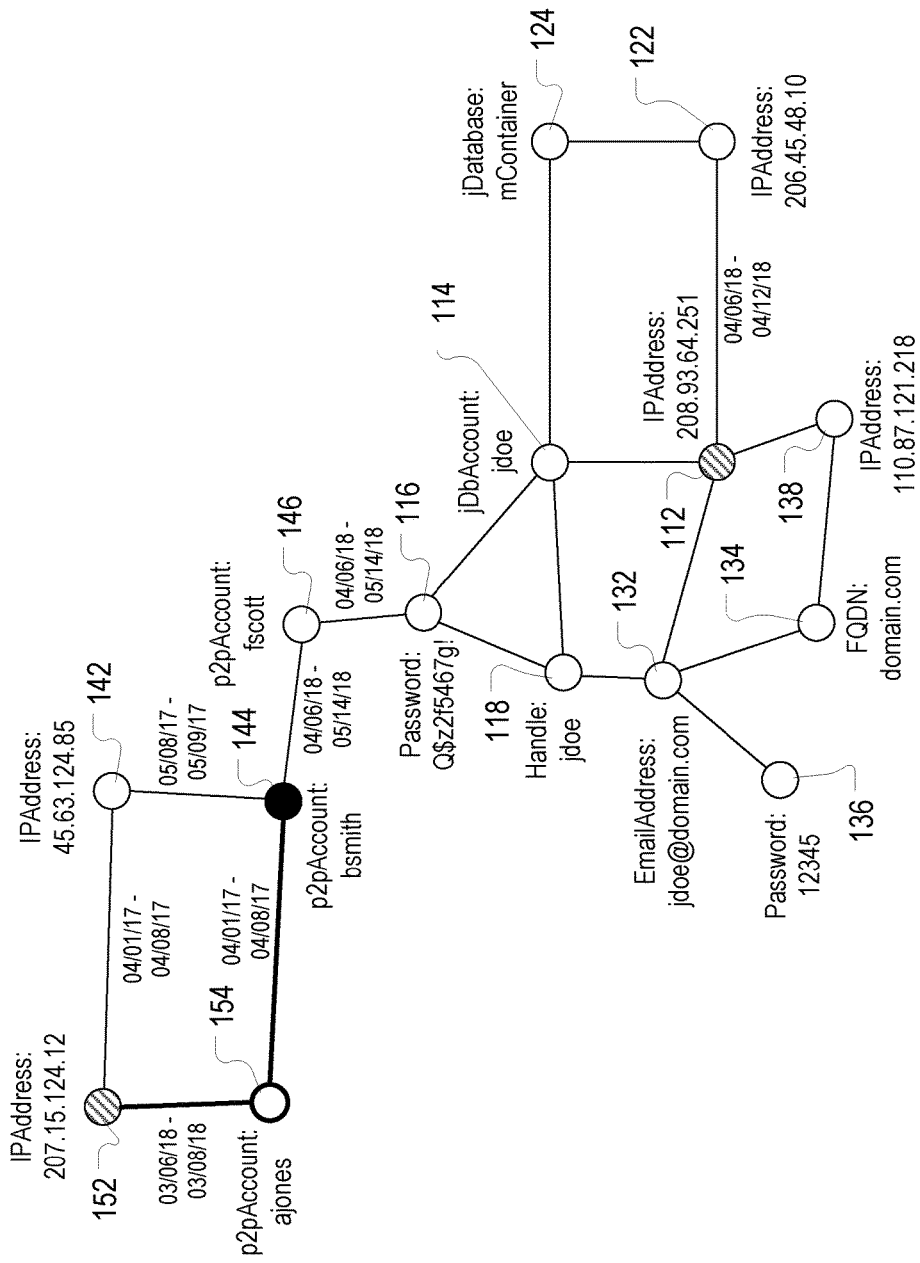
FIG. 105 illustrates a fanciful representation of a query for a ProximityTimePath value for a path from a node having a node type of "p2pAccount" and a node value of "bsmith" through a node having a node type of "p2pAccount" and a node value of "ajones" to a node having a node type of "IPAddress" and a node value of "207.15.124.12".

As another example, FIG. 105 illustrates a fanciful representation of a query for a ProximityTimePath value for a path from the node 144 (having a node type of "p2pAccount" and a node value of "bsmith") through the node 154 (having a node type of "p2pAccount" and a node value of "ajones") to the node 152 (having a node type of "IPAddress" and a node value of "207.15.124.12"). FIG. 105 highlights this path via use of a thicker line.

The fanciful representation of the query includes an indication of a time interval that is being used for purposes of the query, in this case "04/08/18:04/08/18". That is, this time interval is Apr. 8, 2018. This time interval could instead be multiple days, e.g. Apr. 8, 2018 to Apr. 10, 2018.

The fanciful representation of the query includes an indication of an m value to be used for subsidiary ProximityTimeLink calculations, in this case "365". The fanciful representation of the query further includes an indication of a unit of time that is being used for calculations, in this case "Days".

A ProximityTimePath value for a path from the node 144 (having a node type of "p2pAccount" and a node value of "bsmith") through the node 154 (having a node type of "p2pAccount" and a node value of "ajones") to the node 152 (having a node type of "IPAddress" and a node value of "207.15.124.12") is equal to a ProximityTimeLink value for the link from the node 144 (having a node type of "p2pAccount" and a node value of "bsmith") to the node 154 (having a node type of "p2pAccount" and a node value of "ajones") multiplied by a ProximityTimeLink value for the link from the node 154 (having a node type of "p2pAccount" and a node value of "ajones") to the node 152 (having a node type of "IPAddress" and a node value of "207.15.124.12").

As described above, FIG. 88 illustrates a fanciful representation of calculation of a ProximityTimeLink value for the link from the node 144 (having a node type of "p2pAccount" and a node value of "bsmith") to the node 154 (having a node type of "p2pAccount" and a node value of "ajones"). As illustrated, a time interval for the link is Apr. 1, 2017 to Apr. 8, 2017, while a time interval for the search is Apr. 8, 2018 to Apr. 8, 2018. Accordingly, the calculated shortest difference is "365" days. This calculated shortest difference is divided by the m value of "365", and then the result of this (which is "1") is subtracted from one, resulting in a calculated ProximityTimeLink value of "0" for the link from the node 144 (having a node type of "p2pAccount" and a node value of "bsmith") to the node 154 (having a node type of "p2pAccount" and a node value of "ajones").

Figure 106:
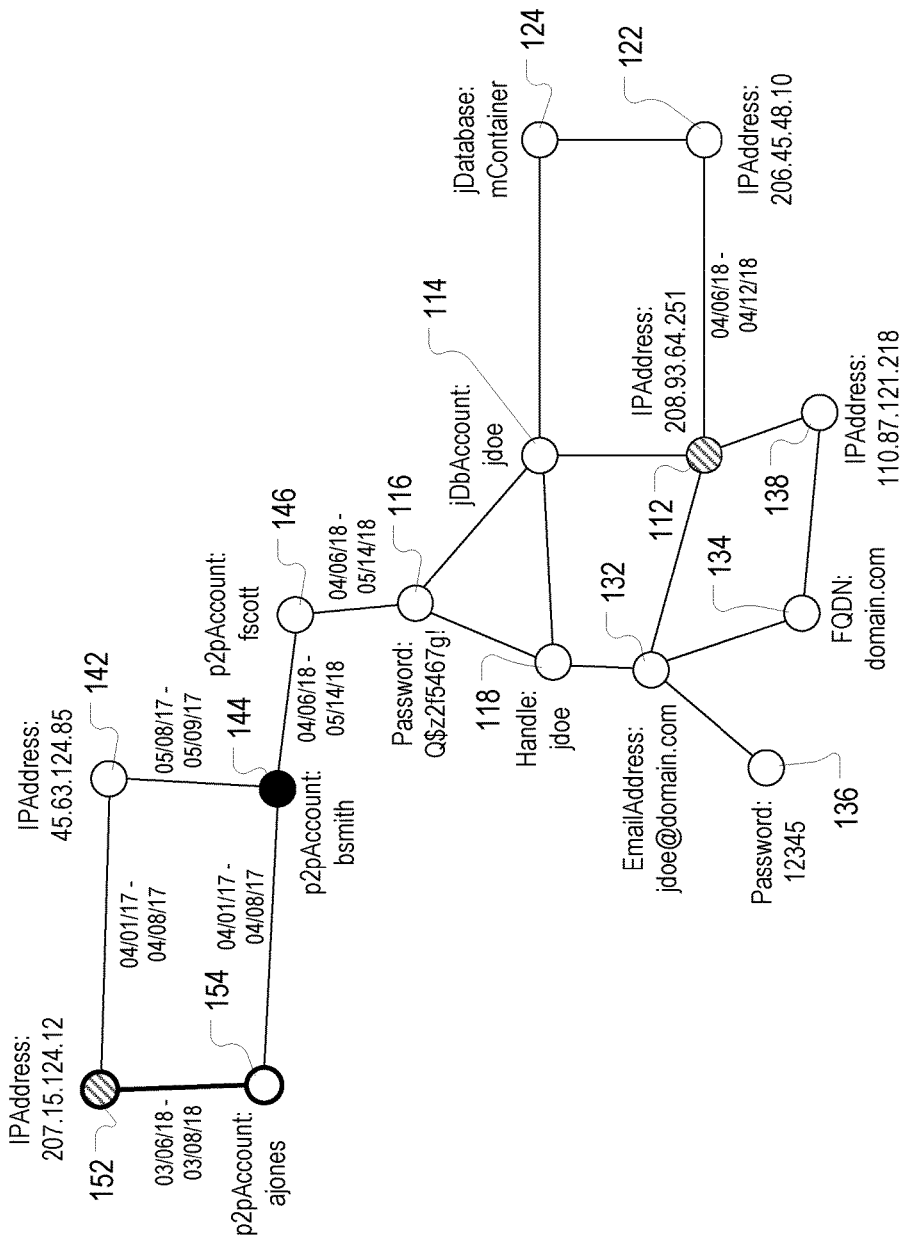
FIG. 106 illustrates a fanciful representation of a query for a ProximityTimeLink value for the link from a node having a node type of "p2pAccount" and a node value of "ajones" to a node having a node type of "IPAddress" and a node value of "207.15.124.12".

FIG. 106 illustrates a fanciful representation of a query for a ProximityTimeLink value for the link from the node 154 (having a node type of "p2pAccount" and a node value of "ajones") to the node 152 (having a node type of "IPAddress" and a node value of "207.15.124.12"). FIG. 106 highlights this link via use of a thicker line.

The fanciful representation of the query includes an indication of a time interval that is being used for purposes of the query, in this case "04/08/18:04/08/18". That is, this time interval is Apr. 8, 2018.

The fanciful representation of the query includes an indication of an m value to be used for a ProximityTimeLink calculation, in this case "365". The fanciful representation of the query further includes an indication of a unit of time that is being used for calculations, in this case "Days".

FIG. 107 illustrates a fanciful representation of calculation of a ProximityTimeLink value for the link from the node 154 (having a node type of "p2pAccount" and a node value of "ajones") to the node 152 (having a node type of "IPAddress" and a node value of "207.15.124.12"). As illustrated, a time interval for the link is Mar. 6, 2018 to Mar. 8, 2018, while a time interval for the search is Apr. 8, 2018 to Apr. 8, 2018. Accordingly, the calculated shortest difference is "30" days. This calculated shortest difference is divided by the m value of "365", and then the result of this (which is "0.0822") is subtracted from one, resulting in a calculated ProximityTimeLink value of "0.9178" for the link from the node 154 (having a node type of "p2pAccount" and a node value of "ajones") to the node 152 (having a node type of "IPAddress" and a node value of "207.15.124.12").

As noted above, a ProximityTimePath value for a path from the node 144 (having a node type of "p2pAccount" and a node value of "bsmith") through the node 154 (having a node type of "p2pAccount" and a node value of "ajones") to the node 152 (having a node type of "IPAddress" and a node value of "207.15.124.12") is equal to a ProximityTimeLink value for the link from the node 144 (having a node type of "p2pAccount" and a node value of "bsmith") to the node 154 (having a node type of "p2pAccount" and a node value of "ajones") multiplied by a ProximityTimeLink value for the link from the node 154 (having a node type of "p2pAccount" and a node value of "ajones") to the node 152 (having a node type of "IPAddress" and a node value of "207.15.124.12").

FIG. 108 illustrates a fanciful representation of calculation of a ProximityTimePath value for the path by multiplying together the calculated ProximityTimeLink values for the component links. Here, the calculation involves multiplying "0"*"0.9178", arriving at a ProximityTimePath value of "0".

Figure 109:
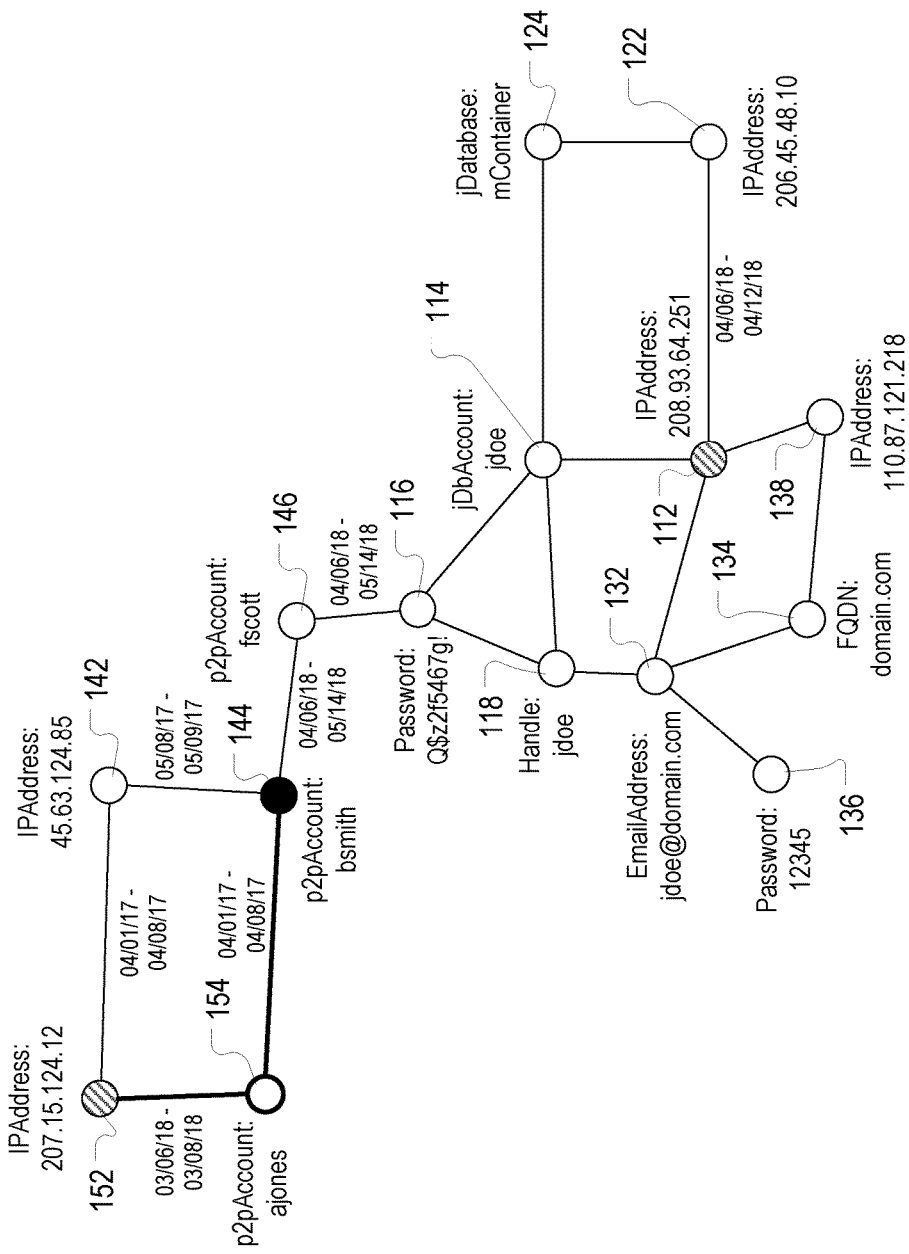
FIG. 109 illustrates a fanciful representation of another query for a ProximityTimePath value for a path from a node having a node type of "p2pAccount" and a node value of "bsmith" through a node having a node type of "p2pAccount" and a node value of "ajones" to a node having a node type of "IPAddress" and a node value of "207.15.124.12".

As another example, FIG. 109 illustrates a fanciful representation of another query for a ProximityTimePath value for a path from the node 144 (having a node type of "p2pAccount" and a node value of "bsmith") through the node 154 (having a node type of "p2pAccount" and a node value of "ajones") to the node 152 (having a node type of "IPAddress" and a node value of "207.15.124.12"). FIG. 109 highlights this path via use of a thicker line.

The fanciful representation of the query includes an indication of a time interval that is being used for purposes of the query, in this case "04/08/18:04/08/18". That is, this time interval is Apr. 8, 2018. This time interval could instead be multiple days, e.g. Apr. 8, 2018 to Apr. 10, 2018.

The fanciful representation of the query includes an indication of an m value to be used for subsidiary ProximityTimeLink calculations, in this case "500". The fanciful representation of the query further includes an indication of a unit of time that is being used for calculations, in this case "Days".

A ProximityTimePath value for a path from the node 144 (having a node type of "p2pAccount" and a node value of "bsmith") through the node 154 (having a node type of "p2pAccount" and a node value of "ajones") to the node 152 (having a node type of "IPAddress" and a node value of "207.15.124.12") is equal to a ProximityTimeLink value for the link from the node 144 (having a node type of "p2pAccount" and a node value of "bsmith") to the node 154 (having a node type of "p2pAccount" and a node value of "ajones") multiplied by a ProximityTimeLink value for the link from the node 154 (having a node type of "p2pAccount" and a node value of "ajones") to the node 152 (having a node type of "IPAddress" and a node value of "207.15.124.12").

Figure 110:
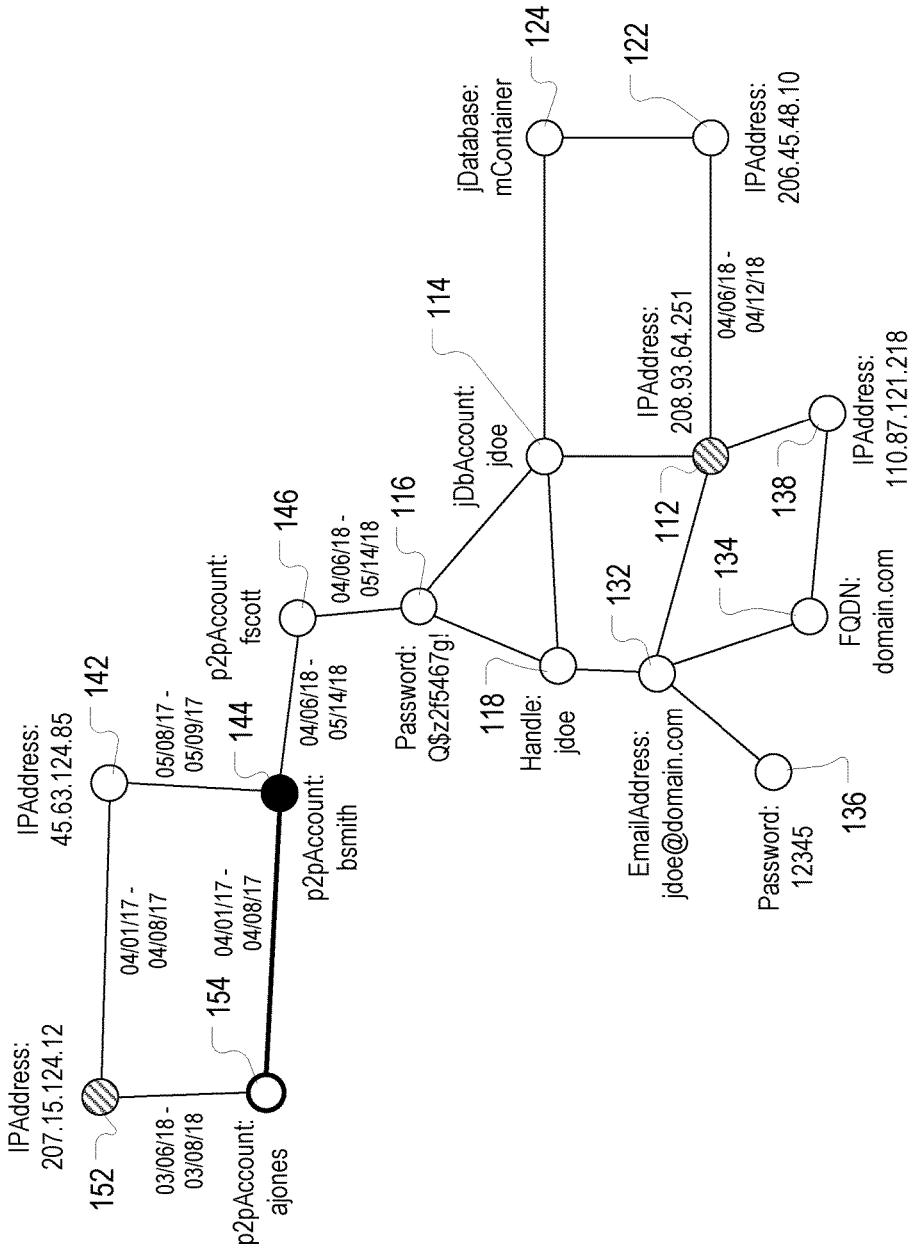
FIG. 110 illustrates a fanciful representation of a query for a ProximityTimeLink value for the link from a node having a node type of "p2pAccount" and a node value of "bsmith" to a node having a node type of "p2pAccount" and a node value of "ajones".

FIG. 110 illustrates a fanciful representation of a query for a ProximityTimeLink value for the link from the node 144 (having a node type of "p2pAccount" and a node value of "bsmith") to the node 154 (having a node type of "p2pAccount" and a node value of "ajones"). FIG. 110 highlights this link via use of a thicker line.

The fanciful representation of the query includes an indication of a time interval that is being used for purposes of the query, in this case "04/08/18:04/08/18". That is, this time interval is Apr. 8, 2018.

The fanciful representation of the query includes an indication of an m value to be used for a ProximityTimeLink calculation, in this case "500". The fanciful representation of the query further includes an indication of a unit of time that is being used for calculations, in this case "Days".

FIG. 111 illustrates a fanciful representation of calculation of a ProximityTimeLink value for the link from the node 144 (having a node type of "p2pAccount" and a node value of "bsmith") to the node 154 (having a node type of "p2pAccount" and a node value of "ajones"). As illustrated, a time interval for the link is Apr. 1, 2017 to Apr. 8, 2017, while a time interval for the search is Apr. 8, 2018 to Apr. 8, 2018. Accordingly, the calculated shortest difference is "365" days. This calculated shortest difference is divided by the m value of "500", and then the result of this (which is "0.73") is subtracted from one, resulting in a calculated ProximityTimeLink value of "0.27" for the link from the node 144 (having a node type of "p2pAccount" and a node value of "bsmith") to the node 154 (having a node type of "p2pAccount" and a node value of "ajones").

Figure 112:
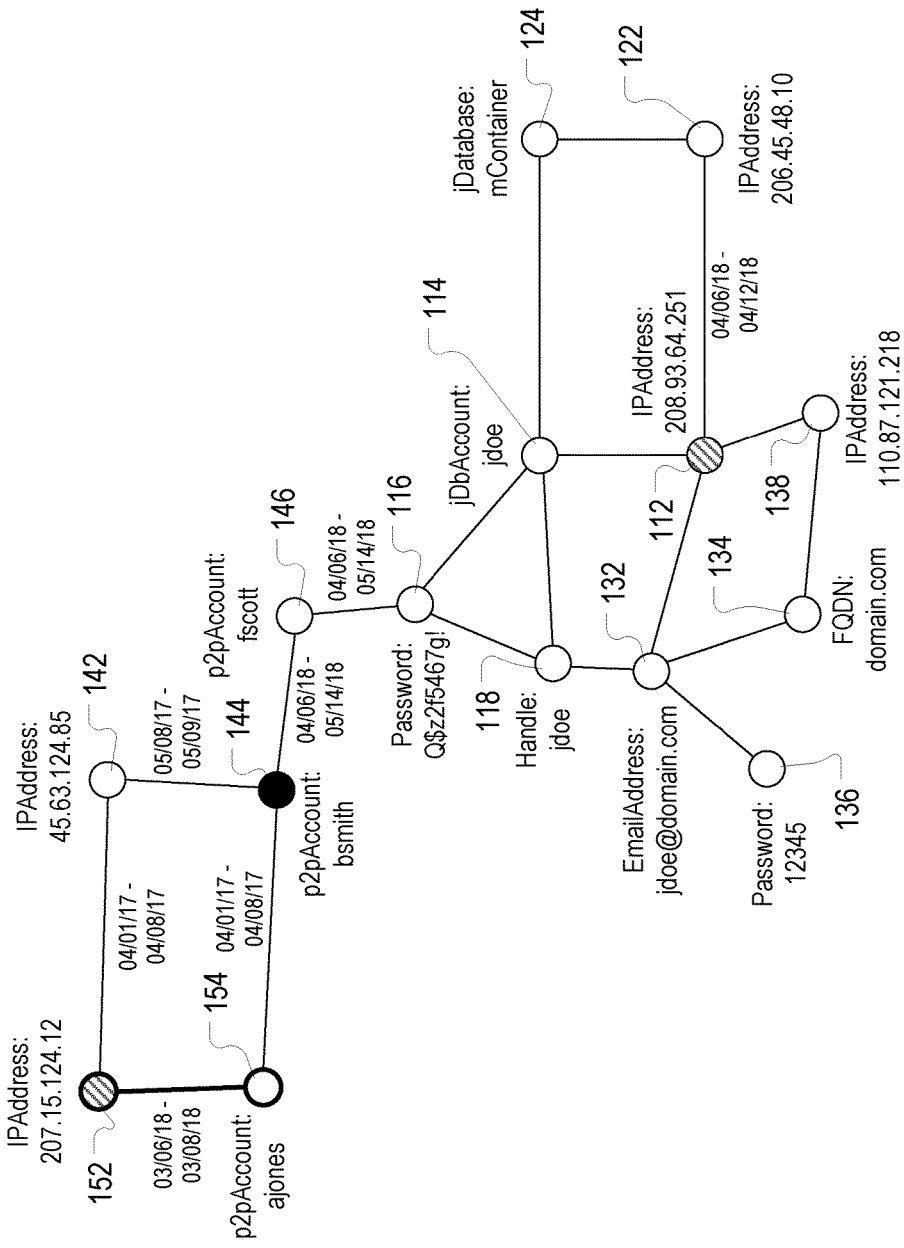
FIG. 112 illustrates a fanciful representation of a query for a ProximityTimeLink value for the link from a node having a node type of "p2pAccount" and a node value of "ajones" to a node having a node type of "IPAddress" and a node value of "207.15.124.12".

FIG. 112 illustrates a fanciful representation of a query for a ProximityTimeLink value for the link from the node 154 (having a node type of "p2pAccount" and a node value of "ajones") to the node 152 (having a node type of "IPAddress" and a node value of "207.15.124.12"). FIG. 112 highlights this link via use of a thicker line.

The fanciful representation of the query includes an indication of a time interval that is being used for purposes of the query, in this case "04/08/18:04/08/18". That is, this time interval is Apr. 8, 2018.

The fanciful representation of the query includes an indication of an m value to be used for a ProximityTimeLink calculation, in this case "500". The fanciful representation of the query further includes an indication of a unit of time that is being used for calculations, in this case "Days".

FIG. 113 illustrates a fanciful representation of calculation of a ProximityTimeLink value for the link from the node 154 (having a node type of "p2pAccount" and a node value of "ajones") to the node 152 (having a node type of "IPAddress" and a node value of "207.15.124.12"). As illustrated, a time interval for the link is Mar. 6, 2018 to Mar. 8, 2018, while a time interval for the search is Apr. 8, 2018 to Apr. 8, 2018. Accordingly, the calculated shortest difference is "30" days. This calculated shortest difference is divided by the m value of "500", and then the result of this (which is "0.06") is subtracted from one, resulting in a calculated ProximityTimeLink value of "0.94" for the link from the node 154 (having a node type of "p2pAccount" and a node value of "ajones") to the node 152 (having a node type of "IPAddress" and a node value of "207.15.124.12").

As noted above, a ProximityTimePath value for a path from the node 144 (having a node type of "p2pAccount" and a node value of "bsmith") through the node 154 (having a node type of "p2pAccount" and a node value of "ajones") to the node 152 (having a node type of "IPAddress" and a node value of "207.15.124.12") is equal to a ProximityTimeLink value for the link from the node 144 (having a node type of "p2pAccount" and a node value of "bsmith") to the node 154 (having a node type of "p2pAccount" and a node value of "ajones") multiplied by a ProximityTimeLink value for the link from the node 154 (having a node type of "p2pAccount" and a node value of "ajones") to the node 152 (having a node type of "IPAddress" and a node value of "207.15.124.12"). FIG. 114 illustrates a fanciful representation of calculation of a ProximityTimePath value for the path by multiplying together the calculated ProximityTimeLink values for the component links. Here, the calculation involves multiplying "0.27" * "0.94", arriving at a ProximityTimePath value of "0.2538".

As noted above, in accordance with one or more preferred implementations, a proximity in time for links along a path from a node to a threat is utilized to deform, or weight, a determined threat distance, and a proximity in time for a path can be calculated by multiplying together respective ProximityTimeLink values for each link along the path.

In accordance with one or more preferred implementations, alternatively to (or additionally to) calculating ProximityTimeLink values for each link along a path, ProximityTimeNode values can be calculated for each node along a path, and a proximity in time for a path can be calculated by multiplying together respective ProximityTimeNode values for each node along the path (and optionally ProximityTimeLink values for each link as well). FIG. 115 illustrates an exemplary equation which can be utilized to calculate a proximity in time for a path that involves multiplying together respective ProximityTimeNode values for each node along the path.

Cardinality

Hereinabove, hypergraphs have been described and illustrated which include nodes and links generated based on gathered data. As discussed herein, these hypergraphs can be utilized to determine proximity of a node to a threat.

Thus far, generally, any intermediate node which indirectly connects together two other nodes has been given equal weight for purposes of calculating proximity to a threat. For some nodes, however, having a direct link to a threat does not necessarily indicate that there is a strong likelihood that other nodes connected to the node are malicious. For example, a social media server or service may be utilized for an attack by a malicious actor (e.g. Twitter has often been used as a method of command and control (C2)), but this does not mean that the social media server or service is malicious, and does not suggest that other nodes connected to the social media server or service are malicious.

In accordance with one or more preferred implementations, a node can be tagged as "nopivot", indicating that attempts to find a shortest path to threat should not pivot through or traverse that node. In accordance with one or more preferred implementations, these might include, for example, non-routable IP addresses used ubiquitously inside local networks, domain name system (DNS) sinkholes used to disable many malware families, and TOR exit nodes.

Figure 116:
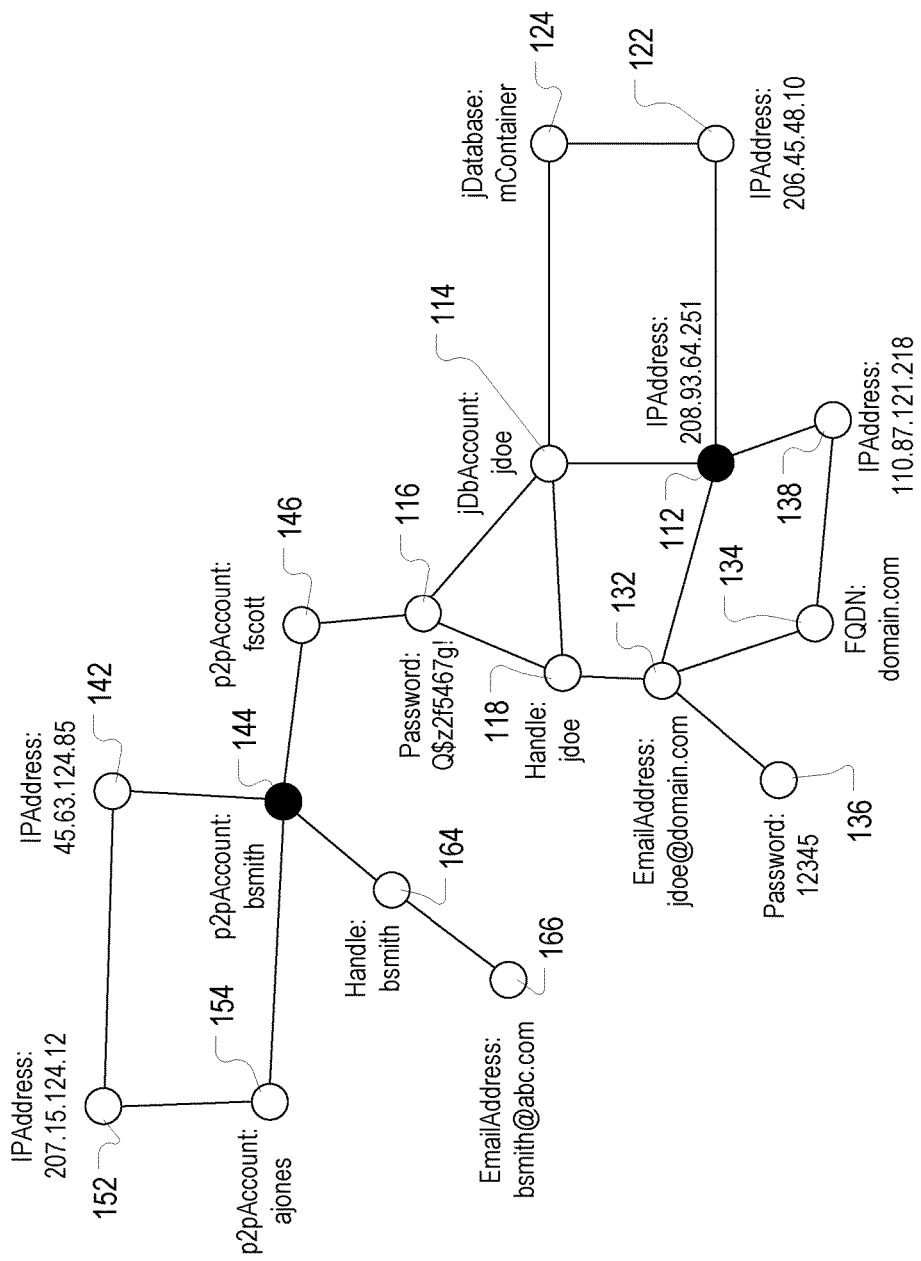
FIG. 116 illustrates a hypergraph which includes a node having a node type of "Handle" and a node value of "bsmith" and a node having a node type of "EmailAddress" and a node value of "bsmith@abc.com".

Similarly, some node types may be more accurate in suggesting maliciousness in the context of less common values, but less accurate with more common values. As an example, consider the hypergraph in FIG. 116, which has been expanded to include a node 164 having a node type of "Handle" and a node value of "bsmith" and a node 166 having a node type of "EmailAddress" and a node value of "bsmith@abc.com". Here, although a handle of "bsmith" was used for a p2pAccount which has been identified as a threat, the handle of "bsmith" is likely too common to meaningfully suggest that any email address or other account using the handle "bsmith" is malicious.

In accordance with one or more preferred implementations, a cardinality value is utilized that represents a metric based on a node's uniqueness. A cardinality value for a node can be based on and calculated using local data, global data, and/or external data (e.g. using external databases).

In accordance with one or more preferred implementations, a variant of the term frequency-inverse document frequency (tf-idf) statistic, which is designed to measure the importance of a word in a document as part of a collection, is utilized to determine cardinality.

As noted above, in accordance with one or more preferred implementations, a hypergraph is deformed based on cardinality. In accordance with one or more preferred implementations, cardinality for links along a path from a node to a threat is utilized to deform, or weight, a determined threat distance, and is utilized with such a threat distance to calculate a value indicating maliciousness.

As noted above, some node types may be more accurate as suggesting maliciousness in the context of less common values, but less accurate with more common values. Relatedly, nodes within a hypergraph may be more accurate as suggesting maliciousness when there are less links to them.

Returning to the example of a social media server or service, it will be appreciated that there may be a number of malicious actors who interact with such a server or service, even while there is a much, much larger number of benign users. There is little ability to infer malicious intent with respect to any particular user, as the vast majority of the users are benign.

As another example, consider a comparison of a public database server which has a lot of different connections from different users throughout any given time period day to a small, private server which has very few connections throughout any given time period from a small number of users. If one of the connections to the public database server is determined to be associated with a malicious actor, this likely does not say much about the maliciousness of any given other connection to the public database server. On the other hand, if one of the connections to the small private server is determined to be associated with a malicious act, this may be more suggestive that other connections may be associated with a malicious actor.

Figure 117:
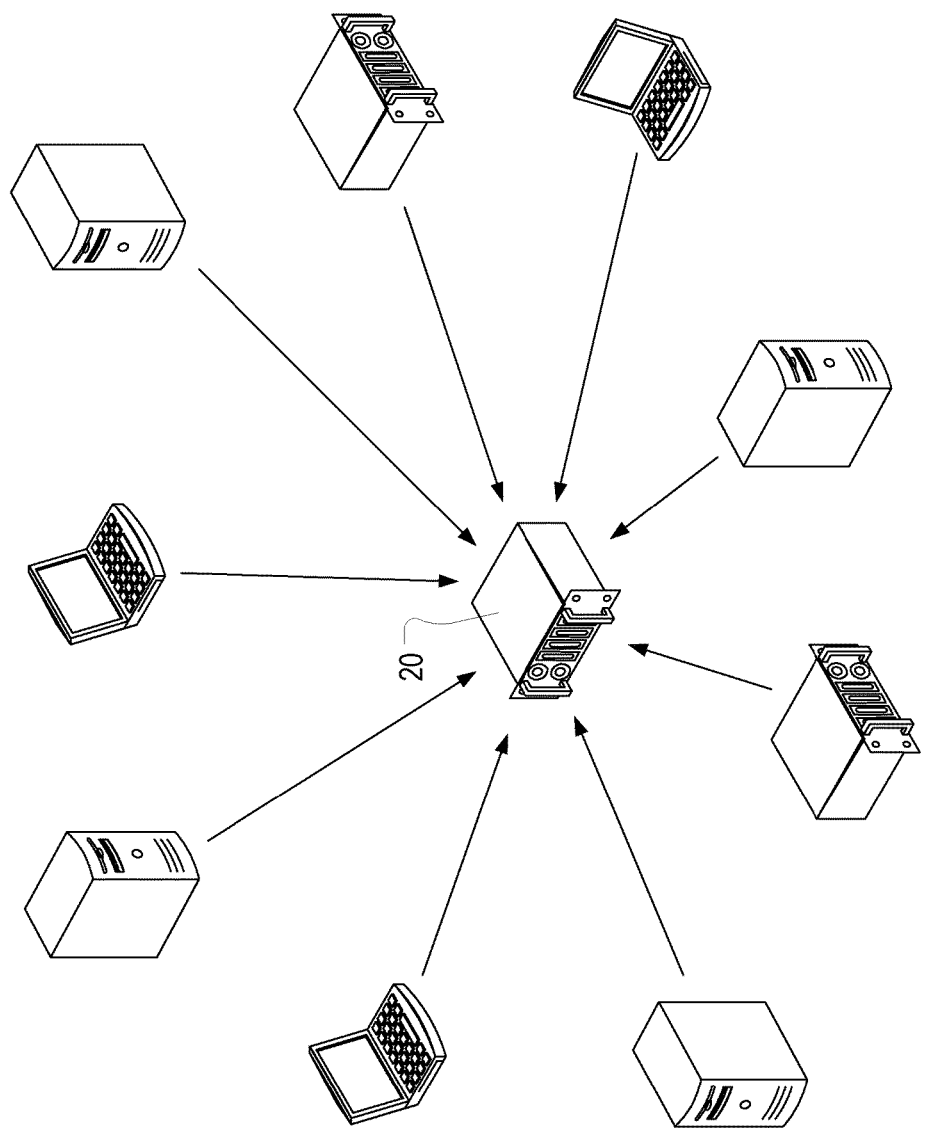
FIG. 117 is an illustration of a database server.
Figure 118:
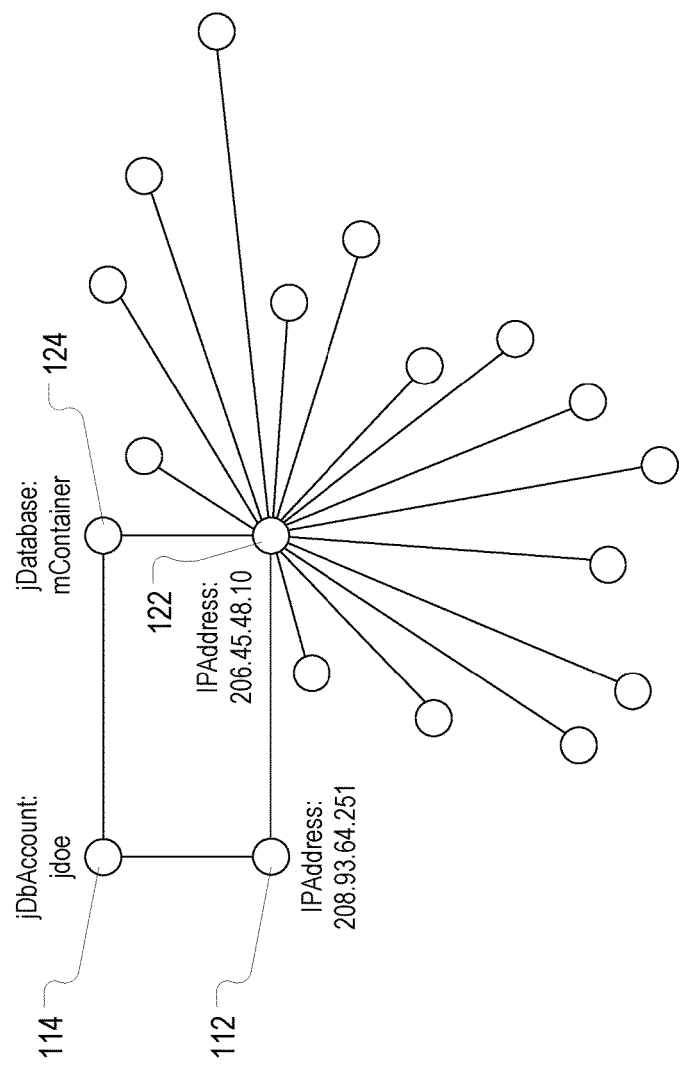
FIG. 118 illustrates updating of a hypergraph to include nodes based on network communication of a database server with other devices.

FIG. 117 is another illustration of the database server 20, illustrating that the database server 20 is a busy public server that engages in a lot of network communication with various, other devices. FIG. 118 illustrates updating of a hypergraph to include nodes based on network communication of the database server 20 with other devices.

In accordance with one or more preferred implementations, cardinality for a node (e.g. a node which has not been marked "nopivot" and for which there is no alternative provided method for determining cardinality) is determined based on a number of links to the node, that is, a node's connectedness. In accordance with one or more preferred implementations, a cardinality value for a node is inversely proportional to its connectedness. In accordance with one or more preferred implementations, cardinality for a node may be calculated as one divided by its connectedness, as illustrated in FIG. 119.

For example, FIG. 120 illustrates a fanciful representation of calculation of a cardinality value for the node 122 having a node type of "IPAddress" and a node value of "206.45.48.10".

FIGS. 121-125 illustrate exemplary C# style pseudocode for exemplary methods of a node class. This code includes exemplary methods for finding a cardinality value for a node. In accordance with one or more preferred implementations, determination of cardinality for a node may only take into account links within a specified time period and/or links having a particular node type, as illustrated in the pseudocode.

As noted above, in accordance with one or more preferred implementations, a cardinality value for a node can be based on and calculated using local data, global data, and/or external data (e.g. using external databases). In accordance with one or more preferred implementations, determining a cardinality value for a node type (such as a handle or password node type) involves using data from other nodes of the hypergraph and/or external data from external data sources that evaluates how common a particular node value (such as a handle or password) likely is. For example, a password of "Q$z2f5467g!" would likely be determined to have a high cardinality value, while a password of "12345" would likely be determined to have a low cardinality value. FIG. 125 illustrates exemplary C# style pseudocode which calls a specific findPasswordCardinality method to find a cardinality value for a node having a "Password" node type.

In accordance with one or more preferred implementations, for data associated with some node types, such as usernames, passwords, domain names, or person names, models can be used to determine uniqueness. For example, a model based on common passwords will give a common password of "123456" a cardinality of 0.0, and a very uncommon password, such as "4zAZ65B6sNLTe9kCUiAB", will have a cardinality of 1.0.

In accordance with one or more preferred implementations, algorithm implementations measuring relative connectedness take into account that different areas of a hypergraph may have been more highly enriched with data gathering than other areas and that connectedness modeling is done per datatype.

As noted above, in accordance with one or more preferred implementations, cardinality for links along a path from a node to a threat is utilized to deform, or weight, a determined threat distance.

FIG. 126 illustrates an exemplary equation which can be utilized to calculate a cardinality value for a path, or CardinalityPath. The equation involves multiplying together respective cardinality values for each node (e.g. CardinalityNode values) along the path.

FIGS. 127-129 illustrates exemplary C# style pseudocode for exemplary findPathCardinality methods, which determine a CardinalityPath value for a path. In accordance with one or more preferred implementations, determination of cardinality for a path may only take into account links within a specified time period and/or links having a particular node type, as illustrated in the pseudocode.

Figure 130:
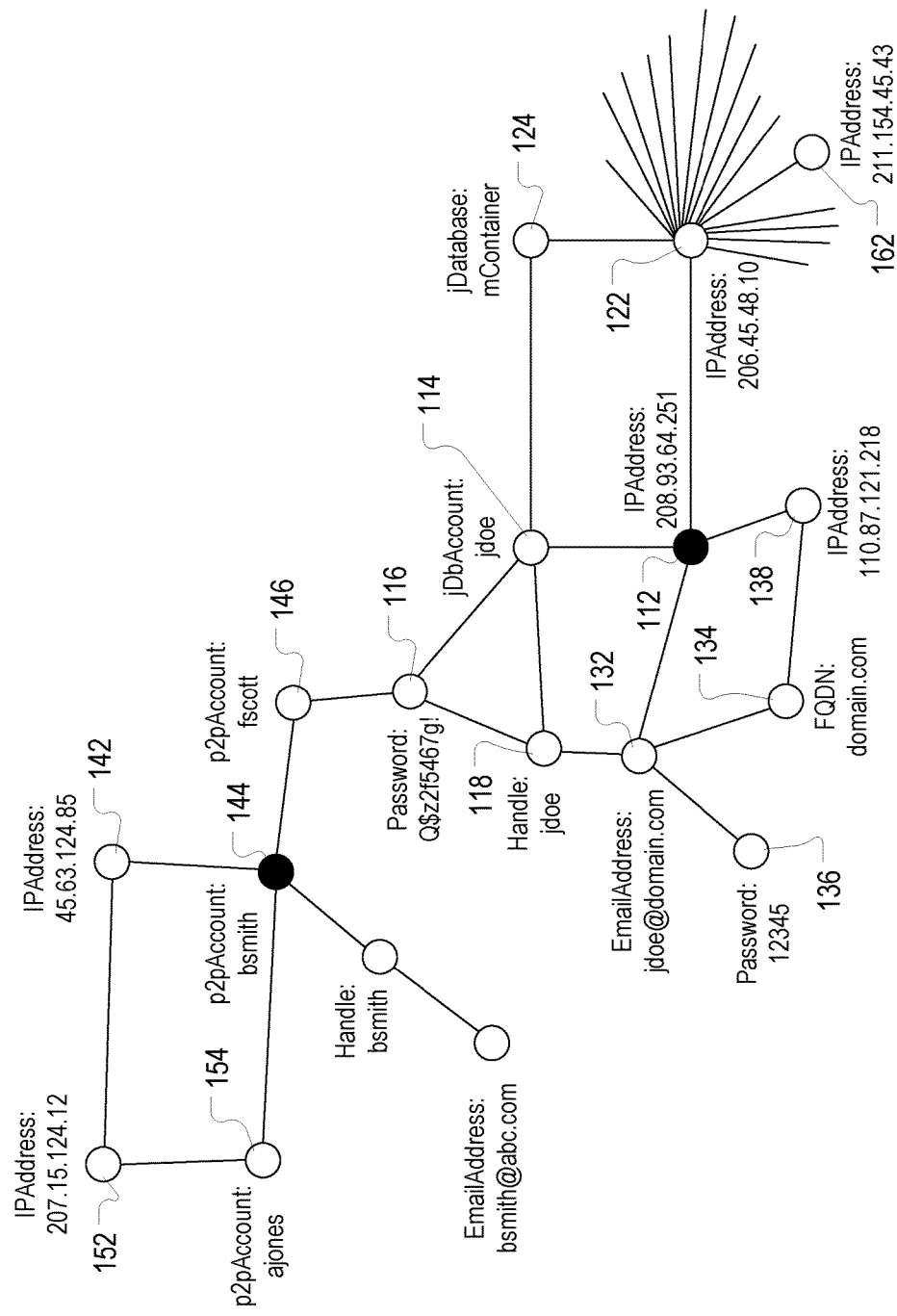
FIG. 130 illustrates an exemplary hypergraph.

The exemplary hypergraph of FIG. 130 will now be utilized to describe exemplary calculation of CardinalityPath values.

Figure 131:
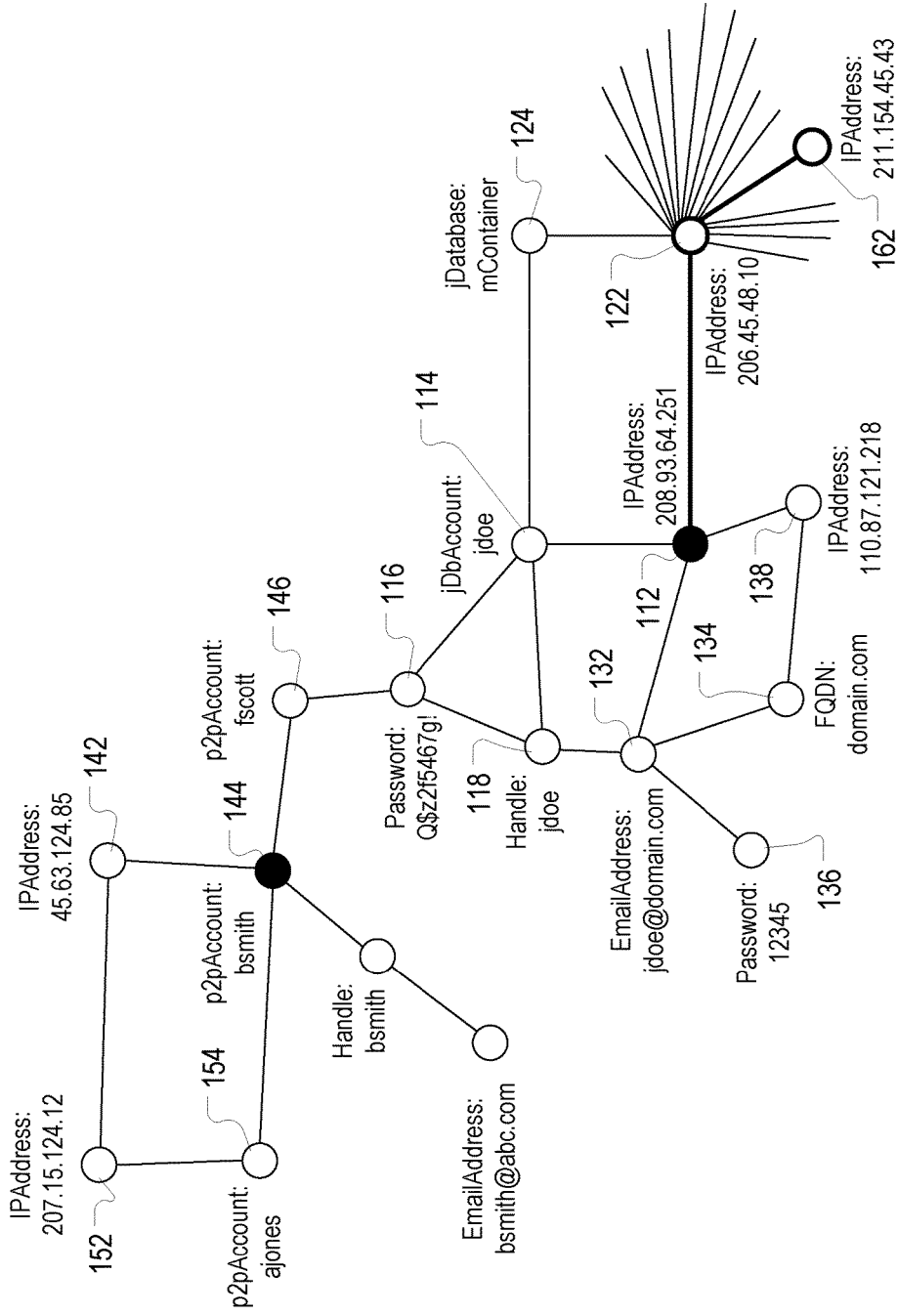
FIG. 131 illustrates a fanciful representation of a query for a CardinalityPath value for a path from a node having a node type of "IPAddress" and a node value of "208.93.64.251" through a node having a node type of "IPAddress" and a node value of "206.45.48.10" to a node having a node type of "IPAddress" and a node value of "211.154.45.43".

For example, FIG. 131 illustrates a fanciful representation of a query for a CardinalityPath value for a path from the node 112 (having a node type of "IPAddress" and a node value of "208.93.64.251") through the node 122 (having a node type of "IPAddress" and a node value of "206.45.48.10") to the node 162 (having a node type of "IPAddress" and a node value of "211.154.45.43". FIG. 131 highlights this path via use of a thicker line.

As illustrated in FIG. 132, a CardinalityPath value for the path from the node 112 (having a node type of "IPAddress" and a node value of "208.93.64.251") through the node 122 (having a node type of "IPAddress" and a node value of "206.45.48.10") to the node 162 (having a node type of "IPAddress" and a node value of "211.154.45.43") is equal to a CardinalityNode value for the node 112 (having a node type of "IPAddress" and a node value of "208.93.64.251") multiplied by a CardinalityNode value for the node 122 (having a node type of "IPAddress" and a node value of "206.45.48.10") multiplied by a CardinalityNode value for the node 162 (having a node type of "IPAddress" and a node value of "211.154.45.43").

Figure 133:
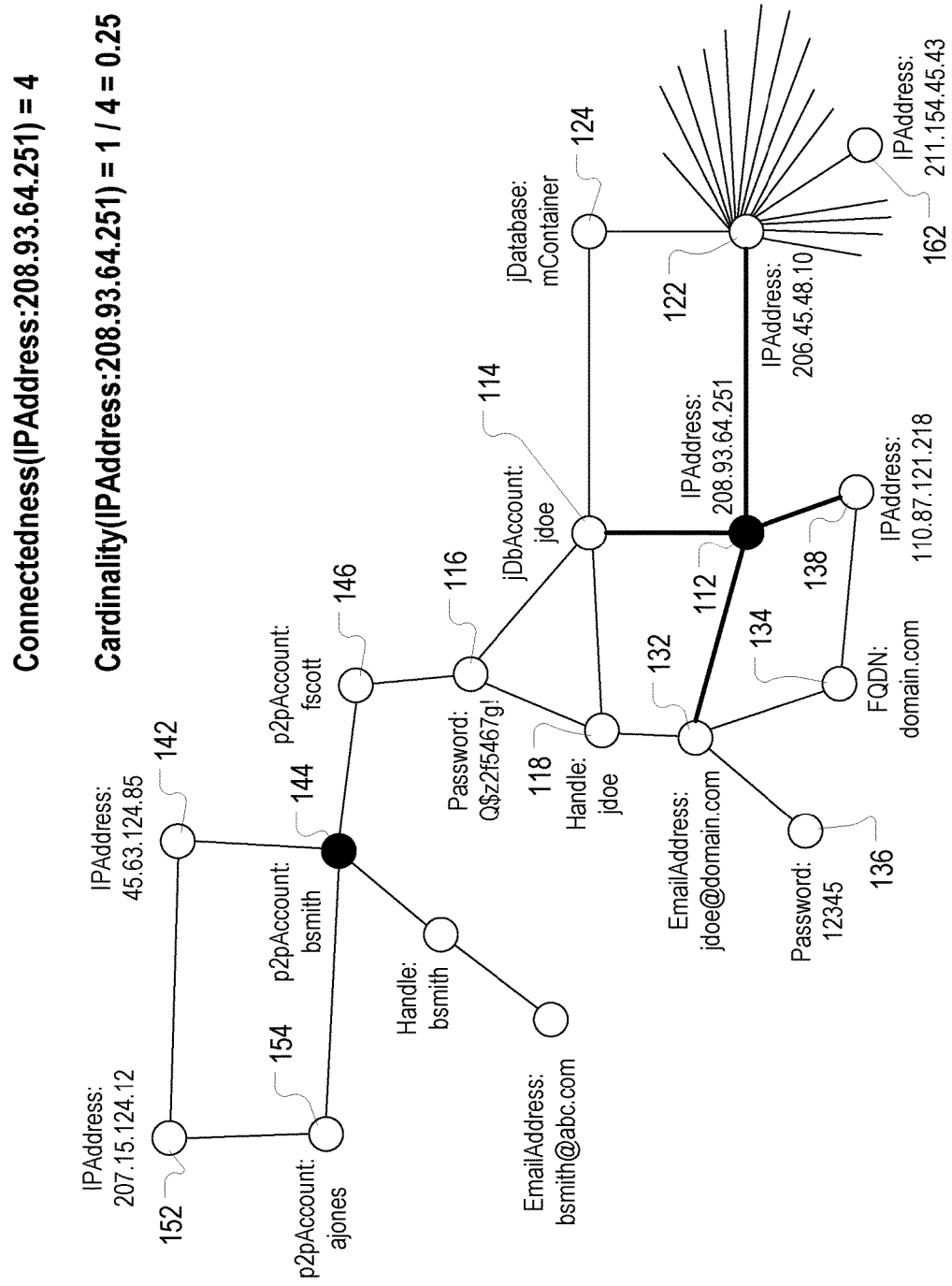
FIG. 133 illustrates a fanciful representation of calculation of a CardinalityNode value for a node having a node type of "IPAddress" and a node value of "208.93.64.251".
Figure 134:
FIG. 134 illustrates calculation of a CardinalityNode value for a node.

FIG. 133 illustrates a fanciful representation of calculation of a CardinalityNode value for the node 112 (having a node type of "IPAddress" and a node value of "208.93.64.251"). As illustrated in FIG. 134, the node 112 has four links, and thus has a connectedness of "4". Accordingly, a CardinalityNode value for the node 112 is calculated by dividing one by this connectedness value of "4", resulting in a CardinalityNode value for the node 112 of "0.25", as illustrated in FIG. 133.

Figure 135:
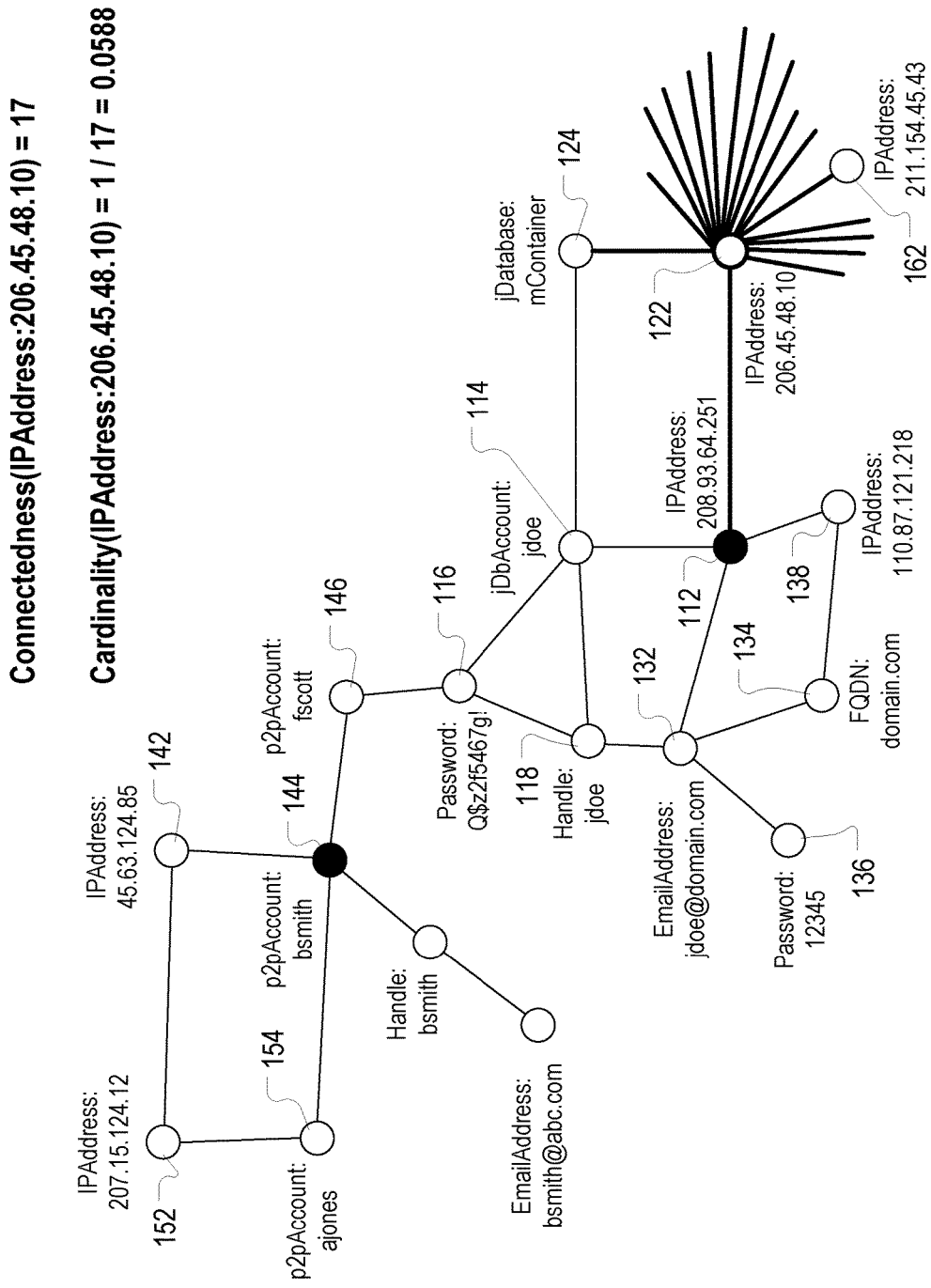
FIG. 135 illustrates a fanciful representation of calculation of a CardinalityNode value for a node having a node type of "IPAddress" and a node value of "206.45.48.10".

FIG. 135 illustrates a fanciful representation of calculation of a CardinalityNode value for the node 122 (having a node type of "IPAddress" and a node value of "206.45.48.10"). The node 122 has seventeen links, and thus has a connectedness of "17". Accordingly, a CardinalityNode value for the node 122 is calculated by dividing one by this connectedness value of "17", resulting in a CardinalityNode value for the node 112 of "0.0588", as illustrated in FIG. 135.

Figure 136:
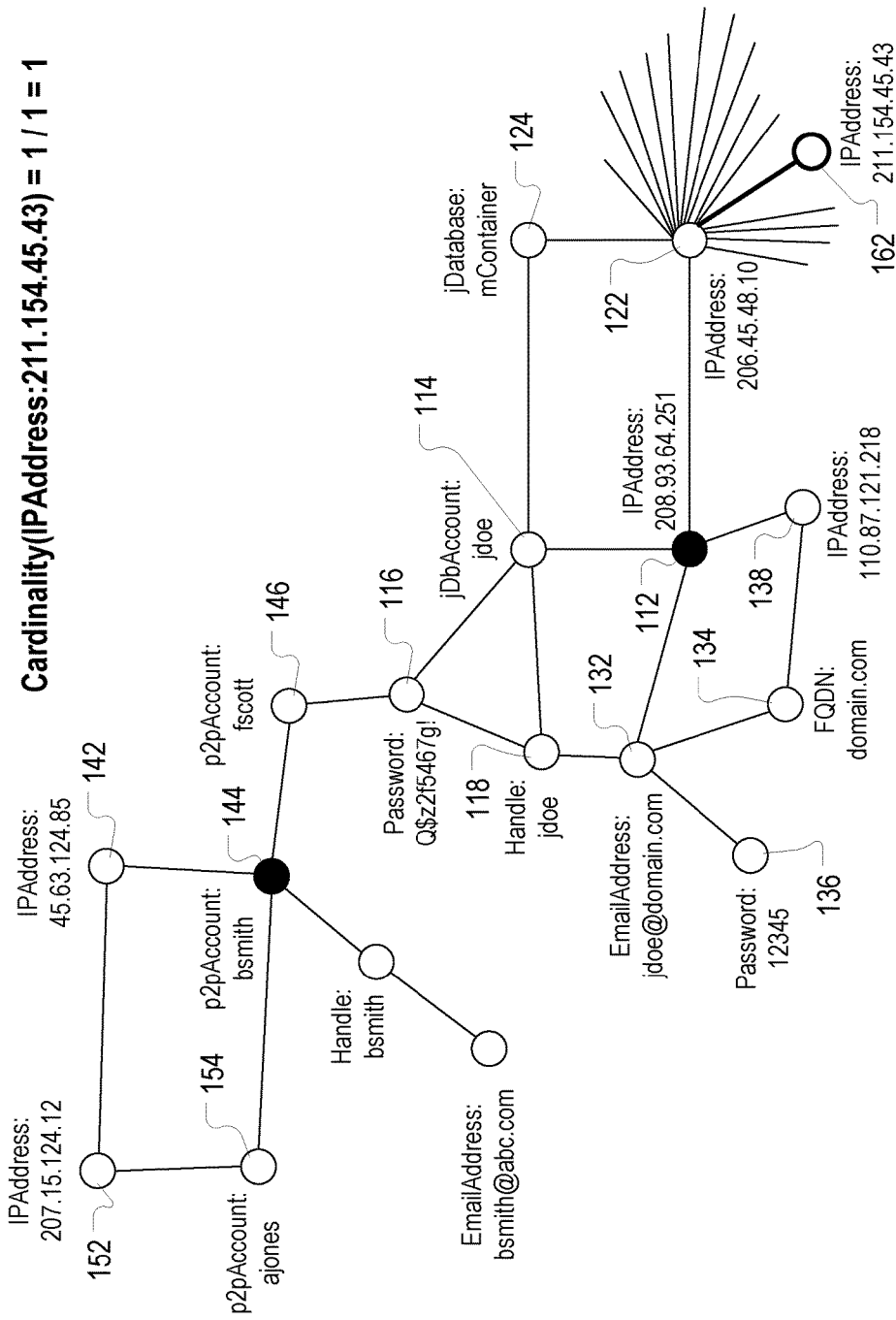
FIG. 136 illustrates calculation of a CardinalityNode value for a node.

FIG. 136 illustrates a fanciful representation of calculation of a CardinalityNode value for the node 162 (having a node type of "IPAddress" and a node value of "211.154.45.43"). The node 162 has one link, and thus has a connectedness of "1". Accordingly, a CardinalityNode value for the node 162 is calculated by dividing one by this connectedness value of "1", resulting in a CardinalityNode value for the node 162 of "1", as illustrated in FIG. 136.

As noted above, a CardinalityPath value for the path from the node 112 (having a node type of "IPAddress" and a node value of "208.93.64.251") through the node 122 (having a node type of "IPAddress" and a node value of "206.45.48.10") to the node 162 (having a node type of "IPAddress" and a node value of "211.154.45.43" is equal to a CardinalityNode value for the node 112 (having a node type of "IPAddress" and a node value of "208.93.64.251") multiplied by a CardinalityNode value for the node 122 (having a node type of "IPAddress" and a node value of "206.45.48.10") multiplied by a CardinalityNode value for the node 162 (having a node type of "IPAddress" and a node value of "211.154.45.43"). FIG. 137 illustrates a fanciful representation of calculation of a CardinalityPath value for the path by multiplying together the calculated CardinalityNode values for the nodes along the path. Here, the calculation involves multiplying "0.25"*"0.0588"*"1", arriving at a CardinalityPath value of "0.0147".

Figure 138:
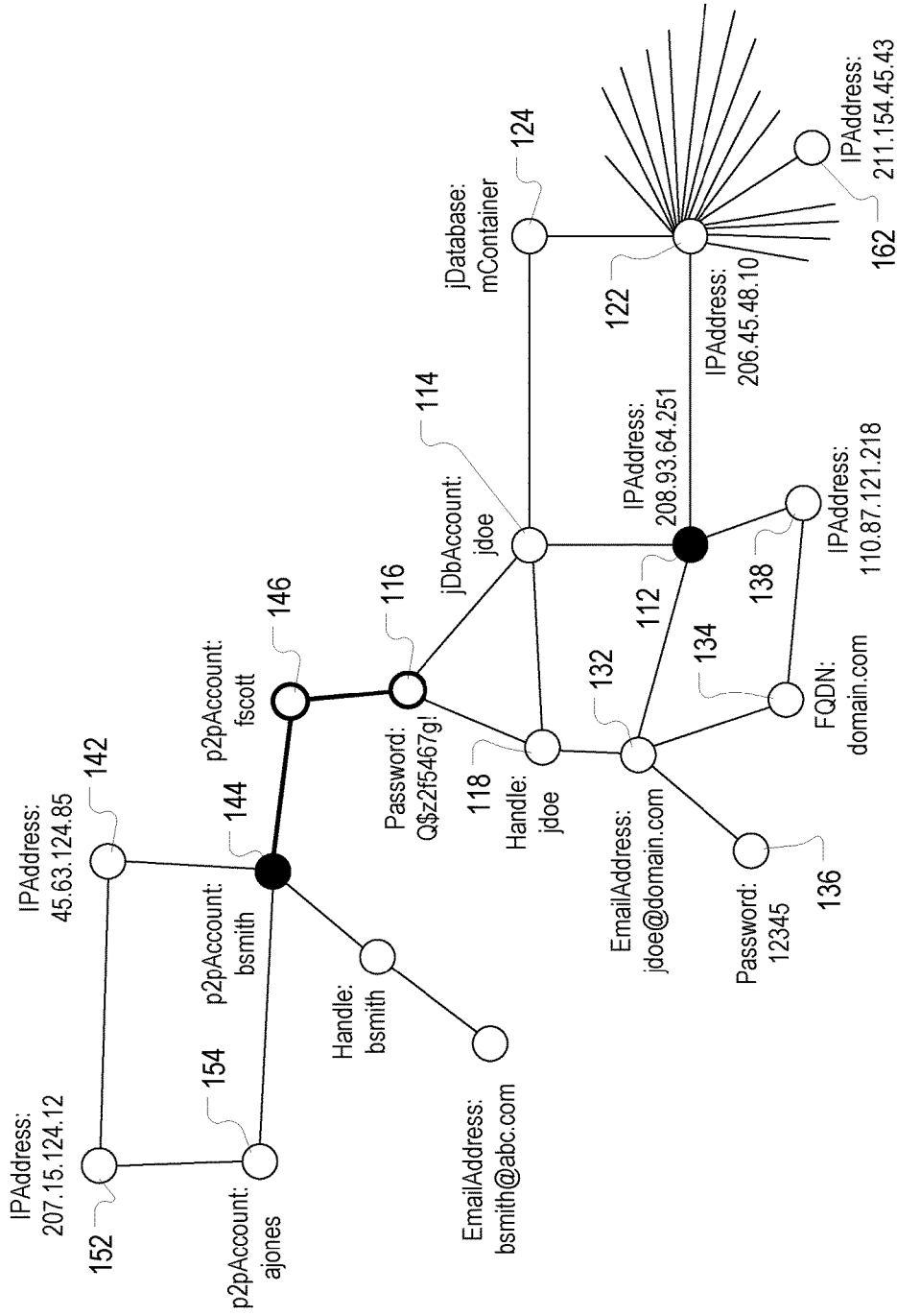
FIG. 138 illustrates a fanciful representation of a query for a CardinalityPath value for a path from a node having a node type of "p2pAccount" and a node value of "bsmith" through a node having a node type of "p2pAccount" and a node value of "fscott" to a node having a node type of "Password" and a node value of "Q$z2f5467g!".

As another example, FIG. 138 illustrates a fanciful representation of a query for a CardinalityPath value for a path from the node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!"). FIG. 138 highlights this path via use of a thicker line.

A CardinalityPath value for the path from the node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!") is equal to a CardinalityNode value for the node 144 (having a node type of "p2pAccount" and a node value of "bsmith") multiplied by a CardinalityNode value for the node 146 (having a node type of "p2pAccount" and a node value of "fscott") multiplied by a CardinalityNode value for to the node 116 (having a node type of "Password" and a node value of "Q$z2f5467g!").

Figure 139:
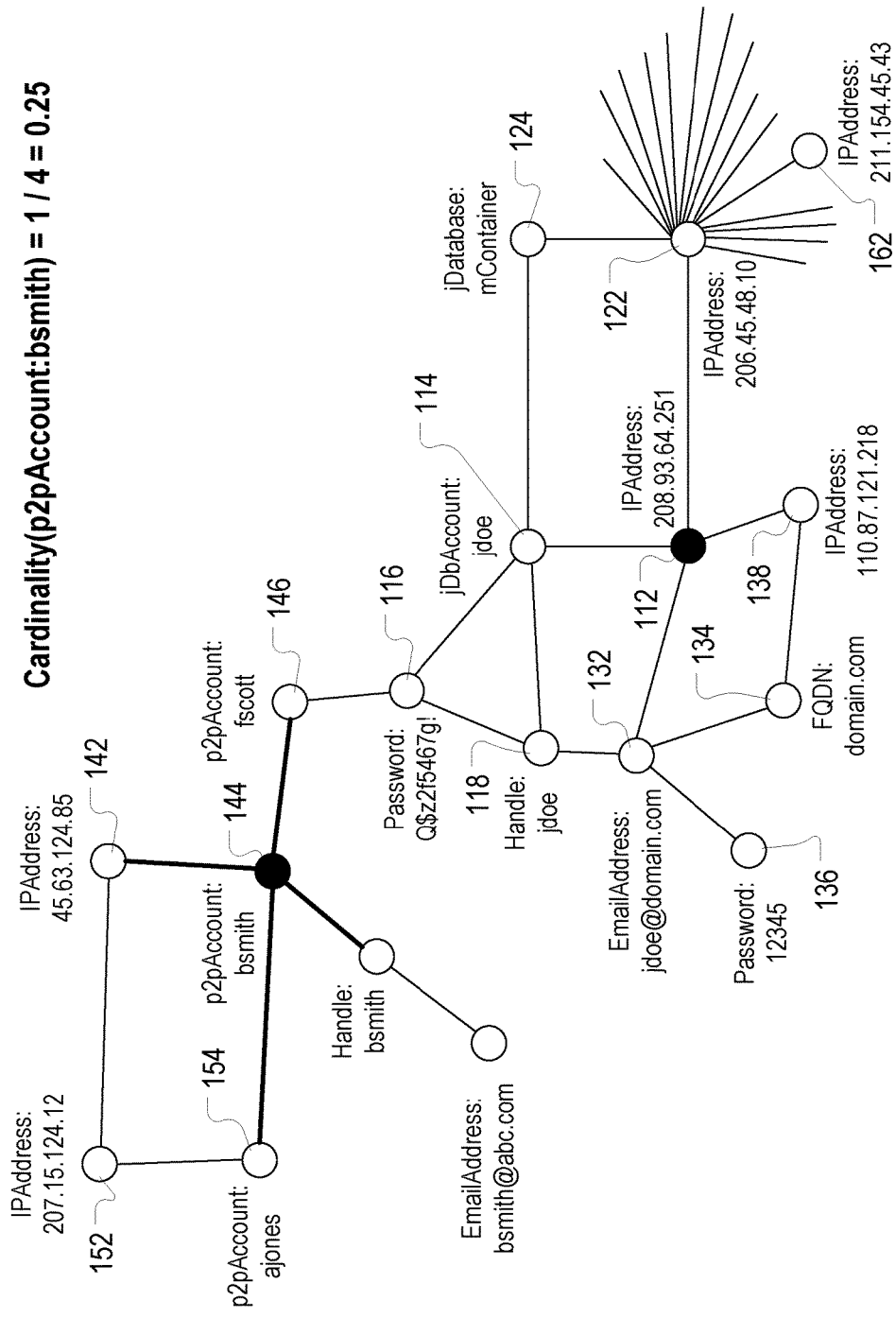
FIG. 139 illustrates a fanciful representation of calculation of a CardinalityNode value for a node having a node type of "p2pAccount" and a node value of "bsmith".

FIG. 139 illustrates a fanciful representation of calculation of a CardinalityNode value for the node 144 (having a node type of "p2pAccount" and a node value of "bsmith"). As illustrated in FIG. 139, the node 144 has four links, and thus has a connectedness of "4". Accordingly, a CardinalityNode value for the node 144 is calculated by dividing one by this connectedness value of "4", resulting in a CardinalityNode value for the node 144 of "0.25", as illustrated in FIG. 139.

Figure 140:
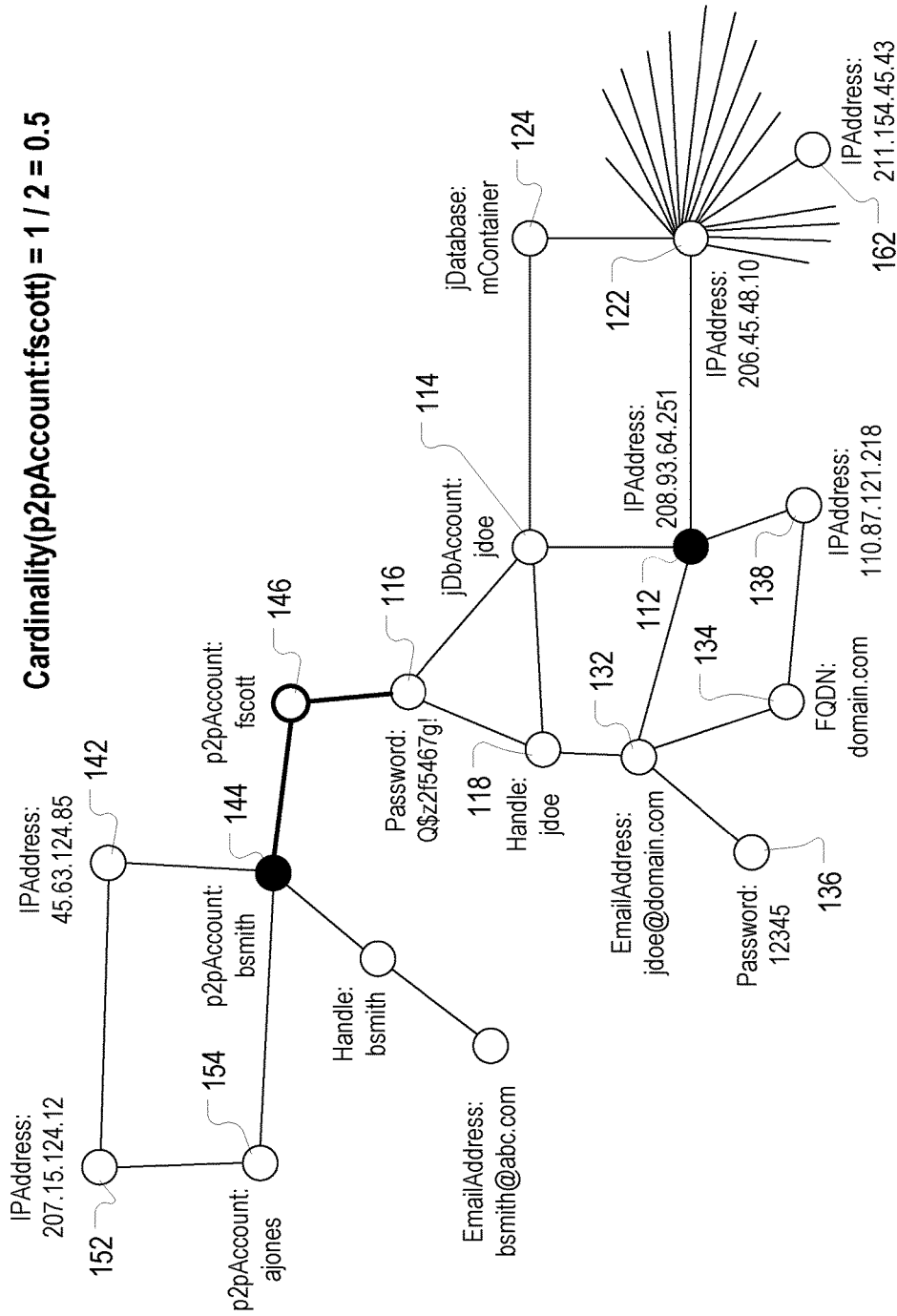
FIG. 140 illustrates a fanciful representation of calculation of a CardinalityNode value for a node having a node type of "p2pAccount" and a node value of "fscott".

FIG. 140 illustrates a fanciful representation of calculation of a CardinalityNode value for the node 146 (having a node type of "p2pAccount" and a node value of "fscott"). The node 146 has two links, and thus has a connectedness of "2". Accordingly, a CardinalityNode value for the node 146 is calculated by dividing one by this connectedness value of "2", resulting in a CardinalityNode value for the node 146 of "0.5", as illustrated in FIG. 140.

Figure 141:
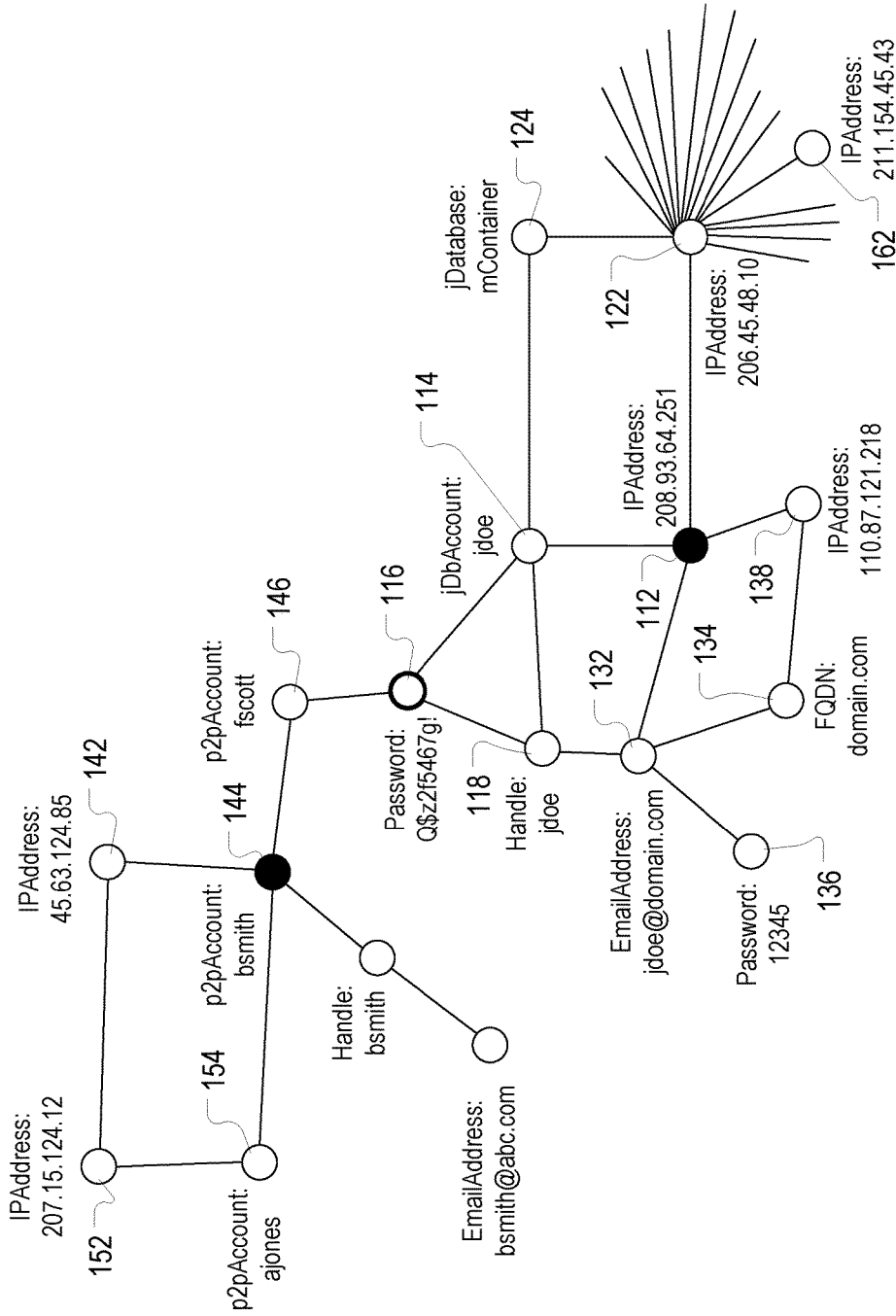
FIG. 141 illustrates a fanciful representation of determination of a CardinalityNode value for a node having a node type of "Password" and a node value of "Q$z2f5467g!".

FIG. 141 illustrates a fanciful representation of determination of a CardinalityNode value for the node 116 (having a node type of "Password" and a node value of "Q$z2f5467g!"). As noted above, in accordance with one or more preferred implementations, a cardinality value for a node can be based on and calculated using local data, global data, and/or external data (e.g. using external databases). In accordance with one or more preferred implementations, determining a cardinality value for a node type (such as a handle or password node type) involves using data from other nodes of the hypergraph and/or external data from external data sources that evaluates how common a particular node value (such as a handle or password) likely is. FIG. 141 illustrates a call to a method for determining a password cardinality value for the password "Q$z2f5467g!". Here, as the password is determined to be very distinct, it is determined to have a cardinality value of "1".

As noted above, A CardinalityPath value for the path from the node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!") is equal to a CardinalityNode value for the node 144 (having a node type of "p2pAccount" and a node value of "bsmith") multiplied by a CardinalityNode value for the node 146 (having a node type of "p2pAccount" and a node value of "fscott") multiplied by a CardinalityNode value for to the node 116 (having a node type of "Password" and a node value of "Q$z2f5467g!"). FIG. 142 illustrates a fanciful representation of calculation of a CardinalityPath value for the path by multiplying together the calculated CardinalityNode values for the nodes along the path. Here, the calculation involves multiplying "0.25"*"0.5"*"1", arriving at a CardinalityPath value of "0.125".

Maliciousness

As noted hereinabove, in accordance with one or more preferred implementations, maliciousness is approximated by measuring the proximity in hyper-dimensional space between a questionable node and a node known to be associated with a threat group. This hypergraph data may not be perfect, so in accordance with one or more preferred implementations, the proximity calculation is deformed based on temporality and cardinality to reduce error. This metric can then be used to detect malicious activity.

In accordance with one or more preferred implementations, calculated proximity in time values for links (or nodes) along a path from a node to a threat, together with calculated cardinality values for nodes along the path, are utilized to deform, or weight, a determined threat distance, e.g. by being utilized together with such a threat distance to calculate a value indicating maliciousness (for example by being multiplied together).

FIG. 143 illustrates an exemplary equation which can be utilized to calculate a maliciousness value for a node.

FIGS. 144-145 illustrate exemplary C# style pseudocode for methods for use in determining a maliciousness value for a node. This pseudocode includes a method for use in determining a maliciousness value for a specified node with respect to a specified threat node, a method for use in determining a maliciousness value for a specified node with respect to a plurality of specified threat nodes (using the shortest path to any of the specified threat nodes), and a method for use in determining a maliciousness value for a specified node with respect to nodes which have been tagged as threats. This pseudocode further includes a method for use in determining a maliciousness value for a specified node based on a shortest path to any node which meets a specified predicate. This pseudocode further includes methods for use in determining a maliciousness value for a specified node where a time interval and/or an m value is specified for use in determining proximity in time values.

FIG. 146 illustrates exemplary C# style pseudocode for a jPath class that can be used in calculating a maliciousness value (e.g. by calculating a maliciousness value based on a path represented as a jPath).

FIG. 147 illustrates exemplary C# style pseudocode for a method which can be utilized to calculate a proximity in space value for a path.

In accordance with one or more preferred implementations, calculating a maliciousness value for a node involves knowing or determining a path from the node to a threat node (preferably a shortest path).

Figure 148:
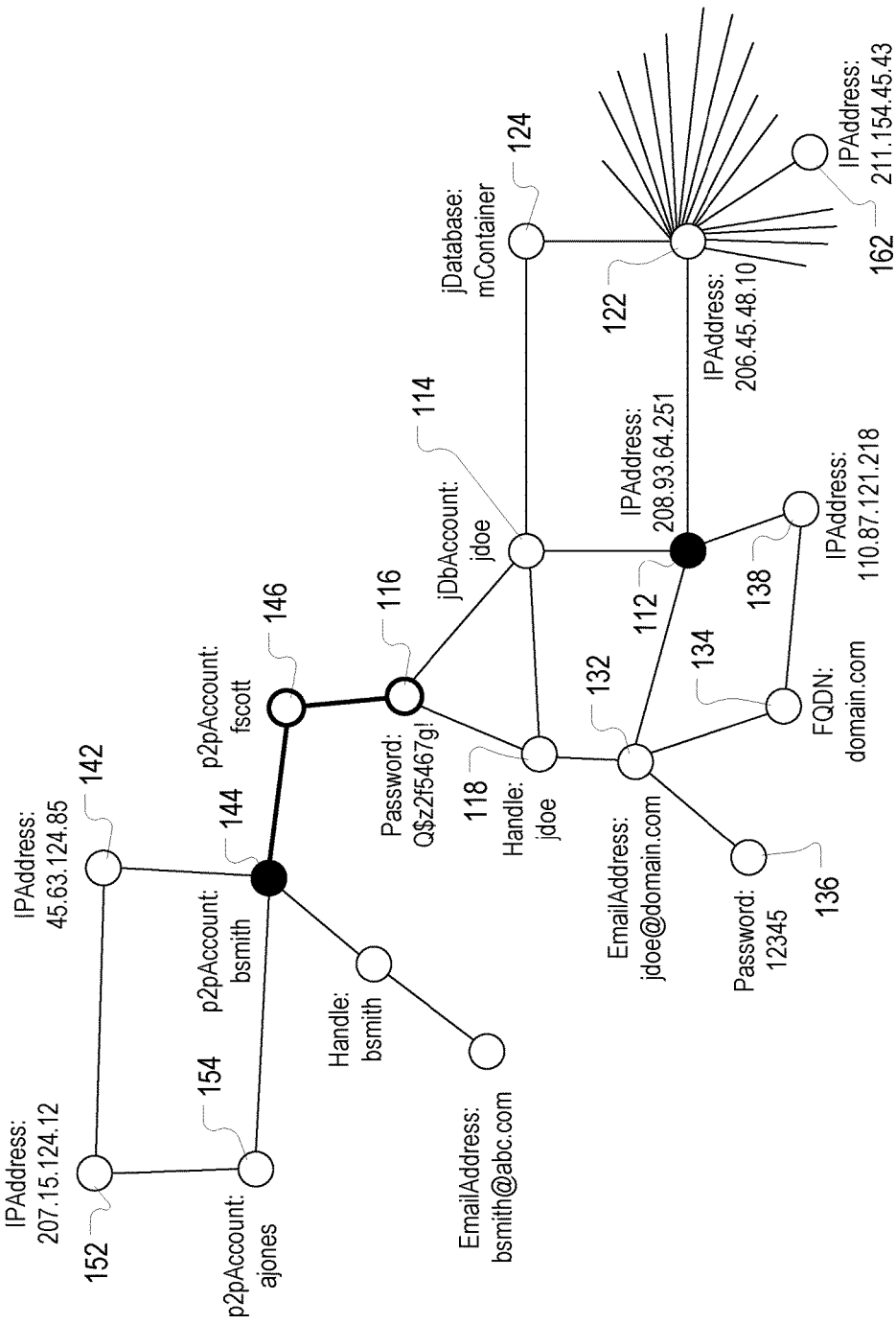
FIG. 148 illustrates a known shortest path from a node having a node type of "Password" and a node value of "Q$z2f5467g!") to a threat node.

FIG. 148 illustrates a known shortest path from the node 116 (having a node type of "Password" and a node value of "Q$z2f5467g!") to a threat node.

Figure 149:
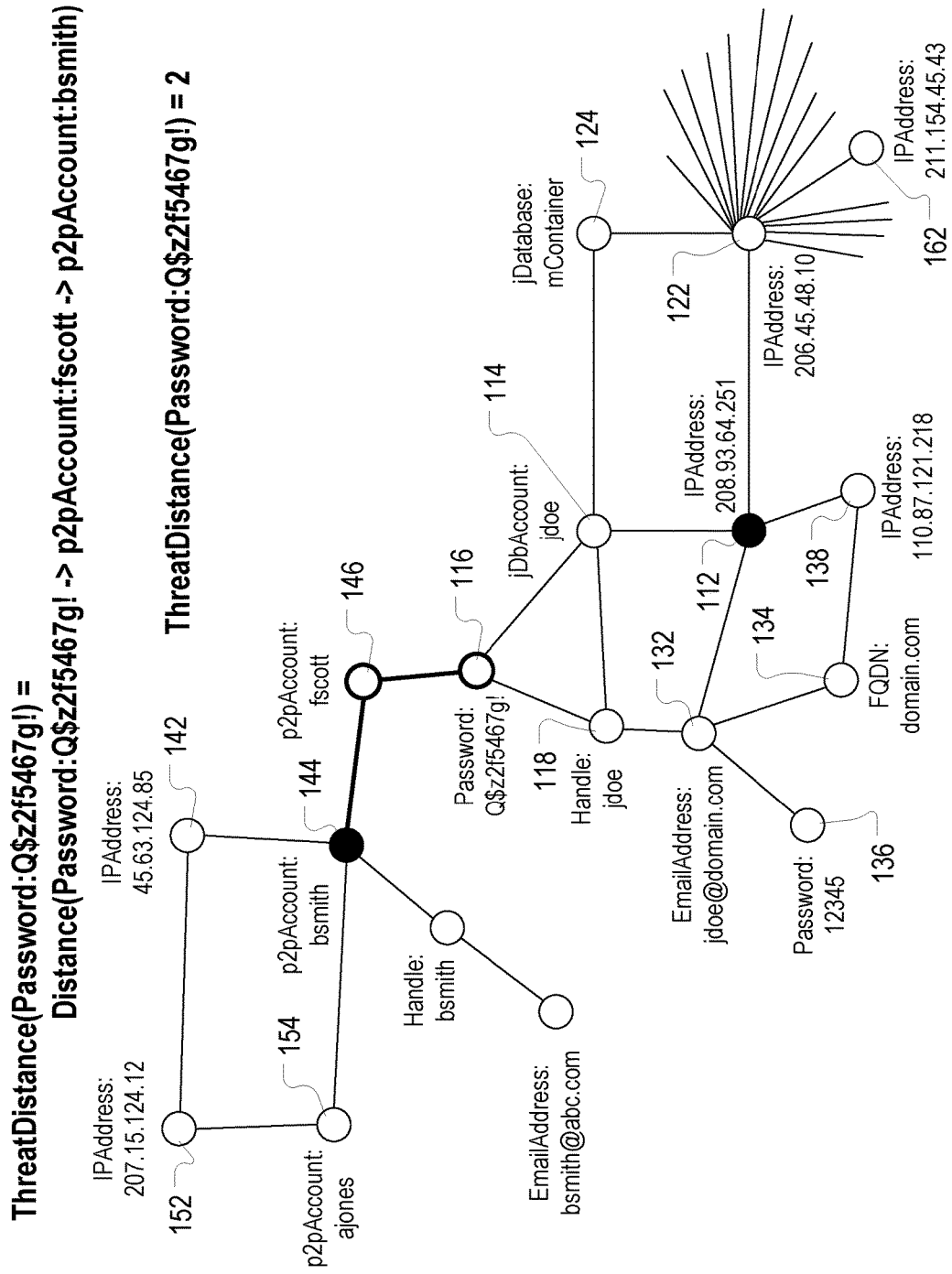
FIG. 149 illustrates determination of a threat distance for a node.

As illustrated in FIG. 149, based on this known shortest path from the node 116 to a threat node, it can be determined that a threat distance for the node 116 is "2".

FIG. 150 illustrates a fanciful representation of calculation of a Proximity Space value for the node 116 (having a node type of "Password" and a node value of "Q$z2f5467g!"). As illustrated, this ProximitySpace value for the node 116 is calculated to be "0.5".

Figure 151:
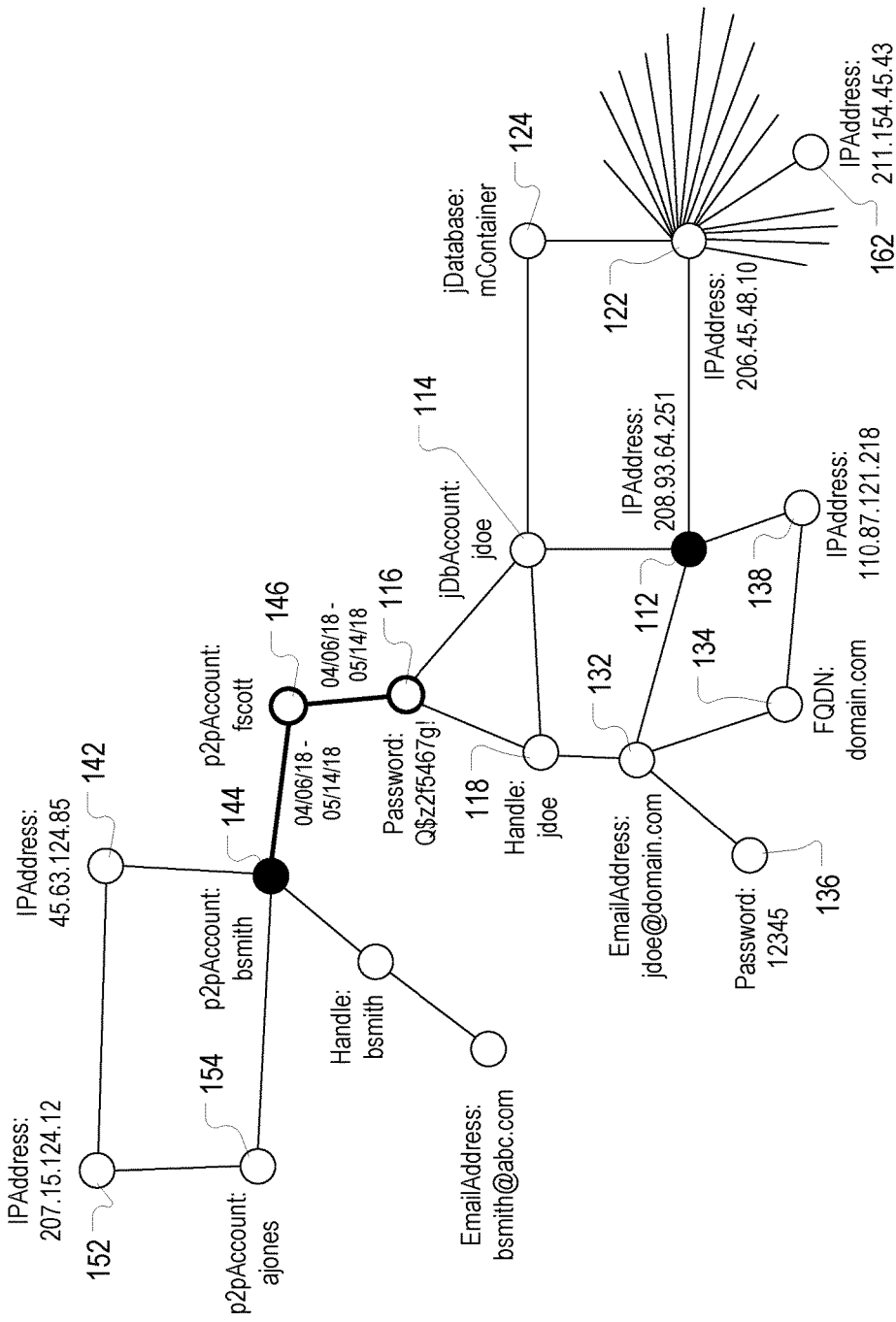
FIG. 151 fancifully illustrates that a proximity time value for a path can be calculated.
Figure 152:
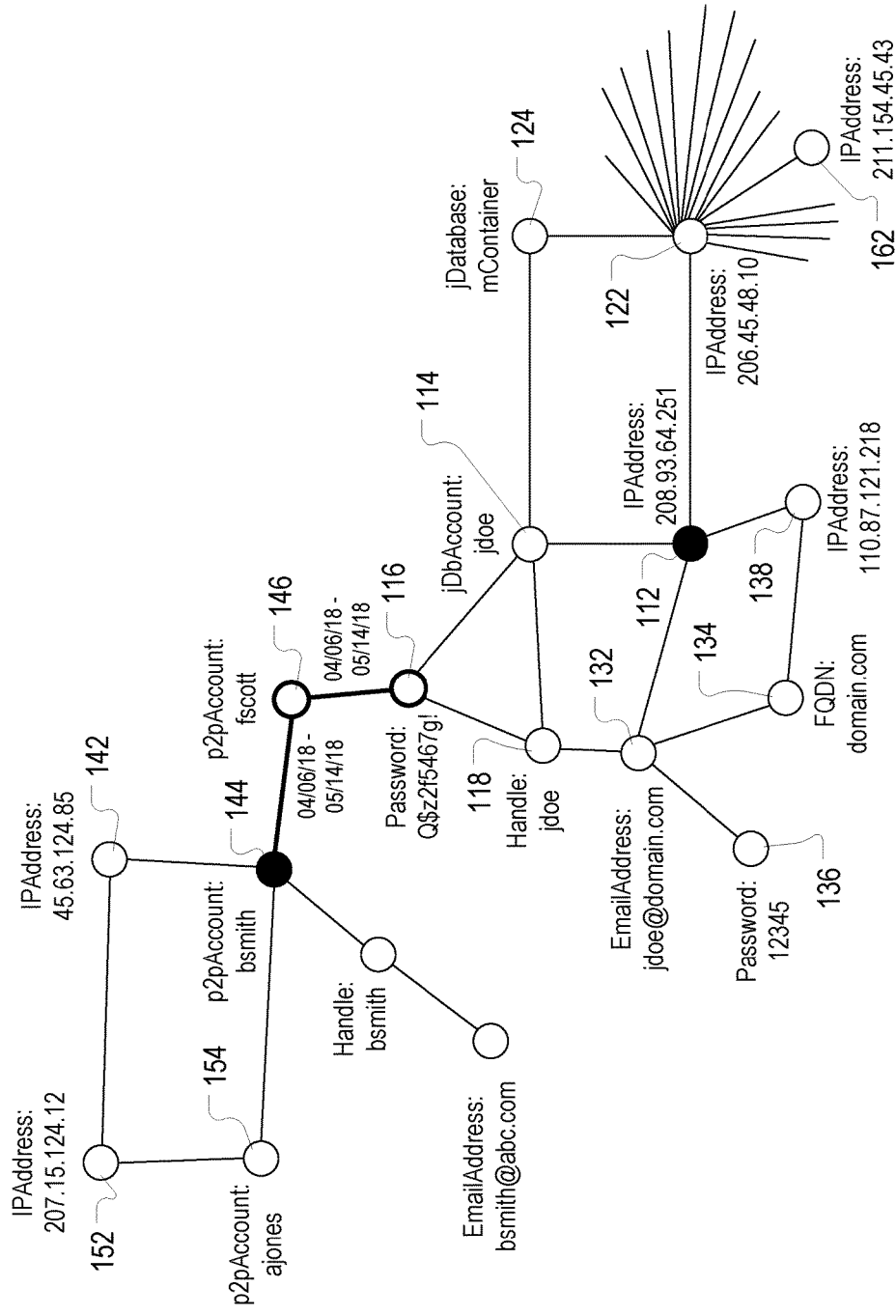
FIG. 152 illustrates calculation of a ProximityTimePath value for a path of "1".

Further, as illustrated in FIG. 151, based on the known shortest path from the node 116 to a threat node, which is a path from the node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!"), a proximity time value can be calculated for that path. Notably, calculation of a proximity time value for this path (using the same m value) was previously described hereinabove, e.g. with respect to FIG. 101. FIG. 152 illustrates the result of that calculation, a calculated ProximityTimePath value for that path of "1". As this path has been determined to be the known shortest path from the node 116 to a threat node, this calculated ProximityTimePath value can be utilized in a maliciousness calculation for the node 116, as fancifully suggested by FIG. 153.

Figure 154:
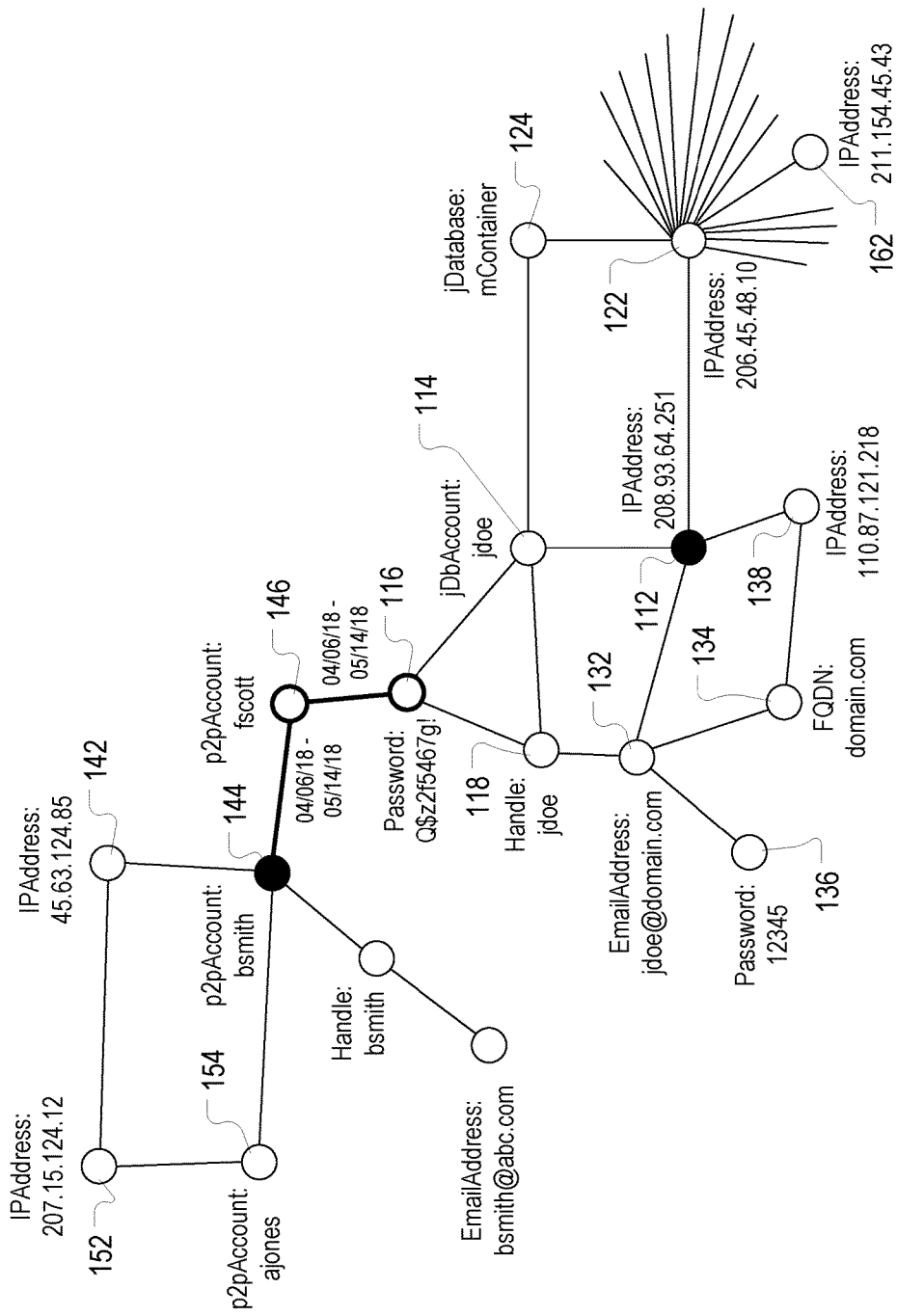
FIG. 154 fancifully illustrates that a cardinality value for a path can be calculated.

Further, as illustrated in FIG. 154, based on the known shortest path from the node 116 to a threat node, which is a path from the node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!"), a cardinality value can be calculated for that path. Notably, calculation of a cardinality value for this path was previously described hereinabove, e.g. with respect to FIG. 142. FIG. 155 illustrates the result of that calculation, a calculated PathCardinality value for that path of "0.125". As this path has been determined to be the known shortest path from the node 116 to a threat node, this calculated PathCardinality value can be utilized in a maliciousness calculation for the node 116, as fancifully suggested by FIG. 155.

As described hereinabove, based on the known shortest path from the node 116 to a threat node, that path being from node 144 (having a node type of "p2pAccount" and a node value of "bsmith") through the node 146 (having a node type of "p2pAccount" and a node value of "fscott") to the node 116 (having a node type of "Password" and a node value of "Q$z2f5467g!"), a ProximitySpace value for the node 116 is calculated to be "0.5", a ProximityTimePath value for that path is calculated to be "1", and a PathCardinality value for that path is calculated to be "0.125".

FIG. 156 illustrates a fanciful representation of calculation of a maliciousness value for the node by multiplying together the calculated Proximity Space value, the calculated ProximityTimePath value, and the calculated PathCardinality value. Here, the calculation involves multiplying "0.5"*"1"*"0.125", arriving at a maliciousness value of "0.0625" for the node 116 having a node type of "Password" and a node value of "Q$z2f5467g!" (based on the known shortest path to a threat node).

In accordance with one or more preferred implementations, an alternative approach to calculating a maliciousness value based on calculated Proximity Space, ProximityTimePath and PathCardinality values may be utilized. For example, FIG. 157 illustrates another exemplary equation that can be utilized to calculate a maliciousness value. In particular, a maliciousness value is calculated to be a weighted average of calculated ProximitySpace, ProximityTimePath and PathCardinality values.

FIG. 158 illustrates an exemplary calculation of a maliciousness value utilizing this approach, in which a calculated PathCardinality value is given less weight than calculated Proximity Space and ProximityTimePath values.

As noted above, in accordance with one or more preferred implementations, calculating a maliciousness value for a node involves knowing or determining a path from the node to a threat node (preferably a shortest path).

Figure 159:
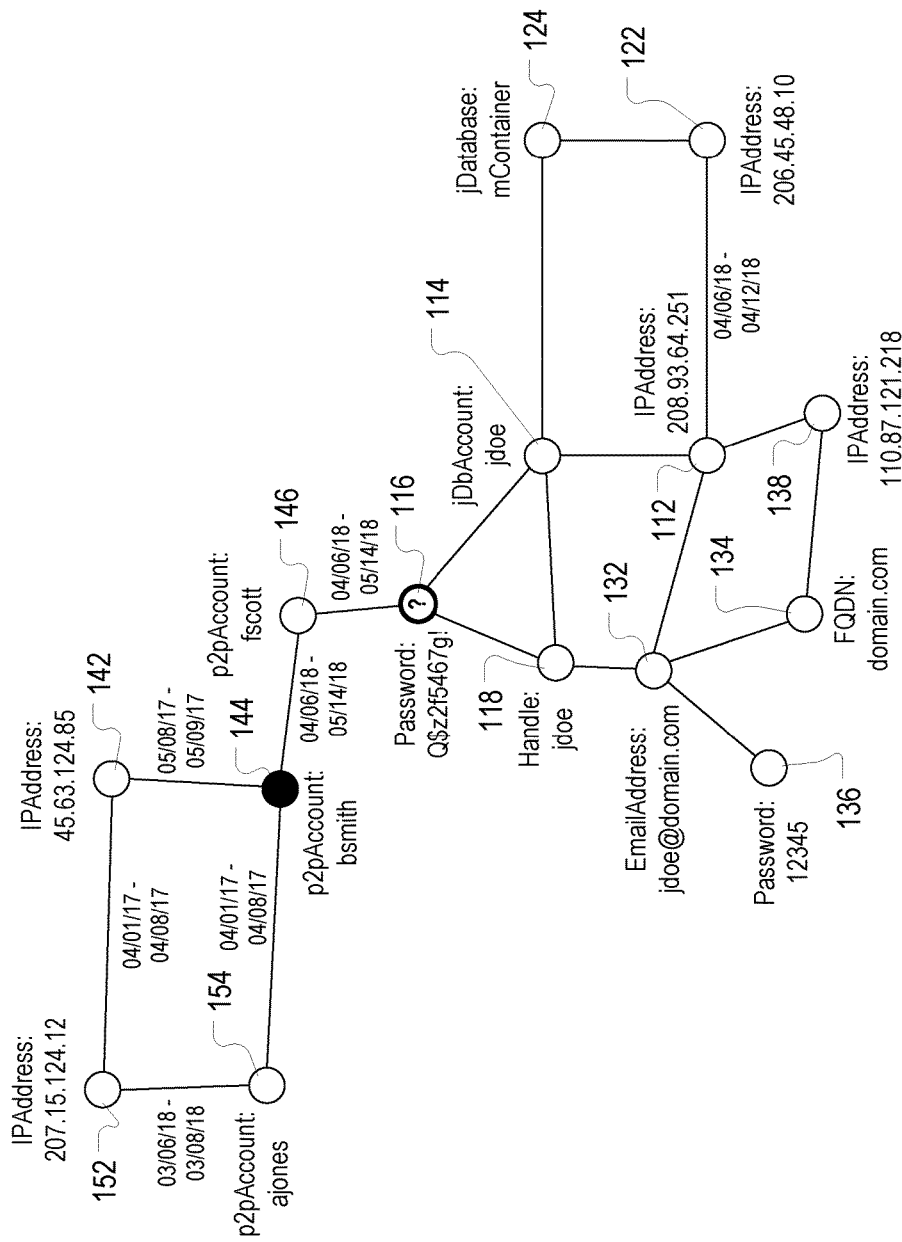

An exemplary methodology for determining a shortest path from a particular node to a threat node will now be described with respect to node 116 illustrated in FIG. 159 and with reference to FIGS. 159-178.

Starting at node 116, one or more links stored in association with the node 116 are accessed, and a first link from the node 116 is determined for traversal. As illustrated in FIG. 160, this is a link for the node 114 which has a node type of "jDbAccount" and a node value of "jdoe".

Figure 161:
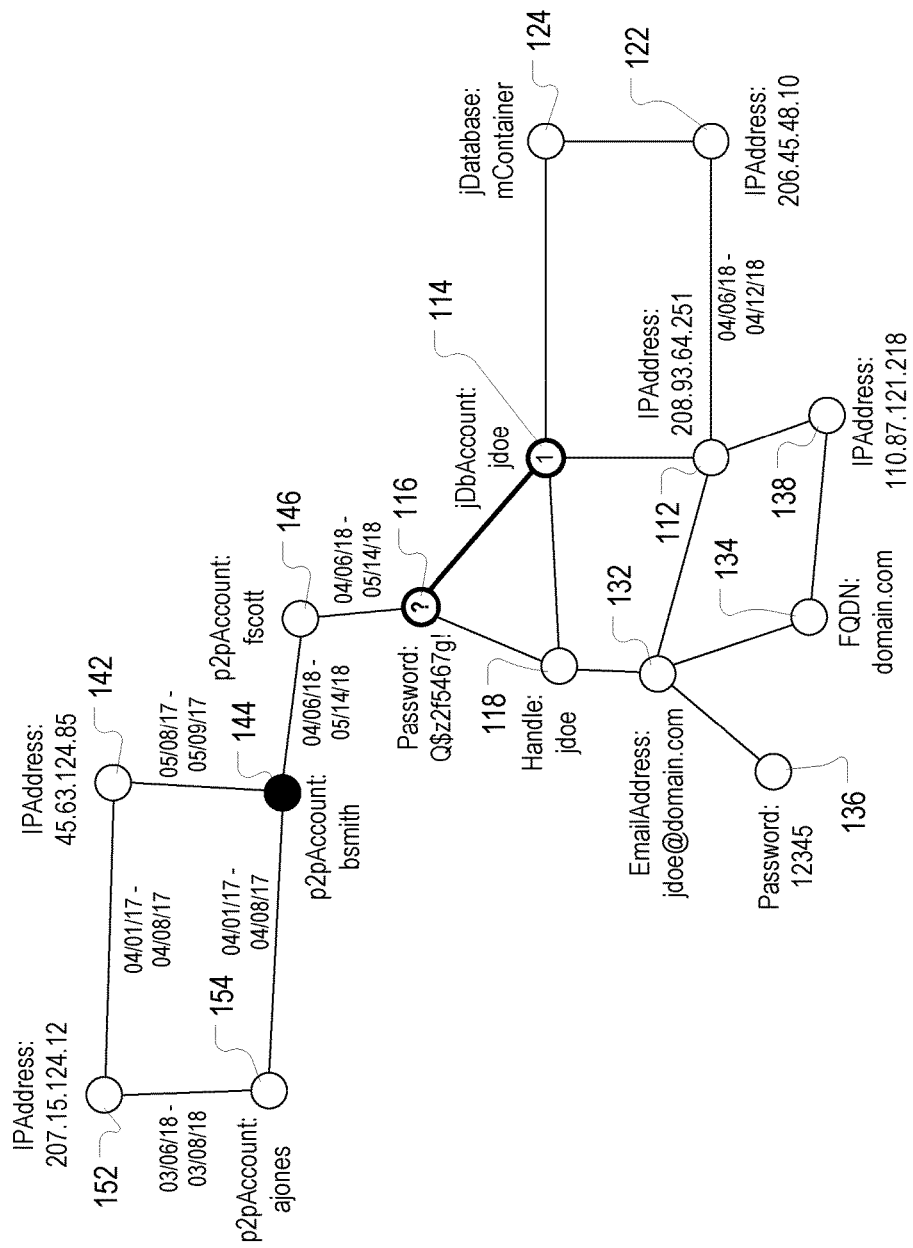

As this node 114 has not yet been visited, a traversal to this node 114 is effected and the node is checked to determine whether it has been tagged as a threat, as illustrated in FIG. 161. The node is also marked as visited. As the node 114 has not been tagged as a threat, the search for a threat node continues.

However, next, rather than continuing to do a depth traversal along a link from node 114, another available link that will result in a lower total distance from the starting node 116 is utilized. In accordance with one or more preferred implementations, a list is constructed of all possible links to take from any node that has been traversed to that leads to a node that has not yet been visited (or a list may be constructed of all possible links to take from any node that has been traversed to and any node that has already been visited may be subsequently ignored or passed over), and then a node is selected that would result in the lowest total traversal distance if traversal occurred to that node.

Here, another link from the node 116 is determined for traversal. As illustrated in FIG. 162, this is a link for the node 118 which has a node type of "Handle" and a node value of "jdoe".

Figure 163:
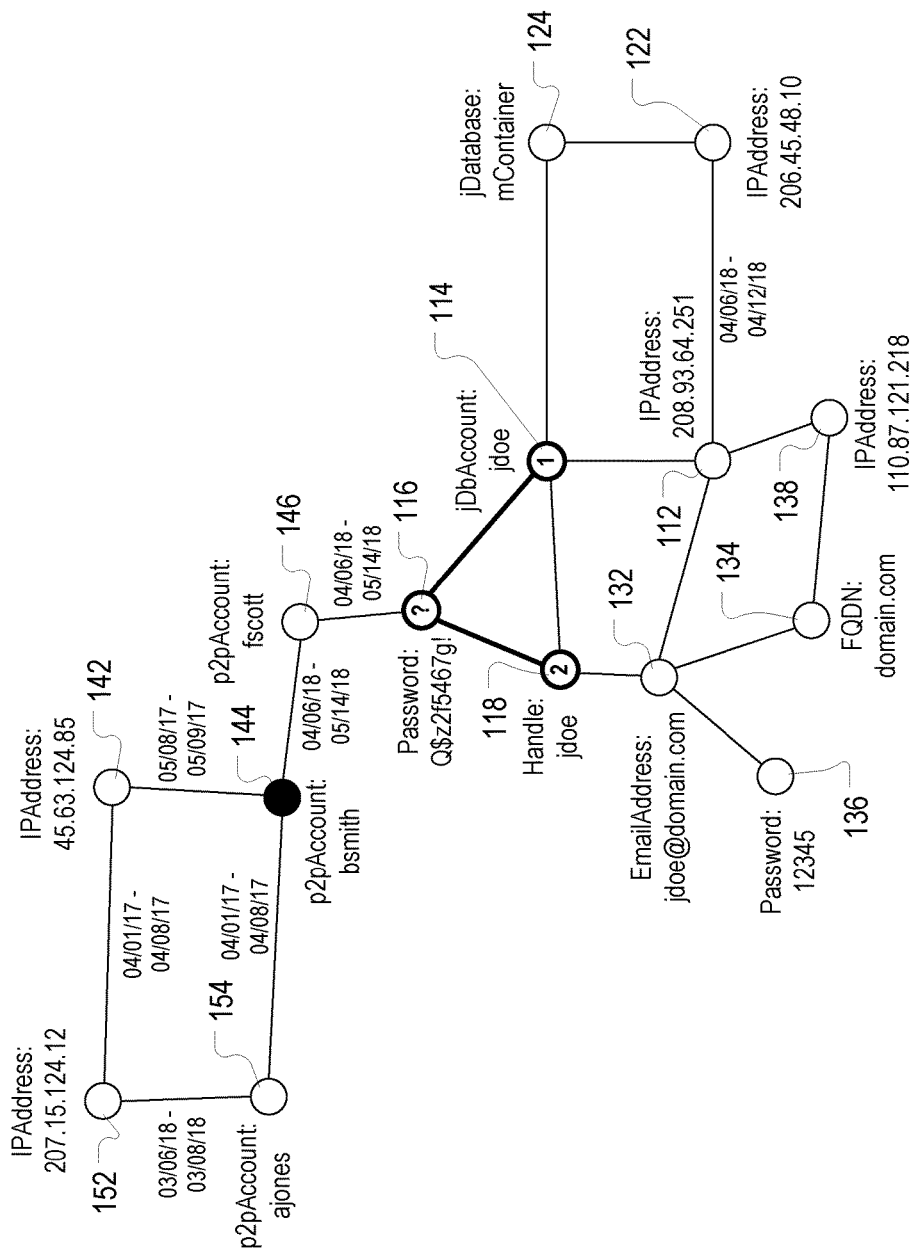

As this node 118 has not yet been visited, a traversal to this node 118 is effected and the node is checked to determine whether it has been tagged as a threat, as illustrated in FIG. 163. The node is also marked as visited. As the node 118 has not been tagged as a threat, the search for a threat node continues.

Once again, rather than continuing to do a depth traversal along a link from node 118, another available link that will result in a lower total distance from the starting node 116 is utilized. In particular, another link from the node 116 is determined for traversal. As illustrated in FIG. 164, this is a link for the node 146 which has a node type of "p2pAccount" and a node value of "fscott".

Figure 165:
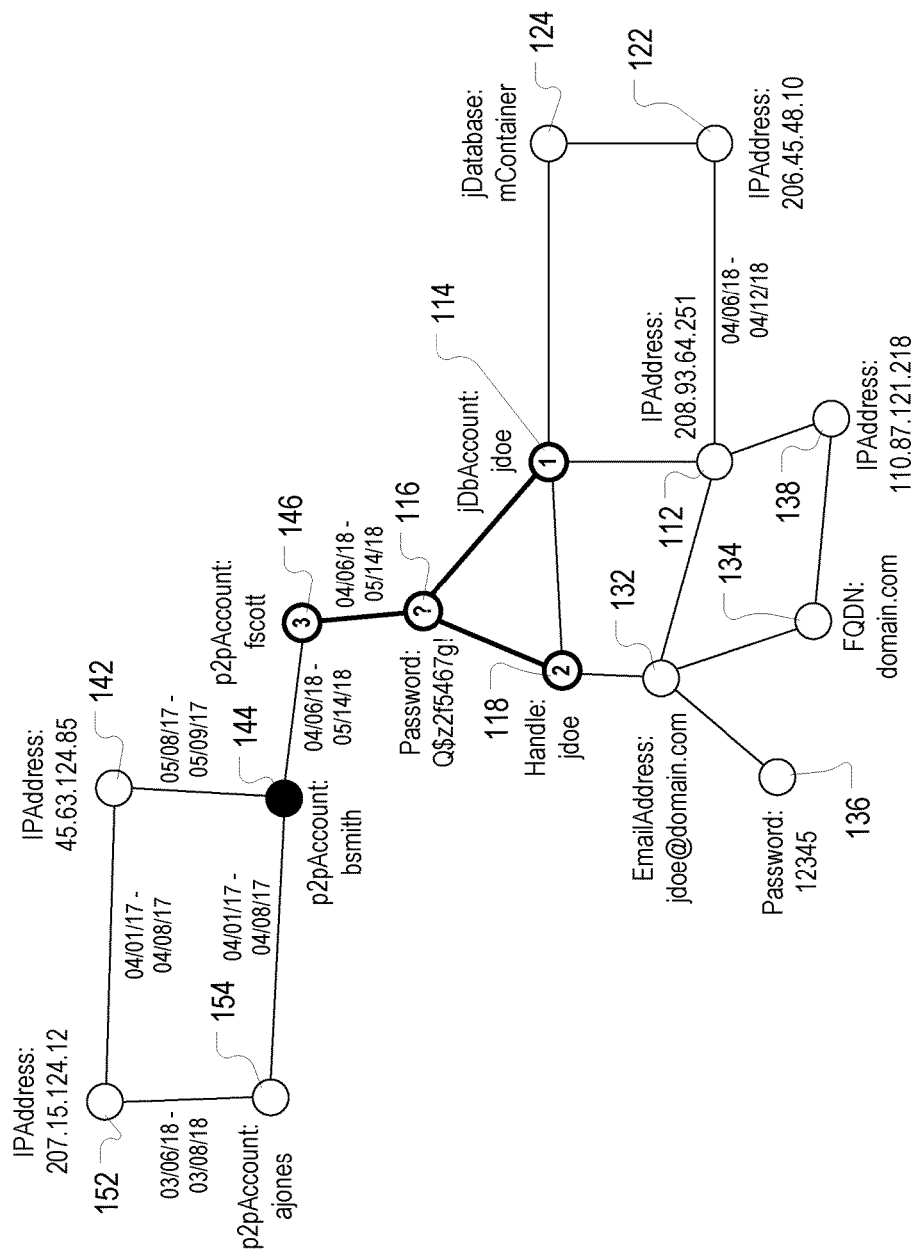

As this node 146 has not yet been visited, a traversal to this node 146 is effected and the node is checked to determine whether it has been tagged as a threat, as illustrated in FIG. 165. The node is also marked as visited. As the node 146 has not been tagged as a threat, the search for a threat node continues.

Again, rather than continuing to do a depth traversal along a link from node 118, another available link that will result in a lower total distance from the starting node 116 is utilized. This time, there are no links left which would result in a total distance from the starting node of 1, so a node is selected which would result in a total distance from the starting node of 2. In accordance with various preferred implementations, various methodologies are utilized for selecting a next link to investigate from among many possible links when each link would result in the same total distance from the starting node. Here, links with equal weight are considered in the order in which the corresponding node containing the corresponding link was traversed, with links with equal weight from the same node being considered in the order in which they are stored or listed, although various other methodologies may be utilized in accordance with one or more preferred implementations.

Here, a first link from the node 114 is determined for traversal. As illustrated in FIG. 166, this is a link for the node 112 which has a node type of "IPAddress" and a node value of "208.93.64.251".

Figure 167:
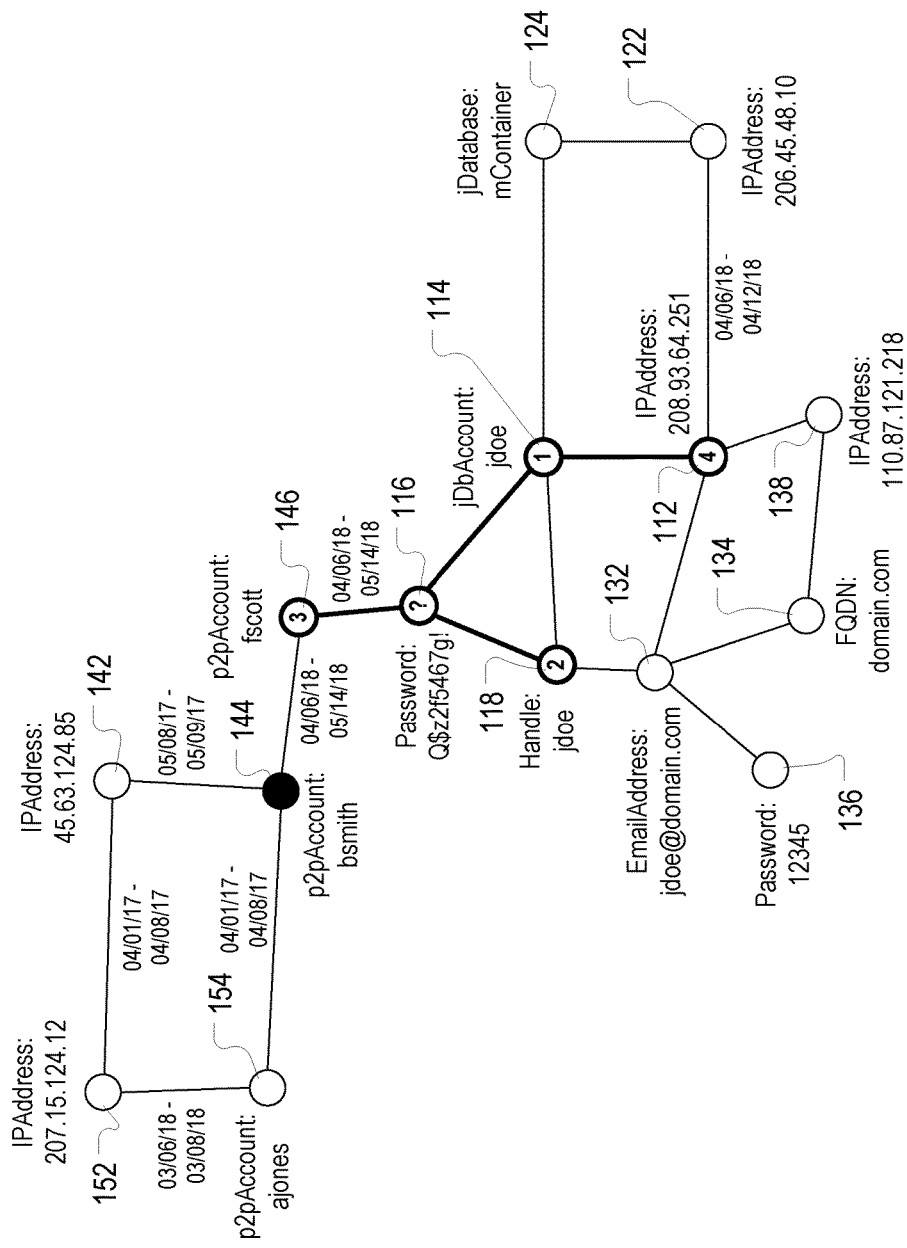

As this node 112 has not yet been visited, a traversal to this node 112 is effected and the node is checked to determine whether it has been tagged as a threat, as illustrated in FIG. 167. The node is also marked as visited. As the node 112 has not been tagged as a threat, the search for a threat node continues.

Next, rather than continuing to do a depth traversal along a link from node 112, another available link that will result in a lower total distance from the starting node 116 is utilized. In particular, another link from the node 114 is determined for traversal. As illustrated in FIG. 168, this is a link for the node 124 which has a node type of "jDatabase" and a node value of "mContainer".

Figure 169:
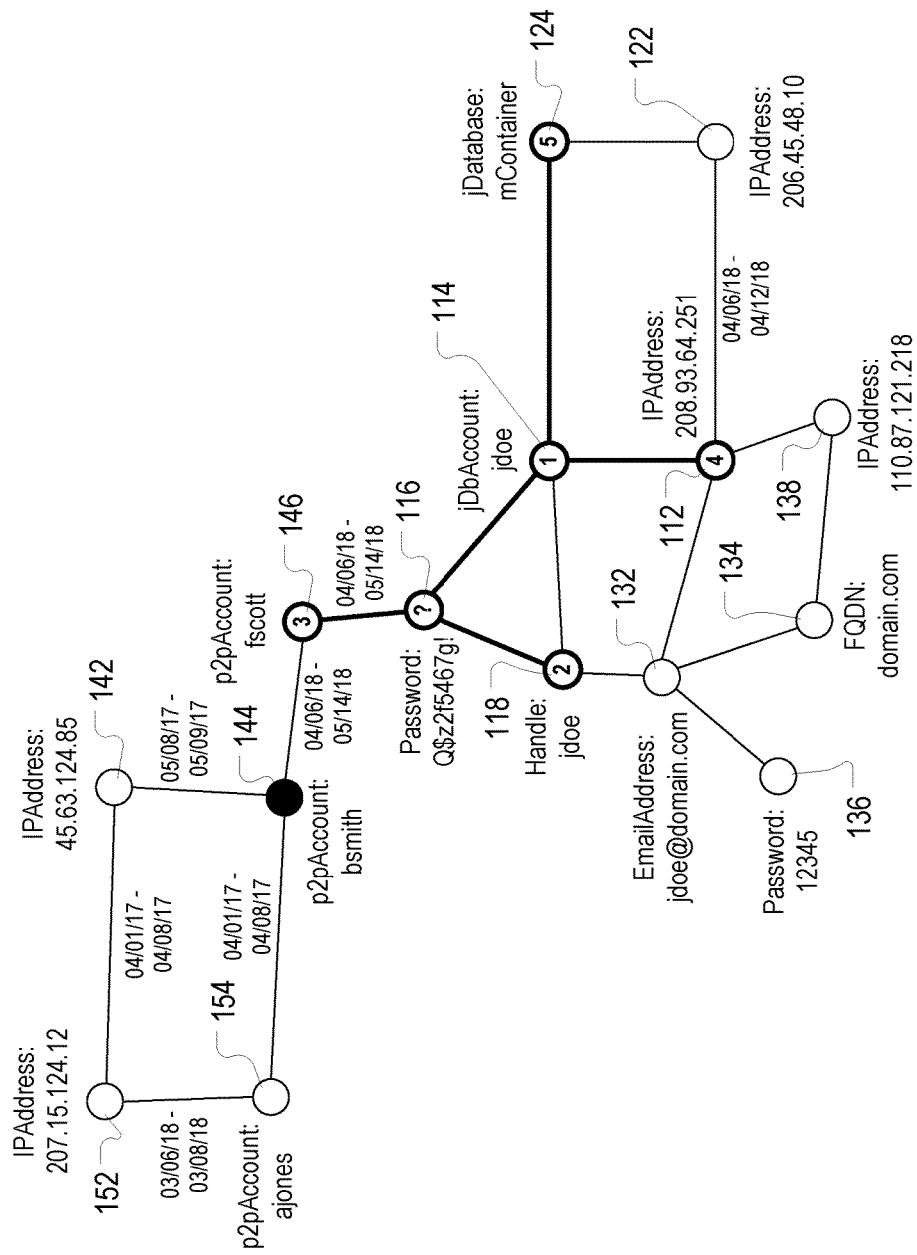

As this node 124 has not yet been visited, a traversal to this node 124 is effected and the node is checked to determine whether it has been tagged as a threat, as illustrated in FIG. 169. The node is also marked as visited. As the node 124 has not been tagged as a threat, the search for a threat node continues.

Figure 171:
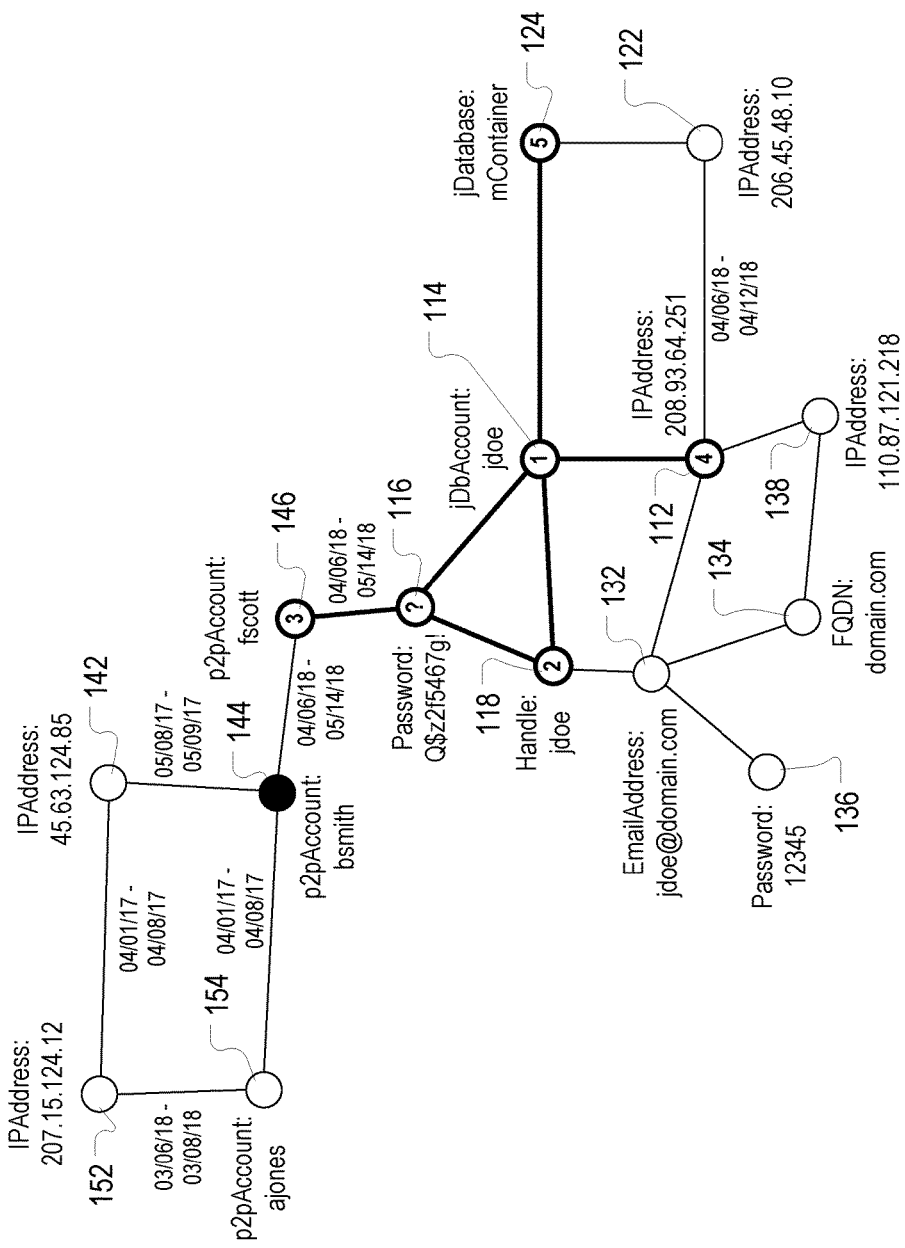

Next, rather than continuing to do a depth traversal along a link from node 112, another available link that will result in a lower total distance from the starting node 116 is sought. Notably, although the next link from the node 114 is for node 118 having a node type of "Handle" and a node value of "jdoe" (as illustrated in FIG. 170), the node 118 has already been visited (as can be seen in FIG. 171), and thus a different link is determined for traversal. Similarly, the next link from the node 114 which is for node 116 (as illustrated in FIG. 172) is also for a node that has already been visited, and thus a different link is determined for traversal.

Similarly, the first two links from the node 118 are for nodes that have already been visited (as illustrated in FIGS. 173-174), and thus a different link is determined for traversal.

Figure 176:
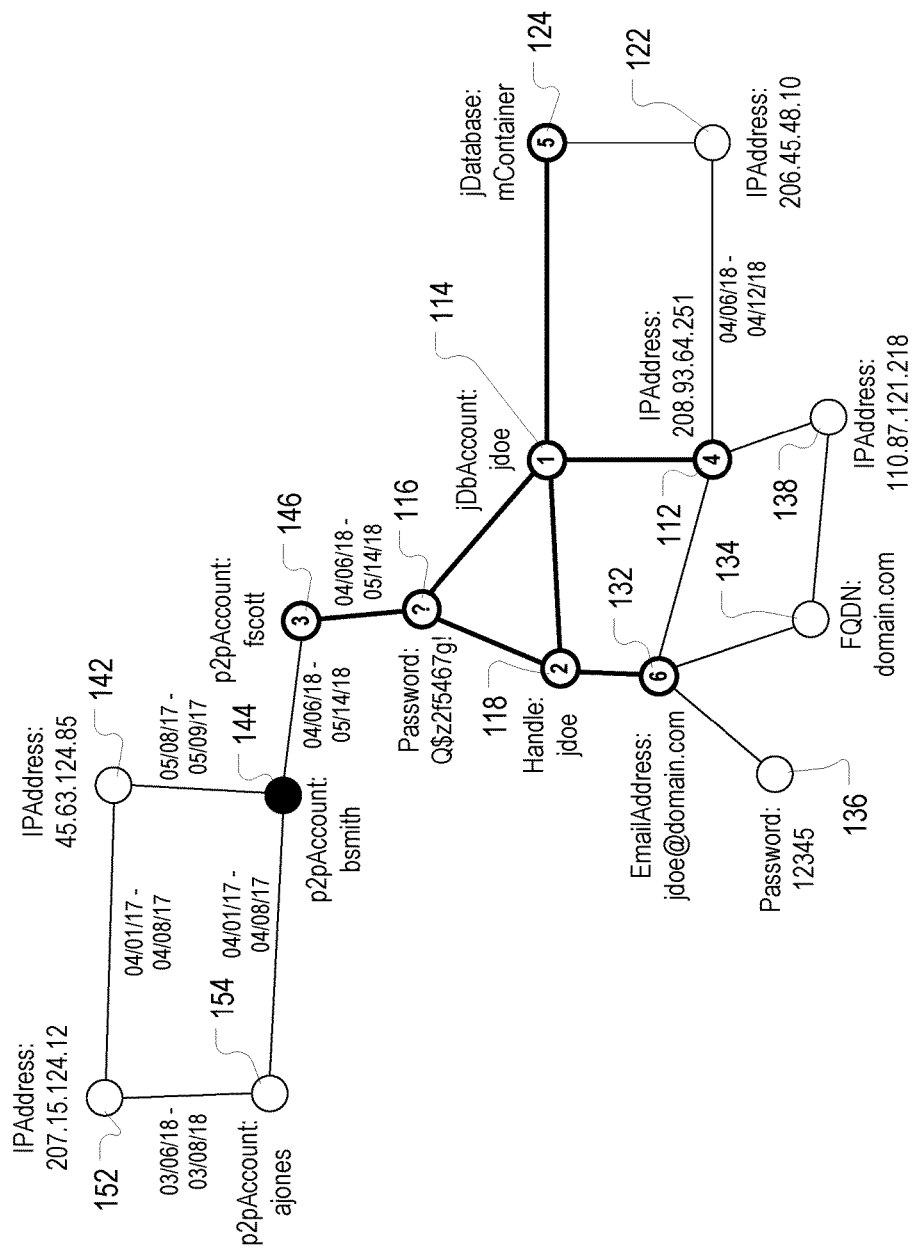

However, the third link from the node 118 is for node 132 (as illustrated in FIG. 175), which has not yet been visited. A traversal to this node 132 is effected and the node is checked to determine whether it has been tagged as a threat, as illustrated in FIG. 176. The node is also marked as visited. As the node 132 has not been tagged as a threat, the search for a threat node continues.

Rather than continuing to do a depth traversal along a link from node 132, another available link that will result in a lower total distance from the starting node 116 is sought.

This time, the only links left which would result in a total distance from the starting node of 2 are from node 146, and a first of the links from this node 146 is determined for traversal. As illustrated in FIG. 177, this is a link for the node 144 which has a node type of "p2pAccount" and a node value of "bsmith".

Figure 178:
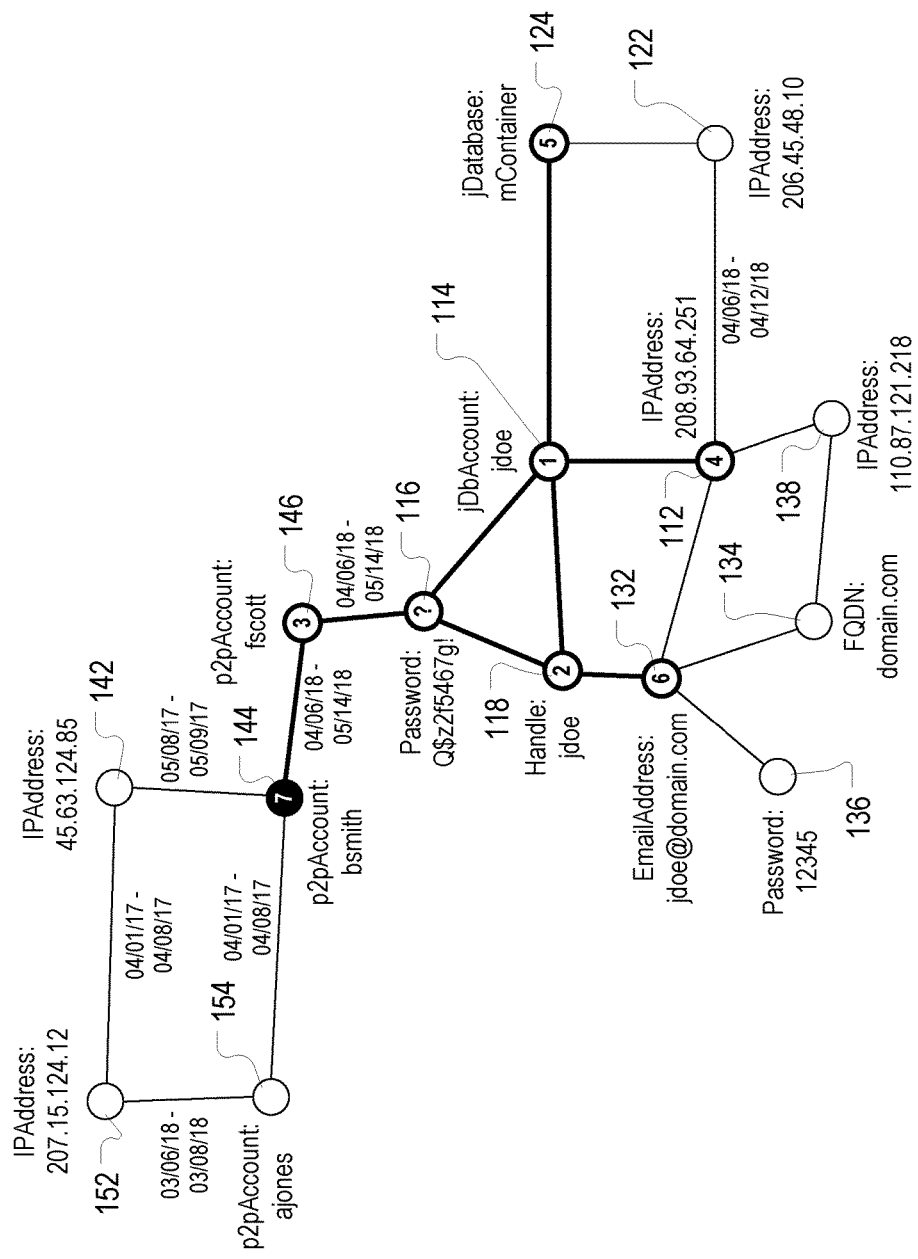

As this node 144 has not yet been visited, a traversal to this node 144 is effected and the node is checked to determine whether it has been tagged as a threat, as illustrated in FIG. 178. As the node 144 has been tagged as a threat, the search for a shortest path to a threat node is over.

In accordance with one or more preferred implementations, a search for a shortest path to a threat node involves use of a breadth first approach or Dijkstra's algorithm.

In accordance with one or more preferred implementations, a search for a shortest path to a threat node may involving utilizing calculated proximity in time and cardinality values to deform links so that each link is not assumed to have a standard link distance of one for purposes of determining a next link to consider for traversal. In accordance with one or more preferred implementations, a deformed link distance might be calculated for each potential link (based on a calculated proximity in time and cardinality value for the tentative path assuming traversal to the respective node) for purposes of determining a next node to consider for traversal.

In accordance with one or more preferred implementations, methodologies such as exemplary methodologies disclosed herein may be utilized for a hypergraph search. FIG. 179 illustrates exemplary pseudocode for an exemplary hypergraph search methodology.

In accordance with one or more preferred implementations, a hypergraph search is performed to find nodes that are calculated to have a maliciousness value indicating a strong likelihood of connections to one or more malicious actors, e.g. a maliciousness value above a specified or configured threshold indicating that the corresponding devices, accounts, etc. may have a connection to one or more malicious actors.

Information Gathering

In accordance with one or more preferred implementations, one or more nodes in a hypergraph can be characterized as sensor nodes in that they are associated with a device that gathers information for use in generating a hypergraph.

In accordance with one or more preferred implementations, such information gathering may comprise gathering, for example, domain and subdomain data, username and password data, and cryptocurrency data.

In accordance with one or more preferred implementations, data for use in hypergraphs may be gathered via sensor nodes or other ways. For example, in accordance with one or more preferred implementations, data regarding known malicious indicators known to be associated with malicious actors (e.g. IP addresses, domain names, malware samples, strings, etc.) may be gathered from, for example, threat group reporting from internal or external research or from network security companies.

In accordance with one or more preferred implementations, data such as domain name server (DNS) data (e.g. IP addresses to domain mapping, and source IP addresses) may be gathered from, for example, internal network DNS logs or external DNS servers.

In accordance with one or more preferred implementations, data such as domain registration information (e.g. domains, owner, email addresses, registration times, name servers, etc.) may be gathered from, for example, whois lookups.

In accordance with one or more preferred implementations, data such as domain subdomain data may be gathered from, for example, domain information.

In accordance with one or more preferred implementations, a software sensor may programmatically increase or decrease the amount and type of data gathered based on a programmatically determined maliciousness value.

Actionable Maliciousness Determinations

Calculation of a quantified maliciousness value allows for actions to be performed based thereon. In accordance with one or more preferred implementations, a programmatically determined maliciousness value is utilized to programmatically determine actions to perform or decline to perform.

For example, in accordance with one or more preferred implementations, software (e.g. firewall software) may block or refuse a network connection based on a programmatically determined maliciousness value.

As another example, in accordance with one or more preferred implementations, software (e.g. a web browser) may prevent or stop navigation based on a programmatically determined maliciousness value.

As another example, in accordance with one or more preferred implementations, software (e.g. antivirus software) may prevent or stop execution of a downloaded code fragment based on a programmatically determined maliciousness value.

In accordance with one or more preferred implementations, a methodology may involve comparing a determined maliciousness value to a minimum and/or maximum threshold value to determine whether to perform or decline to perform an action.

As noted above, in accordance with one or more preferred implementations, a software sensor may programmatically increase or decrease the amount and type of data gathered based on a programmatically determined maliciousness value.

In accordance with one or more preferred implementations, software may direct programmatic or manual cyber incident response to nodes of higher maliciousness, enabling more rapid triage of cyber attacks.

In accordance with one or more preferred implementations, software may direct programmatic or manual cyber incident attribution activities based on maliciousness, enabling more rapid understanding of threat actors.

Computer Generated Visualizations

While calculated maliciousness values for nodes can be used to programmatically perform actions, in accordance with one or more preferred implementations, a visualization may be utilized to convey results of a hypergraph search to a user. In accordance with one or more preferred implementations, a visualization is utilized in which lines represent connection of a node (or device, domain, etc.) to another node (e.g. a malicious node).

Figure 180:
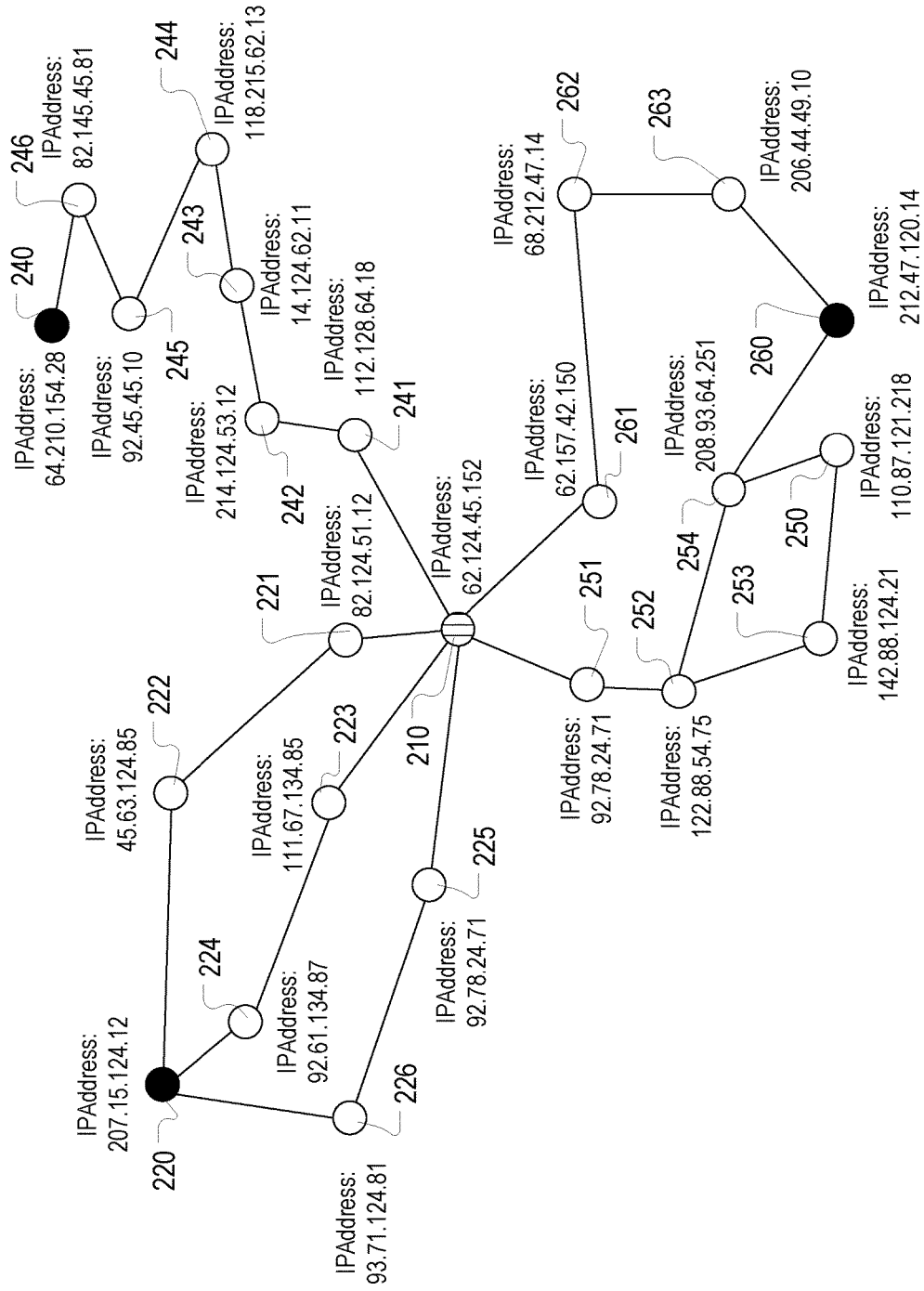
FIG. 180 illustrates an exemplary hypergraph which includes three nodes that have been identified as threat nodes.

For example, FIG. 180 illustrates an exemplary hypergraph which includes three nodes 220,240,260 that have been identified as threat nodes. In accordance with one or more preferred implementations, an exemplary search of the hypergraph might be used to find any nodes having a calculated maliciousness value above a certain threshold. In accordance with one or more preferred implementations, a search may specifically be targeted on a certain node or search parameter, e.g. IP address "62.124.45.152". Alternatively, a search may identify one or more nodes (and may identify corresponding devices, etc.) that have a maliciousness value exceeding a specified or configured threshold.

In either event, a visualization may be generated to convey search results to a user.

Figure 181:
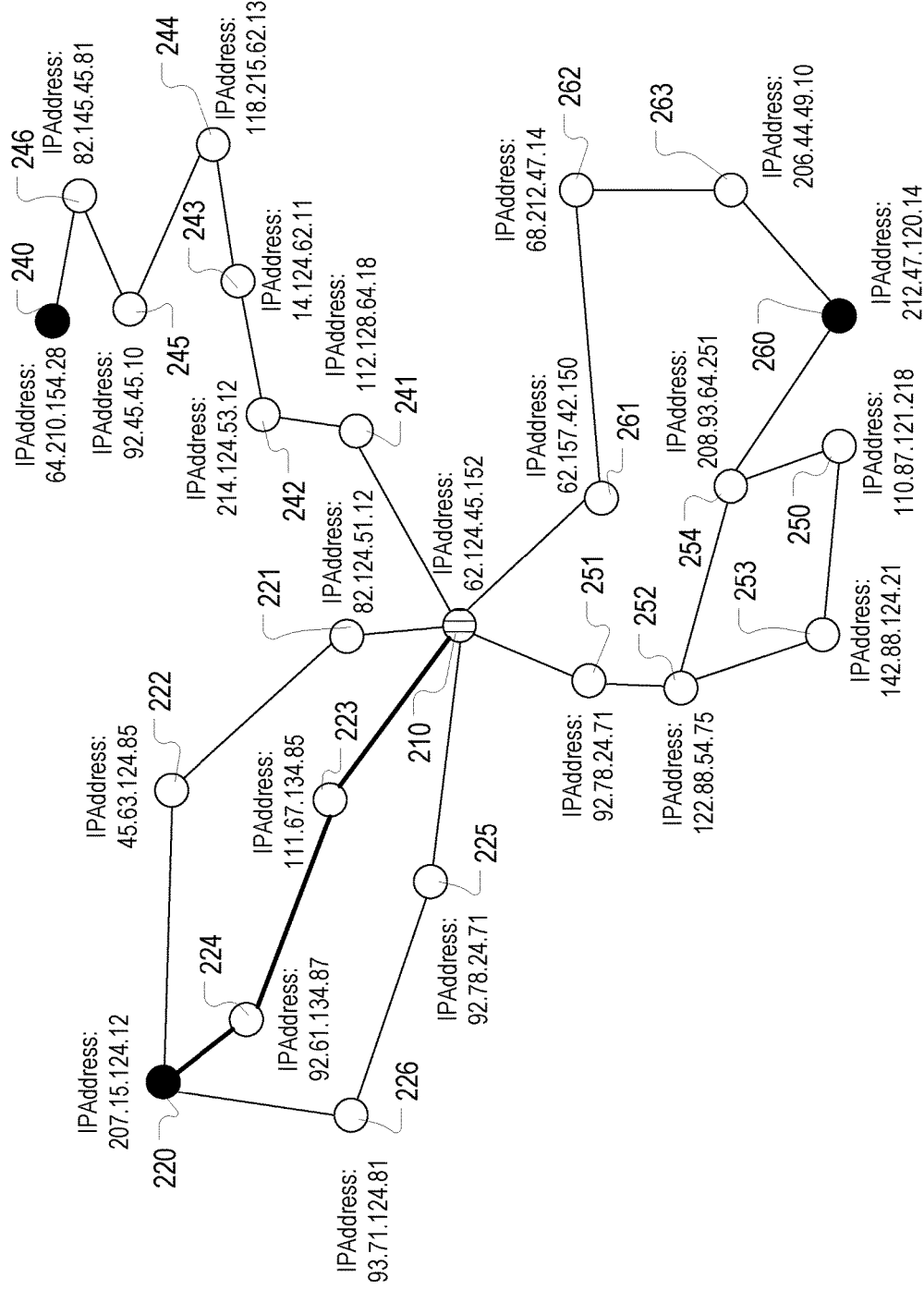
FIG. 181 illustrates a path having a distance of three.
Figure 182:
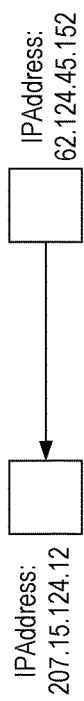
FIG. 182 illustrates a visualization indicating hypergraph distance of the IP address "62.124.45.152" from the IP address "207.15.124.12" which has been identified as a threat.

For example, FIG. 181 illustrates a path having a distance of three from the node 210 to the node 220 across nodes 223,224. As illustrated in FIG. 182, a visualization is generated indicating hypergraph distance of the IP address "62.124.45.152" from the IP address "207.15.124.12" which has been identified as a threat. In accordance with one or more preferred implementations, a visualization is generated in which a length of a line indicating a connection to a threat is proportional to a distance of a corresponding node to the threat in a hypergraph.

Figure 183:
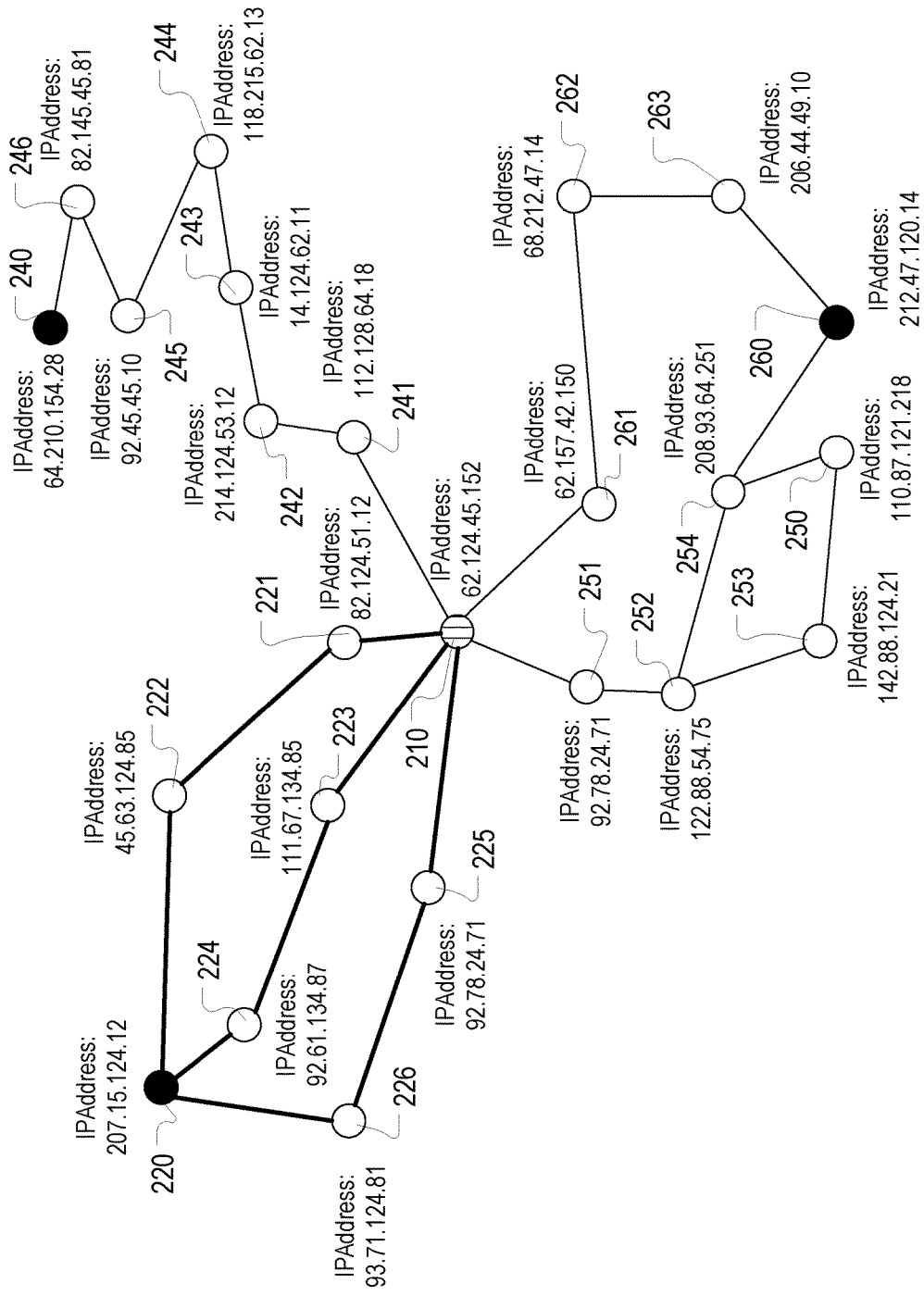
FIG. 183 illustrates three total paths each having a distance of three.

Notably, a node in a hypergraph may be connected to a node that has been identified as a threat over more than one path. In accordance with one or more preferred implementations, a visualization is generated in which a thickness of a line indicating a connection to a threat is proportional to a number of paths connecting the corresponding node to the threat in a hypergraph. For example, FIG. 183 illustrates three total paths each having a distance of three connecting the node 210 to the node 220, including the first path across nodes 223,224, a second path across nodes 221,222, and a third path across nodes 225,226.

Figure 184:
FIG. 184 illustrates another generated visualization in which a thickness of the line connecting the IP address "62.124.45.152" to the IP address "207.15.124.12" indicates that there are three paths connecting the two.

FIG. 184 illustrates another generated visualization in which a thickness of the line connecting the IP address "62.124.45.152" to the IP address "207.15.124.12" indicates that there are three paths connecting the two.

Notably, in the hypergraph of FIG. 180, there are paths connecting the node 210 to other nodes which have been tagged as a threat as well.

Figure 185:
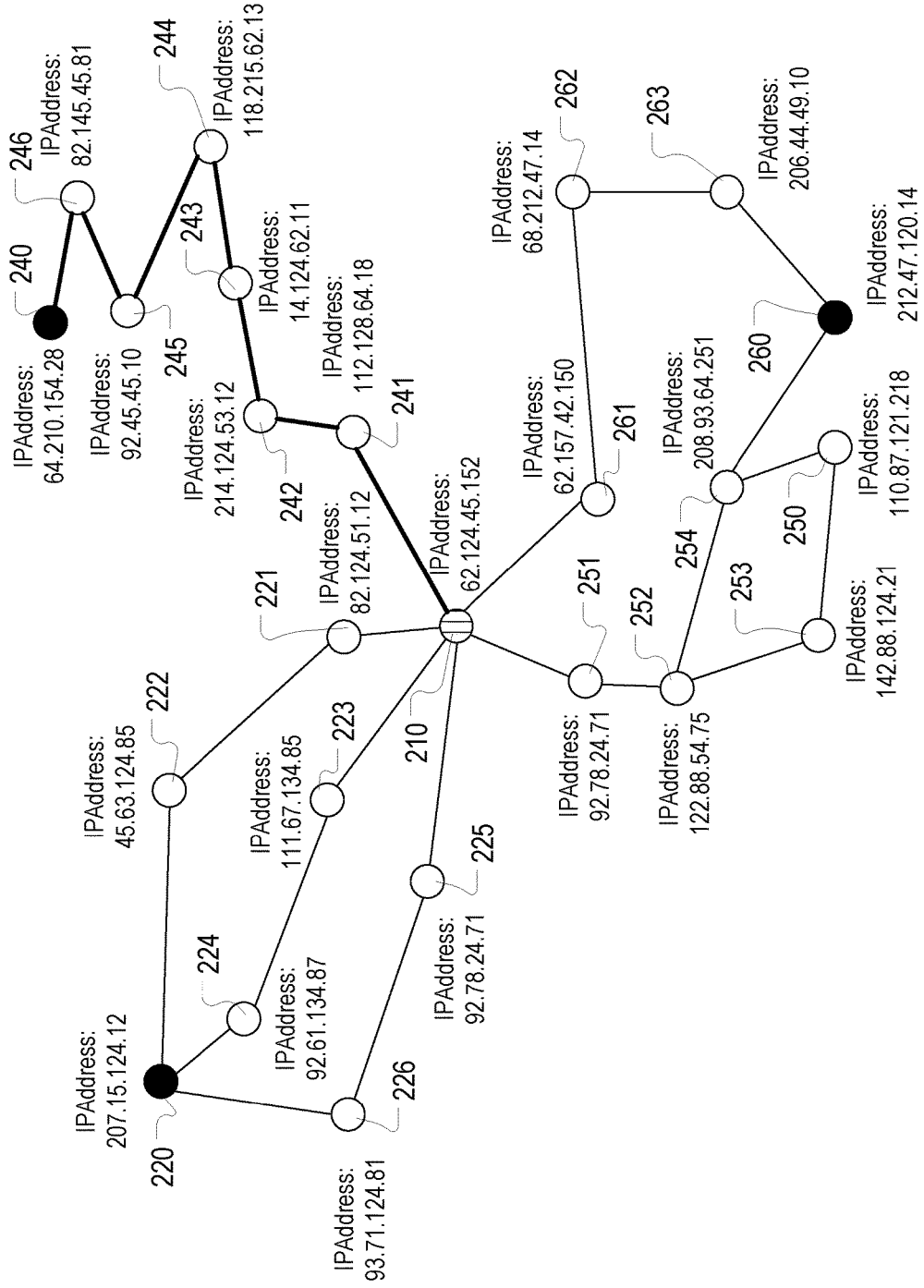
FIG. 185 illustrates a path having a distance of three.
Figure 186:
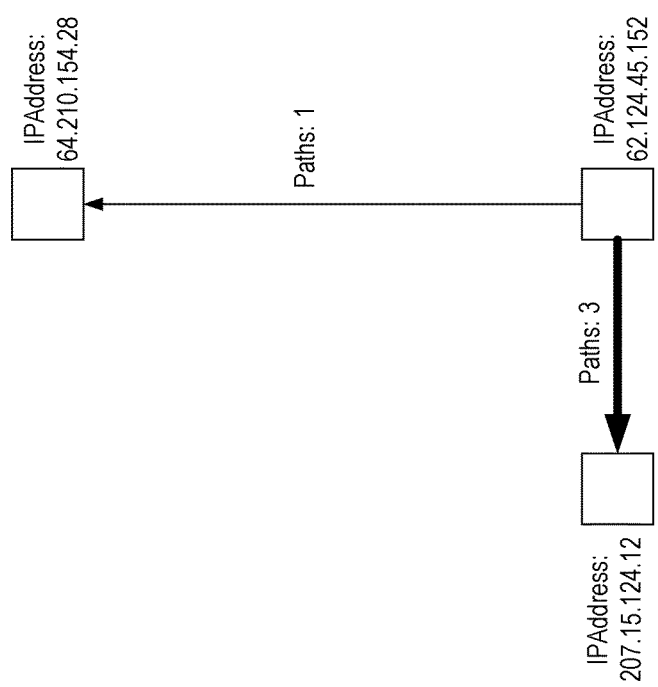
FIG. 186 illustrates a generated visualization which conveys a connection to the IP address "64.210.154.28" which has been identified as a threat.

FIG. 185 illustrates a path having a distance of three from the node 210 to the threat node 240 across nodes 241,242, 243,244,245,246. FIG. 186 illustrates a generated visualization which conveys this connection to the IP address "64.210.154.28" which has been identified as a threat.

Figure 187:
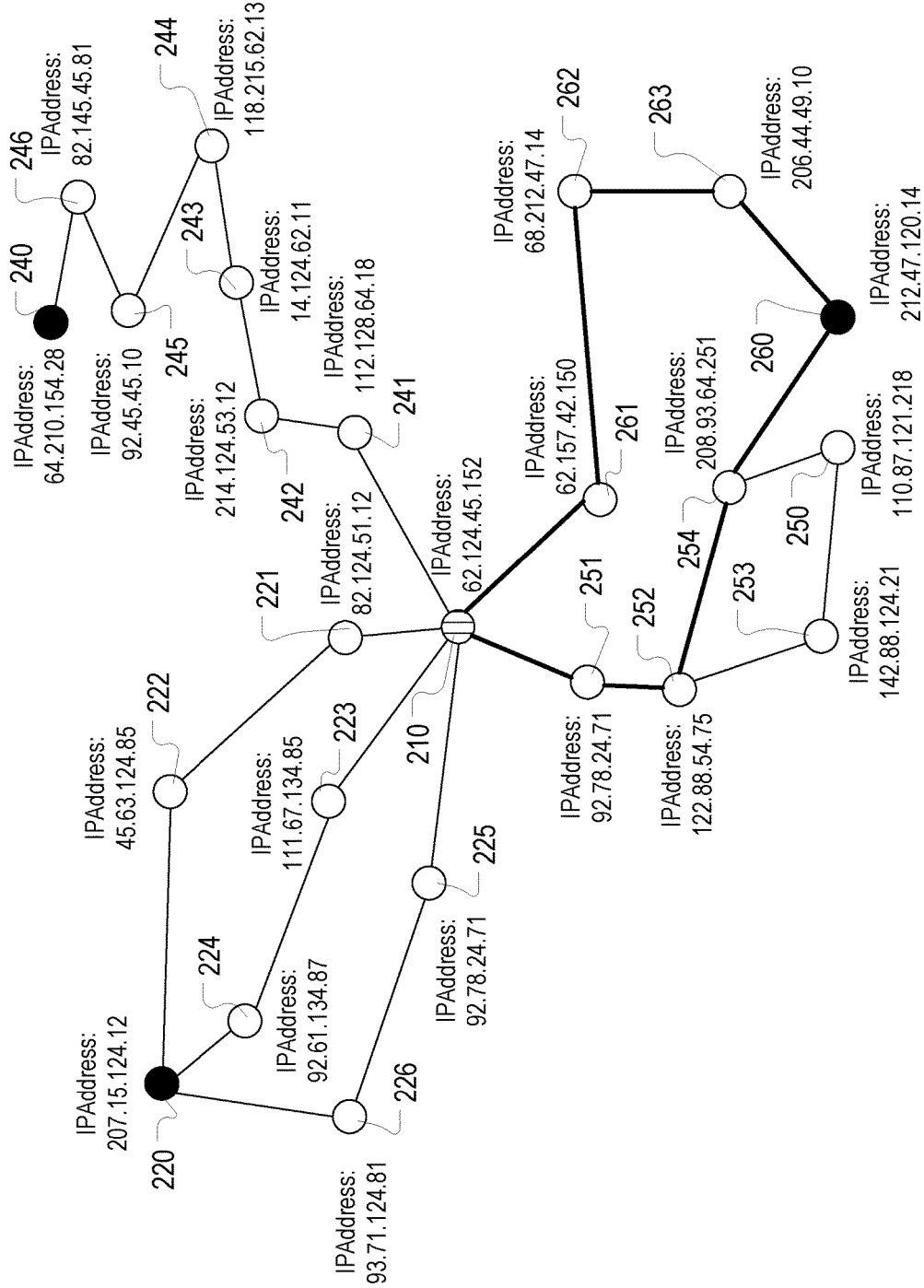
FIG. 187 illustrates two paths having a distance of three.
Figure 188:
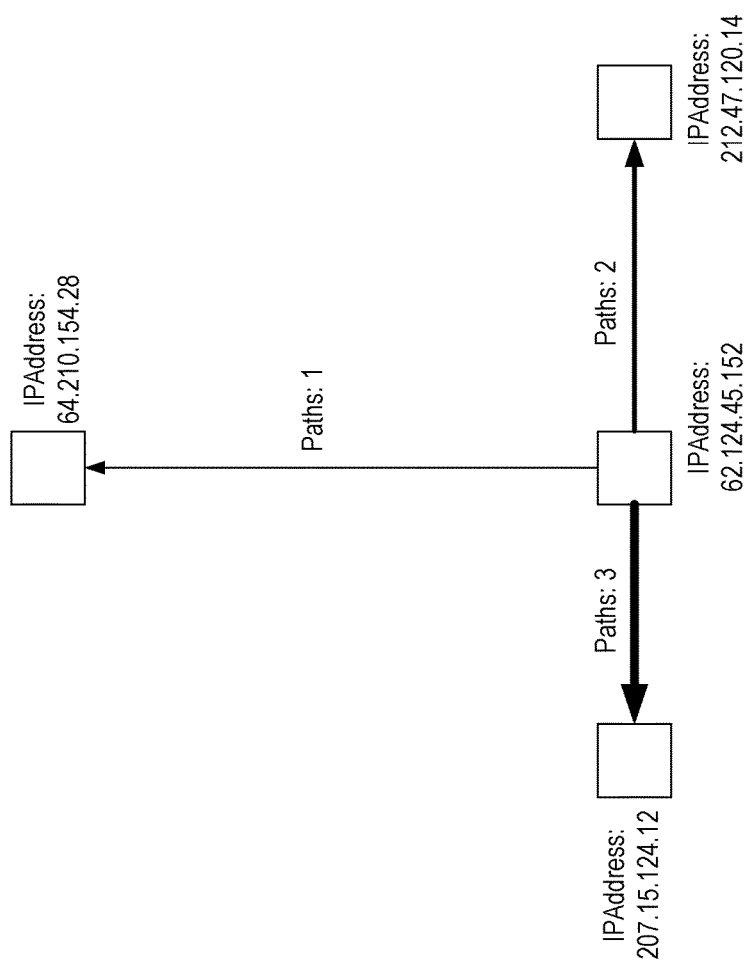

Further, FIG. 187 illustrates two paths having a distance of three from the node 210 to the threat node 260, one across nodes 261,262,263, and one across nodes 251,252,254. FIG. 188 illustrates a generated visualization which conveys this connection to the IP address "64.210.154.28" which has been identified as a threat.

It will be appreciated that in these simplistic examples, a visualization is presented which includes lines length proportional to a distance in space in a hypergraph, but which are not deformed based on proximity in time or cardinality. In accordance with one or more preferred implementations, a visualization is generated which includes line lengths that are proportional to a distance value that is deformed based on proximity in time and cardinality. In accordance with one or more preferred implementations, a visualization is generated which includes line lengths that are proportional to a calculated maliciousness value.

Closing

Figure 189:
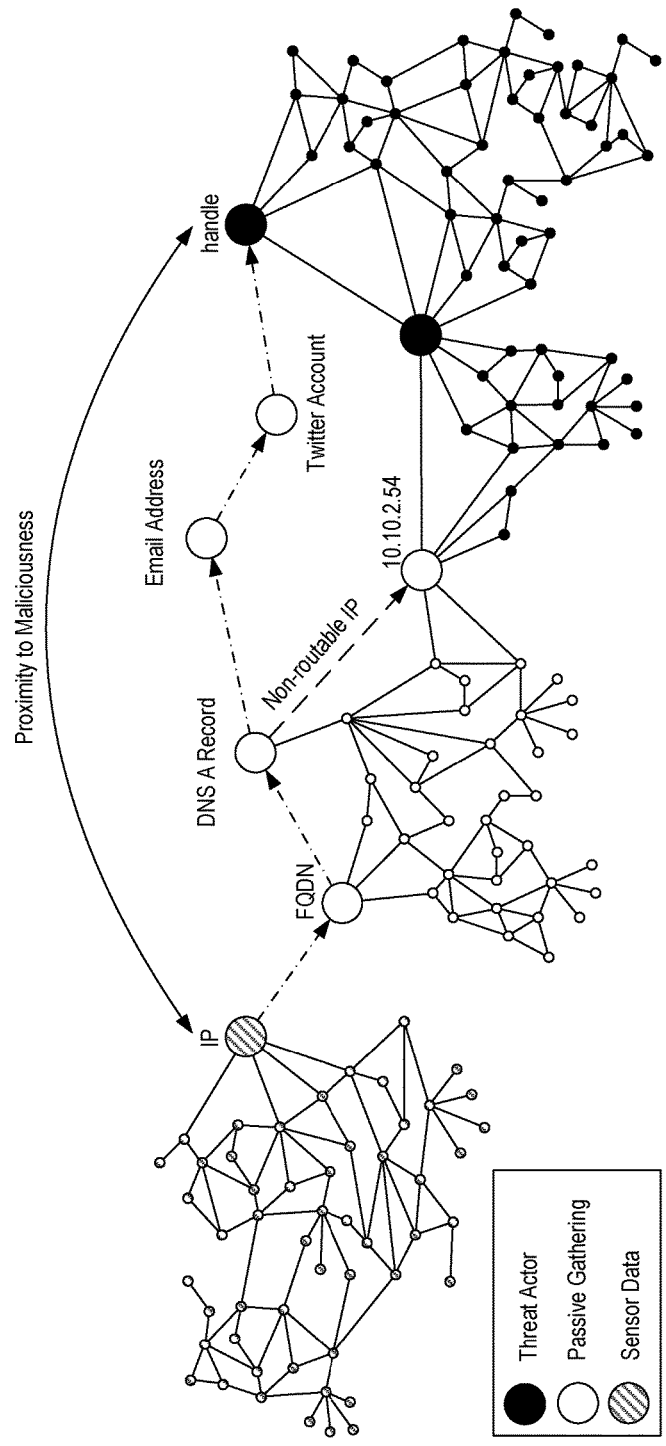
Figure 190:
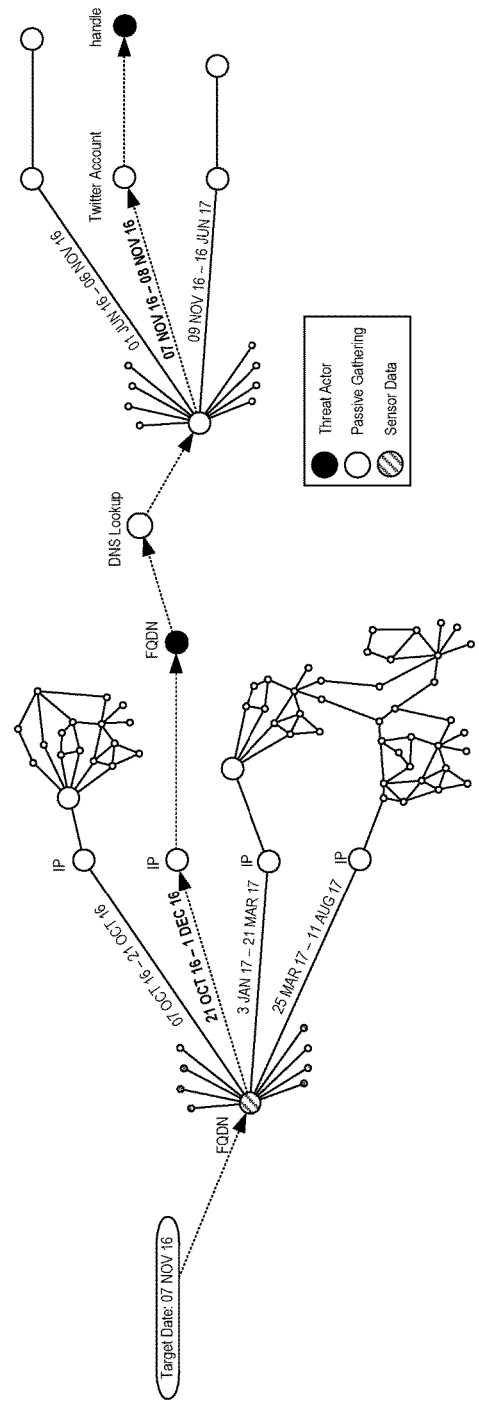
Figure 191:
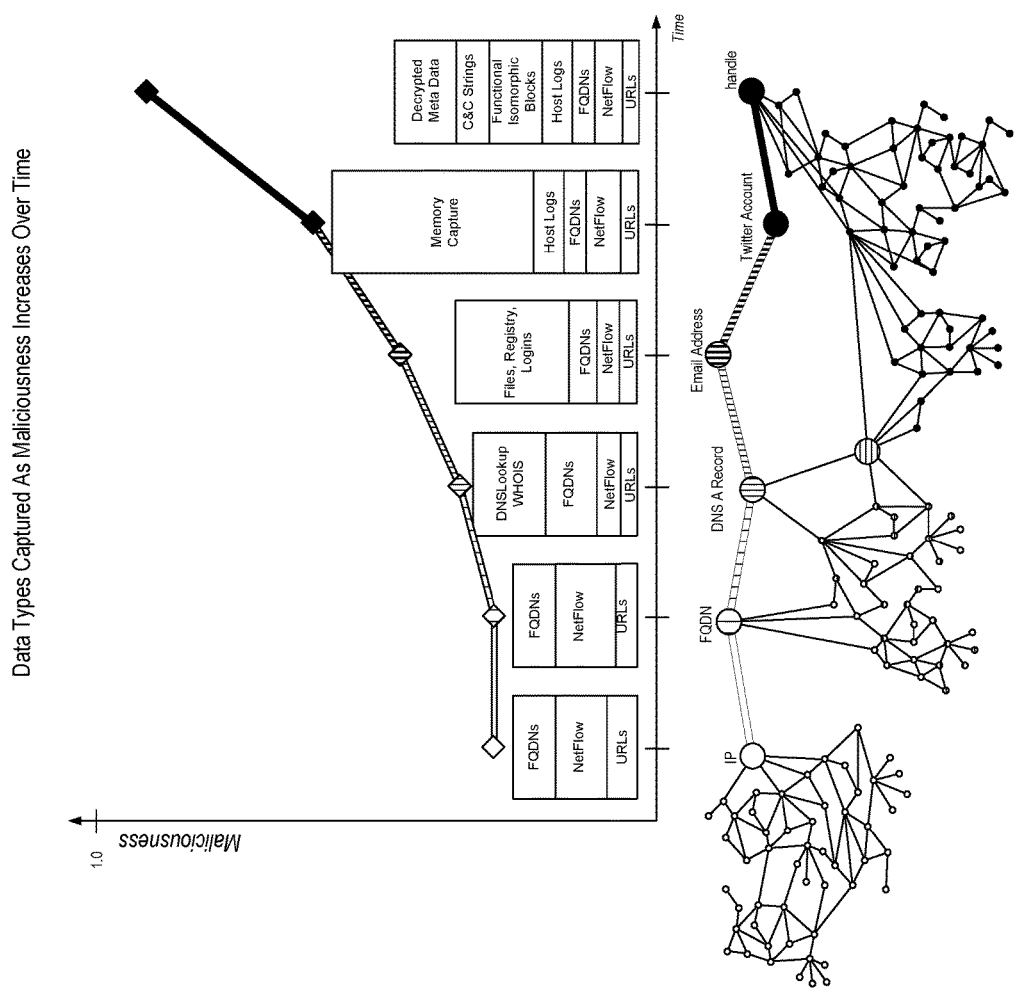

Fanciful examples and calculations have been provided herein for purposes of clarity of description of innovative aspects and features in accordance with one or more preferred implementations. For example, FIG. 189 illustrates another fanciful example of a hypergraph showing a path from a sensor node to a threat node, and FIG. 190 illustrates another fanciful example of a hypergraph showing a path from a sensor node to a threat node that takes into account a specified time period to search on. Similarly, FIG. 191 illustrates another simple example involving an exemplary visualization of search results for a domain name.

It will be appreciated that in practice, the amount of data supporting hypergraphs will generally be much more voluminous, and the requisite calculations will generally become much more complex.

Further, it will be appreciated that the discussed and described node types are merely exemplary, and that various other node types are utilized in accordance with one or more preferred implementations.

In this regard, in accordance with one or more preferred implementations, various node types are utilized to store information regarding files, registry entries or fingerprints (e.g. hashes), logins, netflows, memory capture data, host logs, decrypted metadata, C&C strings, functional isomorphic blocks, etc. In accordance with one or more preferred implementations, data types captured may increase over time, as illustrated in FIG. 192.

It will be appreciated that exemplary methodologies have been disclosed herein, but that modifications and variations may be performed without departing from disclosed aspects and features.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer implemented method providing a technical solution to the technical problem of detecting and preventing malicious activity in a computer network, the technical solution involving programmatic performance, based on a calculated metric indicating a likelihood of association with a known malicious actor, of an action by a computer system designed to ensure security of the computer system, the method comprising:

(a) gathering, via one or more electronic devices configured to act as sensor devices, network information for one or more computer networks;

(b) storing, in a dimensional graph database, data based on the information gathered for the one or more computer networks, the stored data comprising data regarding a plurality of nodes, including, for each node,
  (i) an indication of a node type for that node,
  (ii) an indication of a node value for that node, and
  (iii) an indication of one or more links from that node to one or more other nodes, including, for each link, an indication of one or more time intervals associated with that link,
  (iv) wherein one or more of the nodes includes a tag indicating that it is known to be associated with a malicious actor;

(c) programmatically determining a maliciousness value for a first node for which data is stored in the dimensional graph database, such programmatic determination comprising
  (i) programmatically determining a shortest path from the first node to any of the nodes which includes a tag indicating that it is known to be associated with a malicious actor,
  (ii) programmatically calculating a proximity in space value for the first node which is inversely proportional to a distance of the determined shortest path,
  (iii) programmatically calculating, for each respective link forming part of the determined shortest path, a respective proximity in time value for that respective link based on the one or more time intervals associated with that respective link,
  (iv) programmatically calculating, based on the calculated respective proximity in time values for each respective link forming part of the determined shortest path, a proximity in time value for the determined shortest path,
  (v) programmatically determining, for each respective node along the determined shortest path, a cardinality value for that respective node, wherein such determining comprises, for at least one respective node of the respective nodes, determining a connectedness value indicating a number of links to such node and calculating a cardinality value based at least in part on such determined connectedness value that is inversely proportional to such determined connectedness value,
  (vi) programmatically calculating, based on the calculated respective cardinality values for each respective node along the determined shortest path, a cardinality value for the determined shortest path, and
  (vii) programmatically calculating, based on the calculated proximity in space value, the calculated proximity in time value for the determined shortest path, and the calculated cardinality value for the determined shortest path, a maliciousness value for the first node;

(d) programmatically comparing the determined maliciousness value for the first node to a threshold value;

(e) blocking, based on the programmatic comparison of the determined maliciousness value for the first node with the threshold value, one or more network communications with an electronic device determined to be associated with the first node.

2. The computer implemented method of claim 1, wherein programmatically determining the shortest path from the first node to any of the nodes which includes a tag indicating that it is known to be associated with a malicious actor comprises programmatically determining the shortest path utilizing a breadth first traversal approach.

3. The computer implemented method of claim 1, wherein programmatically determining the shortest path from the first node to any of the nodes which includes a tag indicating that it is known to be associated with a malicious actor comprises programmatically determining the shortest path utilizing Dijkstra's algorithm.

4. The computer implemented method of claim 1, wherein programmatically calculating, for each respective link forming part of the determined shortest path, the respective proximity in time value for that respective link based on the one or more time intervals associated with that respective link comprises utilizing an m value which impacts how quickly or slowly a proximity in time value degrades over time.

5. The computer implemented method of claim 1, wherein programmatically calculating, based on the calculated respective proximity in time values for each respective link forming part of the determined shortest path, the proximity in time value for the determined shortest path comprises multiplying together the calculated proximity in time values for each respective link.

6. The computer implemented method of claim 1, wherein programmatically calculating, based on the calculated respective cardinality values for each respective node along the determined shortest path, the cardinality value for the determined shortest path comprises multiplying together the calculated cardinality values for each respective node along the determined shortest path.

7. The computer implemented method of claim 1, wherein programmatically determining, for each respective node along the determined shortest path, the cardinality value for that respective node comprises, for at least one respective node of the respective nodes, determining the cardinality value based on a determined uniqueness of a value of such node.

8. The computer implemented method of claim 1, wherein programmatically calculating, based on the calculated proximity in space value, the calculated proximity in time value for the determined shortest path, and the calculated cardinality value for the determined shortest path, the maliciousness value for the first node comprises multiplying together the calculated proximity in space value, the calculated proximity in time value for the determined shortest path, and the calculated cardinality value for the determined shortest path.

9. The computer implemented method of claim 1, wherein programmatically calculating, based on the calculated proximity in space value, the calculated proximity in time value for the determined shortest path, and the calculated cardinality value for the determined shortest path, a maliciousness value for the first node comprises calculating a weighted average of the calculated proximity in space value, the calculated proximity in time value for the determined shortest path, and the calculated cardinality value for the determined shortest path.

10. The computer implemented method of claim 1, wherein programmatically determining a maliciousness value for a first node for which data is stored in the dimensional graph database is performed utilizing one or more computer processors of one of the one or more electronic devices.

11. One or more non-transitory computer readable media containing computer executable instructions configured for performance of a computer implemented method providing a technical solution to the technical problem of detecting and preventing malicious activity in a computer network, the technical solution involving programmatic performance, based on a calculated metric indicating a likelihood of association with a known malicious actor, of an action by a computer system designed to ensure security of the computer system, the method comprising:

(a) gathering, via one or more electronic devices configured to act as sensor devices, network information for one or more computer networks;

(b) storing, in a dimensional graph database, data based on the information gathered for the one or more computer networks, the stored data comprising data regarding a plurality of nodes, including, for each node,
   (i) an indication of a node type for that node,
   (ii) an indication of a node value for that node, and
   (iii) an indication of one or more links from that node to one or more other nodes, including, for each link, an indication of one or more time intervals associated with that link,
   (iv) wherein one or more of the nodes includes a tag indicating that it is known to be associated with a malicious actor;

(c) programmatically determining a maliciousness value for a first node for which data is stored in the dimensional graph database, such programmatic determination comprising
   (i) programmatically determining a shortest path from the first node to any of the nodes which includes a tag indicating that it is known to be associated with a malicious actor,
   (ii) programmatically calculating a proximity in space value for the first node which is inversely proportional to a distance of the determined shortest path,
   (iii) programmatically calculating, for each respective link forming part of the determined shortest path, a respective proximity in time value for that respective link based on the one or more time intervals associated with that respective link,
   (iv) programmatically calculating, based on the calculated respective proximity in time values for each respective link forming part of the determined shortest path, a proximity in time value for the determined shortest path,
   (v) programmatically determining, for each respective node along the determined shortest path, a cardinality value for that respective node, wherein such determining comprises, for at least one respective node of the respective nodes, determining a connectedness value indicating a number of links to such node and calculating a cardinality value based at least in part on such determined connectedness value that is inversely proportional to such determined connectedness value,
   (vi) programmatically calculating, based on the calculated respective cardinality values for each respective node along the determined shortest path, a cardinality value for the determined shortest path, and
   (vii) programmatically calculating, based on the calculated proximity in space value, the calculated proximity in time value for the determined shortest path, and the calculated cardinality value for the determined shortest path, a maliciousness value for the first node;

(d) programmatically comparing the determined maliciousness value for the first node to a threshold value;

(e) blocking, based on the programmatic comparison of the determined maliciousness value for the first node with the threshold value, one or more network communications with an electronic device determined to be associated with the first node.

12. The one or more non-transitory computer readable media of claim 11, wherein programmatically determining the shortest path from the first node to any of the nodes which includes a tag indicating that it is known to be associated with a malicious actor comprises programmatically determining the shortest path utilizing a breadth first traversal approach.

13. The one or more non-transitory computer readable media of claim 11, wherein programmatically determining the shortest path from the first node to any of the nodes which includes a tag indicating that it is known to be associated with a malicious actor comprises programmatically determining the shortest path utilizing Dijkstra's algorithm.

14. The one or more non-transitory computer readable media of claim 11, wherein programmatically calculating, for each respective link forming part of the determined shortest path, the respective proximity in time value for that respective link based on the one or more time intervals associated with that respective link comprises utilizing an m value which impacts how quickly or slowly a proximity in time value degrades over time.

15. The one or more non-transitory computer readable media of claim 11, wherein programmatically calculating, based on the calculated respective proximity in time values for each respective link forming part of the determined shortest path, the proximity in time value for the determined shortest path comprises multiplying together the calculated proximity in time values for each respective link.

16. The one or more non-transitory computer readable media of claim 11, wherein programmatically calculating, based on the calculated respective cardinality values for each respective node along the determined shortest path, the cardinality value for the determined shortest path comprises multiplying together the calculated cardinality values for each respective node along the determined shortest path.

17. The one or more non-transitory computer readable media of claim 11, wherein programmatically determining, for each respective node along the determined shortest path, the cardinality value for that respective node comprises, for at least one respective node of the respective nodes, determining the cardinality value based on a determined uniqueness of a value of such node.

18. The one or more non-transitory computer readable media of claim 11, wherein programmatically calculating, based on the calculated proximity in space value, the calculated proximity in time value for the determined shortest path, and the calculated cardinality value for the determined shortest path, the maliciousness value for the first node comprises multiplying together the calculated proximity in space value, the calculated proximity in time value for the determined shortest path, and the calculated cardinality value for the determined shortest path.

19. The one or more non-transitory computer readable media of claim 11, wherein programmatically calculating, based on the calculated proximity in space value, the calculated proximity in time value for the determined shortest path, and the calculated cardinality value for the determined shortest path, a maliciousness value for the first node comprises calculating a weighted average of the calculated proximity in space value, the calculated proximity in time value for the determined shortest path, and the calculated cardinality value for the determined shortest path.

20. A computer implemented method providing a technical solution to the technical problem of detecting malicious activity in a computer network, the technical solution involving programmatically identifying, based on a calculated metric indicating a likelihood of association with a known malicious actor, a device on a network that represents a potential threat, the method comprising:
  (a) gathering, via one or more electronic devices configured to act as sensor devices, network information for one or more computer networks;
  (b) storing, in a dimensional graph database, data based on the information gathered for the one or more computer networks, the stored data comprising data regarding a plurality of nodes, including, for each node,
    (i) an indication of a node type for that node,
    (ii) an indication of a node value for that node, and
    (iii) an indication of one or more links from that node to one or more other nodes, including, for each link, an indication of one or more time intervals associated with that link,
    (iv) wherein one or more of the nodes includes a tag indicating that it is known to be associated with a malicious actor;
  (c) programmatically determining a maliciousness value for a first node for which data is stored in the dimensional graph database, such programmatic determination comprising
    (i) programmatically determining a shortest path from the first node to any of the nodes which includes a tag indicating that it is known to be associated with a malicious actor,
    (ii) programmatically calculating a proximity in space value for the first node which is inversely proportional to a distance of the determined shortest path,
    (iii) programmatically calculating, for each respective link forming part of the determined shortest path, a respective proximity in time value for that respective link based on the one or more time intervals associated with that respective link,
    (iv) programmatically calculating, based on the calculated respective proximity in time values for each respective link forming part of the determined shortest path, a proximity in time value for the determined shortest path,
    (v) programmatically determining, for each respective node along the determined shortest path, a cardinality value for that respective node, wherein such determining comprises, for at least one respective node of the respective nodes, determining a connectedness value indicating a number of links to such node and calculating a cardinality value based at least in part on such determined connectedness value that is inversely proportional to such determined connectedness value,
    (vi) programmatically calculating, based on the calculated respective cardinality values for each respective node along the determined shortest path, a cardinality value for the determined shortest path, and
    (vii) programmatically calculating, based on the calculated proximity in space value, the calculated proximity in time value for the determined shortest path, and the calculated cardinality value for the determined shortest path, a maliciousness value for the first node;
  (e) programmatically identifying, based on the determined maliciousness value for the first node, an electronic device determined to be associated with the first node as a potential threat.

* * * * *